(12) United States Patent
Radecker et al.

(10) Patent No.: US 7,969,754 B2
(45) Date of Patent: *Jun. 28, 2011

(54) CONTROL CIRCUIT FOR A SWITCH UNIT OF A CLOCKED POWER SUPPLY CIRCUIT, AND RESONANCE CONVERTER

(75) Inventors: Matthias Radecker, Duisburg (DE); Fabio Bisogno, Sankt Augustin (DE); Michael Herfurth, Gilching (DE)

(73) Assignees: Infineon Technologies AG, Munich (DE); Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/579,254

(22) Filed: Oct. 14, 2009

(65) Prior Publication Data

US 2010/0135049 A1 Jun. 3, 2010

Related U.S. Application Data

(62) Division of application No. 11/383,979, filed on May 18, 2006, now Pat. No. 7,746,671.

(30) Foreign Application Priority Data

May 23, 2005 (DE) .......................... 10 2005 023 686
May 16, 2006 (DE) .......................... 10 2006 022 845

(51) Int. Cl.
*H02M 3/335* (2006.01)
*G05F 1/613* (2006.01)
(52) U.S. Cl. .................... 363/21.03; 363/132; 323/244; 323/246

(58) Field of Classification Search .................... 363/17, 363/21.02, 21.03, 97, 98, 131, 132; 323/247, 323/248, 284, 285, 288, 351; 310/318
See application file for complete search history.

(56) References Cited

U.S. PATENT DOCUMENTS 3,880,572 A   4/1975   Haugsjaa et al.
(Continued)

FOREIGN PATENT DOCUMENTS

DE   69604896   12/1996
(Continued)

OTHER PUBLICATIONS

Yin, et al.; "Digital Controller Design for Electronic Ballasts with Phase Control"; Sep. 7, 2004; IEEE Transactions on Power Electronics.

(Continued)

*Primary Examiner* — Jessica Han
(74) *Attorney, Agent, or Firm* — Michael A. Glenn; Glenn Patent Group

(57) ABSTRACT

A control circuit for a switch unit of a clocked power supply receives an auxiliary signal from a resonant transformer driven by the switch unit and detects reference crossing moments when the auxiliary signal crosses a reference value. A driver is controllable to switch the switch unit, and a synchronization circuit synchronizes a turn-on of the switch unit within a predetermined time interval around a zero crossing of a voltage present across the switch unit, or of a current flowing through the switch unit. The synchronization circuit receives information about the reference crossing moments and provides a turn-on signal to the driver with a fixed phase delay at the reference crossing moments, so as to define turn-on moments at which the driver is to turn on the switch unit.

14 Claims, 38 Drawing Sheets

U.S. PATENT DOCUMENTS

| | | | |
|---|---|---|---|
| 4,631,652 A * | 12/1986 | Wendt | 363/16 |
| 5,065,067 A | 11/1991 | Todd et al. | |
| 5,495,136 A | 2/1996 | Chiang et al. | |
| 5,546,294 A | 8/1996 | Schutten et al. | |
| 5,854,543 A | 12/1998 | Satoh et al. | |
| 5,866,968 A | 2/1999 | Mech | |
| 6,002,214 A | 12/1999 | Ribarich | |
| 6,013,969 A | 1/2000 | Noma et al. | |
| 6,087,787 A | 7/2000 | Williams | |
| 6,144,139 A | 11/2000 | Noma et al. | |
| 6,239,558 B1 | 5/2001 | Fujimura et al. | |
| 6,281,637 B1 | 8/2001 | Asada | |
| 6,348,755 B1 | 2/2002 | Shimamura et al. | |
| 6,433,465 B1 | 8/2002 | McKnight et al. | |
| 6,591,524 B1 | 7/2003 | Lewis et al. | |
| 6,747,421 B2 | 6/2004 | Kohn | |
| 6,853,150 B2 | 2/2005 | Clauberg et al. | |
| 6,914,365 B1 | 7/2005 | Chou et al. | |
| 6,930,893 B2 * | 8/2005 | Vinciarelli | 363/17 |
| 7,019,993 B2 | 3/2006 | Vazquez | |
| 7,049,760 B2 | 5/2006 | Dowe | |
| 7,218,533 B2 | 5/2007 | Radecker et al. | |
| 7,746,671 B2 * | 6/2010 | Radecker et al. | 363/21.03 |
| 2002/0024269 A1 | 2/2002 | Nakatsuka et al. | |
| 2007/0024254 A1 | 2/2007 | Radecker et al. | |

FOREIGN PATENT DOCUMENTS

| | | |
|---|---|---|
| DE | 10143016 | 9/2001 |
| EP | 0782374 | 12/1996 |
| EP | 1146630 | 10/2001 |
| JP | 09-082479 | 9/1995 |

OTHER PUBLICATIONS

Hamamura, et al.; "Piezoelectric transformer AC-DC Converter Over a Worldwide Range of Input Voltage by Combined PWM and PFM Control"; Jun. 17-21, 2001; IEEE Power Electronics Specialists Conference, vol. 1, pp. 416-421.

* cited by examiner

ASSUMPTION: $I_{L,2} = I_L$ $$I_L = \hat{I}_L \sin\omega t$$
$$I_{L\Delta\varphi z} = \hat{I}_{L\Delta\varphi}\sin(\omega t - \Delta\varphi_z)$$

CONTROL CIRCUIT FOR A SWITCH UNIT OF A CLOCKED POWER SUPPLY CIRCUIT, AND RESONANCE CONVERTER

CROSS REFERENCE TO RELATED APPLICATIONS

This application is a divisional of U.S. patent application Ser. No. 11/383,979, filed May 18, 2006 now U.S. Pat. No. 7,746,671, which claims priority from German patent application no. 102005023686.3, filed May 16, 2006, each of which are herein incorporated, in their entirety, by this reference thereto.

DESCRIPTION

The present invention generally relates to a control circuit for a switch unit of a clocked power supply circuit as well as to a resonance converter, specifically to a regulated resonance converter.

In a multitude of applications, it is required to generate an output voltage or an output current because of an input-side energy source, it typically being required to regulate the output voltage, the output current or the output power.

Solutions which are current today in terms of operating regulated power supply units are flyback converters with galvanic separation, or galvanic isolation. What is disadvantageous is the high level of power dissipation of conventional transformers which arises here, as well as the structural height of conventional electromagnetic transformers, which is several millimeters and is a factor of interference for small powers of up to about 100 Watts, but in particular up to 10 Watts. These disadvantages may be remedied by employing higher-cost planar transformers or integrated magnetic devices (so-called integrated magnetics), by means of which the structural height of such power supplies may indeed be reduced, but the efficiency factor can be influenced to a lesser extent, however, in particular with very small powers of up to 10 Watts. Common flyback converter solutions, however, are advantageous in that output voltage regulation of a precision of about 10% may be achieved by a so-called primary current regulation in that only the switch current (primary current) is observed and used for regulating the output voltage and/or the output current. Please see DE 10143016A1 for details.

A remedy having the goal of reducing the structural height and improving the efficiency factor may be provided by a resonance converter using a piezo transformer. With appropriate dimensioning, said resonance converter has a high efficiency factor of 97% to 99% and can be limited to a structural height of 1 to 5 mm in the entire power range of up to 100 Watts, whereas conventional transformers have structural heights of between 7 mm and 15 mm in this power range. Integrated magnetics may achieve smaller structural heights, for example between about 3 mm and 10 mm, but the efficiency factor of the magnetic transformers mostly does not exceed 90% for powers below 10 Watts. In addition, the technological basic expense for constructing integrated magnetics in the power range below about 50 Watts is clearly too high in comparison with a discretely structured circuit.

The mechanical dimensions of the footprint of the piezotrafo (PT) are dependent on the frequency and may be reduced to values of between 10 mm and 40 mm in the power range mentioned if an expedient frequency range is selected for such applications (e.g. 25 to 500 kHz).

If a half-bride topology or a push-pull topology is used for such a resonance converter, regulation of the output voltage mostly is possible only by feeding back the voltage via a galvanically separating optocoupler or by another galvanically separating device when a primary-action resonant circuit having oscillations is used between an input-side magnetic choke coil and the input capacitance of the piezo transformer (PT).

One has known of various solutions wherein phase shifts between a load quantity (load current) and a voltage quantity of the switch unit in resonance converters are utilized for regulating the output voltage, the output power or the output current.

U.S. Pat. No. 6,002,214 proposes to detect the voltage present across a switch unit, for example in a resonant half-bridge or bridge converter, and to compare the phase position of turning on or off, or switching on or off, this voltage with the phase position of the load alternating current. A phase difference is determined from a comparison of a zero crossing of the load current, which is detected by a sense resistor either in the switch unit or in the load circuit, and the switching signal of the switch voltage (to close or to open the switch). The phase difference is compared with a target phase and fed back, via a regulator, to a voltage-controlled oscillator (VCO) which controls the switch unit. Such a load circuit may operate with low or high Q, so that the phase difference reflects the power supplied to the load.

Mostly, however, regulation is used with low Q of the load circuit, so that the load circuit does not represent a sinusoidal current source in every case, but may also represent a different periodic alternating source. However, a disadvantage of this configuration is that even though the power present at a load fed with alternating current may be regulated via this phase shaft and/or phase difference, the load-circuit elements L and C must be known with a relatively high level of precision for a certain power to be set. If, however, the value of L is not known, the power cannot be adjusted in an exact manner.

In accordance with DE 696 04 896 T2, the phase position of the output voltage of a piezo transformer (piezoelectric converter) is compared to the phase position of its input voltage so as to set (adjust, or regulate) a predetermined value of the phase position that will guarantee optimum efficiency of the converter (luminosity of a cold cathode tube) and, at the same time, constant output power (luminosity) of the converter, which is maintained irrespective of input voltage fluctuations. However, the input voltage range is limited, and the transformation ratio, or transmission ratio, of the converter causes an upward transformation. Therefore, what needs to be detected in addition to the phase signal between input voltage and output voltage is the output current so as to maintain the output power of the load connected (cold cathode tube) at a constant level. Thus, two feedback circuits are required which also do not achieve galvanic separation between input and output.

In accordance with U.S. Pat. No. 6,013,969, a load alternating current is again detected, and the phase position thereof is compared with the voltage present at the switch unit so as to operate, via a regulator (integrator), a voltage-controlled oscillator (VCO) for controlling the switch unit (drive circuit) in a closed loop. Use is made of an input-side boost converter which causes signal matching toward the input, so that the output power is maintained at a constant level and/or so that different loads can be operated within a wide range of load resistances and input voltages. However, in addition to a phase detector, which compares the phase between a switch voltage and a load current, a rectifying circuit is also used, which resistively loads the tapping of the load (sense resistor), and which would thus corrupt the signal of the load circuit if one wanted to couple out, or extract, or tap, this phase signal from the piezo transformer itself. Therefore, one cannot achieve galvanic separation between the load and the input without using an additional optocoupler or another galvanically separating coupling circuit, which is also not required in the application set forth in the document mentioned.

Similarly, in accordance with U.S. Pat. No. 6,348,755 B1, a phase comparison between an input voltage curve of a PT and the input current curve (possibly using a load compensation circuit for correcting the phase curve of the input current of the PT by means of the load current at the output of the PT in the load) forms the signal for driving a voltage-controlled oscillator (VCO) via a low-pass filter. The output load current is detected, in addition, to generate a burst-mode pulse width modulation (burst-mode PWM), which maintains this current at a constant level. Regulating the oscillator frequency via the phase comparison servers to drive the PT in an optimum manner and at a high level of efficiency. The phase position between the input voltage and the input current of the PT is always regulated to a maximum. The pulse width modulation (PWM) has a lower frequency, and it either connects the VCO through to the output, or it switches it off so as to thus maintain the output current at a constant level on average.

In a further solution in accordance with U.S. Pat. No. 6,144,139, a phase difference between a target signal (e.g. a signal of a capacitive current as a phase-related input voltage mapping) and the current present at the input of the PT is used for driving a VCO, wherein subsequently, the duty cycle of the signal is generated via the evaluation of the output voltage by means of an error comparator. Thus, the VCO is generally driven by a phase difference between the input voltage and the input current or between the input voltage and the output current. The output voltage or the output current, on the other hand, are used to set the associated duty cycle of the driver circuit. However, by doing this, a current from the transformation network of the PT is not included in the regulation, so that a galvanic separation of this circuit without galvanically separating feedback elements is not possible, since a output quantity, or variable, is always required for regulation (frequency and duty cycle). Galvanic separation is not envisaged in the solution mentioned. As regards the galvanic separation, the same applies as with the solution in accordance with U.S. Pat. No. 6,348,755 B1.

A similar solution is shown in EP 0 782 374, wherein a phase difference between the input voltage and the output voltage serves to control a VCO, and wherein the output current sets the duty cycle via a pulse width generation. This circuit is also not suitable for galvanic separation without feeding-back elements from the output to the input.

In another solution as is shown in U.S. Pat. No. 6,239,558 B1, an alternating output current present at the load, or a current flowing through the load is detected, and the detected signal is rectified so as to operate a regulator via the comparison with a reference signal.

Another configuration of the prior art has used the detection of the load current of the load network, and has compared its phase position with the switching signal present at the switch unit, for example with the phase position of the turn-off moment, or turn-off instant (Yan Yin; Zane: "Digital Controller design for electronic ballasts with phase control", PESC 2004, Vol. 3, pp 1855ff, 20-25 Jun. 2004, Aachen, proceedings).

In addition, there are solutions for detecting the voltage present at the load, and/or of the current flowing through the load, wherein a phase difference as compared with the voltage signal present at the converter input is formed from one of these signals so as to control or to regulate the power, the voltage or the current present at the load. In accordance with U.S. Pat. No. 5,866,968, a signal which is proportional to the alternating output voltage is fed back and is compared to the phase of the switching signal of a driving VCO. Optionally, a rectified signal which is proportional to the output voltage is detected and is used for regulating the output voltage or power in addition to the fed-back phase signal.

All of these configurations have in common that only a current or a voltage of the load network is compared with a voltage quantity or a turn-on and/or turn-off quantity of the switch unit, which may be observed at the switch unit.

Thus, previous solutions have made use of a phase shift between a quantity, or variable, of the switch unit and a magnitude of the load current in the load network as a basis of regulating the load. This configuration, however, entails major disadvantages. On the one hand, in a load resonant circuit of low Q in the normal load operation, or nominal load operation, a distortion of the ohmic load current by a dynamic non-linear load (for example CCFL, FL, HID lamps) as compared with the parallel capacitive current (for example a heating circuit capacitor) renders such a regulation via such a phase shift too imprecise, so that another solution in accordance with U.S. Pat. No. 6,002,214 has often been selected instead. With light applications (fluorescent lamps), galvanic separation between the load and the source is not required in most cases, so that a feedback need not be effected via an insulating transformer. In addition, U.S. Pat. No. 6,002,214 would also be applicable with a galvanically separating transformer arranged toward the load, since what is dealt with is an alternating current load, and since a symmetrical half-bridge circuit forms the switch unit. For direct current loads connected downstream from a rectifier bridge with a buffer capacitor, this circuit might react no longer to dynamic changes to the load in such a manner that it is known, by means of the phase position determined, whether only a dynamic load current for loading the buffer capacitance flows via the rectifier, or whether the load has increased permanently. In this case, the output voltage is not so easy to regulate in a dynamic manner.

In addition, the submitted contribution for the IEEE Transactions on Power Electronics of Sep. 7, 2004 entitled "Digital Controller Design for Electronic Ballast with Phase Control" describes a transformational detection of the load current (i.e. a detection performed by a transformer). It is suggested to compare the zero crossing of this load current with the zero crossing of only the active current in the load with regard to their phase shift, and thus to set a constant level of power at the load by means of a constant phase difference thus detected. However, what is disadvantageous is that it is necessary to generate the load current from an additional device which acts as a transformer and is not already included in the load circuit.

In accordance with U.S. Pat. No. 5,866,968, in addition, a signal directly detected from the output voltage is rectified, if need be, which gives rise to a power loading at the output. Said power loading is acceptable only with upward-transforming applications so as to keep respective losses within certain limits. With downward-transforming applications, however, a loading at the auxiliary output by a resistive load or a rectification is problematic, since one would have to keep the voltage at a correspondingly low level to realize low-loss tapping. Consequently, however, the signal-to-noise ratio is too small to be able to evaluate the auxiliary signal in a reliable manner. In addition, however, the phase signal which has been coupled out from an auxiliary tapping of a piezo transformer is compared only with a phase signal of the driver circuit (turn-on moment or turn-off moment) so as to achieve a phase regulation. For this purpose, in the U.S. Pat. No. 5,866,968, an adapted phase rotation across, for example, an RC network is used so as to couple the frequency of the oscillator of the driver circuit of a piezo converter to the frequency of the piezo transformer by means of a phase linking. At the same time, however, the turn-on time is fixedly set (to about 40%) so as to achieve a zero-voltage switching (ZVS) across a sufficiently large load range. If, however, the input voltage is also changed on a large scale, the publication mentioned offers no satisfying solution. Even though a PLL function is used, the turn-on point is suboptimal in the solution presented when a load change in the broad range is added to by a major change of the input voltage. In addition, it is not possible to detect, via the phase signal of the output or of the auxiliary output which has thus been generated, whether zero-voltage switching (ZVS) is still possible, or whether, for example with a small load and a high input voltage, the relative turn-on time approaches zero, so that continuous operation is no longer possible, and so that one would have to switch to burst mode.

It is also desirable to use the phase signal of an auxiliary tapping—the phase signal being proportional to the output voltage or having a fixed mathematical relationship therewith—not only in a PLL loop for an alternating current load so as to set an approximately constant output current or a constant power, but to obtain, also at direct current loads operated by a rectifier at the output of a piezo transformer, a statement, which is independent of the input voltage, about the magnitude of the load by evaluating a suitable phase angle.

If, as is shown in U.S. Pat. No. 5,866,968, however, the moment of switching the switch unit of the converter is compared with the phase position of the output signal (for example of the output voltage), one will obtain a transformation behavior which is dependent on the input voltage and is set to a maximally transferable power and to an optimum efficiency factor of the piezo transformer. In many cases, however, the transformation behavior desired, for example in the over-resonant frequency range, is one which indeed signifies a slightly smaller efficiency factor, but does not entail any increased losses and thus enables the output voltage to be regulated by means of a frequency change without requiring, with smaller loads than the nominal load of the piezo transformer, a burst mode control, which signifies additional oscillation-buildup losses and increased buffer capacitance at the output.

In addition, one method of the load detection which is independent of the input voltage is applicable only if one can unambiguously detect the load current in the switch unit, with regard to its phase position, in its relation to the phase position of the resistive and reactive portions, respectively, of the currents and/or voltages present at the load, so that currents which are superimposed at the input side or at the load network side do not corrupt the zero crossing of the load current which is detected, for example, in the switch unit of a converter, or so that it becomes possible to unambiguously determine and correct this corruption.

In a half-bridge circuit, an input-side corruption of the load current detection in terms of its phase position is impossible whenever at least one of the switches exhibits a parallel capacitance which is shorted in the turn-on interval, and whenever the load current—in the event that such a switch is turned on—flows exclusively through this switch rather than through further parallel or serial reactive elements which are inserted in the load circuit and which otherwise would dissipate some of the load current in parallel with the switch. However, should such reactive elements be present, a correction of the phase position of the load current detected in at least one switch is necessary, so that one may infer from this the resulting phase position of the load, only part of which is detected accurately in the switch.

So far, there have been no fundamental technical solutions and suggestions for this which enable operation of various topologies of a load resonance converter using one and the same control principle.

In addition, systematic detection of further resonance networks of a resonance converter by means of a control circuit, in addition to the load resonance network, is a task which has not been solved to date, which represents its influence on the regulation and control behavior, for example when a phase difference is to be evaluated as a regulated or controlled variable. In addition, there has so far been no useful technical solution to using a load circuit at the same time for supplying the control circuit when no additional auxiliary tappings are to be provided for supplying the control power and when, at the same time, the load current is not to be corrupted by such an auxiliary current supply with regard to its detection in terms of amplitude and phase position.

Furthermore, there has so far been no technical solution to detecting a variable proportional to the output voltage, in a manner in which it is galvanically separate from the output, such that it is neither electrically connected to a potential of the output voltage nor to a potential of the input voltage at the same time, but may be evaluated at any electrical potential desired, so that the two input electrodes may be guided via a voltage supply circuit, connected upstream from the piezo transformer, for supplying the control circuit, rather than also having to be connected, for example, at the reference potential of the control circuit, which is required for evaluating this auxiliary voltage proportional to an output voltage, the detection being irrespective of whether the output voltage is a pure alternating voltage or a trapezoid or oblong alternating voltage which acts toward the load via a rectifying circuit, and the amplitude of which corresponds to the direct load voltage.

In addition, the detection of the input voltage of power-transmitting converters mostly is implemented by an ohmic resistive divider which requires two highly resistive divider resistors and thus requires an additional terminal at a control IC or an additional terminal at an analog discrete evaluation circuit. Therefore, it is desirable to detect the input voltage indirectly via other signals and variables from the switch unit or the load circuit.

In summary, it may thus be stated that galvanically separated regulation of the output voltage is achieved only at great expense in conventional voltage supply circuits.

It is thus the object of the present invention to provide a universally applicable concept for operating a resonance converter, the concept enabling reliable regulation at low expense.

This object is achieved by a control circuit for a switch unit of a clocked power supply circuit as claimed in claim 1, by a resonance converter as claimed in claim 35, by a resonance converter as claimed in claim 41 as well as by a resonance converter as claimed in claim 51.

The present invention provides a control circuit for a switch unit of a clocked power supply circuit, the switch unit being designed to effect input-side excitation of a resonant transformer arrangement. The control circuit comprises an input for receiving an auxiliary signal from a resonant transformer arrangement, the auxiliary signal exhibiting an essentially fixed phase relation to a load alternating current flowing through a resonant circuit of the transformer arrangement. The control circuit further comprises a phase detector designed to detect reference crossing moments when the auxiliary signal crosses a predefined reference value, as well as a driver controllable to switch the switch unit.

In addition, the inventive control circuit comprises a synchronization means designed to synchronize a turn-on of the switch unit by the driver with regard to a phase position with the auxiliary signal so as to achieve a turn-on of the switch unit within a predetermined time interval around a zero crossing of a voltage present across the switch unit, or of a current flowing through the switch unit. The synchronization means is designed to receive information about the reference crossing moments from the phase detector, and to provide a turn-on signal to the driver with a fixed phase delay at the reference crossing moments, so as to define turn-on moments at which the driver is to turn on the switch unit.

The inventive control circuit further comprises a detector designed to determine an amplitude information which depends on an amplitude or a mean value of the auxiliary signal. A regulator is designed to change an operating frequency in dependence on the amplitude information supplied by the detector, and to determine a period duration between turn-off moments at which the driver is to turn off the switch unit as a reciprocal of the operating frequency.

Thus, it is the core idea of the present invention that an advantageous regulation of a clocked power supply circuit may be effected using only one auxiliary signal having an essentially fixed phase relation to a load alternating current flowing through a resonant circuit of the transformer arrangement. In a respective configuration of the resonant transformer arrangement, the auxiliary signal is a measure both of the load alternating current flowing through a resonant circuit of the resonant transformer arrangement and of a voltage present at the output of the resonant transformer arrangement. This is the case, for example, if a resistive load present at an output of the resonant transformer arrangement has a clearly higher impedance than a capacitive load present at the output of the resonant transformer arrangement.

In addition, the auxiliary signal does not deviate substantially (typically by less than +/−15°), in terms of its phase, from a phase position of a current flowing through a switch in the switch unit. Thus, it may be stated that in a suitable configuration of the resonant transformer arrangement, the auxiliary signal coupled out from the resonant transformer arrangement exhibits an essentially fixed phase relation to the load alternating current flowing through a resonant circuit of the transformer arrangement, and is also a precise measure of the output voltage made available at the output of the resonant transformer arrangement. For this reason, the auxiliary signal is suited to specify and/or to regulate both the turn-on moments for the driver and the operating frequency of the control circuit. Since the auxiliary signal exhibits an essentially (i.e. except for a deviation of +/−10°) fixed phase relation to the load alternating current, and thus also exhibits an essentially fixed phase relation (for example with a deviation of +/−20° as a maximum) to the current flowing through the switch of the switch unit, a direct conclusion may be drawn from the reference crossing moments as to when the switch in the switch unit is to be activated so as to achieve a zero voltage switching (ZVS). Since, additionally, the auxiliary voltage signal is proportional to the voltage present at the output of the resonant transformer arrangement, an item of information for regulating the operating frequency may additionally result from an item of information about the amplitude of the auxiliary signal, the operating frequency determining the power transmitted by the resonant transformer arrangement, and thus also determining the voltage present at the output of the resonant transformer arrangement.

In other words, the inventive control circuit uses only one signal coupled out from the resonant transformer arrangement in order to determine both the frequency with which the switch unit is switched and the turn-on moments of the switches of the switch unit. Thus, the inventive control circuit benefits from the findings that with a suitably dimensioned resonant transformer arrangement, there is an auxiliary signal which is suitable for both purposes at the same time.

By using an inventive control circuit, the expense for implementing a resonance converter is thus considerably reduced as compared to conventional arrangements. For fully regulating the resonance converter, coupling out only one auxiliary signal from the resonant transformer arrangement is required, whereas further feedback branches may be dispensed with out any loss in terms of the levels of accuracy and efficiency required.

Thus, the present invention stands in contrast to conventional arrangements wherein various signals must be used for regulating the voltage and for specifying the turn-on moment of at least one switch in the switch unit.

The present invention further provides, in accordance with a further aspect, a resonance converter for providing an output voltage or an output current for a load network based on an energy supplied by an energy source. The resonance converter comprises a resonant transformer arrangement having an input for receiving an input-side excitation, an output for providing the output voltage or the output current for the load network, and an auxiliary output for transformationally providing an auxiliary signal, the amplitude of which is essentially proportional to a load alternating current flowing through a resonant circuit of the resonant transformer arrangement. The auxiliary signal exhibits an essentially fixed phase relation to the load alternating current flowing through the resonant circuit of the resonant transformer arrangement.

An inventive resonance converter further comprises a switch unit designed to generate the input-side excitation of the resonant transformer arrangement from the energy of the energy source, as well as a control circuit, as has been described above. The input of the control circuit is coupled to the auxiliary output of the resonant transformer arrangement, and the driver is designed to generate a control signal to switch the switch unit.

A resonance converter configured as described enables both regulating the output voltage present at the output of the resonant transformer arrangement and controlling the turn-on moments of the switch unit based on only one single auxiliary signal. One has found, specifically, that the auxiliary signal, the amplitude of which is essentially proportional to a load alternating current flowing through a resonant circuit of the resonant transformer arrangement, describes, in a good approximation, by its phase position, the phase position of a current flowing through a switch of the switch unit, and further describes, by its amplitude, the output voltage of the resonant transformer arrangement. This results from the fact that with a resonant transformer arrangement, in the proper operation, a fixed phase relation exists between the current flowing through a switch of the switch unit and the current flowing in the resonant circuit of the resonant transformer arrangement.

The absolute value of the phase shift between the current flowing through the switch of the switch unit and the load alternating current flowing through the resonant circuit of the resonant transformer arrangement is indeed dependent on the topology of the switch unit and the resonant transformer arrangement, but this does not change the fact that there is a phase relation which is essentially independent of the load condition of the resonance converter. The amplitude of the load alternating current flowing through the resonant circuit of the resonant transformer arrangement, however, is a good measure of the output voltage of the resonant transformer arrangement with a light load, since the amplitude of the load alternating current flowing through the resonant transformer arrangement characterizes well an energy content of the resonant transformer arrangement, which is reflected in the output voltage (provided that the Q of the resonant transformer arrangement is high enough and/or that the load resistance does not present too heavy a load on the output of the resonant transformer arrangement). At the same time, the amplitude of the load alternating current is a good measure of the output current of the resonant transformer arrangement in the event of an overload and a short circuit.

Thus, the inventive resonance converter exhibits the same advantages as the control circuit described, i.e. it enables a clearly simplified topology wherein only one feedback signal is required.

In accordance with a further aspect, the present invention includes a resonance converter for providing an output voltage or an output current for a load network based on an energy supplied by an energy source, the resonance converter comprising a resonant transformer arrangement having an input for receiving an input-side excitation, an output for providing the output voltage or the output current for the load network, and an auxiliary output for transformationally providing a signal which is essentially proportional to the output voltage or to the output current provided by the resonant transformer arrangement. In this case, the resonance converter comprises a switch unit designed to generate the input-side excitation of the resonant transformer arrangement from the energy of the energy source, the switch unit comprising a switch.

The respective resonance converter further comprises a control circuit designed to set or to regulate a frequency, with which the switch unit is switched, in dependence on a phase shift between a current flowing through the switch or a current flowing from the switch unit to the input of the resonant transformer arrangement, on the one hand, and on the signal present at the auxiliary output, on the other hand.

It is the core idea of the present invention that a regulation of the operating frequency may result from the phase position of a transformationally coupled-out signal which is essentially (i.e., for example, with a non-linear deviation of less than +/−20%) proportional to the output voltage or to the output current. In other words, it has been found that with a resonant transformer arrangement, a transformationally coupled-out auxiliary signal which enables a galvanically separated feedback exhibits a phase position which is suitable for reliably regulating the operating frequency.

Thus, the inventive resonance converter in accordance with the second aspect of the present invention enables regulation of the resonance converter, wherein galvanic separation of the feedback is enabled both from the input and from the output of the resonance converter. It has been found that the resonant transformer arrangement may advantageously be provided with a transformationally coupled auxiliary output enabling full regulation. It is thus not required to provide a tap at the output of the resonant transformer arrangement or at the load network connected to the resonant transformer arrangement. Due to the architecture mentioned, the necessity to use additional galvanically separating elements such as, for example, optocouplers, beside the resonant transformer arrangement is thus dispensed with.

In accordance with a further aspect of the present invention, a resonance converter for providing an output voltage or an output current for a load network based on an energy provided by an energy source comprises a resonant transformer arrangement having an input for receiving an input-side excitation, an output for providing the output voltage or the output current, and an auxiliary output for transformationally providing an auxiliary signal, the amplitude of which is essentially proportional to the output voltage provided by the resonant transformer arrangement, the amplitude of which is essentially proportional to the output current provided by the resonant transformer arrangement, or the amplitude of which is essentially proportional to a load alternating current flowing through a resonant circuit of the resonant transformer arrangement. In accordance with the third aspect of the present invention, the resonance converter comprises a switch unit designed to generate the input-side excitation of the resonant transformer arrangement from the energy of the energy source, and a regulator circuit.

The regulator circuit comprises a comparator adapted to receive the auxiliary signal, to compare it with a predefined reference value and to provide comparison information indicating whether the auxiliary signal is larger or smaller than the reference value. The regulator circuit further comprises a switching detection means designed to detect whether the comparison information changes its state within a predefined time interval. The regulator circuit is further designed to change an operating frequency, the period duration of which determines time intervals between turn-on moments or turn-off moments of the switch unit, from a resonant frequency of the resonant transformer arrangement when the detection means detects that the comparison information has changed its state within the predefined time interval, and to change the operating frequency toward the resonant frequency when the detection means detects that the comparison information has not changed its state within the predefined time interval.

It is thus the core idea of the third aspect of the present invention that a particularly simple regulation of the operating frequency may be effected in that the auxiliary signal is compared with a predefined reference value, and that, in addition, the operating frequency is changed depending on whether the comparator switches or does not switch. Switching of the comparator indicates that the signal present at the auxiliary output crosses the predefined reference value, i.e. that the signal present at the auxiliary output is at least temporarily larger than the reference value. If, consequently, a switching of the comparator, and/or a change of state of the comparative information occurs within the predefined time interval, the regulator will change the operating frequency away from the resonant frequency of the resonant transformer arrangement, so that the power transmitted by the resonant transformer arrangement will decrease. Conversely, the regulator will change the operating frequency to the opposite direction if no switching of the comparator occurs within the predefined time interval, i.e. if the comparative information has not changed its state.

The present invention thus defines a particularly simple type of two-point regulation, wherein only two states (increasing the operating frequency, decreasing the operating frequency) will occur. Processing of analog signals is required only up to the input of the comparator, whereas, on the other hand, only digital signals need to be processed from the output of the comparator onward. A time constant of the regulation may be specified in a particularly simple manner by selecting the predefined time interval. Overall, there is thus a regulation which, apart from the comparator, can be implemented in a simple and low-cost manner with purely digital circuit technology, wherein a time constant is implemented by a switching detection means which takes into account a specific predefined time interval.

Particular configurations of the present invention are further defined by the dependent patent claims and constitute particular configurations of the above-mentioned fundamental configurations.

Preferred embodiments of the present invention will be explained below in more detail with reference to the accompanying figures, wherein.

Figure 16A:
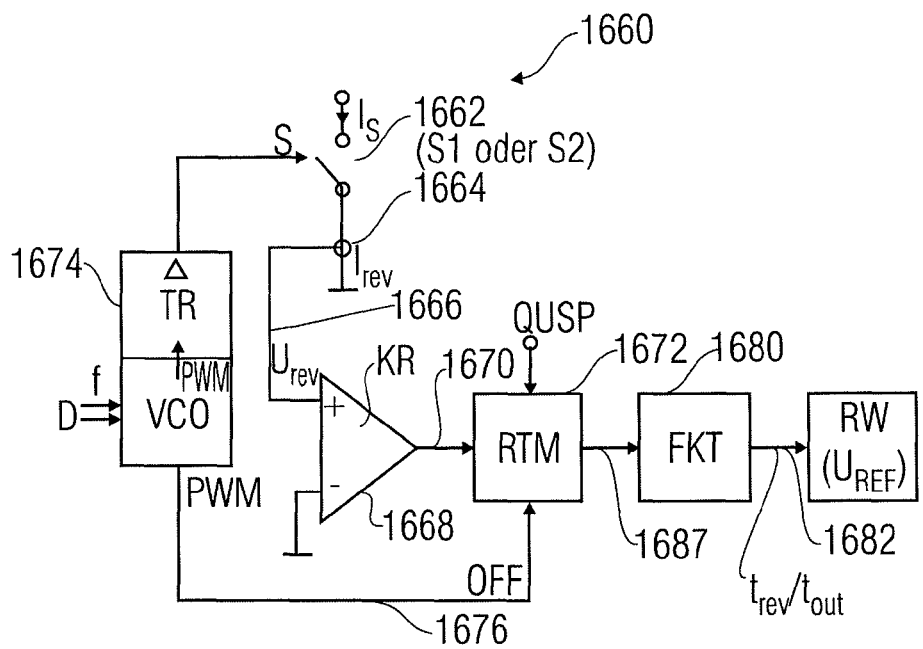
FIG. 16A is a block diagram of an inventive circuitry for generating a reference value in dependence on a current flow through a switch of a switch unit, and on the input voltage of a converter means including the switch unit.
Figure 16B:
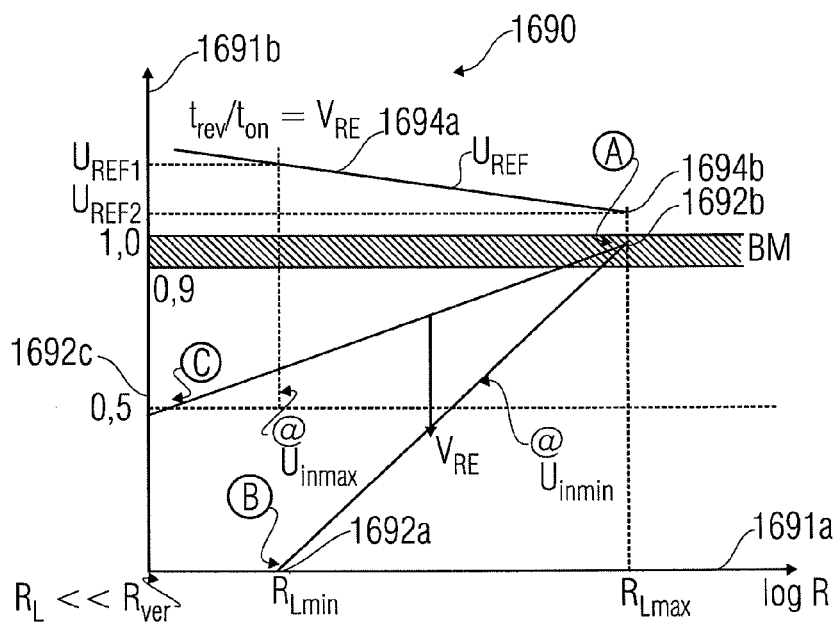
FIG. 16B is a graphical representation of a connection between a load resistance in a load network, a reverse-time/forward-time ratio, and a reference voltage.
Figure 16C:
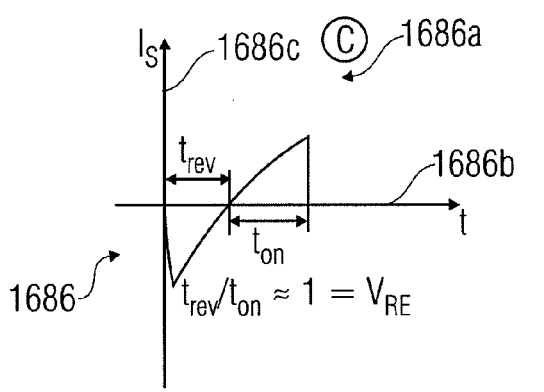
FIGS. 16C, 16D and 16E are graphical representations of current curves flowing through a switch of the switch unit for various reverse-time/forward-time ratios.
Figure 16D:
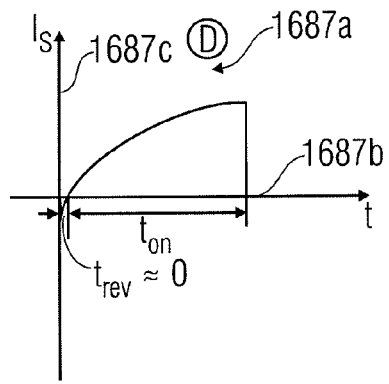
Figure 16E:
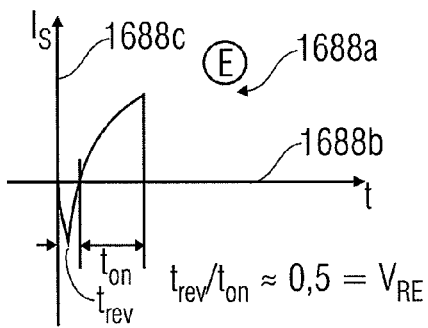
Figure 16F:
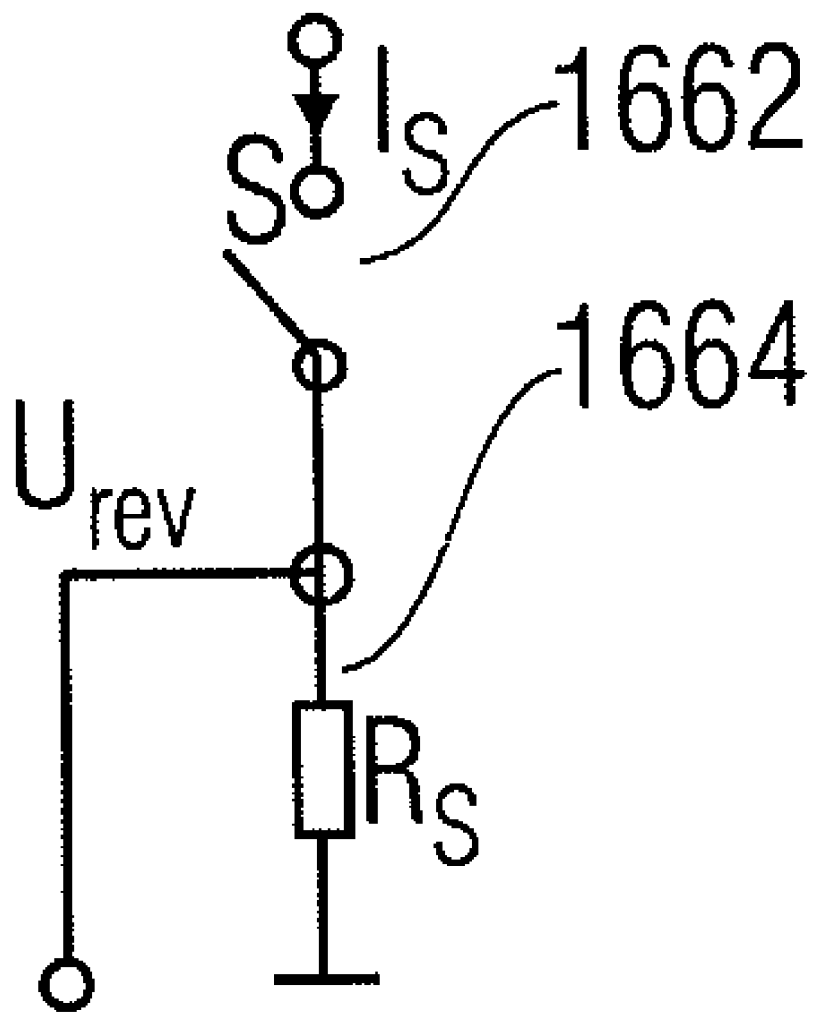
FIG. 16F is a circuit diagram of a possible circuitry for dissipating a voltage which is proportional to the current flowing through the switch of the switch unit.
Figure 16G:
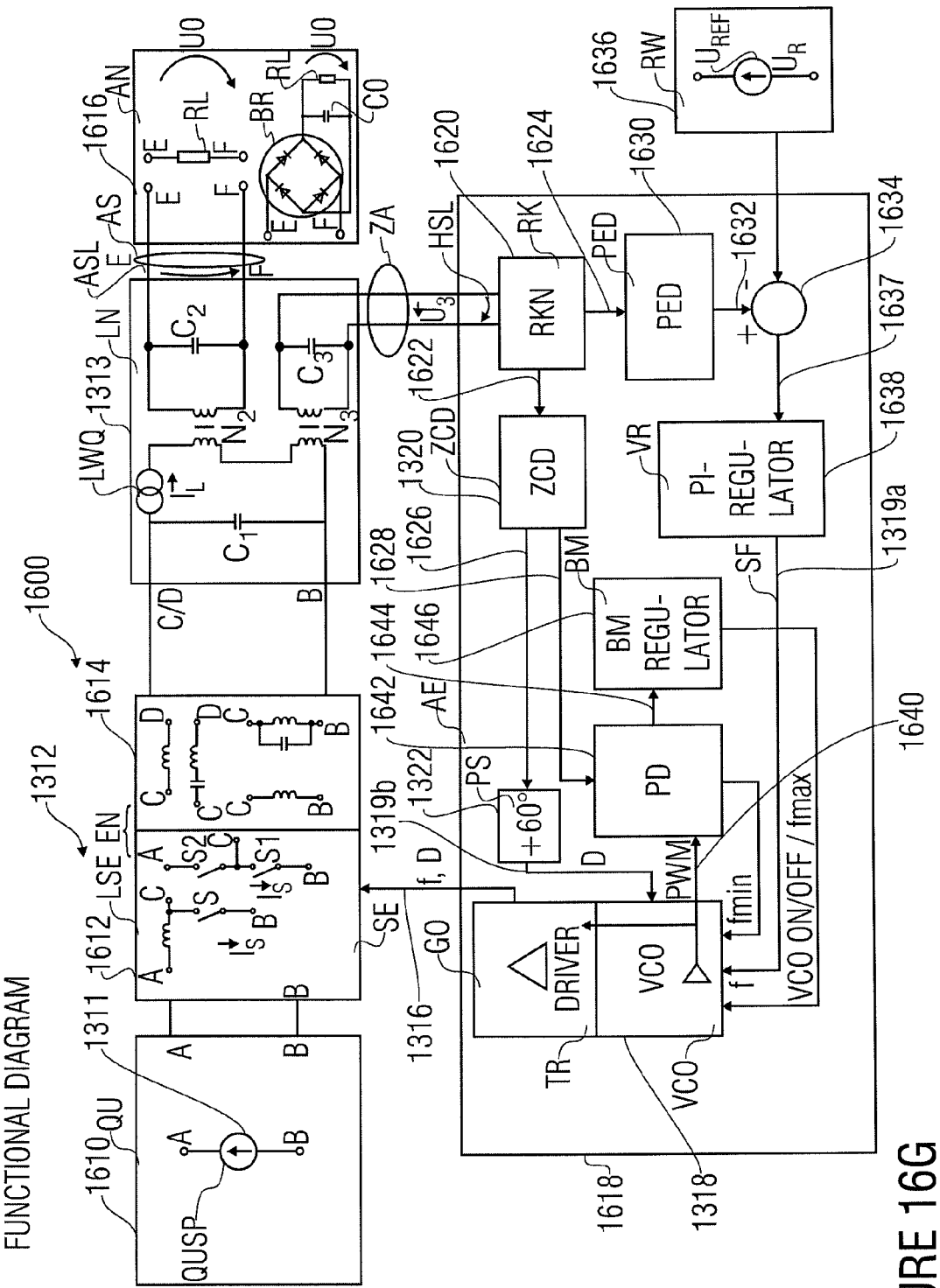
FIG. 16G is a block diagram of an inventive resonance converter with a control circuit for specifying the frequency and turn-on time of a control signal for a switch unit on the basis of an auxiliary signal of a serially coupled-out auxiliary output of the resonant transformer arrangement.
Figure 18:
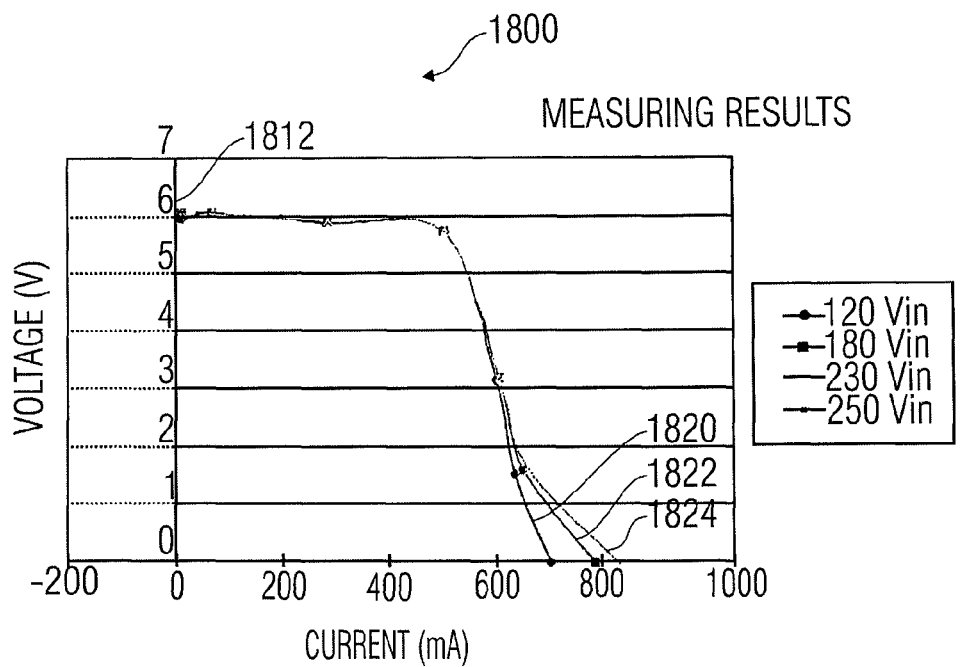
Figure 19:
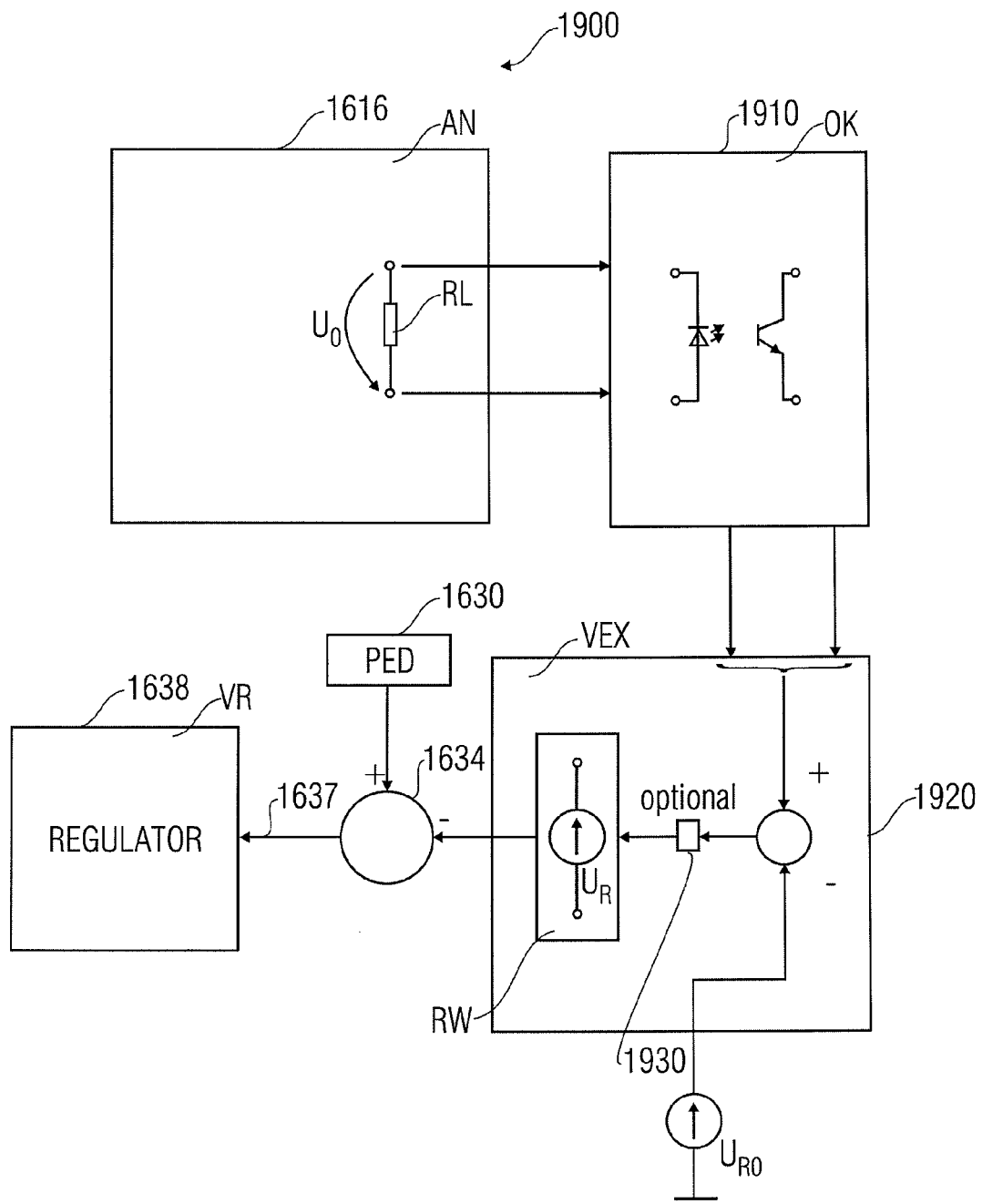
Figure 20:
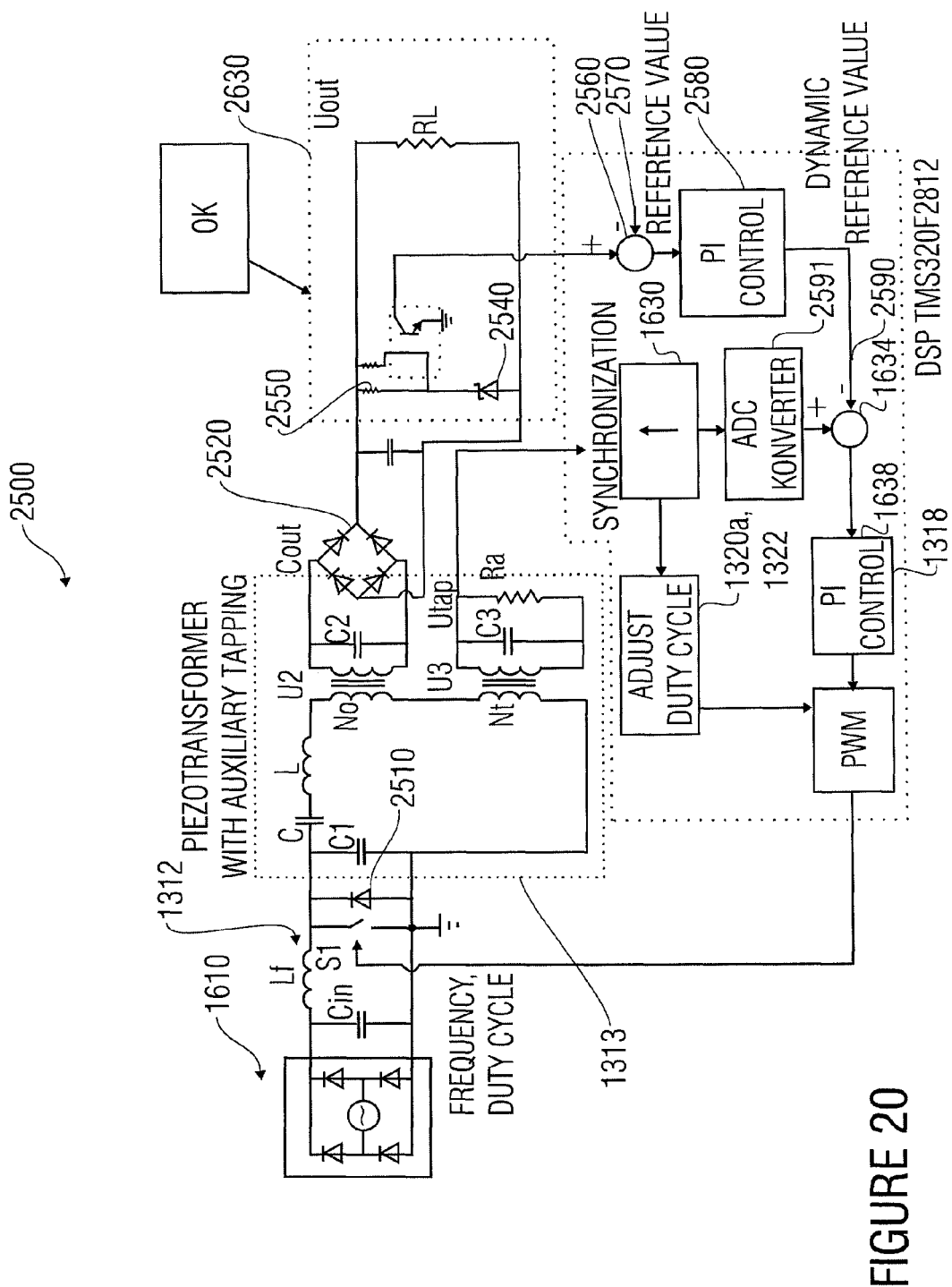
Figure 21A:
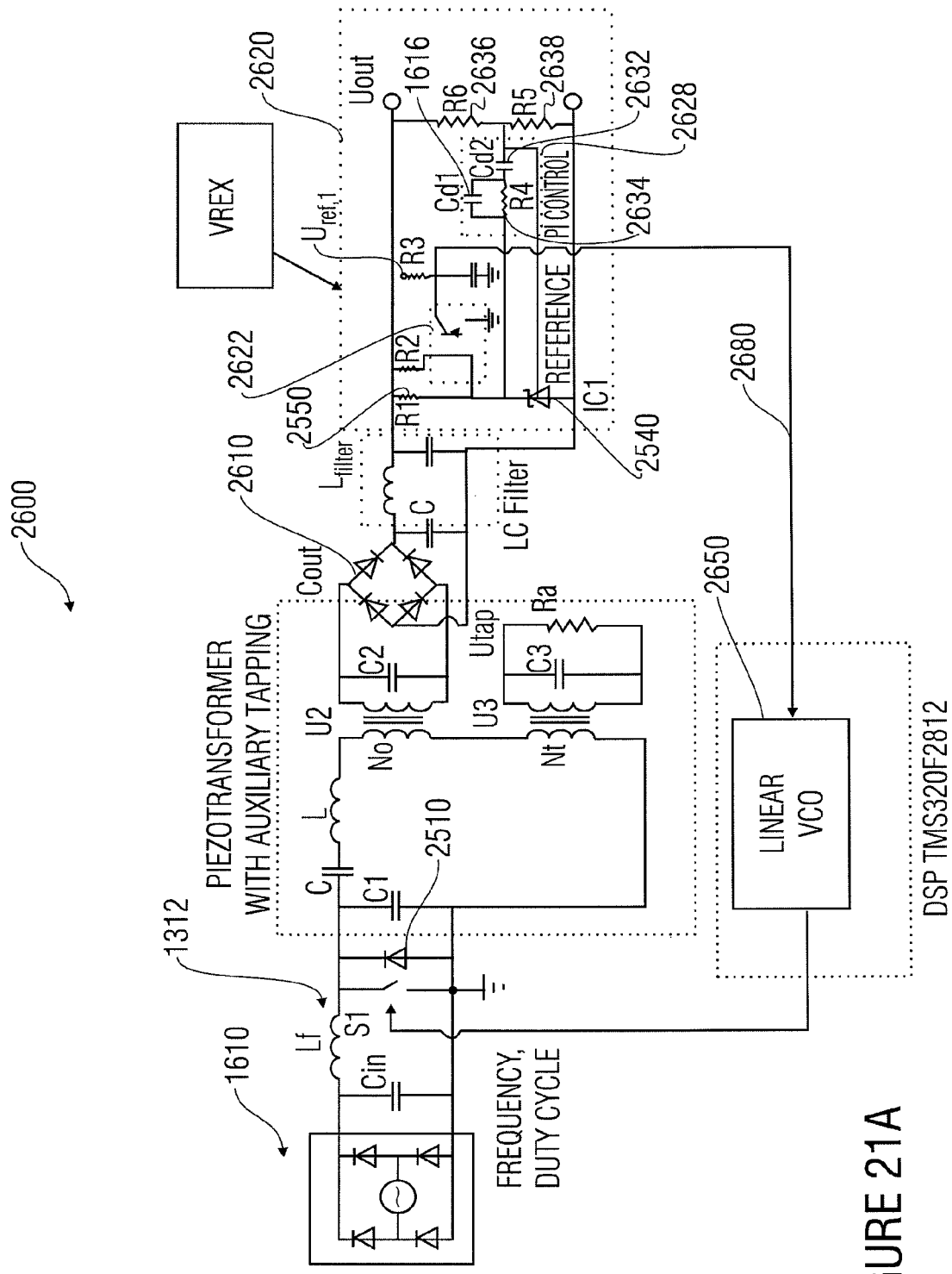
Figure 21B:
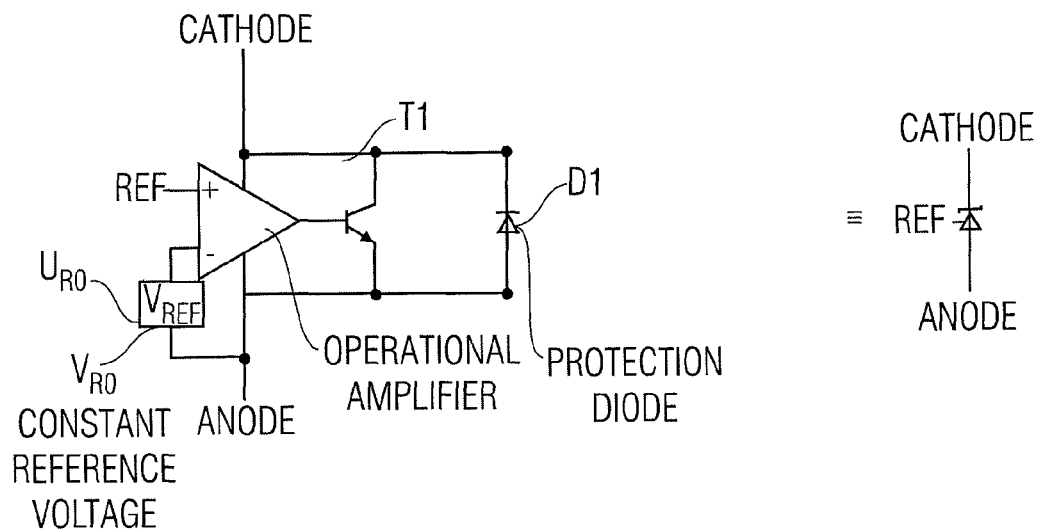
Figure 22:
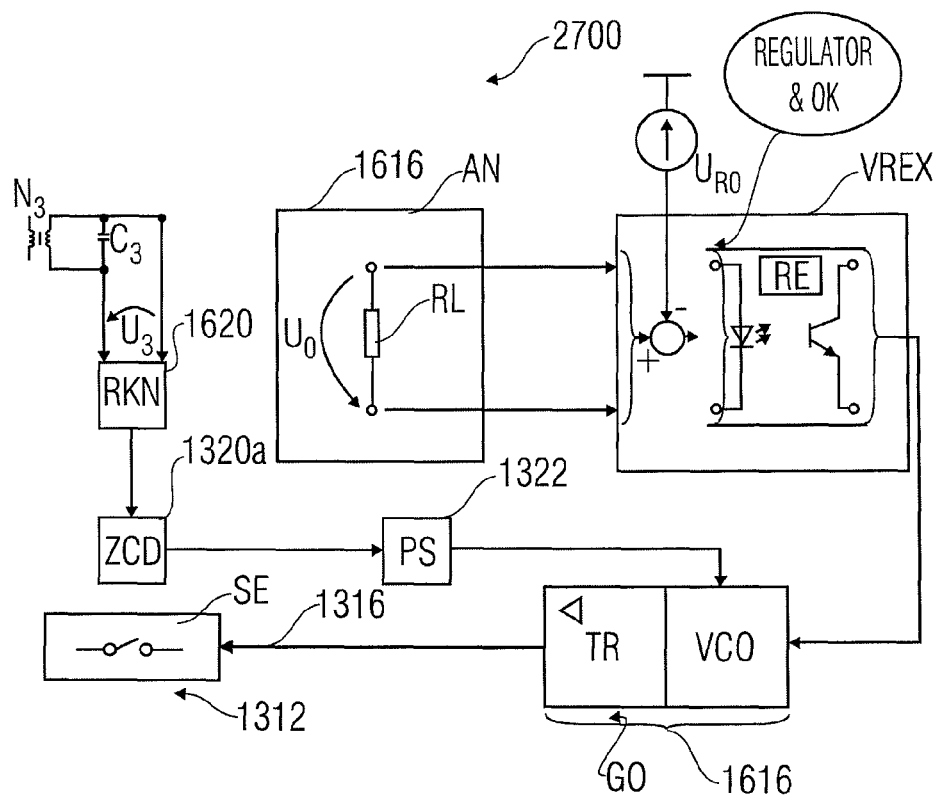

FIG. 18 is a graphical representation of measuring results in a circuitry with an auxiliary tapping ZA according to FIG. 16G for synchronizing the turn-on moment and for regulating by means of a peak detector PED (1630) and a comparator (1634) when generating a variable reference $U_R$ in block RW (1636) according to FIG. 16G and FIG. 19, by means of an optocoupler OK for feeding back the output voltage to a further external comparative means VEX for generating the above-mentioned variable reference UR for regulating a constant output voltage $U_O$ with a small load up to full load, and for regulating an approximately constant output current flowing through the load RL in the event of overload and short circuit by limiting the reference $U_R$ to a constant maximum value;

FIG. 19 is a block diagram of an inventive resonance converter having a means for setting a reference voltage UR in dependence on an output-side current variable or voltage variable fed back by an optocoupler;

FIG. 20 is a block diagram of an inventive configuration according to FIG. 19 and FIG. 16G as well in accordance with claim 52;

FIG. 21A is a block diagram of an inventive configuration according to FIG. 22 as well as in accordance with claims 53 and/or 54;

FIG. 21B is an electric equivalent circuit diagram of reference 2540; and

FIG. 22 is a block diagram of an inventive circuitry having a means for feeding back an output voltage via an optocoupler.

To facilitate understanding of the present invention, various circuitries will be described below which enable generation of input-side excitation of a resonant transformer arrangement. The circuitries mentioned do indeed form part of the prior art, but it has turned out that they exhibit particular advantages specifically in connection with the inventive control concept, or regulation concept. All circuitries described using FIGS. 1B, 1C, 1D, 2A, 2B, 2C, and 2D may therefore form an input network of the circuitries according to FIGS. 2F, 2G, 3G, 3H, 3I, 5, 6, 9, 12, 13B, 14, 16G.

Figure 1A:
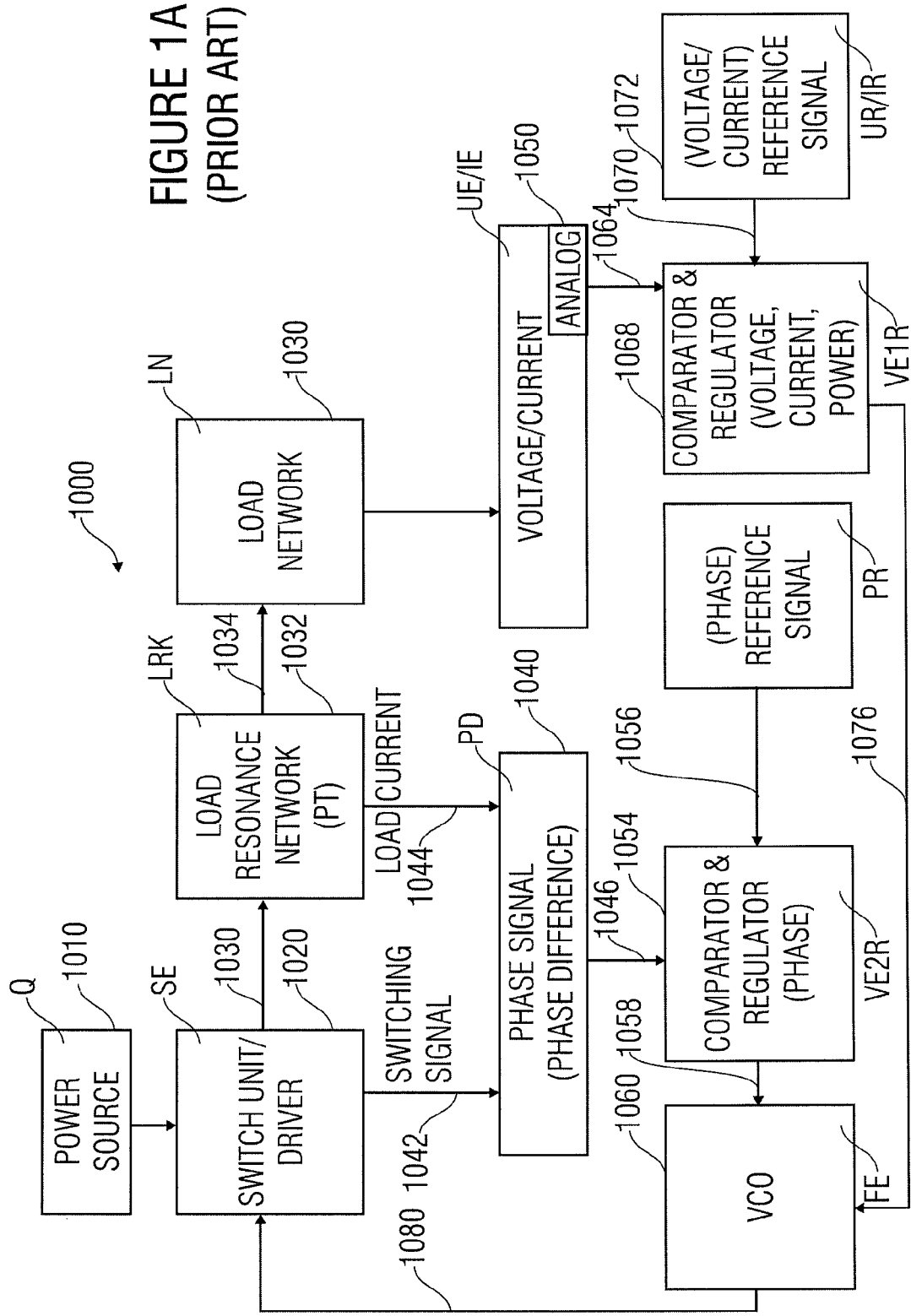
FIG. 1A is a block diagram of resonance converter in accordance with the prior art.
Figure 1B:
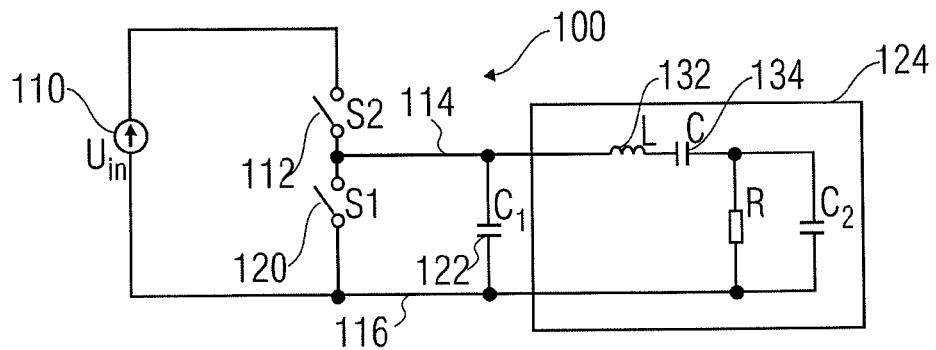
FIG. 1B is a circuit diagram of a half-bridge converter for generating input-side excitation of a resonant transformer arrangement in accordance with the prior art.

For example, FIG. 1B depicts a circuit diagram of a half-bridge circuit for generating input-side excitation for a resonant transformer arrangement.

The circuitry of FIG. 1B is designated by 100 in its entirety. Circuitry 100 includes a voltage source 110, the first terminal of which is coupled to a first input node 114 of the resonant transformer arrangement via a switch 112 (S2). A second terminal of voltage source 110 is coupled to a second input node 116 of the resonant transformer arrangement. A second switch 120, a first capacitance 122 as well as an input of the resonant transformer arrangement are connected in parallel between the first input node 114 and the second input node 116. The resonant transformer arrangement is designated by 124 in its entirety, the resonant transformer arrangement 124 being represented by an equivalent circuit diagram. Thus, the input of resonant transformer arrangement 124 forms, in connection with first capacitance 122, a resonant arrangement which is excited by the two switches 112, 120. It is to be assumed that both switches 112, 120 are switched in push-pull mode, so that at any given moment, maximally one of the two switches 112, 120 is turned on, respectively.

In addition, it is to be noted here that the two switches 112, 120 may be regarded as parts of a switch unit. First capacitance 122 may also be regarded as being part of the switch unit or of an input network, as the case may be. It shall also be noted that the input of the resonant transformer arrangement forms, e.g., a resonant circuit represented by an inductance 132 and a capacitance 134 in FIG. 1B.

Further, the external capacitance 122 is typically not associated with the resonant circuit.

Figure 1C:
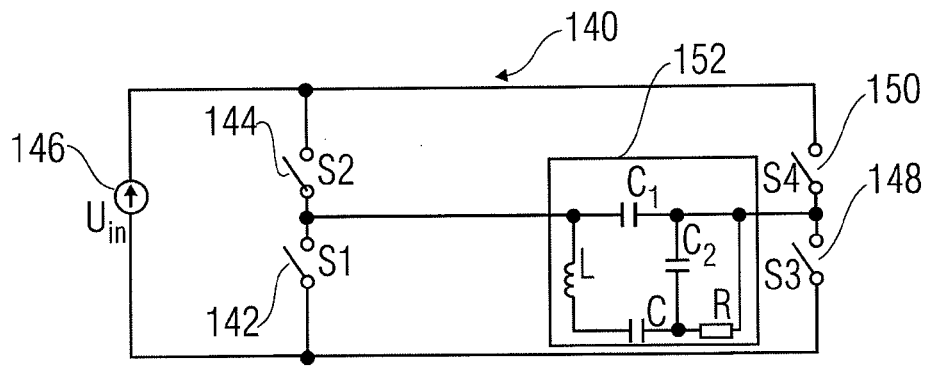
FIG. 1C is a circuit diagram of a full-bridge converter for generating input-side excitation of a resonant transformer arrangement in accordance with the prior art.

FIG. 1C shows a further embodiment of a circuitry for generating input-side excitation for a resonant transformer arrangement. The circuitry according to FIG. 1C is designated by 140 in its entirety. In circuitry 140, a first switch 142 and a second switch 144 are connected in series between two terminals of a voltage source 146. In addition, a third switch 148 and a fourth switch 150 are also connected in series between the two terminals of voltage source 146, as is depicted in FIG. 1C. A first central terminal between first switch 142 and second switch 144 is further coupled to a first input terminal of a resonant transformer arrangement 152. A second central terminal between third switch 148 and fourth switch 150 is further coupled to a second input terminal of resonant transformer arrangement 152. Resonant transformer arrangement 152, again, is represented by an equivalent circuit diagram.

In addition, with the circuitry shown, it is assumed that in a first phase, first switch 142 and third switch 150 are turned on at the same time, and that in a second phase, second switch 144 and third switch 148 are turned on at the same time. It is also assumed that first switch 142 and second switch 144 are not turned on simultaneously at any time, and that, also, third switch 148 and fourth switch 150 are never turned on simultaneously at any time.

Moreover, it shall be noted that switches 142, 144, 148, 150 together form a switch unit which is controlled, for example, by a single control signal and/or by two control signals opposite in phase. In other words, circuitry 140 forms a full bridge for generating input-side excitation for resonant transformer arrangement 152.

Figure 1D:
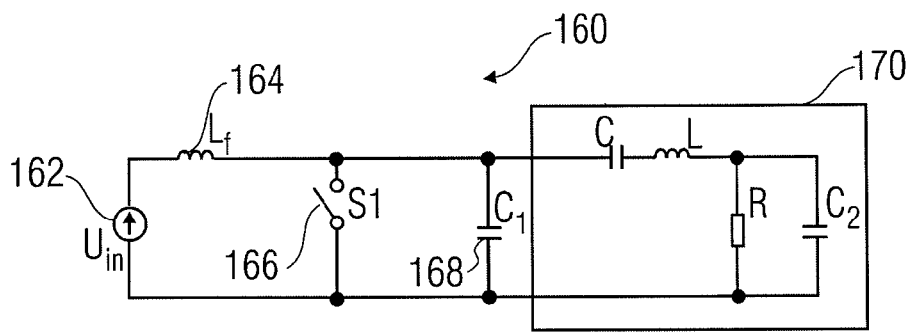
FIG. 1D is a circuit diagram of a class-E converter for generating input-side excitation of a resonant transformer arrangement in accordance with the prior art.

FIG. 1D shows a further, particularly advantageous circuitry for generating input-side excitation for a resonant transformer arrangement. The circuitry of FIG. 1D is designated by 160 in its entirety, and it forms a class-E converter. A first terminal of a voltage source 162 is coupled to a first terminal of a switch 166 via an inductance 164. A second terminal of switch 166 is further coupled to a second terminal of voltage source 162. The first terminal of switch 166 is further coupled to a first terminal of a capacitance 168 as well as to a first input-side terminal of a resonant transformer arrangement 170. The second terminal of switch 166 is further coupled to a second terminal of capacitance 168 as well as to a second input-side terminal of resonant transformer arrangement 170. Resonant transformer arrangement 170, again, is represented by an equivalent circuit diagram.

It shall further be noted that a common feature of circuits 100, 140, 160 according to FIGS. 1B, 1C, 1D is that a phase relation between switching the respective switches 112, 120; 142, 144, 148, 150; 166 and a current flowing in a resonant circuit of the resonant transformer arrangement (for example, formed from inductance L and capacitance C) may be determined by a circuit analysis.

Figure 2A:
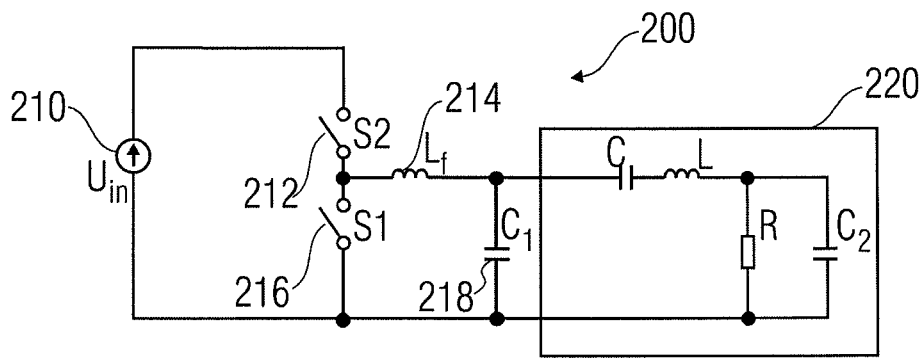
FIG. 2A is a circuit diagram of a half-bridge converter with an inductance, which is serial to the load network, for generating input-side excitation of a resonant transformer arrangement in accordance with the prior art.

As an alternative to the circuitries shown using FIGS. 1B, 1C and 1D, use may also be made, for example, of circuitries according to FIG. 2A, 2B, 2C, or 2D. For example, FIG. 2A depicts a circuit diagram of a circuitry for generating input-side excitation of a resonant transformer arrangement using inductance which is serial to a load network. The circuitry according to FIG. 2A is designated by 200 in its entirety. A first terminal of a voltage source 210 is connected to a first terminal of an inductance 214 via a switch 212. A second terminal of voltage source 210 is further connected to the first terminal of inductance 214 via a second switch 216. A second terminal of inductance 214 is further coupled to the second terminal of voltage source 210 via a capacitance 218.

In addition, the second terminal of inductance 214 is coupled to a first input-side terminal of a resonant transformer arrangement 220. The second terminal of capacitance 218 and/or the second terminal of voltage source 210 is further coupled to a second input-side terminal of resonant transformer arrangement 220. Thus, circuitry 200 forms a half-bridge converter having an inductance which is serial to the load network. It shall be noted here that the load network is regarded, for example, as an input-side resonant circuit (consisting of inductance L and capacitance C) of resonant transformer arrangement 220. It shall further be pointed out that inductance 214 and capacitance 218 may be regarded as a resonant circuit, the resonant frequency of which thus forms a resonant frequency of an excitation source and/or alternating current source for the input-side excitation of resonant transformer arrangement 220.

Figure 2B:
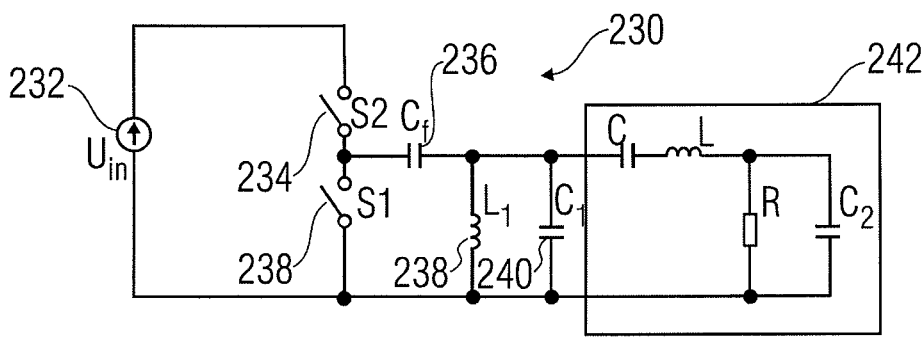
FIG. 2B is a circuit diagram of a half-bridge converter with an inductance, which is parallel to the switch, for generating input-side excitation of a resonant transformer arrangement in accordance with the prior art.

FIG. 2B shows a further circuitry for generating input-side excitation of a resonant transformer arrangement. The circuitry according to FIG. 2B is designated by 230 in its entirety. A first terminal of a voltage source 232 is coupled to a first terminal of a first capacitance 236 via a first switch 234. In addition, a second terminal of voltage source 232 is coupled to the first terminal of first capacitance 236 via a second switch 238. A second terminal of first capacitance 236 is further coupled to the second terminal of voltage source 232 via an inductance 238. In addition, inductance 238 has a second capacitance 240 connected in parallel with it.

In addition, a first input-side terminal of a resonant transformer arrangement 242 is coupled to the first terminal of inductance 238. A second input-side terminal of resonant transformer arrangement 242 is further coupled to the second terminal of inductance 238. First switch 234 and second switch 238, again, form a switch unit, it also being possible to optionally regard first capacitance 236 and inductance 238 as parts of the switch unit. The two switches 234, 236 typically switch in a push-pull mode, for example in response to a control signal from a driver. Inductance 238 and capacitance 240 may be regarded as a resonant circuit, the resonant frequency of which forms an excitation source and/or an alternating current source for input-side excitation of resonant transformer arrangement 220.

Figure 2C:
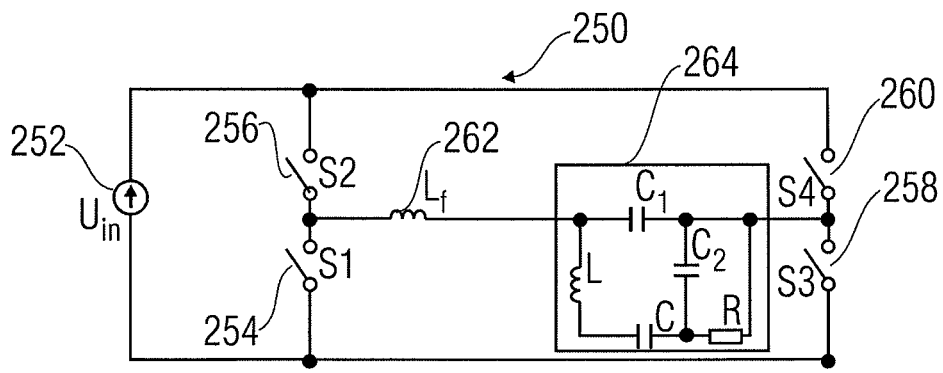
FIG. 2C is a circuit diagram of a full-bridge converter with an inductance, which is serial to the load network, for generating input-side excitation of a resonant transformer arrangement in accordance with the prior art.

FIG. 2C depicts a circuit diagram of a further embodiment of a circuitry for generating input-side excitation of a resonant transformer arrangement. The circuitry of FIG. 2C is designated by 250 in its entirety. A first switch 254 and a second switch 256 are connected in series between a first terminal of voltage source 252. In addition, a series connection consisting of a third switch 258 and a fourth switch 260 is connected between the first terminal of voltage source 252 and the second terminal of voltage source 252. A first central terminal between first switch 254 and second switch 256 is further coupled to a first input-side terminal of a resonant transformer arrangement 264 via an inductance 262. A second terminal of the resonant transformer arrangement 264 is further coupled to a second central terminal between third switch 258 and fourth switch 260. Typically, the four switches 254, 256, 258, 260 are controlled by a control signal from a driver such that in a first phase, first switch 254 and fourth switch 260 are closed, whereas in a second phase, second switch 256 and third switch 258 are closed. Typically, the first and second phases do not overlap. Thus, circuitry 250 according to FIG. 2 forms a full-bridge converter having an inductance which is serial to the load network (to the input of resonant transformer arrangement 264).

Figure 2D:
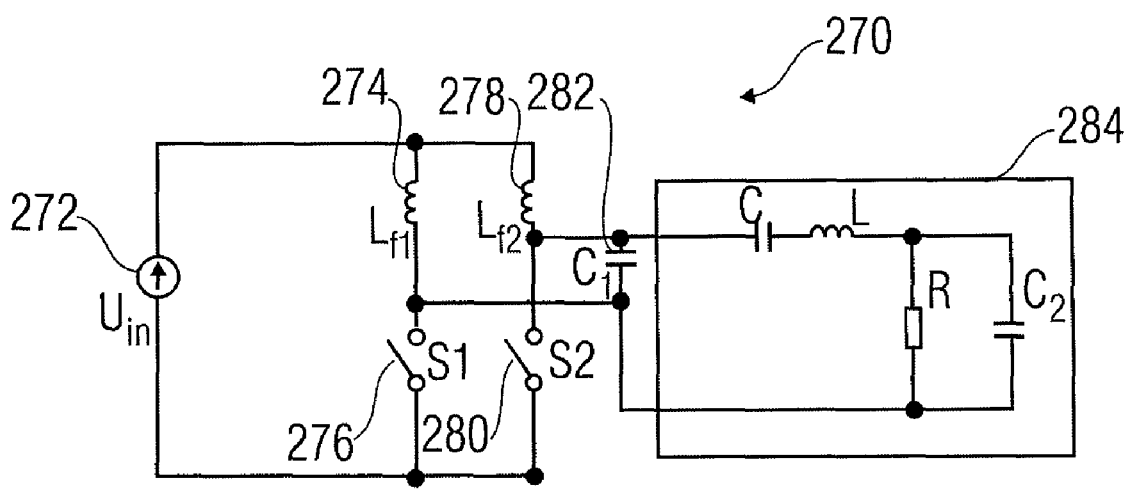
FIG. 2D is a circuit diagram of a push-pull converter having an inductive input network for generating input-side excitation for a resonant transformer arrangement in accordance with the prior art.

FIG. 2D shows a further embodiment of a circuitry for generating input-side excitation of a resonant transformer arrangement. The circuitry according to FIG. 2D is designated by 270 in its entirety. A first series connection consisting of a first inductance 274 and a first switch 276 is connected between a first terminal of a voltage source 272 and a second terminal of the voltage source 272. In addition, a second parallel connection consisting of a second inductance 278 and a second switch 280 is connected between the first terminal of voltage source 272 and the second terminal of voltage source 272. A first central terminal between first inductance 274 and first switch 276 is further coupled to a first input-side terminal of a resonant transformer arrangement 284. A second central terminal between second inductance 278 and second switch 280 is further coupled to a second input of resonant transformer arrangement 284. First switch 276 and second switch 280 are controlled, in each clock, for example via a control signal from a driver.

Thus, circuitry 270 forms a push-pull converter having an inductive input network.

In summary, one may state that using FIGS. 1B, 1C, 1D, 2A, 2B, 2C and 2D, various particularly advantageous circuitries for generating input-side excitation for a resonant transformer arrangement have been depicted. Switches 112, 120; 142, 144, 148, 150; 166; 212, 216; 234, 238; 254, 256, 258, 260; 276, 280 may be regarded as parts of a respective switch unit. In addition, the inductances 164, 274 and 278 may also be regarded as parts of the switch unit. Moreover, the combination of switches 212, 216 and of inductance 214 as well as the combination of switches 234, 238, of capacitance 236 and of inductance 238 by definition form an input network (EN). Also, the combination of switches 254, 256, 258, 260 and of inductance 262 forms an input network. Thus, it is to be stated that an input network is typically formed by a combination of a switch unit and, as the case may be, additional inductances and/or capacitances. In other words, an input network is understood to mean that circuit part according to FIG. 1B, 1C, 1D, 2A, 2B, 2C, or 2D which is connected between the respective voltage source (energy source) and the input-side terminals of the resonant transformer arrangement.

In addition, it shall be noted that the capacitances 122, 168, 218, 240, 282 designated by C1 may be associated with the input network or the resonant transformer arrangement, respectively. If the resonant transformer arrangement is, for example, a piezo transformer, the capacitance mentioned will typically be an integral part of the piezo transformer. If the resonant transformer arrangement 284 is a discretely structured resonant transformer arrangement, by contrast, capacitance C1 may be a separate capacitance, for example. The capacitance designated by C2 in FIGS. 1B, 1C, 1D, 2A, 2B, 2C, and 2D may also be an integral part of the piezo transformer or may be configured as a separate and/or discrete device.

Before providing detailed descriptions of concrete configurations of the present invention, the basic concept of the present invention will be briefly summarized below. The present invention offers a solution to the described technical disadvantages and problems of the prior art by preferably using a class-E converter according to FIG. 1D or, alternatively, a half- or full-bridge converter according to FIG. 1B or 1C which, as seen from the switches, is free from inductance on the load-circuit side. Alternatively, use may also be made of other load resonance converters, such as a half- or full-bridge converter having an inductance parallel to the switch, for example according to FIG. 2B, or having an inductance serial to the load network, for example according to FIG. 2A or 2C. Alternatively, a push-pull converter having an inductive input network according to FIG. 2D may be used. In addition, the load circuit (i.e., for example, that circuit part which is excited by the input network) is preferably configured with a high-Q resonant circuit (i.e. having Q>5). A correspondingly high Q is given by the use of a piezo transformer (PT) in all cases for reasons of the quality of the mechanical oscillations of the material suitable therefor, similar to that of a mechanical spring oscillator.

Further, the advantages of using a piezo transformer are a high efficiency factor, and in the case of using a piezo transformer (PT) instead of a magnetic transformer, the advantages also include low interference, or noise, emission and a small number of additional reactive devices. Use of a piezo transformer further results in a reduced structural height in comparison to flyback converters or other solutions of resonance converters having a conventional transformer. At the same time, in accordance with one aspect of the present invention, an evaluation of a phase difference between a switch current of the converter and a purely capacitive or purely resistive current or a purely capacitive or purely resistive voltage of the load network is effected, on the other hand, by coupling out the signal which is proportional to the load current, or one of the signals proportional to the output voltage present at the load network. Thus, with a required galvanic separation of the load from the input side of the converter, no galvanically separating feedback (for example via an optocoupler or an electromagnetic transformer), and no output-voltage reference signal to be detected via a rectifier is required in order to regulate or to control the resonance converter. This means that, for example, no analog/digital conversion (A/D conversion) of the output quantities of current or voltage is required in order to regulate the converter with accurately adjusted regulation parameters. In addition, no continuous analog detection of the output quantities is required.

To facilitate understanding, a known resonance converter in accordance with the prior art will be described below with reference to FIG. 1A. The resonance converter according to FIG. 1A is designated by 1000 in its entirety. A power source 1010 (also referred to as Q) makes available a power and/or an energy to a switch unit 1020 (also referred to as SE). In the resonance converter 1000, switch unit 1020 further includes a driver. Switch unit 1020 further provides an excitation 1030 to a load resonance network 1032, also referred to as LRK. In addition, load resonance network 1032 provides a current or a voltage 1034 to a load network 1036, also referred to as LN. A phase detector 1040 receives a switching signal 1042 from switch unit 1020. In addition, the phase detector receives information 1044 about a load current from load resonance network 1032, and forms a phase signal 1046 which describes a phase difference.

Moreover, a voltage/current detection means 1050 detects a voltage or a current in load network 1030 in an analogous manner. A comparator and regulator 1054 (also referred to as VE2R) compares phase signal 1046 with a phase reference signal 1056 (also referred to as PR) and provides a control signal 1058 to a voltage-controlled oscillator 1060 (also referred to as VCO or FE). The voltage/current determination means 1050 further provides voltage/current information 1064 as an analog value to a voltage/current comparator and regulator 1068 (also referred to as VE1R). The voltage/current comparator and regulator 1068 compares the information 1064 with a voltage/current reference signal 1070 from a voltage/current reference signal generation means 1072 (also referred to as UR or IR), and generates a control signal 1076 which is supplied to voltage-controlled oscillator 1060. An output signal 1080 of voltage-controlled oscillator 1060 is further supplied to switch unit 1020.

In other words, using a circuitry 1000 according to FIG. 1A, one would detect a voltage or a current present at the load as an analog signal when using a piezo transformer PT as the load network. The analog signal would be determined, for example, via a peak-value rectification, or use would be made of an optocoupler which would feed the signal, in a galvanically separated and analog manner, back to the input side of the load network to the switch unit. Once the output signal 1064 which was determined in an analog manner has been compared with a reference signal (current or voltage) and amplified via a regulator (illustrated by the voltage/current comparator and regulator 1068, or VE1R), it is placed onto a voltage-controlled oscillator 1060 (VCO) or another controlled oscillator in the sense of a frequency generation circuit (FE), which controls the switch unit 1020 (SE) by means of a driver which possibly may be connected upstream, and which has a frequency f, and a relative turn-on time D required. Switch unit 1020 (SE) is fed by a power source 1010 (Q) which may embody a voltage or a current source.

Figure 2E:
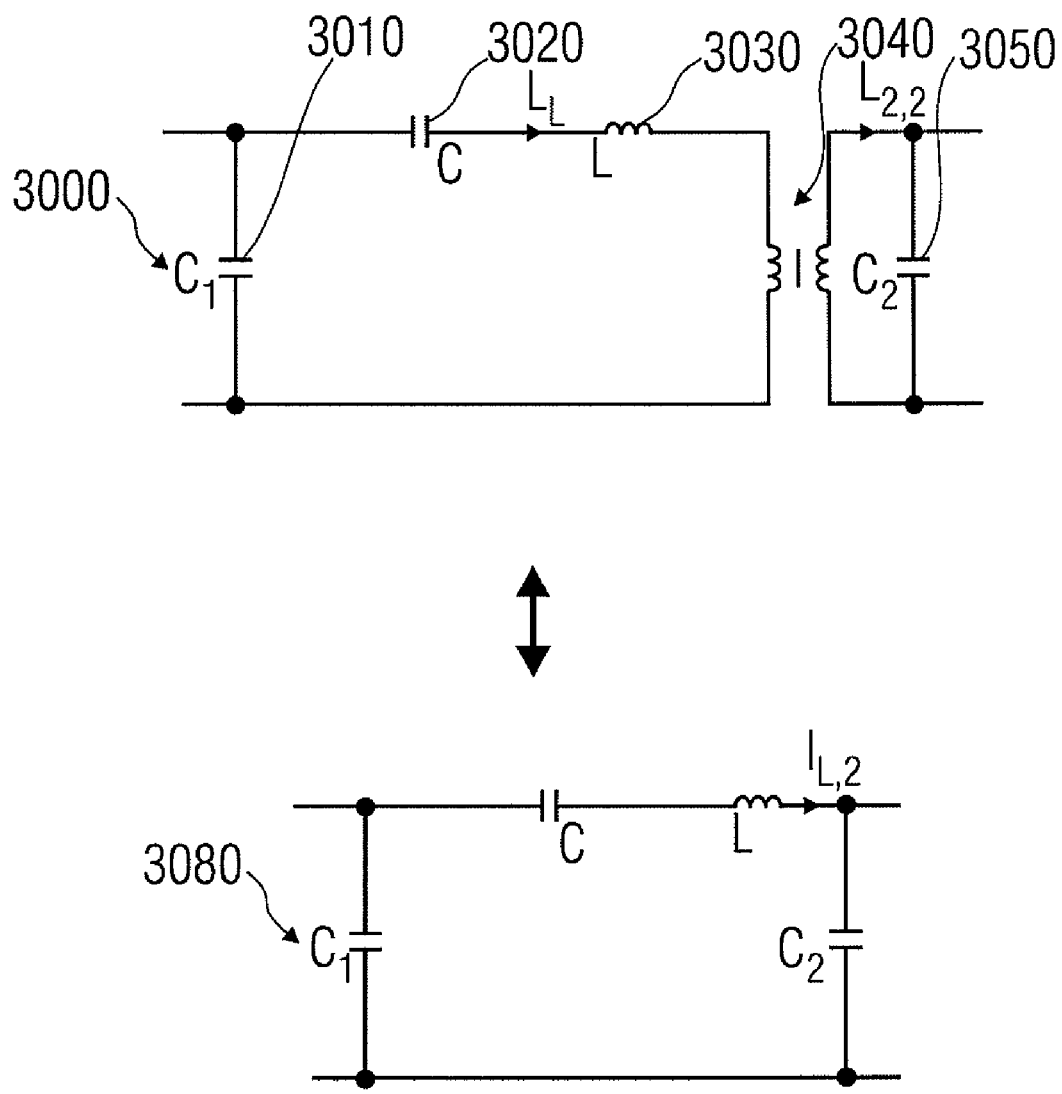
FIG. 2E is a graphical representation of equivalent circuit diagrams for a piezo transformer.
Figure 2F:
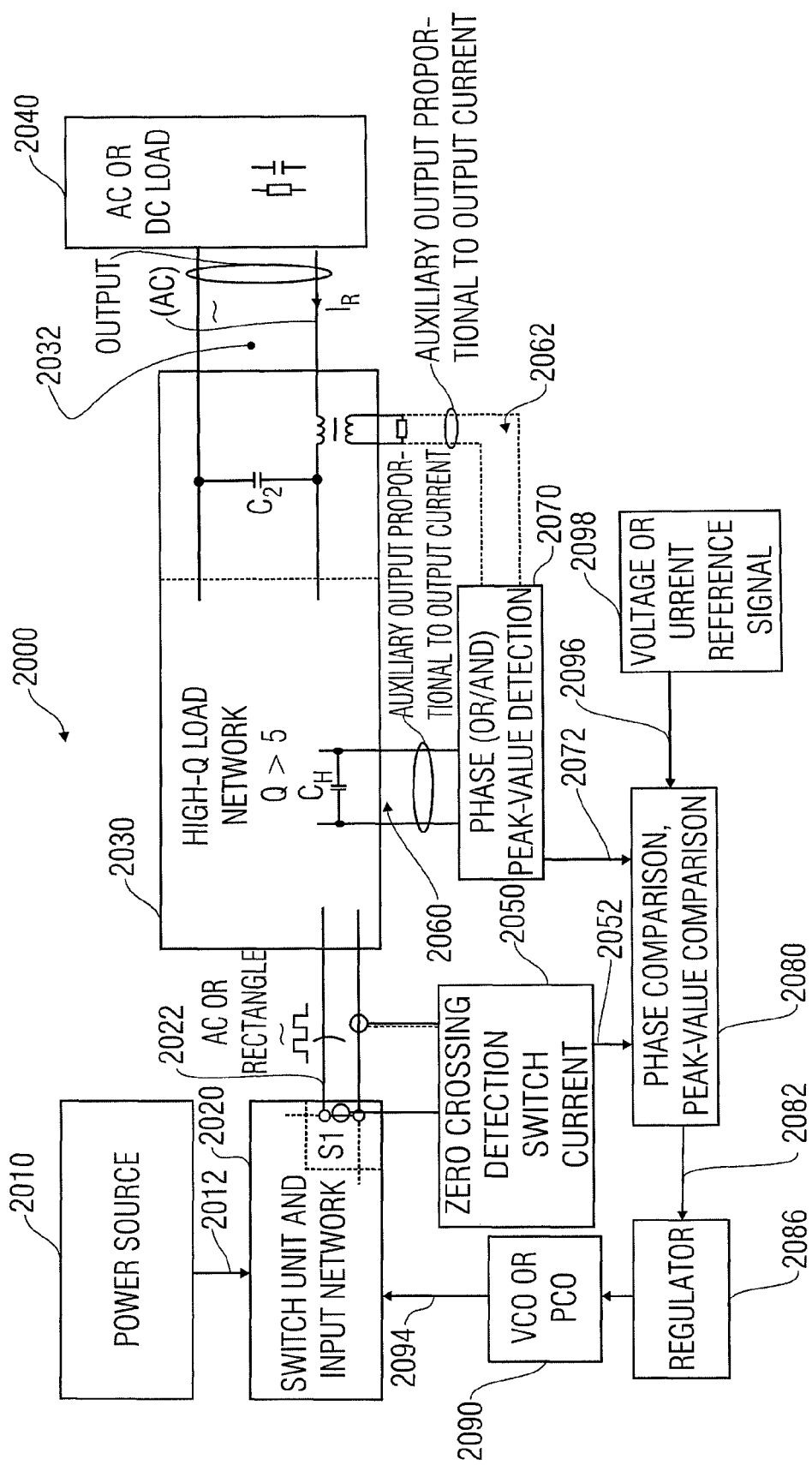
FIG. 2F is a block diagram of a resonance converter in accordance with configurations "A" and "B" of the present invention.

The basic concept of a circuitry in accordance with an aspect of the present invention will be described below with reference to FIG. 2F. For this purpose, FIG. 2F depicts a block diagram of an inventive circuitry designated by 2000 in its entirety. A power source and/or energy source 2010 provides power or energy 2012 to an input network 2020 which also includes a switch unit. The input network 2020 provides input-side excitation 2022 to a high-Q load network 2030. It shall be noted at this point that the input-side excitation 2022 with regard to a voltage curve or a current curve may be, for example, an approximately sinusoidal or approximately oblong excitation. Also, load network 2030 typically exhibits a Q>5.

It shall be pointed out that load network 2030 typically is a load resonance network or a resonant transformer arrangement. Load network or load resonance network 2030 includes an output 2032 where load network 2030 provides an output voltage or an output current (typically an alternating output voltage or an alternating output current) for an alternating current load or direct current load 2040. If a direct voltage load and/or a direct current load is present, it typically additionally includes a rectifier means so as to generate a direct voltage signal or a direct current signal from the alternating voltage signal or the alternating current signal present at output 2032.

Circuitry 2000 further includes a zero-crossing detection means 2050 for detecting a zero crossing of a current flowing through a switch of the switch unit in input network 2020. Alternatively, zero-crossing detection means 2050, however, may also detect a zero crossing of a current provided by the switch unit or by input network 2020 to load network 2030. In other words, zero-crossing detection means 2050 provides a zero-crossing detection signal 2052 which includes a moment of a zero crossing of the switch current or of the current supplied to load network 2030. Load network 2030 further includes at least one auxiliary output.

In accordance with a first embodiment, load network 2030 is designed to provide, at the auxiliary output, a transformationally generated signal which is essentially proportional to the output voltage present at output 2032 of load network 2030. For this purpose, load network 2030 may contain, for example, an auxiliary tap arranged and/or designed such that the auxiliary voltage arising at the auxiliary tap is proportional to the output voltage present at output 2032. Such a coupling-out may be achieved both with a conventional resonant transformer arrangement and with a piezo transformer. The respective auxiliary output is designated by 2060 in circuitry 2000. Typically (but not necessarily), a capacitance is further connected in parallel with auxiliary output 2060, the capacitance being designated, for example, by $C_H$. In addition, a further capacitance, which is designated here by $C_2$ by way of example, is connected in parallel with output 2032 of load network 2030, typically within or outside of load network 2030. By means of a suitable selection of the coupling-out and of capacitances $C_H$ and $C_2$, what may be achieved, for example, is that the preferred proportionality between the auxiliary voltage present at auxiliary output 2060 and the output voltage present at output 2030 exists at least approximately. To enable a reference, the auxiliary output that has just been described will also be referred to as voltage auxiliary output 2060 below.

As an alternative to a voltage auxiliary output 2060, load network 2030 may also include a current auxiliary output 2062. In this case, load network 2030 is designed such that a voltage or current signal (uniformly referred to as current auxiliary signal below) coupled-out at current auxiliary output 2062 is essentially proportional to a current supplied to load 2040 via output 2032 of load network 2030. This may be achieved, for example, in that coupling out the current auxiliary signal to current auxiliary output 2060 is effected by serially turning on a coupling-out network, so that the current supplied to load 2040 by load network 2030 flows through the coupling-out network. A current transformer, for example, may serve as the coupling-out network. For coupling out, it is preferred that at current auxiliary output 2062, a current flow through a capacitance $C_2$, which may be present, as the case may be, at the output side of the high-Q load network and which serves to set a resonance condition of load network 2030, not be taken into account. In other words, the current flowing through, for example, capacitance $C_2$ is not reflected in the current auxiliary signal.

In addition, circuitry 2000 includes a detection means 2070 for detecting a phase position and/or a peak value of one of the voltage auxiliary signal from voltage auxiliary output 2060, or the current auxiliary signal from current auxiliary output 2062. Thus, the detection means provides at least one phase signal or peak-value signal 2070 to a means 2080 for phase comparison and/or peak-value comparison. Means 2080 thus receives the zero-crossing detection signal 2052 as well as one of a phase signal or peak-value signal 2072. If means 2080 receives a phase signal 2072 from detection means 2070, means 2080 performs a phase comparison between the zero-crossing detection signal 2052 and phase signal 2072. In this case, means 2080 supplies a phase comparison signal 2082 to regulator 2086. The regulator then controls voltage-controlled oscillator 2090 or a phase-controlled oscillator (VCO or PCO) and sets, for example, the frequency and/or a relative turn-on time of the voltage-controlled oscillator 2090. The voltage-controlled oscillator 2090 further drives the switch unit in input network 2020 via a control signal 2094, and thus effects turn-on and turn-off of at least one switch in input network 2020.

If detection means 2070 provides a peak-value signal 2072 to means 2080, means 2080 will compare the peak-value signal 2072 with a voltage reference signal or current reference signal 2096 from a voltage reference signal provision means or current reference signal provision means 2098. As a result of the peak-value comparison, means 2080 provides a control signal 2082 to regulator 2086.

Further, it shall be pointed out that detection means 2070 may perform both a phase detection and a peak-value detection so as to provide both a phase detection signal and a peak-value detection signal to means 2080. In this case, means 2080 may perform both a phase comparison between the zero-crossing detection signal 2052 and the phase detection signal, and a peak-value comparison between the peak-value detection signal and the voltage reference signal or current reference signal 2096. Means 2060 may then combine the two comparison results both of the phase comparison and of the peak-value comparison, for example in an additive or subtractive manner, so as to generate control signal 2082 for regulator 2086.

It shall be pointed out that controlling the output voltage or of the output current to have a desired, for example constant, value may be achieved, for example, either only by means of an (indirect) evaluation of a DC input voltage of a converter and of two phase signals (load current by evaluating a switch current in a closed state, on the one hand, as well as of an active current of the load or of a quantity which is proportional to the load network output voltage, on the other hand). In other words, if a DC input voltage of a resonance converter and, in addition, either a phase difference between a switch current (of a switch in the input network) and an active current provided to the load by the load network, or a phase shift between the switch current and the output voltage of the load network is known, the output voltage or the output current of the load network may be regulated to take on a desired value.

A main concern of the present invention, however, is to detect an entire load current (i.e., for example, a current flowing through a resonant circuit of the resonant transformer arrangement or, preferably, a current flowing through an input-side resonant circuit of the resonant transformer arrangement) from observing a switch current, which carries this load current, with regard to the phase position thereof, and to compare this phase position either with an active component of this current which flows to the load, or, alternatively, with the phase position of a variable which is proportional to the load network output voltage and which at the same represents the voltage across a pure capacitance parallel to the load or to a rectifying circuit supplying the load. In other words, it is a concern of the present invention to detect the phase position of a load current, i.e., for example, the current flowing through an input-side resonant circuit of load network 2030. To this end, the current flowing through a switch of the switch unit in input network 2020 may be detected, for example, since in typical embodiments of a load resonance network 2030, this current exhibits, with regard to its phase position, a predeterminable and approximately fixed phase relation (with a deviation of typically less than +/−15°).

Alternatively, however, it is also possible to detect a phase position of a current which flows into the load network 2030 at the input side. The current which has been mentioned and which flows into load network 2030 at the input side is not necessarily identical with the load current (i.e. with the current flowing through the resonant circuit of the load network), but typically has a predeterminable phase difference compared to same which fluctuates only within a small range (of, e.g., about +/−15°).

A phase position of the load current is detected accordingly for example by zero-crossing detection means 2050 according to FIG. 2F.

In addition, the phase position of an active component of the current which flows to the load is detected, i.e. a phase position of a current as is described by the current auxiliary signal present at current auxiliary output 2062. It is assumed that load 2040 essentially behaves like a resistive load, i.e. that voltage and current have a phase shift of less than +/−30°. This is the case, for example, when load 2040 is a purely resistive load or when load 2040 is, for example, a (bridge) rectifying circuit with a load capacitor and an additional resistive load. Also, the active component is detected at current auxiliary output 2062, since the current flowing through the capacitor $C_2$ does not flow through the coupling-out network (e.g. the current transformer).

What may be detected as an alternative to the phase position of the active component of the output-side current is the phase position of the output voltage at output 2032 of load network 2030. Thus, for example, the phase difference is determined between the phase position of the above-defined load current and the active component of the current which flows to the load. Alternatively, the phase difference is determined between the load current and the output voltage present at output 2032.

From the phase difference, a comparison is performed with a target phase difference for regulating the output voltage or output power. An exclusive evaluation of an inventive phase difference has the advantage that same will always provide a value which is independent of the input voltage and which corresponds to a load angle between a capacitive and a resistive load. Thus, when a constant capacitive load (for example constant capacitance $C_2$) is known, a present resistive load may be determined via this phase angle, and a switching frequency (or operating frequency) used may be determined. However, it shall be noted that this does not determine the magnitude of the output voltage, of the output current or of the output power. Specifically, a phase angle mentioned documents only the partitioning of active current and reactive current, but not its absolute magnitude.

In order to regulate or to control, in addition, the absolute values of output voltage, output power or output current, provision is made, in accordance with the invention, of determining the output voltage via a signal which is proportional to the capacitive and/or resistive load and which is taken from the load network. To this end, a signal proportional to the output voltage present across the capacitive load is preferably used by transformational coupling-out from the load network in order to detect the maximum value of the output voltage. This value which is proportional to the output voltage present at the load may be compared with a reference voltage. Thus, a nominal output voltage which is configured to have the magnitude of the reference voltage and/or adjusted to the magnitude of the reference voltage may be set or regulated. Alternatively, a signal proportional to the resistive load current may be coupled out from the load network in a transformational manner. The coupled-out signal proportional to the resistive load current thus represents the absolute value of the current flowing through the load. The current flowing through the load may be compared with a reference value and may thus be further set or regulated to be constant.

In addition, it is possible to generate a regulation or setting of that quantity which has not been detected, respectively, (output voltage present across the capacitive load, or current flowing through the resistive load) from the additional information about the phase angle determined in accordance with the invention, by means of one of the quantities which have been detected in terms of their maximum values (current flowing through the resistive load, or output voltage present across the capacitive load).

Finally, it is in a known manner that the quantity to be regulated may be detected on the output side, and the regulation deviation, or control deviation, may be determined using a regulation amplifier, and fed to the control circuit using an optocoupler.

Figure 3A:
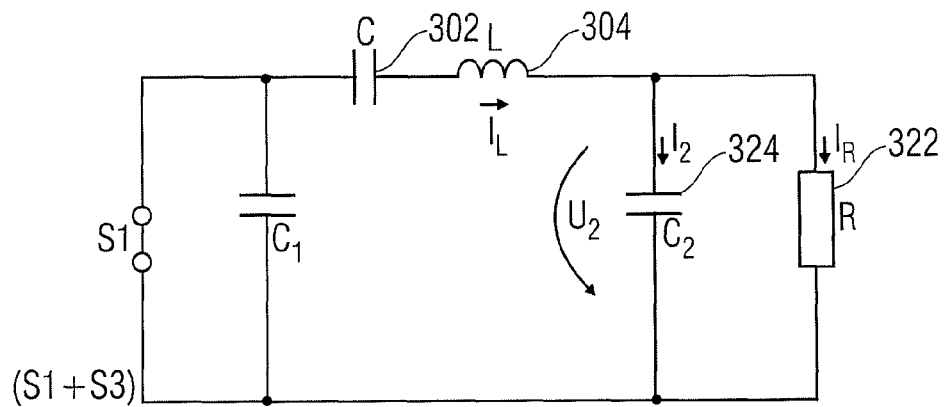
FIG. 3A is a starting scheme of an inventive solution if same is applied to the converter types of FIG. 1B or 1C.

To facilitate understanding of the present invention, an equivalent circuit diagram of an inventive resonant transformer arrangement will be explained below using FIGS. 3A-3C. For further illustration, FIG. 2E depicts a crucial assumption and/or simplification underlying the following configurations, respectively. For this purpose, a first circuit diagram 3000 of FIG. 3A depicts a conventional equivalent circuit diagram of a piezo transformer. The conventional equivalent circuit diagram includes an input capacitance 3010 (C1), a series resonant circuit consisting of a capacitance 3020 and an inductance 3030, a transformer 3040 as well as an output-side capacitance 3050. A so-called "load alternating current" $I_L$ flows through the input-side series resonant circuit consisting of capacitance 3020 and inductance 3030. Transformer 3040 provides an output-side current $I_{L,2}$ at the output side. It shall be noted here that conventionally, a differentiation should be made between the current $I_L$ flowing on the input side and the current $I_{L,2}$ flowing on the output side, since they are not necessarily identical in magnitude.

For reasons of simplification, however, it shall be assumed here that there is at least a fixed connection between currents $I_L$ and $I_{L,2}$. Thus, $$I_{L,2} = C_{input,output} I_L.$$

In this, $c_{input,output}$ be a constant. If $I_L$ and $I_{L,2}$ are assumed to be complex phasor quantities, the constant $c_{input,output}$ may also be complex-valued so as to indicate a phase shift which may possibly occur between the input-side current $I_L$ and the output-side current $I_{L,2}$.

Due to the fixed connection between currents $I_L$ and $I_{L,2}$ which has been previously described, a differentiation will be dispensed with below, and both the input-side current and the output-side current will be referred to as $I_L$. However, one should always take into account that the currents need necessarily be identical, but may be mutually scaled in amplitude and may further comprise a phase shift.

However, the respective scaling and the respective phase shift may be predetermined.

Thus, the equivalent circuit diagram of a piezo transformer depicted in circuit diagram 3080 represents the conventional piezo transformer described in equivalent circuit diagram 3000. Although a differentiation of the input-side current $I_L$ and the output-side current $I_{L,2}$ may be relevant for actually dimensioning a piezo transformer and/or a resonance converter, this differentiation is of only minor importance for the following considerations.

On the basis of the understanding according to FIG. 2E, FIG. 3A thus depicts an equivalent circuit diagram of a piezo transformer and/or, generally, of a resonant transformer arrangement (so that what has been said above about a piezo transformer may be translated to a general resonant transformer arrangement), which is excited on the input side (the energy source here not being shown, and the input-side excitation here being represented by a switch S1 for reasons of simplification).

In other words, FIG. 3A shows a starting scheme of an inventive solution if same is applied to converter types according to FIG. 1B or 1C. In other words, it is assumed here that if the current flowing in the input-side resonant circuit of the piezo transformer is known, the current flowing in the output-side resonant circuit of the piezo transformer will also be known. For further simplification, an equivalent circuit diagram 320 according to FIG. 3B is derived on the basis of the equivalent circuit diagram of FIG. 3A. Since the load resonant circuit, which consists of a capacitance 302 according to FIG. 3A and of an inductance 304 according to FIG. 3A (or is represented by capacitance 302 and inductance 304), is to have a high-Q resonant circuit of Q>5, resonant circuit 302, 304 is replaced, in the equivalent circuit diagram 320 according to FIG. 3B, by a sinusoidal current source $I_L$ which provides a current $I_L$ in accordance with the assumption made here. The nearly sinusoidal load current $I_L$ thus is divided into resistive load 322 (R) and capacitive load 324 ($C_2$) in accordance with the complex equation $$\frac{I_L}{I_R} = 1 + j\omega C_2 R. \qquad (1)$$

A phase angle $\phi$ between load current $I_L$ and resistive current $I_R$ flowing through resistor 322 (R) thus results in accordance with the following formula, which is also referred to as (2):

$$\cos\varphi = \frac{1}{1+\omega C_2 R} \qquad (2)$$

In other words, if phase angle $\phi$ is known from a determination of a phase difference and/or phase shift between load current $I_L$ and resistive current $I_R$ flowing through the load resistor R, and if a resonant circuit frequency $\omega$ of the load circuit is also known as $\omega=2\cdot\phi\cdot f$, the value of load resistor R (322) may be determined via the value of capacitance $C_2$ (324) in accordance with above formulae. Load current $I_L$ may be determined, for example, by zero-crossing detection means 2050 (wherein a phase shift between an input-side current $I_L$ and an output-side current $I_{L,2}$ in accordance with the configurations using FIG. 2E may possibly still need to be taken into account). The resistive current $I_R$ flowing through resistor 322 (R) may further be tapped, for example, at the current auxiliary output 2062 according to FIG. 2F. Phase angle $\phi$ may be determined accordingly in means 2080, for example.

At the same time, the phase position of voltage $U_2$ present at the output of load network 2030 (or of resonant transformer arrangement 2030) versus load current $I_L$ is also to be determined in accordance with (2), since voltage $U_2$ is proportional to the ohmic current flowing through resistor 322 (R). In other words, the value of resistor 322 (R) may be determined (provided that the resonant circuit frequency w and the value of capacitance $C_2$ are known) even if the phase shift between load current $I_L$ and the voltage present at output 2032 of load network 2030 is known.

This view first of all applies to the case of a purely capacitive and resistive alternating current load with constant values R and $C_2$ in parallel connection. If one also wants to regulate or set the voltage present at the resistive load, one has to observe its value itself. This is effected, in accordance with the invention, in that voltage $U_2$, i.e. the voltage present across load resistor 322 (R) and output-side capacitance 324 ($C_2$), is transformationally coupled-out from the load circuit, so that a coupling-out signal (also referred to as auxiliary signal or voltage auxiliary signal) having a voltage $U_3$ will arise, voltage $U_3$ always being approximately proportional to voltage $U_2$. In other words, a linearity deviation between output voltage $U_2$ and auxiliary voltage $U_3$ is 20% at the most.

The coupled-out signal, or auxiliary signal, $U_3$ is then compared to a reference voltage $U_r$, which, along with a constant phase shift $\phi_r$ between the zero crossing of output voltage $U_2$ and the arrival of the voltage or auxiliary voltage $U_3$ the reference value $U_r$, enables regulating or setting the output voltage. The settable or regulatable output voltage will then result in accordance with (3) as follows $$U_2 = k_r U_3 = \frac{k_r U_r}{\sqrt{2}\sin\varphi_r}. \qquad (3)$$

In other words, regulation or setting of the output voltage is effected, in accordance with one aspect of the present invention, in dependence on the angle $\phi_r$, so that (direct) evaluation of an amplitude of auxiliary voltage $U_3$ is not required. To this end, the phase shift between the zero crossing of auxiliary voltage $U_3$ and a point in time at which auxiliary voltage $U_3$ crosses a predefined reference value $U_r$ is determined. Thus, the amplitude of $U_3$ may be determined from the connection $U_3=U_r/\sin \phi_r$, and/or $\phi_r$ is a measure of the amplitude. Using a proportionality constant $k_r$, either the amplitude or the mean value of output voltage $U_2$ may further be inferred in accordance with (3). However, explicitly calculating the amplitude is not necessary, but the angle $\phi_r$ may instead be used as a regulation quantity, or controlled quantity, for example.

In addition, it is to be noted that equation (3) is simplified when, for example, reference value $\phi_r$ is selected to be 90°. In this case, $\sin \phi_r=1$.

Figure 3B:
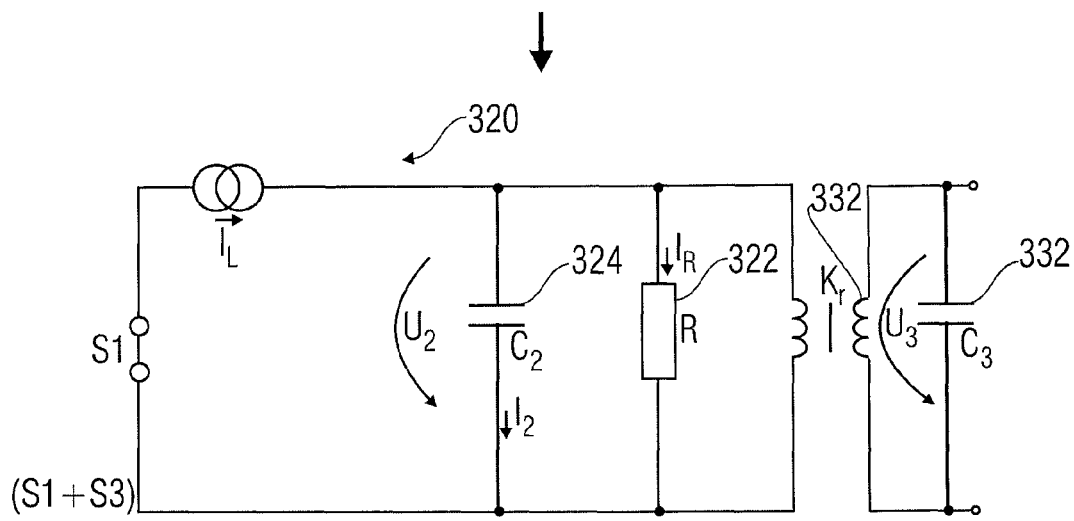
FIG. 3B is an equivalent circuit diagram of an inventive output circuit when using a resistive load alternating current.

It shall also be noted that FIG. 3B depicts a transformational coupling-out of auxiliary voltage $U_3$. A transformer 330 is connected, on the input side, in parallel with the load resistor and/or the alternating current load 322, so that the same voltage is present across the input of transformer 330 as across load resistor 322. The transformer further comprises a transformation ratio $k_r$. One output of the transformer is coupled, for example, to a third capacitance $C_3$. The voltage present at the output of the transformer 330 forms an auxiliary signal which is also referred to as auxiliary voltage $U_3$ and/or as a voltage auxiliary signal.

Thus, by specifying a reference, or reference voltage, $U_r$, and by comparing the reference voltage $U_r$ with the coupled-out voltage $U_3$, an alternating current load according to FIG. 3B may be regulated to have a constant voltage, a constant power or a constant current. Doing so, a further capacitive load 322 ($C_3$) is admissible at the transformer output of transformer 330 having the voltage transformation ratio $k_r$. The capacitive load 332 ($C_3$) is either negligible with regard to the second capacitance 324 ($C_2$), or is included, via the transformation ratio $k_r$, into the value of $C_2$ so as to obtain an in-phase association of the capacitive and resistive loads.

If, in other words, the value of second capacitance 324 ($C_2$), the properties of transformer 330, and the value of third capacitance 332 ($C_3$) are known, this may be used to predetermine also a phase relation between output voltage $U_2$ and auxiliary voltage $U_3$, which, as the case may be, may be included into voltage regulation as a correction factor.

Figure 3C:
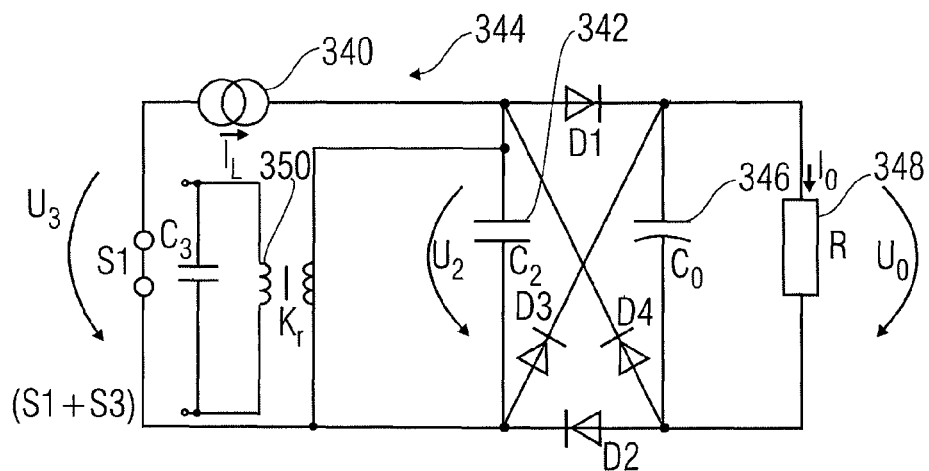
FIG. 3C is an equivalent circuit diagram of an inventive output circuit when using a resistive direct current load in connection with a rectifying circuit.

FIG. 3C depicts a further equivalent circuit diagram of an output circuit of an inventive resonance converter, the alternating current load depicted with regard to FIGS. 3A and 3B being replaced by a direct current load in connection with a bridge rectifier and a filter capacitor. In the embodiment shown, the output of the resonant transformer arrangement is again represented by a current source 340 providing a current $I_L$. A second capacitance 342 is coupled to the output of the resonant transformer arrangement. The output of the transformer arrangement is further coupled to an input of a bridge rectifier consisting, for example, of four diodes. A filter capacitance 346 is further connected at an output of the bridge rectifier 344. A direct current load 348 (R) is further connected in parallel with the filter capacitance 356 ($C_0$), the direct current load here being represented by an ohmic resistor. A voltage present across the direct current load is referred to as $U_0$, and a current flowing through the direct current load is designated by $I_0$.

In addition, a transformer 350 is directly connected to the output of the resonant transformer arrangement. In other words, an input of transformer 350 is connected in parallel with the output of the resonant transformer arrangement (represented by current source 340) and/or in parallel with the second capacitance 342 ($C_2$). For example, a third capacitance 352 is optionally connected to the output of transformer 350. Thus, the auxiliary voltage, or the voltage auxiliary signal, $U_3$ is available at the output of transformer 350.

In other words, FIG. 3C illustrates how, in accordance with the invention, a capacitive alternating current load (second capacitance 342) is connected in parallel with a rectifying circuit (for example a bridge rectifier consisting of four diodes $D_1$, $D_2$, $D_3$, $D_4$) instead of a parallel connection of capacitive and resistive alternating current loads. A resistive direct current load 348 (also referred to as R or $R_0$) is arranged, possibly in parallel with a buffer capacitance 346 ($C_0$), at the output of rectifying circuit 344.

In this case, too (i.e. when using a direct current load in connection with a rectifying circuit), an unambiguous association between a phase angle $\phi_{LZ}$ and/or $\phi_{L0}$ of the zero crossing of load current $I_L$ and of the zero crossing of voltage $U_2$ present at capacitance $C_2$, or of the arrival at voltage $U_0$, is given. Thus, it is possible to set or regulate the output voltage by means of knowing capacitance $C_2$, switching frequency f, phase angle $\phi_{Z0}$ between the voltage zero crossing of $U_2$ and/or of $U_3$ as a value which is proportional to $U_2$, and arrival at a reference voltage $U_r$, which may be proportional to output voltage $U_0$, as well as evaluating the maximum value of $U_3$, proportional to $U_2$, itself. Phase angle $\phi_{Z0}$ thus results from the difference of the two phase angles $\phi_{LZ}$ and $\phi_{L0}$, as is depicted in FIG. 3D.

Figure 3D:
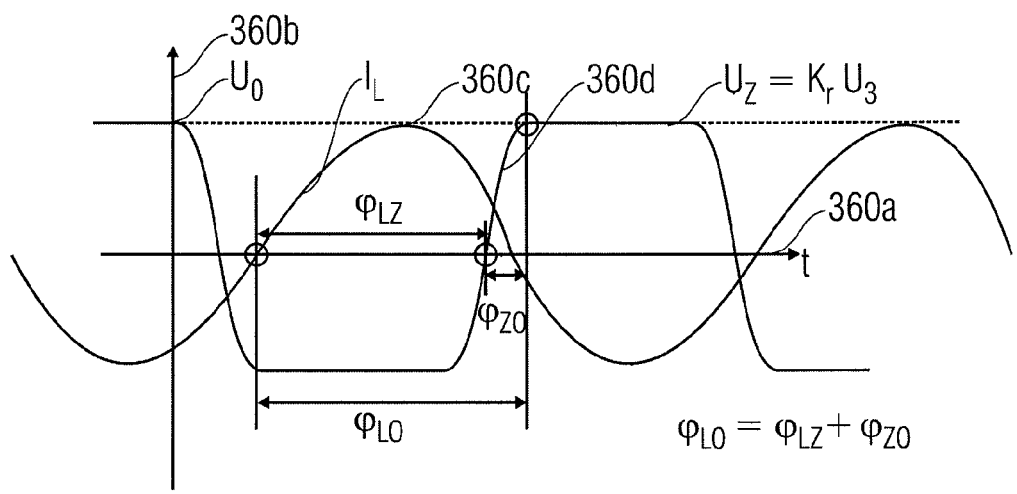
FIG. 3D is a graphical representation of current and voltage curves in an inventive output circuit.

In other words, FIG. 3D shows a graphical representation of voltage and current curves as occur in an output circuit of the resonance converter according to FIG. 3C. An abscissa 360a describes the time, whereas an ordinate 360b describes a magnitude of a respective current or of a respective voltage. A first curve shape 360c describes a current $I_L$ supplied by the output of the resonant transformer arrangement, and a second curve shape 360d describes both voltage $U_2$ present at the output of the resonant transformer arrangement, and auxiliary voltage $U_3$, since, for example, the two voltages mentioned are proportional to each other.

Phase angle $\phi_{L0}$ further describes a phase difference between an increasing zero crossing of a load current $I_L$ provided by the resonant transformer arrangement at its output and/or flowing in an output-side resonant circuit of the resonant transformer arrangement, and a moment when auxiliary voltage $U_3$ reaches the predefined threshold value. Phase angle $\phi_{LZ}$ further describes a phase difference between an increasing zero crossing of load current $I_L$ and an increasing zero crossing of output voltage $U_2$ or auxiliary voltage $U_3$. In addition, phase angle $\phi_{Z0}$ describes a phase difference between the increasing zero crossing of output voltage $U_2$, or auxiliary voltage $U_3$, as well as the moment when auxiliary voltage $U_3$ reaches the predefined threshold value, or reference value. As may be seen from FIG. 3D, the following thus applies:

$$\phi_{L0} = \phi_{LZ} + \phi_{Z0}.$$

Figure 3E:
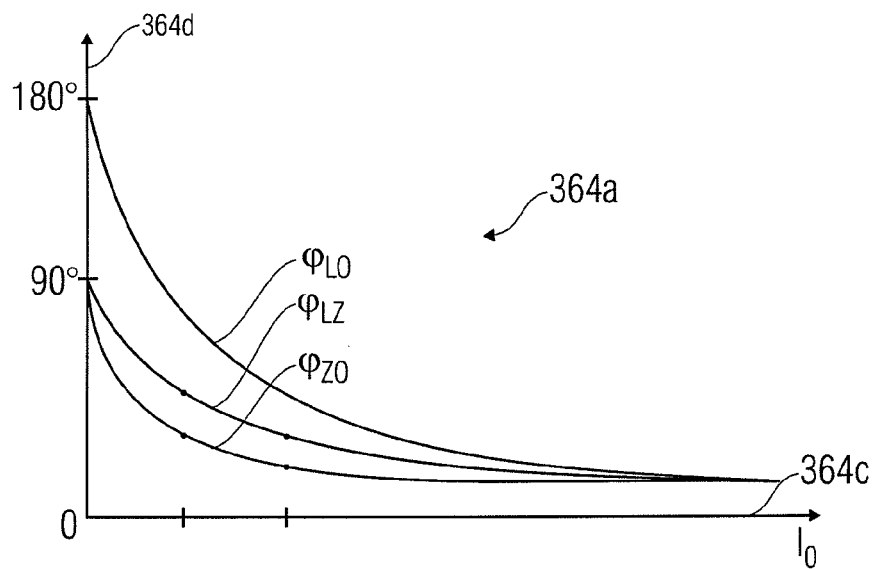
FIGS. 3E and 3F are graphical representations of dependencies of various phase, angles occurring in an inventive resonance converter on a current flowing through a ohmic load resistor.
Figure 3F:
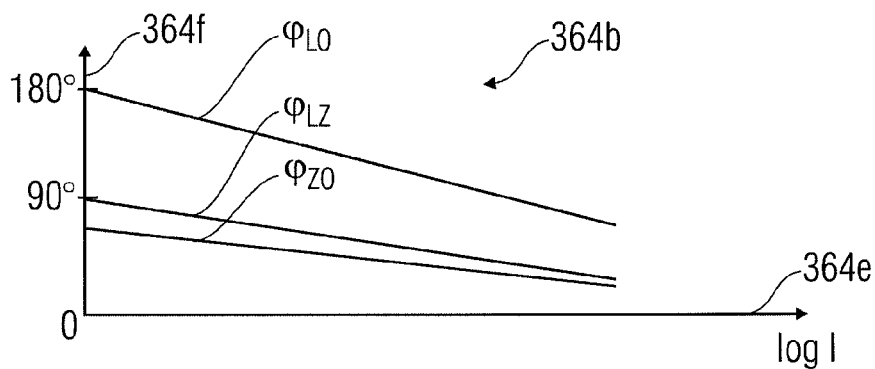

FIGS. 3E and 3F show graphical representations of dependencies of angles $\phi_{L0}$, $\phi_{LZ}$ and $\phi_{Z0}$ on a current $I_0$ flowing through direct current load 348. In other words, FIGS. 3E and 3F show a typical dependence of phase angle $\phi_{Z0}$ on current $I_0$ flowing through the ohmic load resistor R. In the process, the angle, or phase angle, $\phi_{Z0}$, just as the angle, or phase angle, $\phi_{LZ}$, sweeps over maximally 90°, in total, from the load-free state (R=∞) up to 0° in the event of a short-circuit (R=0). In addition, however, the angle, or phase angle, $\phi_{L0}$ sweeps over an angle of from 180° to 0° in the same load range. All phase angles determined in this manner further have in common that they change in a linear manner with the logarithm of the output current $I_0$ with a constant output voltage $U_0$. Thus, the phase angles mentioned will also change linearly with the logarithm of the output power, as is also shown in FIGS. 3E and 3F.

In other words, FIGS. 3E and 3F show, in two graphical representations 364a, 364b, phase angles $\phi_{L0}$, $\phi_{LZ}$ and $\phi_{Z0}$ in dependence on the output current $I_0$. In the first graphical representation 364a, the output current $I_0$ is plotted in a linear form on an abscissa 363c, whereas an ordinate 364b depicts the angles in a linear representation. However, in the second graphical representation 364b, the output current $I_0$ is plotted in a logarithmic manner on an abscissa 364e, whereas an ordinate 364f depicts phase angles $\phi_{L0}$, $\phi_{LZ}$ and $\phi_{Z0}$ in a linear manner.

In accordance with one aspect of the present invention, it is therefore advantageous to preferably detect phase angle $\phi_{L0}$ and to use it for regulating or controlling the output voltage, since phase angle $\phi_{L0}$ offers a broader range, within a predefined load range, than the two phase angles $\phi_{Z0}$ and $\phi_{LZ}$. In other words, within a predefined load range, phase angle $\phi_{L0}$ will change more than phase angles $\phi_{Z0}$ and $\phi_{LZ}$. In addition, one can benefit from the logarithmic dependence of the phase angles on the output power or the output current with a constant output voltage in order to detect the load current, or output current $I_0$ via a sensor, to form a logarithm from the detected value in terms of circuit engineering, and to linearly change the phase angle using the function thus obtained so as to set a constant output voltage $U_0$. Accordingly, a locked loop having a respective control function is depicted in FIG. 3G.

Figure 3G:
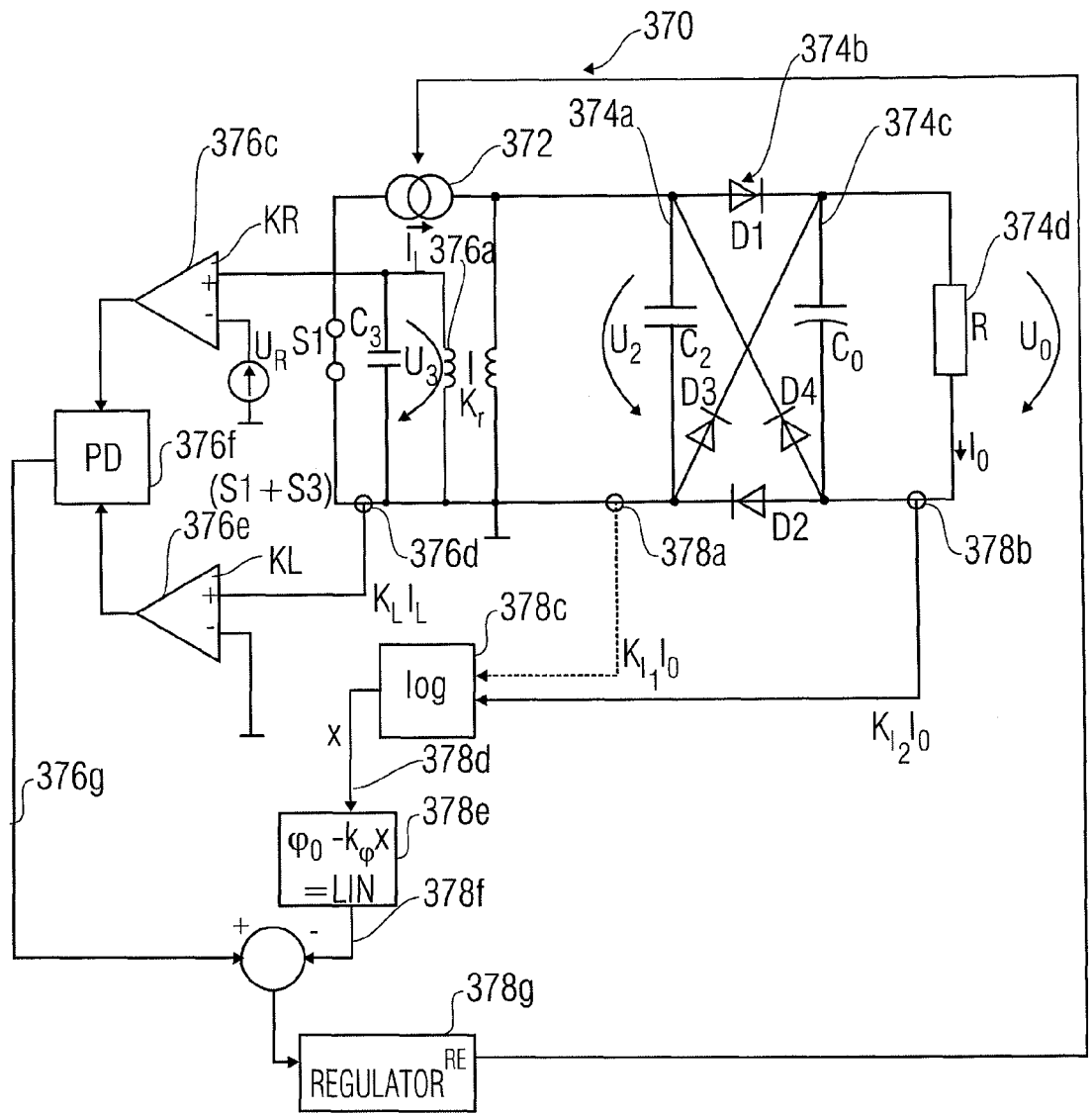
FIG. 3G is a block diagram of an inventive circuitry for regulating a resonance converter using a load current supplied to a load.

In other words, FIG. 3G shows a circuit diagram of an inventive resonance converter with a regulation of the output voltage using the logarithm of the output current. The circuitry of FIG. 3G is designated by 370 in its entirety. An output of a resonant transformer arrangement here is symbolized by a current source 372 which provides a load alternating current $I_L$. An output of the resonant transformer arrangement is thus coupled to a second capacitance 374a ($C_2$). In addition, an input of a bridge rectifying circuit 374b is coupled to the second capacitance 374a. An output of bridge rectifying circuit 374b is coupled to a filter capacitance and/or load capacitance 374c as well as to a direct current load 374d. Direct current load 374d here is symbolized by an ohmic resistor having a value of R. In addition, an input of a transformer 376a is coupled to the output of the resonant transformer arrangement. Moreover, a capacitance 376b is connected in parallel at the output of transformer 376a. Moreover, an auxiliary voltage $U_3$ is present at the output of transformer 376a.

In addition, circuitry 370 includes a first comparator or reference value comparator 376c comparing auxiliary voltage $U_3$ with a reference voltage $U_R$. Thus, a signal is present at the output of reference value comparator 376c, the signal indicating the moment when auxiliary voltage $U_3$ crosses a reference value predefined by reference voltage $U_R$. Since auxiliary voltage $U_3$ is a proportional measure (which, however, may in addition possibly be shifted in phase) of output voltage $U_2$ present across second capacitance 374a ($C_2$), information about when output voltage $U_2$ crosses the associated reference value is thus also present at the output of reference value comparator 376c.

Circuitry 370 further includes a switch current determiner 376d which provides information about a current flow through a switch of a switch unit which generates primary-side excitation of the resonant transformer arrangement. Circuitry 370 further includes a second comparator, or reference value comparator, 376e which receives the information about the switch current from switch current determiner 376d and compares it with a further predefined reference value. Thus, information about when the switch current crosses the predefined second reference value or exhibits, for example, a zero crossing is present at the output of second reference value comparator 376e. A phase detector 376f receives the output signals both of first reference value comparator 376c and of second reference value comparator 376e and thus provides information 376g which describes a phase shift between a zero crossing of load current $I_L$ (or of the switch current), and auxiliary voltage $U_3$ reaching the predefined reference value. In other words, information 376g describes, for example, phase angle $\phi_{LO}$ as has been described with reference to FIGS. 3D and 3E and 3F.

Circuitry 370 further includes an output current detection means 378a or 378b. Output current detection means 378a or 378b detects, e.g., that current which is provided by the output of the resonant transformer arrangement either to the input of rectifying circuit 374b (or of bridge rectifier 374b), or that current which flows into direct current load 374d. Alternatively, an output current detection means might also detect that current which is provided by the output of rectifying circuit 374b to filter capacitor 374c and to direct current load 374d. Alternatively, the output current detection means may detect a current supplied to a resistive alternating current load.

The information provided by the output current detection means 378a here is designated by $k_{I1}I_0$, and the information provided by output current detection means 378b here is designated by $k_{I2}I_0$. Of course, it is sufficient for one of the output current detection means 378a, 378b to be present. The information about the output current which is supplied by the respective output current detection means 378a, 378b is then supplied to a means 378c for taking the logarithm. The means 378c for taking the logarithm provides an auxiliary quantity 378d which corresponds at least approximately, and/or within a certain range of output current $I_0$, to the logarithm of the information provided by output current detection means 378a, 378b. The auxiliary quantity is further also referred to as x. A mapping means 378e generates a phase reference value 378f, also designated by LIN, from auxiliary quantity 378d (x) by means of a linear mapping, wherein the following is true:

$$LIN = \phi_0 - k_\phi x$$

and wherein the following is true at least as an approximation:

$$x = \log(k_{I1,2} I_0).$$

A regulator 378g receives a difference between phase information 376g and phase reference value 378f, and regulates a frequency and/or a duty cycle of input-side excitation of the resonant transformer arrangement in such a manner that the input signal of regulator 378g (the difference between phase information 376g and phase reference value 378f) is regulated to have a predefined (e.g. fixed) value, or is regulated to be zero.

In other words, by taking the logarithm of the output current $I_0$ detected (also referred to as LOG) or of a proportional variable derived therefrom, a linear function LIN is generated which will lead, or must lead, to a respective phase shift according to FIGS. 3E and 3F in the event of a constant output voltage. A zero crossing of load current $I_L$ is detected by a comparator 376e (KL) and passed on to a phase detector 376f. A phase error is formed by comparing the actual value of output current $I_0$ with a phase shift detected by phase detector 376f (PD), for example of angle $\phi_{LO}$ or $\phi_{LZ}$ or of a phase angle set by a different value of reference voltage $U_r$ as a target value. Via regulator 378g (RE), the phase error influences the load current source $I_L$, i.e. the input-side excitation of the resonant transformer arrangement.

Also, with the arrangements shown according to FIG. 3G, load currents may alternatively also be detected and regulated or controlled directly in order to keep them at a constant level, for example instead of the output voltage.

It may thus be stated in summary that using the circuitry of FIG. 3G, voltage $U_0$ present across the direct current load 374d may be kept at a constant level, the only requirement being to ascertain a phase shift $\phi_{LO}$, a phase shift $\phi_{LZ}$ or a phase shift $\phi_{Z0}$ as well as a measure of output current $I_0$. The value of direct current load 374d need not be known and/or may be variable.

Figure 3H:
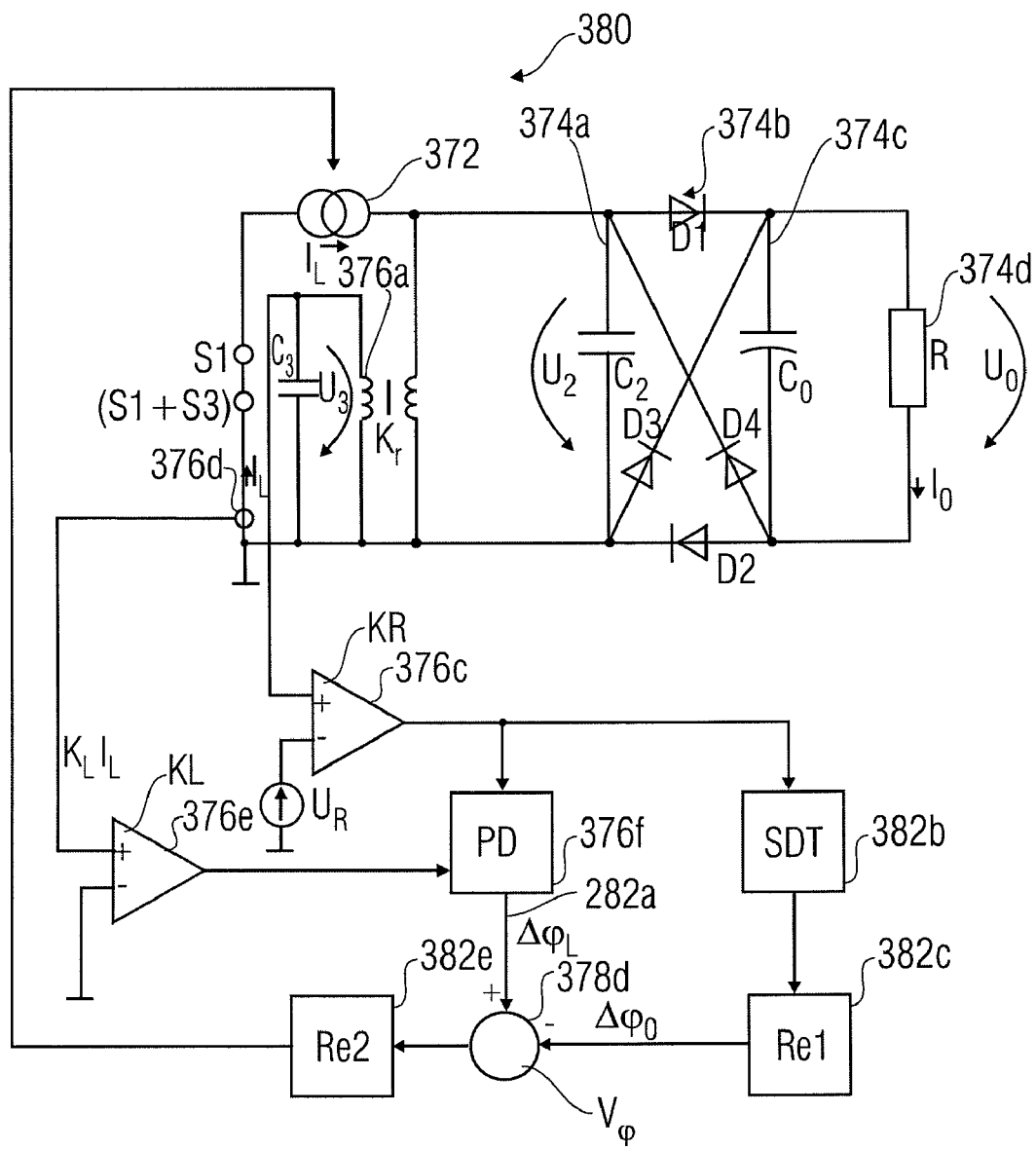
FIG. 3H is a block diagram of an inventive circuitry for regulating a resonance converter using both a phase shift between a switch current and a signal of an auxiliary output, and an amplitude of the signal present at the auxiliary output.

FIG. 3H shows a circuit diagram of an inventive resonance converter having a regulation based on a phase difference between the phase position of a switch current and a phase position of the auxiliary voltage. The circuitry of FIG. 3H is referred to as 380 in its entirety. Circuitry 380 is very similar to circuitry 370 shown with reference to FIG. 3G, so that in circuitry 380, identical means are designated by the same reference numerals as in circuitry 370. The output signal of first reference value comparator 376c, and the output signal of second reference value comparator 367e are supplied to phase detector 376f which, based on a phase shift between the output signals of first reference value comparator 376c and of second reference value comparator 376e, provides an output signal 382a describing a phase error $\Delta\phi_L$.

In addition, the output signal of first reference value comparator 376 is supplied to the threshold detector 382b, and threshold detector 382b generates an output signal by means of which a first regulator 382c is controlled. First regulator 382c provides a signal describing a regulation deviation $\Delta\phi_0$. The output signal of phase detector 376f as well as the output signal of first regulator 382c are then combined in a difference determination stage 382d (referred to as V$\phi$) so as to form an input signal for a second regulator. The second regulator 382e regulates a frequency and/or a duty cycle of an input-side excitation of the resonant transformer arrangement.

The mode of operation of circuitry 380 will be described below on the basis of the structural description. In order to keep an output voltage $U_0$ (present at direct current load 374d) at a constant level, output voltage $U_2$ (present at the output of the resonant transformer arrangement) may be evaluated, for example, in accordance with one aspect of the present invention, by detecting the auxiliary voltage $U_3$ which is proportional thereto. For the purposes of evaluation, the load current $I_L$ is furthermore detected, and a phase difference (between load current $I_L$ and auxiliary voltage $U_3$) is determined by phase detector 376f. In addition, a threshold detector 382b (also referred to as SD) is activated by reaching the reference value $U_r$ (also referred to as $U_R$), which is proportional to and/or linearly dependent on a value and/or target value of output voltage $U_0$. Threshold detector 382b controls the first regulator 382c and amplifies a positive or negative deviation from reference value $U_r$ by first regulator 382c (also referred to as RE1).

This regulation deviation of output voltage $U_0$ is switched as a phase deviation $\Delta\phi_0$ in addition to a phase error $\Delta\phi_L$. In other words, phase deviation $\Delta\phi_L$ provided by first regulator 382c is combined, by sum formation or difference formation, with the phase error $\Delta\phi_L$ provided by phase detector 376f. A consequent regulation error, or control error, which results, for example, from the sum formation and/or difference formation of $\Delta\phi_L$ and $\Delta\phi_0$, is switched to the second regulator 382e and/or is supplied to the second regulator 382e as an input signal. Second regulator 382e influences the current source $I_L$ (i.e. the excitation of the resonant transformer arrangement) in such a manner that load current $I_L$ is changed accordingly for reducing the regulation error. What is achieved by this is that only a small change in output voltage $U_0$, which would generate only a small regulation deviation $\Delta\phi_0$ via first regulator 382c, generates a larger regulation deviation, by underlying or superimposing of signal $\Delta\phi_L$ by means of detecting the load change via the output current $I_0$ which is changing to a higher extent, so that a faster regulation becomes possible. At the same time, only two observed signals $I_L$ and $U_3$ are required in comparison with threshold values zero and $U_r$, so that the regulator circuit is simplified as compared to known solutions.

In other words, by means of the circuitry according to FIG. 3H, both the output voltage $U_0$ and a load change (via phase difference $\Delta\phi_L$) are observed at the same time, and the two variables, or quantities, observed (change in the voltage and change in the current and/or in the present load) are also included into the regulation. This results in a faster and more reliable regulation of load changes.

It shall be pointed out here that the reference voltage $U_R$ may also be zero. It shall also be noted that the output signal of phase detector 376f represents a measure of a load (i.e., for example, a measure of the magnitude of direct current load 374b). The threshold detector 382b may also be a means which merely detects whether or not first reference value comparator 376c switches. If first reference value comparator 376c switches at least once within a certain time interval, threshold detector 382b reports a first state to first regulator 382c. If, on the other hand, no switching of the first reference value comparator 376c occurs within the predefined time interval, the threshold value detector 382d reports a second state to regulator 382c.

In other words, regulator 382c receives, from threshold value detector 382b, a signal indicating whether or not first reference value comparator 376c has switched within the predefined time interval. First regulator 382c may be, for example, merely a multiplier which sets the reference signal $\Delta\phi_0$ to a first value or a second value on the basis of the information received from threshold value detector 382b. However, reference signal $\Delta\phi_0$ may alternatively also exhibit a linear dependence on output voltage $U_0$. Generally, the combiner 382 may further be designed to output, to regulator 382e, an input signal which depends both on information about the magnitude of the load ($\Delta\phi_L$) and on information about the magnitude of the output voltage ($\Delta\phi_0$). For example, combiner 382b may use signal $\Delta\phi_0$ to decide whether the frequency and/or the duty cycle of the input-side excitation of the resonant transformer arrangement are to be increased or decreased.

In other words, combiner 382d may evaluate the signal $\Delta\phi_0$ as qualitative information which indicates only whether an increase or a decrease of the output signal of second regulator 382e is necessary. In addition, combiner 382b may decide, on the grounds of the magnitude of the load, on the basis of signal $\Delta\phi_L$, the extent to which the output quantity of second regulator 382e is to be changed. With a high load, a major change in the output quantity of second regulator 382e is advantageous, whereas with a small load, a small change to the output quantity of second regulator 382e is effected.

Using the circuitry 380 shown, one may achieve that with small loads, a constant output voltage $U_0$ is available, whereas, on the other hand, with high loads, the output voltage decreases with the logarithm of the output current.

Figure 3I:
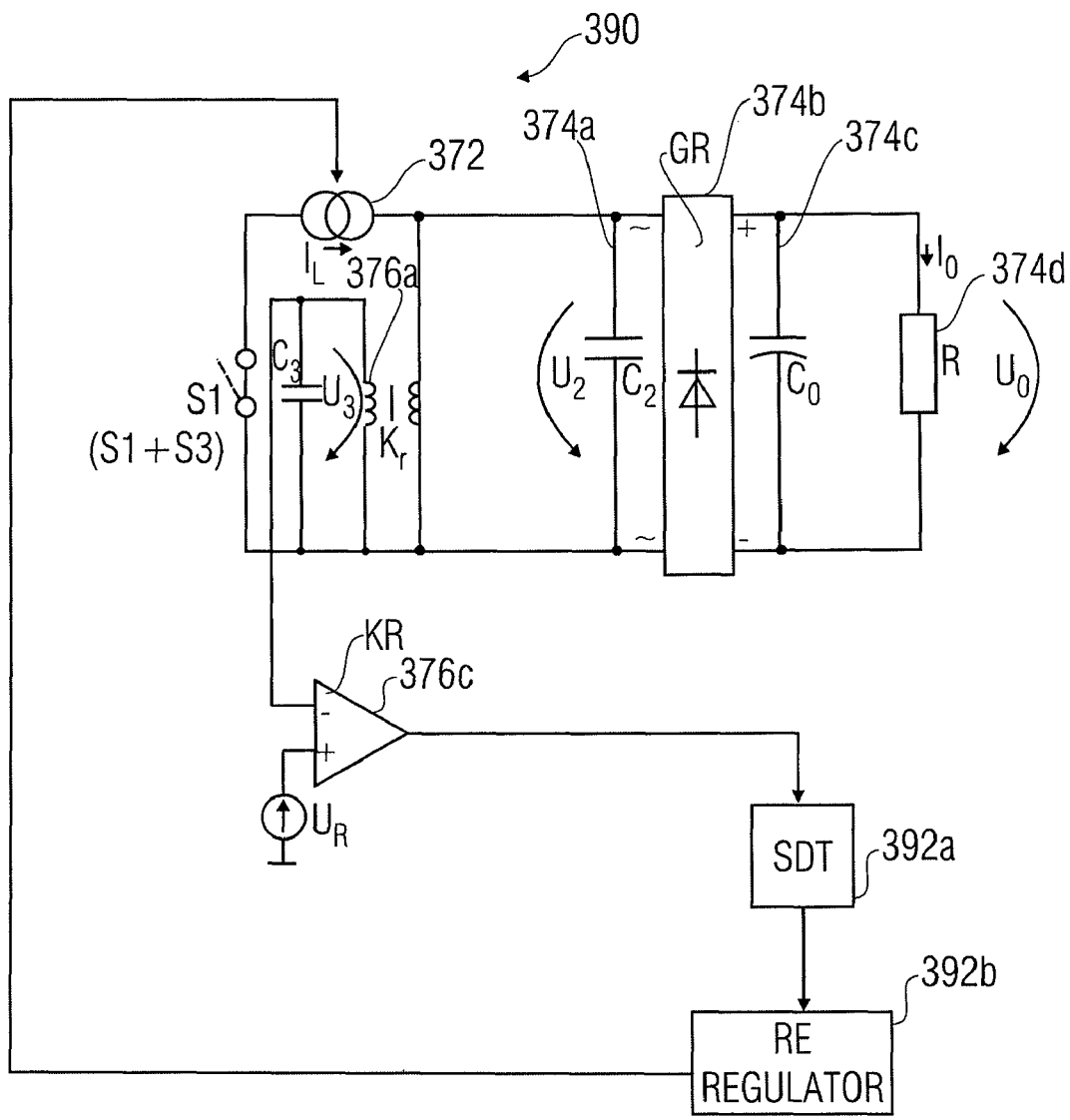
FIG. 3I is a block diagram of an inventive circuitry for regulating a resonance converter using only comparative information from a comparison between an auxiliary signal and a predefined reference value.

FIG. 3I shows a circuit diagram of an inventive resonance converter with a regulation based only on a voltage present at an auxiliary output. The circuitry of FIG. 3I is designated by 390 in its entirety. Since circuitry 390 of FIG. 3I also partly matches the circuitries 370, 380 shown with reference to FIGS. 3G and 3H, identical means are again provided with identical reference numerals and will not be explained once again here.

Reference value comparator 376c compares auxiliary signal $U_3$ with reference value $U_R$ and provides the output signal, which results from the comparison and which carries information about a comparison result, to a threshold value detector 392a also referred to as SD or SDT. Threshold value detector 392a provides its output signal to a regulator 392b. Further, regulator 392b provides a control signal for determining the frequency and/or the duty cycle for the input-side excitation of the resonant transformer arrangement.

In other words, a regulator circuit or control circuit, which consists of reference value comparator 376b, threshold value detector 392a and regulator 392b, is designed to detect when auxiliary signal $U_3$ exceeds or falls below reference value $U_R$. If reference value comparator 376c switches regularly and/or in a sequence, so that temporal intervals between the individual switching operations are shorter than a predefined maximum duration, peak detector 382, which may also be interpreted as a switching detection unit, will detect this and report a "switching" of the output of reference value comparator 376c to regulator 392b. If, however, no switching of the reference value comparator 376c occurs within a predefined interval, threshold value detector 392a will report a "non-switching" to regulator 392b. The states "switching" and "non-switching" are thus mapped by the peak detector and/or by switching detection unit 392a to associated voltages serving to control the regulator 392b. In the state of "switching", the quantity regulated by the regulator is changed, for example, toward a first direction, and in the state of "non-switching", the quantity influenced by the regulator is changed toward a second direction opposite to the first direction.

In other words, circuitry 390 presents a very simple regulator circuit, the regulation in accordance with circuitry 390 doing without a phase comparison. Only output voltage $U_0$ is compared with a reference value $U_r$ via factor $k_r$ from the transformational coupling-out by means of $U_3$. Since (as is the case also in FIG. 3H) the maximum value of auxiliary voltage $U_3$ is proportional to the maximum value of output voltage $U_2$, wherein approximately $U_{2max}=U_0$ applies, the output voltage $U_0$ may also be kept at a constant level via the comparison with a threshold value detector 392a (also referred to as SD and/or SDT) and after amplifying the error signal by regulator 392b (also referred to as RE) in that current source $I_L$ is influenced in order to remedy the error deviation. In other words, voltage $U_0$ present at direct current load 374d is about the same as a maximum value of output voltage $U_2$ present at the output of the resonant transformer arrangement, so that there is a connection between voltage $U_0$ and auxiliary voltage $U_3$.

To increase understanding, FIGS. 4A to 4E depict various equivalent circuit diagrams of an inventive resonance converter taking into account a phase shift between a switch current $I_S$ flowing through a switch of the switch unit, and load current $I_L$ flowing through a resonant circuit of the resonant transformer arrangement.

Figure 4A:
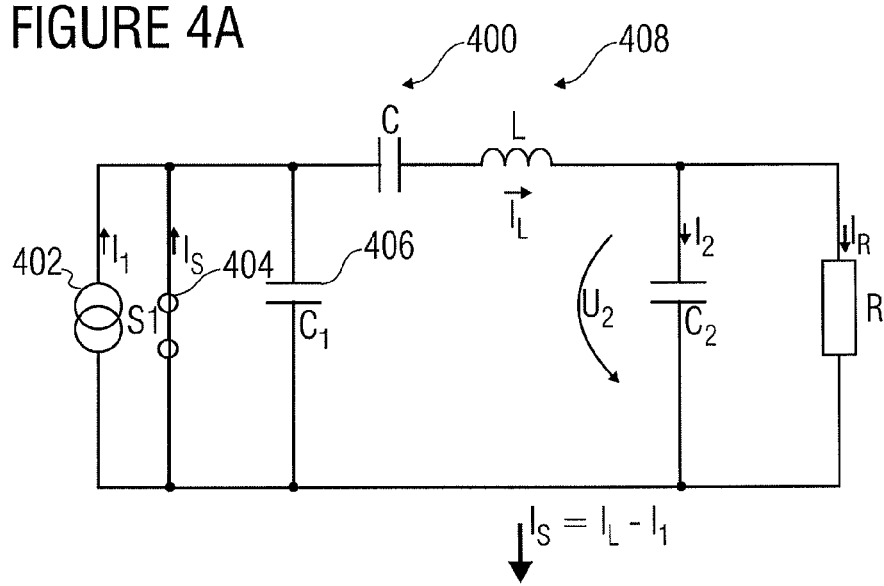
FIG. 4A is an equivalent circuit diagram of an inventive resonance converter.
Figure 4B:
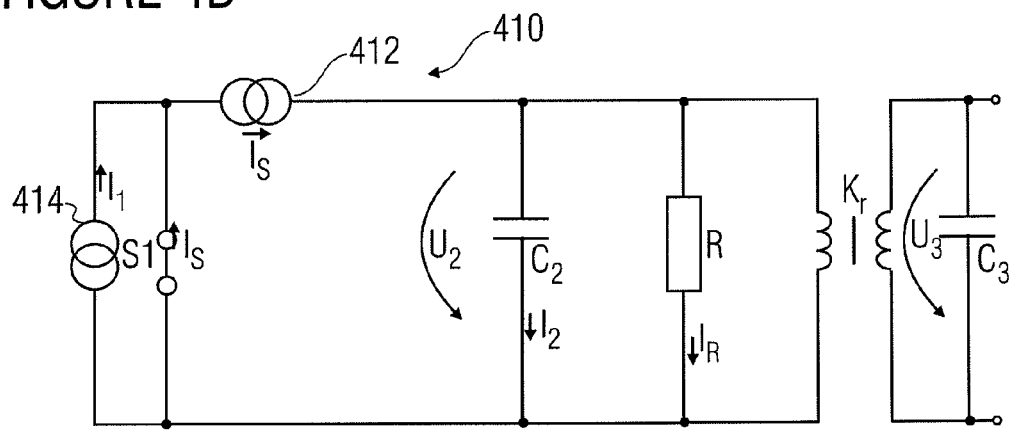
FIG. 4B is a reshaped equivalent circuit diagram of an inventive resonance converter of FIG. 4A.

FIG. 4A shows a fundamental circuit diagram of a resonance converter, the assumptions about the resonant transformer arrangement according to FIG. 2E being included.

The equivalent circuit diagram of FIG. 4A is designated by 400 in its entirety. An input current source 402 is connected in parallel with at least one switch 404 of the switch unit. Similarly, a first capacitance 406 ($C_1$) is connected in parallel with switch 404. An input of a resonant transformer arrangement 408 is consequently fed by input current source 402, which provides an input current $I_1$, as well as by switch 404 through which a switch current $I_S$ flows.

The equivalent circuit diagram 400 according to FIG. 4A thus shows the case that load current $I_L$, as is shown, e.g., in FIG. 3H, is measured directly in the switch (for example, thus, in switch 404), however that an input current $I_1$ is superimposed on the load current with $I_S=I_L-I_1$.

This is the case, for example, in the topologies of FIGS. 1D, 2B and 2D, so that a shift of the phase position between the load current ($I_L$) and the switch current ($I_S$) may occur. In the equivalent circuit diagram 410 of FIG. 4B, this fact is illustrated with equivalent current sources. A first equivalent current source 412 provides an effective load current $I_L=I_S+I_1$.

For FIGS. 1B and 1C (i.e. for topologies according to FIGS. 1B and 1C), however, the equivalent circuit diagram according to FIG. 3A applies, so that:

$$I_S=I_L.$$

In this case, load current $I_L$ is identical with switch current $I_S$ when the switch is closed.

Figure 4C:
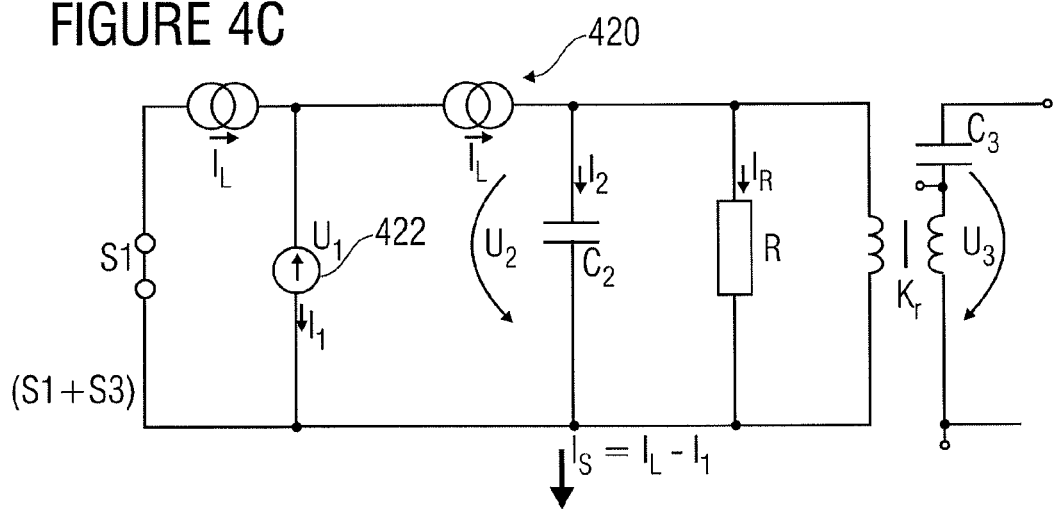
FIG. 4C is a further equivalent circuit diagram of an inventive resonance converter.

Also, there is the case that in accordance with the equivalent circuit diagram 420 of FIG. 4C, switch current $I_S$ and load current $I_L$ flow to an interposed voltage source 422 of voltage $U_1$, so that:

$$I_S=I_L+I_1.$$

This case applies to the converters of FIGS. 2A and 2C.

Figure 4D:
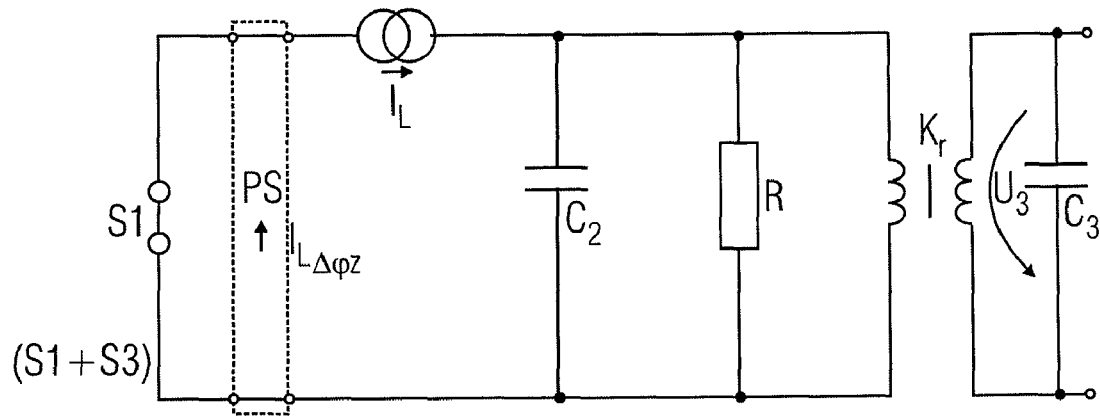
FIG. 4D is a reshaped equivalent circuit diagram of an inventive resonance converter while taking into account a phase shift between a switch current and a current in a resonant circuit of the resonant transformer arrangement of FIG. 4C.
Figure 4E:
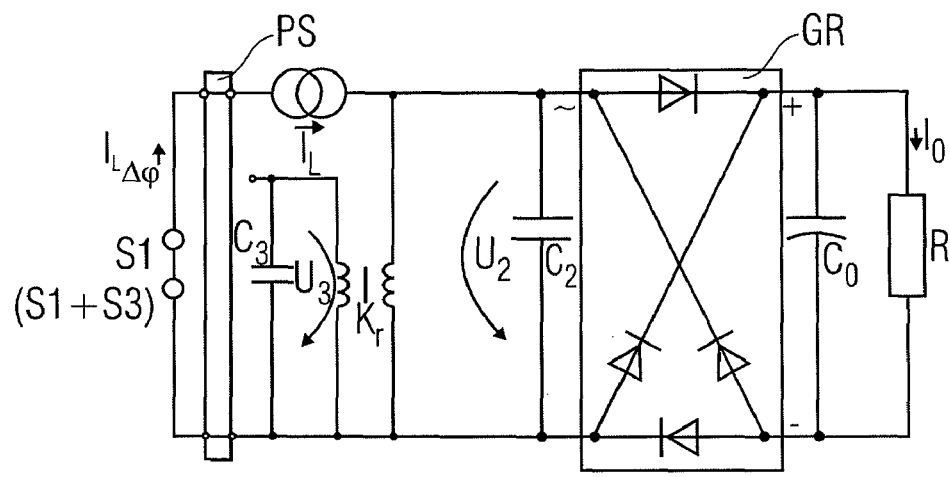
FIG. 4E is a further equivalent circuit diagram of a resonant transformer arrangement while taking into account a phase shift between a switch current and a current in the resonant circuit of the resonant transformer arrangement when using a resistive direct current load in connection with a rectifying circuit.

FIGS. 4D and 4E depict equivalent circuit diagrams wherein the fact of current superposition in the switch due to a phase shift $\Delta\phi_Z$ is illustrated. In reality, however, phase shift $\Delta\phi_Z$ is negligible in most cases.

If in a converter having a phase shift of switch current $I_S$ toward load current $I_L$, the resonant frequency of an input circuit or of an intermediate circuit is set to a load resonant frequency, the phase shift $\Delta\phi_Z$ in a current zero crossing will be almost zero, even though amplitudes of switch current $I_S$ and load current $I_L$ differ. The larger a deviation of an input frequency as a resonant frequency between $L_f$ and $C_1$ (as the resonant frequency of an oscillation circuit consisting of an inductance of the value $L_f$ and of a capacitance of the value $C_1$) from a resonant frequency of the load circuit consisting of inductance L and capacitance C, the larger the phase shift $\Delta\phi_Z$ will be. However, phase shift $\Delta\phi_Z$ will mostly be in an order of maximally +/−15° in the vicinity of resonance of the input circuit of up to +/−30° in the event that the input circuit exhibits a clearly reduced resonant frequency (as compared with the load circuit).

In the vicinity of the resonance between the input circuit or the intermediate circuit and the load circuit, this phase shift may therefore be neglected, in accordance with the invention, in that instead of load current $I_L$, switch current $I_S$ is evaluated with regard to its zero crossing. If, in the starting operation of the converter, the input frequency is measured in that the input circuit (or the voltage signal or current signal provided by the input circuit) is sampled during settling, a phase correction factor may be determined, and the load current may be sampled in a more precise manner with regard to its phase position via the switch current.

In other words, by detecting a resonant frequency of the input circuit or the intermediate circuit which is connected upstream from the input of the resonant transformer arrangement, a correction term may overall be determined which enables to determine an actual phase position of load current $I_L$ by correcting the phase position of switch current $I_S$ using the correction quantity.

Respective correction circuits will be shown below, and the correction value or the correction quantity mentioned will be referred to as $\Delta\phi_k$ below.

Figure 4F:
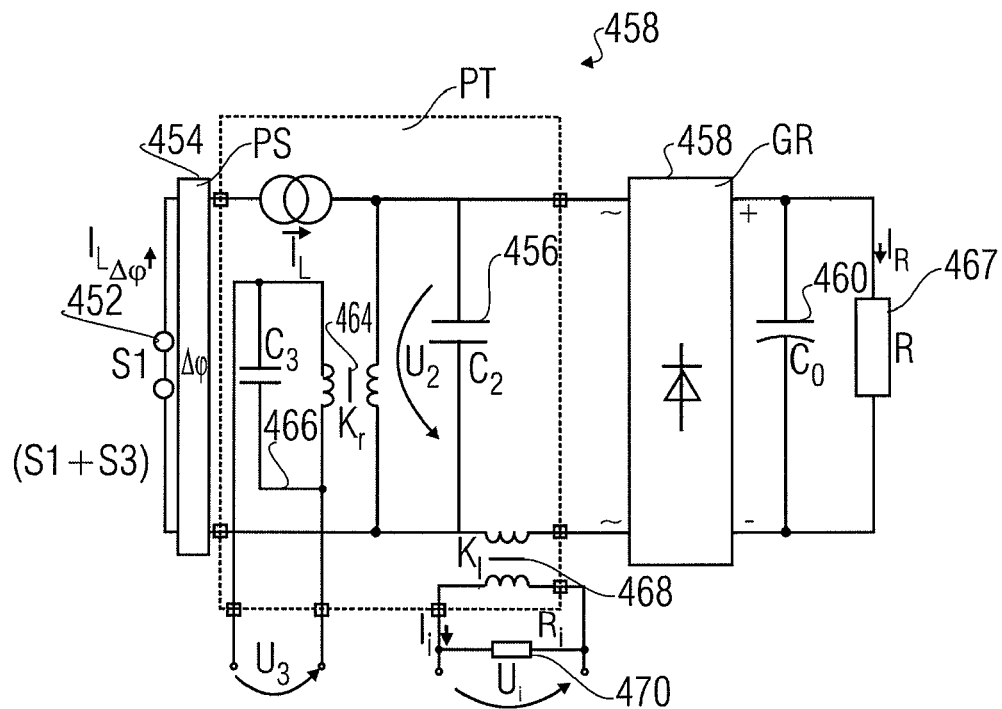
FIG. 4F is a portion of the equivalent circuit diagram of a resonance converter while taking into account a phase shift between a circuit current and a load current in a resonant circuit of the resonant transformer arrangement.

FIG. 4F shows part of an equivalent circuit diagram of an inventive resonance converter in accordance with an embodiment of the present invention while taking into account a phase shift between a switch current $I_S$ and a load current $I_L$. In addition, FIG. 4F depicts various possibilities of coupling out an auxiliary quantity. The circuitry of FIG. 4F is designated by 450 in its entirety. It shall be noted, with reference to FIG. 2F, that the input network 2020 according to FIG. 2F in FIG. 4F is represented by a switch 452 as well as by a phase shifter 454. The following applies to a switch current $I_S$ flowing through the switch 452:

$$I_S=I_{L\Delta\phi}=I_L \cdot e^{\pm j\Delta\phi}$$

Phase shifter 454 receives switch current $I_S$ and represents the fact that a load current $I_L$ exhibits a phase shift of $\Delta\phi$ as compared with switch current $I_S$. In accordance with circuitry 450, load current $I_L$ forms an output-side current flow of the resonant transformer arrangement and divides into a second capacitance 456 as well as the output of the resonant transformer arrangement. Also, the output of the resonant transformer arrangement is connected to the input of a rectifying circuit 485, at the output of which a load capacitance (filter capacitance) 460 is connected in parallel with a direct current load 462. The voltage present across the output of the resonant transformer arrangement is designated by $U_2$, whereas a voltage present across the direct current load 462 is designated by $U_0$. In addition, an input of a transformer 464 is connected in parallel with the output of the resonant transformer arrangement. An output of transformer 464 provides a voltage auxiliary signal (referred to as $U_3$). In addition, a third capacitance 466 ($C_3$) is connected in parallel with the output of transformer 464. It shall be pointed out here that transformer 464 is part of the resonant transformer arrangement, for example. It is preferred, for example, for the transformer 464 to be part of a piezo transformer (PT) or to be coupled to the piezo transformer.

In addition, an input of a current transformer 468 is connected in series between the output of the resonant transformer arrangement and the input of the rectifying circuit 458. In addition, an output of current transformer 468 is loaded with a load resistor 470 ($R_i$). Thus, a voltage which is proportional to a current $I_0$ flowing from the output of the resonant transformer arrangement to the input of the rectifying circuit 458 is present across resistor 470. Further, the respective voltage is designated by $U_i$ and forms a so-called current auxiliary signal. Further, instead of current transformer 468, any other circuitry may be selected which enables to generate a signal which is proportional to the current flowing from the output of the resonant transformer arrangement to the input of rectifying circuit 458. It is preferred, however, for there to be a galvanic separation between the output of the resonant transformer arrangement and the current auxiliary signal $U_i$.

Figure 4G:
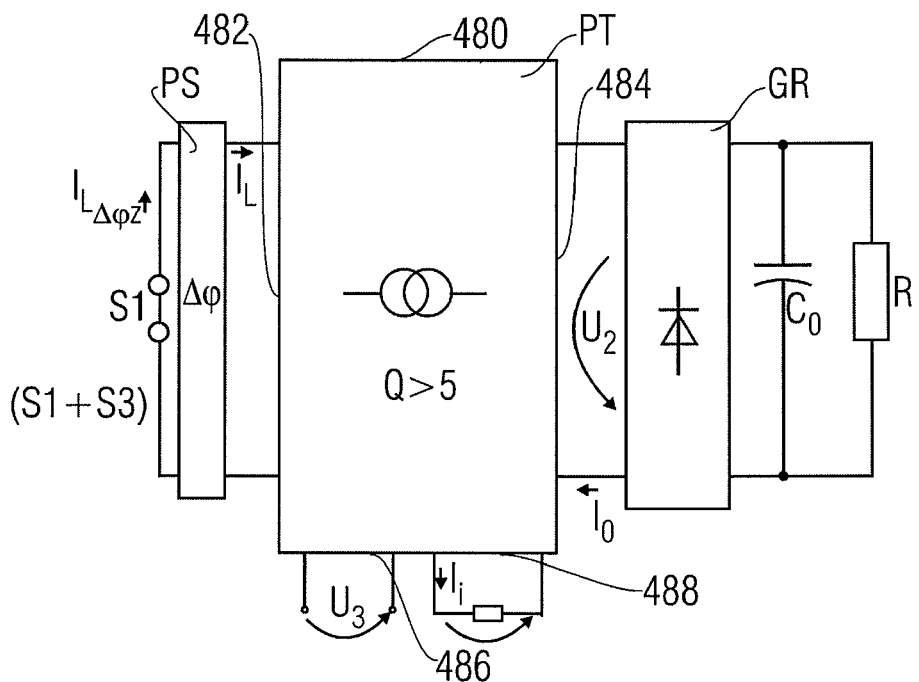
FIG. 4G is a further combined portion of the equivalent circuit diagram of a resonance converter while taking into account a phase shift between a switch current and a current in a resonant circuit of the resonant transformer arrangement of FIG. 4F.

FIG. 4G shows a form of representation, abstracted even more, of the network according to FIG. 4F, the resonant transformer arrangement 480 being depicted as a four-port network. Resonant transformer arrangement 480 receives input-side excitation at an input 482, and provides an output voltage $U_2$ and/or an output current $I_0$ at an output 484. Auxiliary voltage $U_3$ is present at a voltage auxiliary output 486, and a current auxiliary signal $U_i$, or $I_i$, which describes output current $I_0$, is present at a current auxiliary output 488.

In other words, FIGS. 4F and 4G depict configurations of load resonant circuits (e.g. resonant transformer arrangements or piezo transformers) having auxiliary outputs 486, 488 for detecting a quantity $U_3$ (auxiliary voltage) which is proportional to the output alternating voltage, and/or a quantity $I_i$ which is proportional to the output alternating current and which may be transformed to a voltage $U_i$ via a shunt, or shunt resistor. In accordance with the invention, the load network and/or the load resonant circuit may be a piezo transformer which includes such auxiliary outputs.

Figure 12:
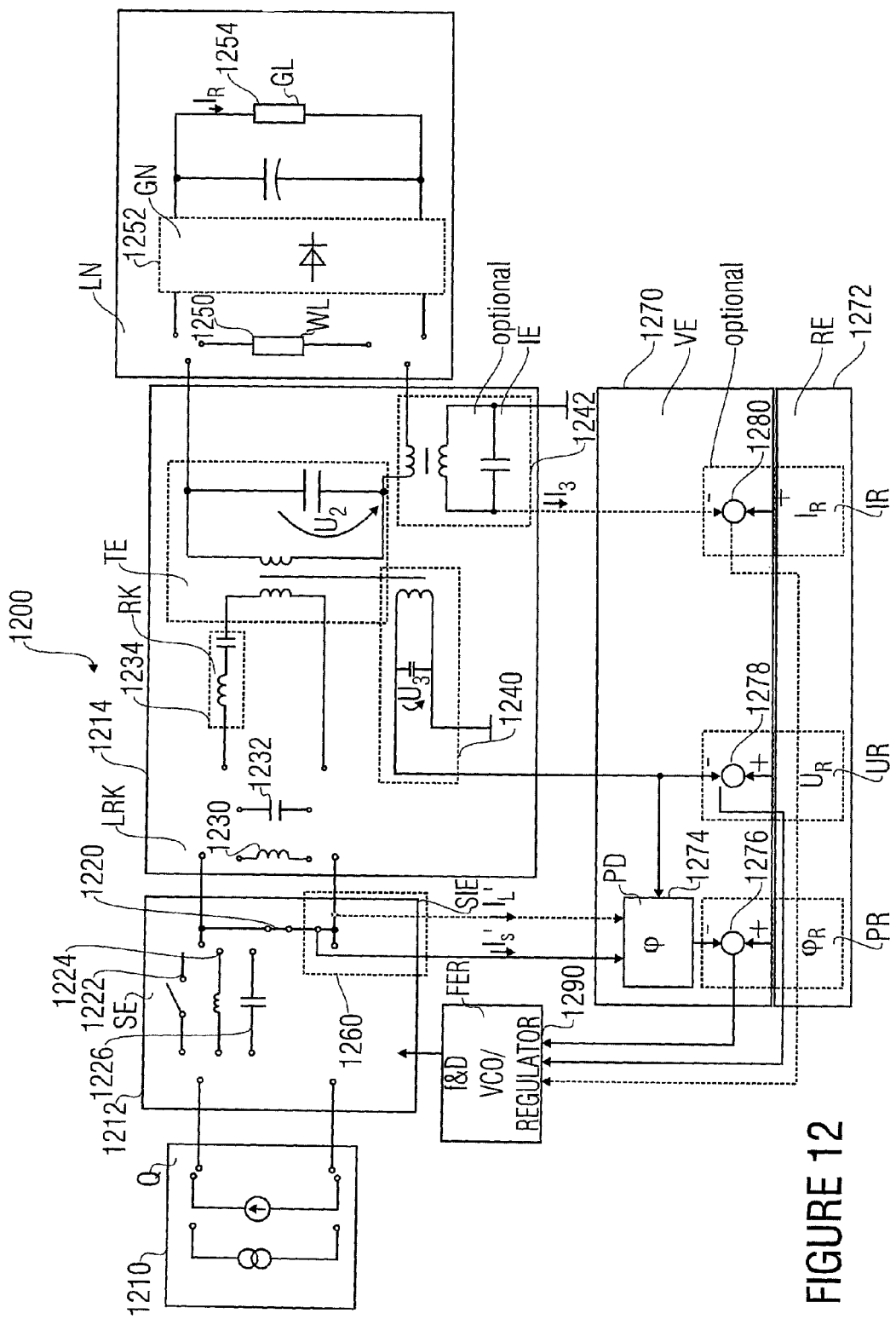
FIG. 12 is a block diagram of an inventive resonance converter for illustrating a general configuration of the regulation concept used.

FIG. 12 shows a block diagram of an inventive resonance converter with the output voltage being coupled out via parallel tapping. The circuitry according to FIG. 12 is designated by 1200 in its entirety, and describes the inventive concept in a very general manner. A source 1210, which may be, for example, a current source or a voltage source, is coupled to the input of a load resonant circuit 1214 via a switch unit 1212. The switch unit may include various topologies shown as alternative solutions in FIG. 12. For example, a second switch 1222, an inductance 1224 or a capacitance 1226 may be connected, alternatively or in combination, between source 1210 and a first switch 1220. On the input side, the load resonant circuit may include, for example, an inductance 1230 or a capacitance 1232 which may be connected in parallel with the input of load resonant circuit 1214.

In addition, the load resonant circuit includes a resonant transformer arrangement, for example a piezo transformer, the input of which is also coupled to the input of the load resonant circuit. On the input side, the resonant transformer arrangement includes, for example, a resonant circuit 1234 also referred to as RK. An output of the resonant transformer arrangement provides an output voltage $U_2$. In addition, the load resonant circuit 1214 includes the auxiliary outputs which have already been described using FIGS. 4F and 4G, specifically at least one voltage auxiliary output 1240 or a current auxiliary output 1242. Further, as has already been described above, alternatively either an alternating current load 1250 may be connected directly at the output of load resonant circuit 1214, or a direct current load 1254 may be connected at the output of load resonant circuit 1214 via a rectifier network 1252. Thus, the load resonant circuit 1214 essentially corresponds to the resonant transformer arrangement 480 as has been described with reference to FIG. 4G.

Circuitry 1200 further includes a current determination means 1260 (SIE) designed to detect the current flowing, for example, through the first switch 1220 of switch unit 1212, or the current provided by switch unit 1212 at load resonant circuit 1214, and to provide a signal (here designated by $I_S'$ or $I_L'$, respectively) which is proportional to the current detected. Circuitry 1200 further includes a comparative means 1270 and a reference means 1272. The comparative means 1270 includes a phase detector 1274 which receives one of signals $I_S'$, $I_L'$ and further receives auxiliary voltage $U_3$ from the voltage auxiliary output 1240. In addition, phase detector 1274 forms the phase difference between the signal $I_S'$, $I_L'$ and the voltage auxiliary signal $U_3$, thus it determines the positions, or phase positions, of the two signals relative to each other.

A linking means and/or a difference determiner, or difference calculator, 1276 determines the difference between a result provided by phase detector 1274 (i.e. the phase difference between signal $I_S'$ and auxiliary voltage $U_3$ or between signal $I_L'$ and auxiliary voltage $U_3$) and a phase reference $\phi_R$. In addition, a second combination means, or a second difference determiner, 1278, determines a difference between auxiliary voltage $U_3$ (or a mean value of same, or an amplitude of same) and a voltage reference $U_R$. In addition, a third combination means, or a third difference determiner, 1280 (optional or alternative), determines a difference between the current auxiliary signal $I_3$ present at current auxiliary output 1242, and a current reference $I_R$.

A regulator 1290 (also referred to as FER) receives the signals of first difference determiner 1276, of second difference determiner 1278 as well as of third difference determiner 1280 (if the latter is present). Regulator 1290 typically includes an analog voltage-controlled oscillator or a digital means for providing a signal having a variable frequency, and is designed to set the frequency of the signal generated as well as the duty cycle of the signal generated as a function of the signals received from the difference determiners 1276, 1278, 1280. Thus, regulator 1290 provides a control signal to switch unit 1212 to control, or turn on or turn off, for example first switch 1220 as well as any further switches that may be present.

Figure 5:
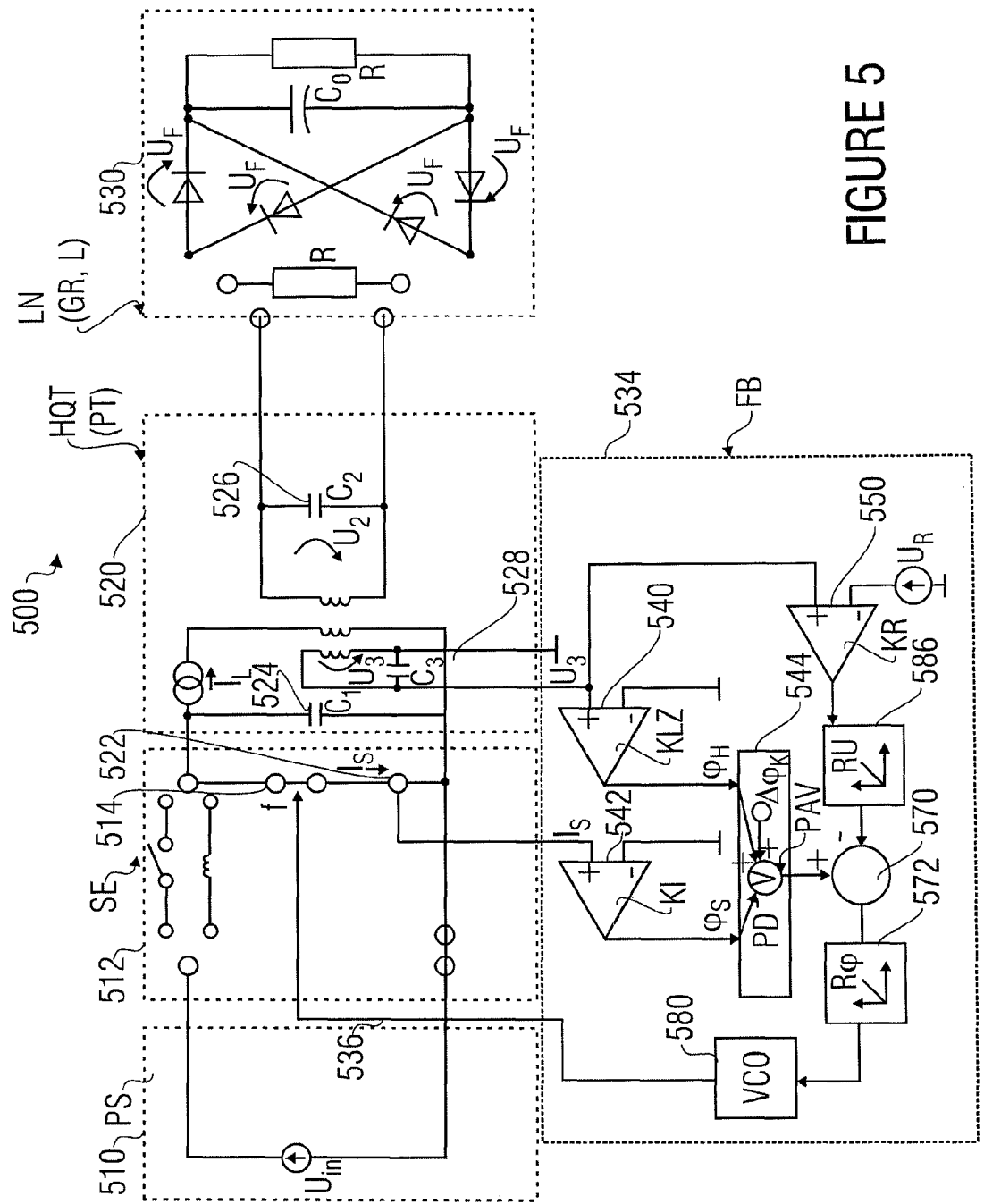
FIG. 5 is a circuit diagram of an inventive resonance converter with a regulation based on a current flowing through a switch of the switch unit, and an auxiliary signal from an auxiliary output of the resonant transformer arrangement while including both a phase shift and an amplitude of the signal present at the auxiliary output.

FIG. 5 shows a block diagram of an inventive resonance converter having a regulation based on a phase difference between the switch current and the auxiliary voltage, and an amplitude of the auxiliary voltage.

The circuitry according to FIG. 5 is based on the fundamental principle as is shown using circuitry 2000 in FIG. 2F, and is further similar to circuitry 1200 according to FIG. 12. For this reason, features that have already been explained with regard to the circuits mentioned will not be set forth in detail here. Rather, reference shall be made to the above configurations. In addition, it shall be pointed out that the circuitry according to FIG. 5 is designated by 500 in its entirety.

A voltage source 510 serves as an energy source and/or a power source, and supplies a switch unit 512 with electric energy. Switch unit 512 includes at least one switch 514 and further serves to generate input-side excitation for a resonant transformer arrangement, or load resonant circuit 520. In terms of its topology, switch unit 512 may correspond to circuitries 100, 140 and/or 160 shown in FIGS. 1B, 1D, and 1D, respectively. In addition, switch unit 512 may alternatively correspond to circuitries 200, 230, 250, 270 according to FIGS. 2A, 2B, 2C and 2D. The only thing that is relevant here is that switch unit 512 includes a current detection means 522 so as to determine the current flowing through switch 514, or the current supplied to load resonant circuit 520 in switch unit 512. A signal carrying information about the current mentioned is designated by $I_S$ here and thus represents switch current $I_S$.

Load resonant circuit 520 includes, for example, a piezo transformer as well as additional input-side and/or output-side reactance elements (inductances or capacitances), as the case may be, for example an input-side first capacitance 524 ($C_1$) and/or an output-side second capacitance 526 ($C_2$). In addition, the load resonant circuit includes an auxiliary output 528, at which an auxiliary voltage $U_3$ is present which is at least approximately (with a maximum linearity error of +/−20%) a proportional image of output voltage $U_2$ present at the output of load resonant circuit 520. Further, the output of load resonant circuit 520 is coupled to an input of a load network 530 which may include, in the previously described manner, an alternating current load and/or a direct current load.

A control circuit 534 (also designated by FB) receives signal $I_S$ from switch current determination means 522 and, in addition, auxiliary voltage $U_3$, and on the basis thereof it generates a control signal 536 for switch unit 512.

A first reference value comparator 540 compares auxiliary voltage $U_3$ with a reference potential so as to detect zero crossings of auxiliary voltage $U_3$. In other words, the first reference value comparator 540 generates an output signal which characterizes a phase position $\phi_H$ of auxiliary voltage $U_3$. A second reference value comparator 542 further compares signal $I_S$ with a reference potential to detect zero crossings of the current flowing through switch 514. The output signal of second reference value comparator 542 thus characterizes a phase position $\phi_S$ of the switch current.

A phase detector 544 receives both the output signal of first reference value comparator 540 and the output signal of second reference value comparator 542, and determines a phase shift between the zero crossing of auxiliary voltage $U_3$ and the zero crossing of switch current $I_S$. In addition, phase detector 544 is optionally designed to perform a phase correction of the phase difference mentioned, i.e. to include a phase correction quantity $\Delta\phi_K$, for example in an additive or subtractive manner, into a result for a phase shift. By means of the phase correction mentioned, for example a phase shift between switch current $I_S$ and load current $I_L$ flowing in a resonant circuit of the resonant transformer arrangement may be taken into account. Thus, phase detector 540 provides information (which has optionally been corrected by phase correction quantity $\Delta\phi_K$) about the phase shift between auxiliary voltage $U_3$ and switch current $I_S$.

Moreover, a third reference value comparator 550 compares auxiliary voltage $U_3$ with a predefined or variable reference voltage, or voltage reference, $U_R$ and provides a result of the comparison to a first regulator 560. An output quantity of first regulator 560 is either increased or decreased as a function of the comparison result provided by third reference value comparator 550. First regulator 560 may process the output signal of third reference value comparator 550, for example by averaging, by integration or by low-pass filtering, so as to provide an output quantity. First regulator 560 may also comprise a non-linear characteristic curve, i.e. may, for example, apply a threshold value decision to the output signal of third reference value comparator 550.

A combiner 570 combines the output quantity of phase detector 544, i.e. the phase difference (which may have been corrected), with the output quantity of first regulator 560 in an additive or subtractive manner and passes the result of the addition or subtraction as an input quantity to a second regulator 572. Second regulator 572 is designed to pass on information about an operating frequency f to a voltage-controlled oscillator (VCO) 580. The voltage-controlled oscillator 580 then controls the switch unit 512 with the operating frequency f so that, for example, a time period between successive turn-on operations of switch 514 or between successive turn-off operations of switch 514 is determined by the operating frequency.

In other words, FIG. 5 shows an implementation of an inventive converter, or resonance converter, having variable features in the input circuit (various possible topologies of switch unit 512) and in the load circuit (direct current load or alternating current load). The inventive converter, or resonance converter, however, exhibits a uniform control principle irrespective of structural details of the input circuit (switch unit 512) or of the load circuit (load network 530). In addition, the inventive converter 500 has an auxiliary winding, which is proportional to the output voltage, of a high-Q (with Q>5) load resonance network 500.

In the input circuit (i.e. in switch unit 512, which is also referred to as SE), the various topologies according to FIG. 1B, 1C, 1D, 2A, 2B, 2C or 2D may be realized in that switch current $I_S$ is regarded as approximately in-phase, in the zero crossing, with load current $I_L$. In load network 530 (also referred to as LN), an alternating current load or a direct current load may alternatively be connected.

The control circuit 534 (also referred to as FB) includes a circuit by means of which all topologies mentioned and, as the situation may be, further topologies may be controlled, or regulated, with a constant output voltage (or may be controlled, or regulated, to have a constant output voltage). In addition to the configuration according to FIG. 3H, the phase position $\Delta\phi_K$ of the switch current is corrected as a function of quantities such as an input voltage, an input frequency as compared with a resonant frequency of the load circuit and/or of a desired load characteristic curve.

If, for example, a constant output voltage is to be set, a self-mapping of the phase position between $\phi_S$ and $\phi_H$ of the comparators, or reference value comparators 542 (also referred to as KL) and 540 (also referred to as KLZ) may be obtained in a desired correction function which, for example, may be programmable. In other words, a function may be specified which maps the phase difference between the output signals of first reference value comparator 540 and of second reference value comparator 542 to a corrected phase difference. Mapping of the phase difference to the corrected phase difference may be effected, for example, using a description of the connection in terms of formulae, or using a table of values, or lookup table. Depending on the mathematical function (or depending on how the correction function is selected), any curve shapes of the output voltage may be realized. In other words, various curves of the output voltage or of the output current may be predefined as a function of a load.

What is disadvantageous about the configuration described is the imprecision of correction factors caused by tolerance deviations in the system. However, higher levels of regulation precision may be achieved with the configuration described than by implementing a control according to FIG. 2F and/or FIG. 2G. Also, the implementation that has just been described offers the possibility of an almost arbitrary characteristic curve of the output voltage as compared with the output current.

In other words, circuitry 500 according to FIG. 5 may effect both a current regulation of the current flowing through load network 530 and a voltage regulation of the voltage present at load network 530. The respective properties may be set, for example, in terms of the magnitudes of the influence of the phase difference provided by phase detector 544 and of the influence of the output signal provided by first regulator 560, relative to one another, on the input signal of second regulator 572. In other words, a determination may be made, by adjusting the amplifications of phase detector 544 and of first regulator 560, as to whether circuitry 500 achieves a voltage regulation or a current regulation. It shall be noted here that the input signal of second regulator 572 specifies the extent and the direction of the change in the frequency of voltage-controlled oscillator 580 (VCO). Additionally, it is to be stated that the angle $\Delta\phi_K$, which is included, in an additive or subtractive manner, in the result of phase detector 544, is defined in the same manner as was described with reference to FIGS. 4A-4G. In other words, the phase correction angle $\Delta\phi_K$ ideally corresponds to the angle $\Delta\phi_Z$, i.e. describes the phase shift between switch current $I_S$ and load current $I_L$.

Figure 6:
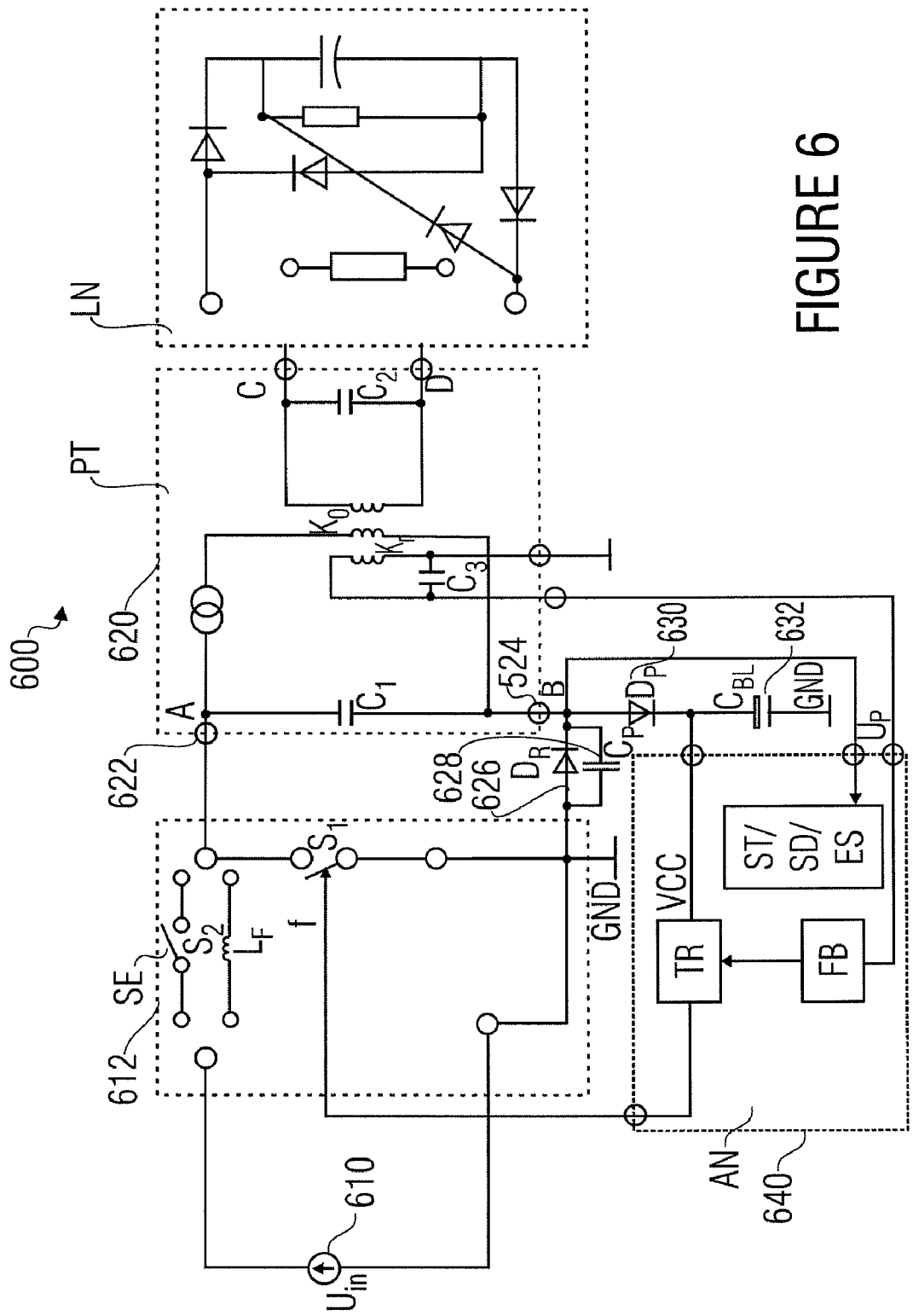
FIG. 6 is a circuit diagram of an inventive resonance converter having a pump circuit for providing a supply voltage as well as monitoring of the pump circuit.

FIG. 6 shows a circuit diagram of an inventive resonance converter in accordance with an embodiment of the present invention having a pump circuit for generating a supply voltage for a control circuit. The circuit of FIG. 6 is designated by 600 in its entirety. Circuitry 600 includes a voltage source 610, the first terminal of which is coupled to a first input terminal of a switch unit 612, and the second terminal of which is coupled to a reference potential GND. Switch unit 612 corresponds to switch unit 512 according to FIG. 5 and may include, for example, the potential circuitries described with reference to FIG. 5. In addition, circuitry 600 includes a load resonant circuit or a load resonance network 620, the structure of which essentially corresponds to load resonance network 520 according to FIG. 5. A first input-side terminal 622 of load resonance network 620 is coupled to an output terminal of switch unit 612, switch unit 612 being designed to provide, at the output terminal, a current flow and/or a voltage with regard to reference potential GND. In other words, the output terminal of switch unit 612 is designed to provide energy at a load between the output terminal and the reference potential GND.

A second input-side terminal 624 of load resonant circuit 620 is coupled to reference potential GND via a first diode 626. An anode terminal of first diode 626, the first diode also being referred to as $D_R$, is coupled to reference potential GND, whereas a cathode terminal of first diode 626 is coupled to the second input-side terminal 625 of load resonant circuit 620. Optionally, a capacitance 628 is connected in parallel with first diode 626. The second input-side terminal 624 of load resonant circuit 620 is further coupled to a first terminal of a pump capacitance 632 via a second diode 630 (in the polarity shown) (the second diode also being referred to as $D_P$). A second terminal of pump capacitance 632 is further coupled to reference potential GND. The potential occurring, in the circuitry mentioned, at the second input-side terminal 624 of load resonant circuit 620 is further referred to as pump voltage $U_P$ and may be utilized for further control, regulation and/or monitoring tasks, as will be explained below. It shall also be noted that the voltage present at the first terminal of pump capacitance 632 may serve as a supply voltage for a control circuit (for example a driver, a regulator circuit or other circuit components).

The mode of operation of the circuit mentioned will be briefly described below. By switch unit 612, input-side excitation of load resonant circuit 620 is generated. Within the framework of this excitation, a direction of a current flow at the second terminal 624 of load resonant circuit 620 may be into the load resonant circuit or out of the load resonant circuit. If the current flowing at the second terminal 624 flows into the load resonant circuit, this current will be provided by the first diode 626 which is conductive in this state and across which there will thus be a very small voltage drop in the order of magnitude of 1 volt. If, however, the current flows out of second terminal 624 of load resonant circuit 620, first diode 626 will block, whereas the second diode 630 will conduct. Thus, a potential which is about 1 volt above the potential present at the first terminal of pump capacitance 632 will be present at the second input-side terminal 624 of load resonant circuit 620.

It shall also be noted that pump voltage Up may be evaluated, for example, by a protective circuit which turns off the resonance converter when, for example, an inadmissibly high or too low a pump voltage $U_P$ occurs.

In summary, it may thus be stated that FIG. 6 depicts an inventive possibility of a pump circuit having two diodes 626 ($D_R$) and 630 ($D_P$). By means of the pump circuit mentioned, it can be ensured that a control circuit 640 (AN) of an inventive resonance converter is supplied. Via capacitance 628 ($C_P$), a limit of the smallest input voltage $U_{in}$ of voltage source 610 may be set at which the circuit is to function. In addition, a signal which, during the oscillation build-up of the converter or resonance converter, determines the frequency, or resonant frequency, of an input circuit in that arrival of pump signal Up at the supply voltage level VCC is sampled, may be picked up at a pump node B (i.e. at the second input-side terminal 624 of load resonant circuit 620). As will be described below, pump signal $U_P$ may also serve as a restarting signal if it reaches a zero crossing, since pump signal $U_P$ is advanced from a potential at node A (i.e. at the first input-side terminal 622 of load resonant circuit 620). By means of an adapted time delay of about ¼ of a period duration, the converter, or resonance converter, may thus be turned on at the correct moment in time.

Figure 7A:
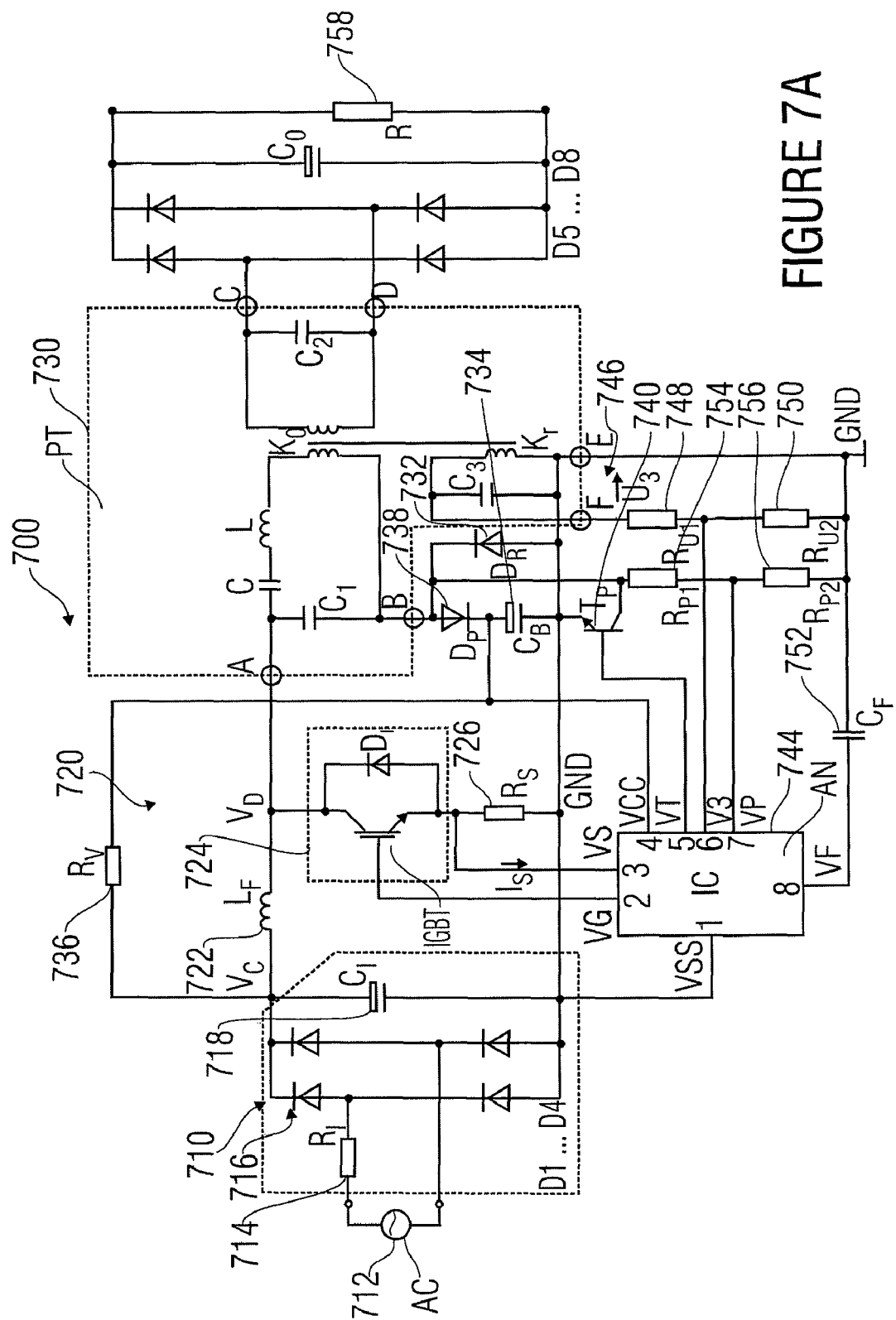
FIG. 7A is a circuit diagram of an inventive resonance converter in a class-E topology with parallel coupling-out of an auxiliary signal from the output voltage of the resonant transformer arrangement using a control IC having eight terminals.

FIG. 7A shows a circuit diagram of an inventive resonance converter in accordance with a further embodiment of the present invention. The resonance converter according to FIG. 7A is designated by 700 in its entirety. The resonance converter 700 includes an energy source, or a direct voltage supply, 710. The energy source 710 receives an alternating voltage from an alternating voltage source 712 and optionally includes an input resistor 714 connected between the alternating voltage source 712 and a bridge rectifier 716. The energy source 710 further includes a load capacitance 718, so that energy source 710 provides an unregulated direct voltage. Circuitry 700 further includes an input network 720. An inductance 722 is connected between an input of the input network, the input being coupled to energy source 710, and an output of the input network. A controlled switch 724 and a shunt resistor 726 are connected in series between the output of the input network and a reference potential GND. Switch 724 is formed by a collector-emitter path of an IGBT transistor, a collector terminal of the IGBT transistor being coupled to the output of input network 720, and an emitter terminal of the IGBT transistor being coupled to reference potential GND via the shunt resistor 726 ($R_S$).

The output terminal of input network 720 further is coupled to a first input-side terminal of a resonant transformer arrangement 730 with a voltage auxiliary output. The resonant transformer arrangement 730 may be, for example, a piezo transformer as has already been described above and can be seen in FIG. 7A. A second input-side terminal of resonant transformer arrangement 730 is coupled to a first terminal of a pump capacitance 734 ($C_P$) via a first diode, or pump diode, 732 ($D_P$). The second terminal of pump capacitance 734 is further coupled to reference potential GND. In addition, a series resistor 736 (RV) is connected between the output of energy source 710 and the first terminal of pump capacitance 734. Also, a second diode, or reverse diode, 738 is connected between the terminal of resonant transformer arrangement 730 and reference potential GND, as is depicted in FIG. 7A.

Moreover, a pump regulation transistor is connected between the second terminal of resonant transformer arrangement 730 and the reference potential, a collector terminal of the pump regulation transistor 740 being coupled to the second input-side terminal of resonant transformer arrangement 730, and an emitter terminal of pump regulation transistor 740 being coupled to reference potential GND.

Circuitry 700 further includes an integrated regulator circuit 744 having eight terminals. A first terminal (VSS) of the integrated regulator circuit is coupled to reference potential GND. A second terminal of the integrated regulator circuit (VG) is coupled to a control input, or gate terminal, of the IGBT transistor. A third terminal (VS) of integrated control circuit 744 is coupled to the emitter terminal of the IGBT transistor so as to receive information about the current flow through switch 724, or through shunt resistor 726. Moreover, a fourth terminal (VCC) is coupled to the first terminal of pump capacitance 734 to receive a supply voltage for the integrated control circuit 744. The supply voltage may either be supplied via series resistor 736 ($R_V$) or by means of first diode 732, and is buffered by pump capacitance 734. A fifth terminal ($V_T$) of integrated control circuit 744 is coupled to the base terminal of pump regulation transistor 740. Turning on the pump regulation transistor may prevent pump capacitance 734 from being charged further, whereby the voltage present across pump capacitance 734 may be regulated to have a target value.

A sixth terminal ($V_3$) of the integrated control circuit 744 receives an auxiliary voltage $U_3$ from an auxiliary output 746 of resonant transformer arrangement 730 via a voltage divider consisting of two resistors. The voltage divider includes two resistors 748, 750 connected between the first terminal of auxiliary output 746 and reference potential GND. In addition, the second terminal of auxiliary output 746 is directly connected to reference potential GND.

A seventh terminal ($V_P$) of integrated control circuit 744 further receives a voltage proportional to the voltage present at the second input-side terminal of the resonant transformer arrangement, via a further resistive voltage divider connected between the second input-side terminal of resonant transformer arrangement 730 and reference potential GND. The voltage provided, accordingly, at a seventh terminal of integrated circuitry 744 will also be referred to as pump voltage $V_P$ below.

An eighth terminal of integrated circuitry 744 is further coupled to reference potential GND via a capacitance 752 ($C_F$).

It shall further be noted that the collector-emitter path of the IGBT transistor further has a free-wheeling diode connected in parallel with it, the free-wheeling diode being designed to carry a reverse current when the IGBT transistor is turned off.

In other words, FIG. 7A shows an inventive technical configuration of an entire converter, or resonance converter, in a class-E topology according to FIG. 1D. The integrated control circuit (also referred to as control IC AN) exhibits eight pins at the most, the allocation of which will be briefly explained once again below. An output $V_G$, for example, drives the IGBT transistor or a high-voltage MOSFET (HV MOSFET) which must block the voltage which is twice or four times as high as that of the mains input voltage peak value (AC). The current flowing in the switch, or through the switch, 724 is sampled via the shunt resistor (briefly referred to as shunt) having a value of $R_S$, and is optionally used for evaluating the phase zero crossing, for monitoring excess current, or for recognizing a reverse current flowing through diode $D_f$. Supply of integrated circuit 744 (IC) via the voltage present at the fourth terminal (VCC) (briefly: via voltage VCC) is initially effected, in a starting operation, via series resistor 736 ($R_V$) and thereafter, in the settled state, by the pump circuit consisting of first diode 732 ($D_P$) and second diode 738 ($D_R$).

It is ensured, via the pump regulation transistor 740 ($T_P$), that voltage VCC varies within certain limits only. If the supply current present across the pump circuit becomes too large, $T_P$ will turn itself on and dissipate the current to reference potential GND (also referred to as VSS). An input frequency may be sampled, as a one-off operation, in a starting operation, respectively, via the resistive divider consisting of resistors 754 ($R_{P1}$) and 756 ($R_{P2}$) in that the voltage present at the seventh terminal ($V_P$) of integrated control circuit 744 is evaluated. In addition, in each period a restarting signal having a delay of about ¼ of a period duration may be generated for the respective pump voltage ($V_P$) in an operation of integrated control circuit 744, the restarting signal causing the switch 724 to be turned on. In addition, indirect determination of an input voltage magnitude (i.e. of the unregulated input direct voltage provided by energy source 710) is possible via a slew rate of the signal mentioned (i.e. of pump voltage $V_P$), so that excess-voltage turn-off may be implemented. For this purpose, a time elapsing between a zero crossing and a nominal value of supply voltage VCC being reached is placed into a relation to a period duration. The higher the input voltage, the shorter, or smaller, the time mentioned, or a relative slew time calculated therefrom. Other influences, such as a load change, may be neglected in this.

The resistive divider consisting of resistors 754 ($R_{P1}$) and 756 ($R_{P2}$) may alternatively, with suitable other resistances, be connected, for example, to a positive electrode of load capacitor 718 ($C_l$), instead of to the second input-side terminal of resonant transformer arrangement 730 (also referred to as node B) so as to observe the input voltage (i.e. the voltage provided by energy source 710) directly and more accurately. In this case, however, determining an input frequency (i.e. a frequency of input-side excitation of resonant transformer arrangement 730, or a resonant frequency of input network 720) is not possible, so that approximated correction factors of the phase shift (between switch current $I_S$ flowing through switch 724 and load current $I_L$ flowing through a resonant circuit of resonant transformer arrangement 730) must be used. In other words, by evaluating the voltage present at the second input-side terminal of resonant transformer arrangement 730, the resonant frequency of input network 720 may be determined, which may be exploited in the above-described manner for correcting the phase shift (for example using a correction angle $\Delta\phi_H$).

In another embodiment, the resonance converter, or the input network, already exhibits a topology with which a phase correction of load current $I_L$ as compared with switch current $I_S$ is not required. This is the case, for example, with the topologies according to FIGS. 1B and 1C. However, it is also possible to use a different topology having an input frequency tuned to the load resonant circuit.

Via an auxiliary output, or voltage auxiliary output, 746 of the resonant transformer arrangement, or the load resonant circuit, 730 (also referred to as PT) at terminals E and F, via a voltage divider consisting of resistors 748 ($R_{U1}$) and 750 ($R_{U2}$), the auxiliary signal, or voltage auxiliary signal, $U_3$ is evaluated in terms of phase and amplitude via the sixth terminal, or input, ($V_3$) of integrated control circuit 744 so as to obtain a desired regulation characteristic. The evaluation has been described above by means of FIGS. 3G, 3H, 3I and 5.

The fifth terminal, or output, (VT) of integrated control circuit 744 controls the regulation transistor, or pump regulation transistor, 740 ($T_P$), which keeps the supply voltage VCC at a constant level by means of a two-point regulation, as has already been described using FIG. 6. The eighth terminal, or input, (VF) of integrated control circuit 744 serves, for example, to specify a minimum frequency via an external capacitance 752 ($C_F$). At the same time, the eighth terminal, or input, may be used for conventional feedback via an optocoupler, or another galvanically separated feedback of the output direct voltage (for example at a direct current load 758) if an application is to be operated without an auxiliary winding of resonant transformer arrangement 730, or of a piezo transformer 730. In this case, capacitance 752 ($C_F$) acts as a filter at the same time in order to suppress high-frequency output-side voltage fluctuations.

Figure 8:
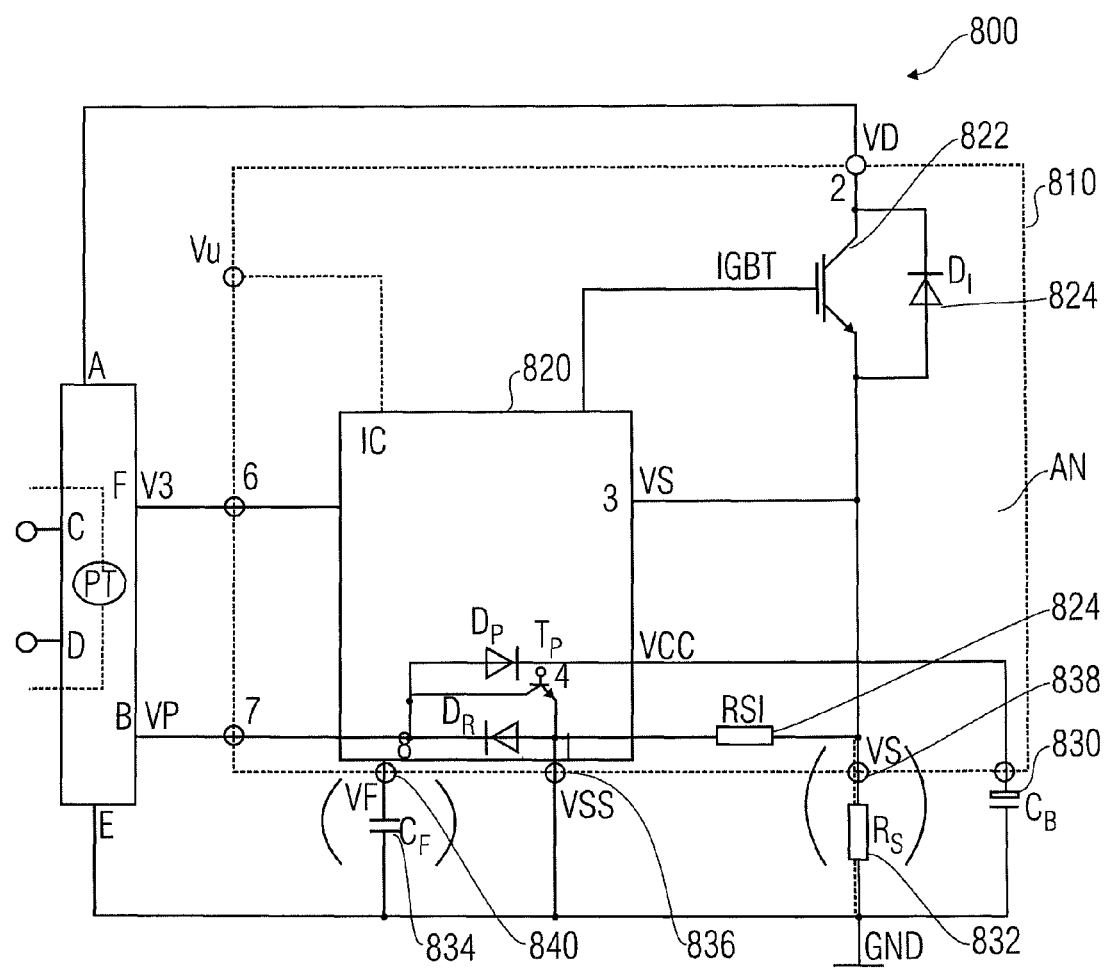
FIG. 8 is a circuit diagram of an inventive resonance converter having integrated therein an IGBT, a free-wheeling diode, a control circuit, diodes of a pump circuit, a regulation transistor and a shunt resistor integrated therein in chip-by-chip technology.

FIG. 8 shows a circuit diagram of an inventive integrated control circuit for controlling an inventive resonance converter. The circuitry according to FIG. 8 is designated by 800 in its entirety and describes an integrated implementation of the inventive control concept. In other words, FIG. 8 depicts an inventive integration of the semiconductor components of IGBT transistor, free-wheeling diode $D_I$, control component IC with diodes $D_P$ and $D_R$, regulation transistor $T_P$, as well as an internally integrated shunt, or shunt resistor, $R_{SI}$ in chip-by-chip technology.

In other words, a control chip 820, an IGBT transistor 822 including a free-wheeling diode 824, and a shunt resistor 826 are integrated into a housing 810, and are connected in the manner shown. Chip 820 includes the two diodes $D_P$ and $D_R$ of the pump circuit as well as the pump regulation transistor $T_P$ in the connection shown, which corresponds to the connection according to FIG. 7A. A pump capacitance 830 as well as, optionally, an external shunt resistor 832 and an external frequency-setting capacitance 834 are arranged outside of housing 810. A respective external connection can be seen in FIG. 8 and further essentially corresponds to the connection according to FIG. 7A. What is striking is that internal shunt resistor 824 is connected between the emitter terminal of IGBT transistor 822 and a reference potential terminal 836, a further terminal 838 further being coupled to the emitter terminal of IGBT transistor 822. Thus, alternatively, the internal shunt resistor 824 may be used on its own, or a parallel connection consisting of internal shunt resistor 824 and external shunt resistor 832 may be used as an effective shunt resistor by connecting the external shunt resistor 832 between terminal 838 and a reference potential GND. This enables a flexible configuration of the control circuit.

The configuration shown in FIG. 8 has eight pins (i.e. housing 810 has eight terminals) so as to ensure full functionality of an inventive semiconductor component for controlling load resonance converters of the type described. One may dispense with wiring the terminals VS and VF. In other words, the external shunt resistor 832 present at terminal 838 may be dispensed with, so that terminal 838 is open. In addition, the external frequency-setting capacitance 834 may be dispensed with, so that a terminal 840 (VF) is open.

In this case, it is only the internally integrated shunt 824 ($R_{SI}$) that is used at VS. In addition, an internally set minimum frequency $f_{min}$ is used instead of an adjustment by means of the external frequency-setting capacitance 834 ($C_F$).

Figure 9:
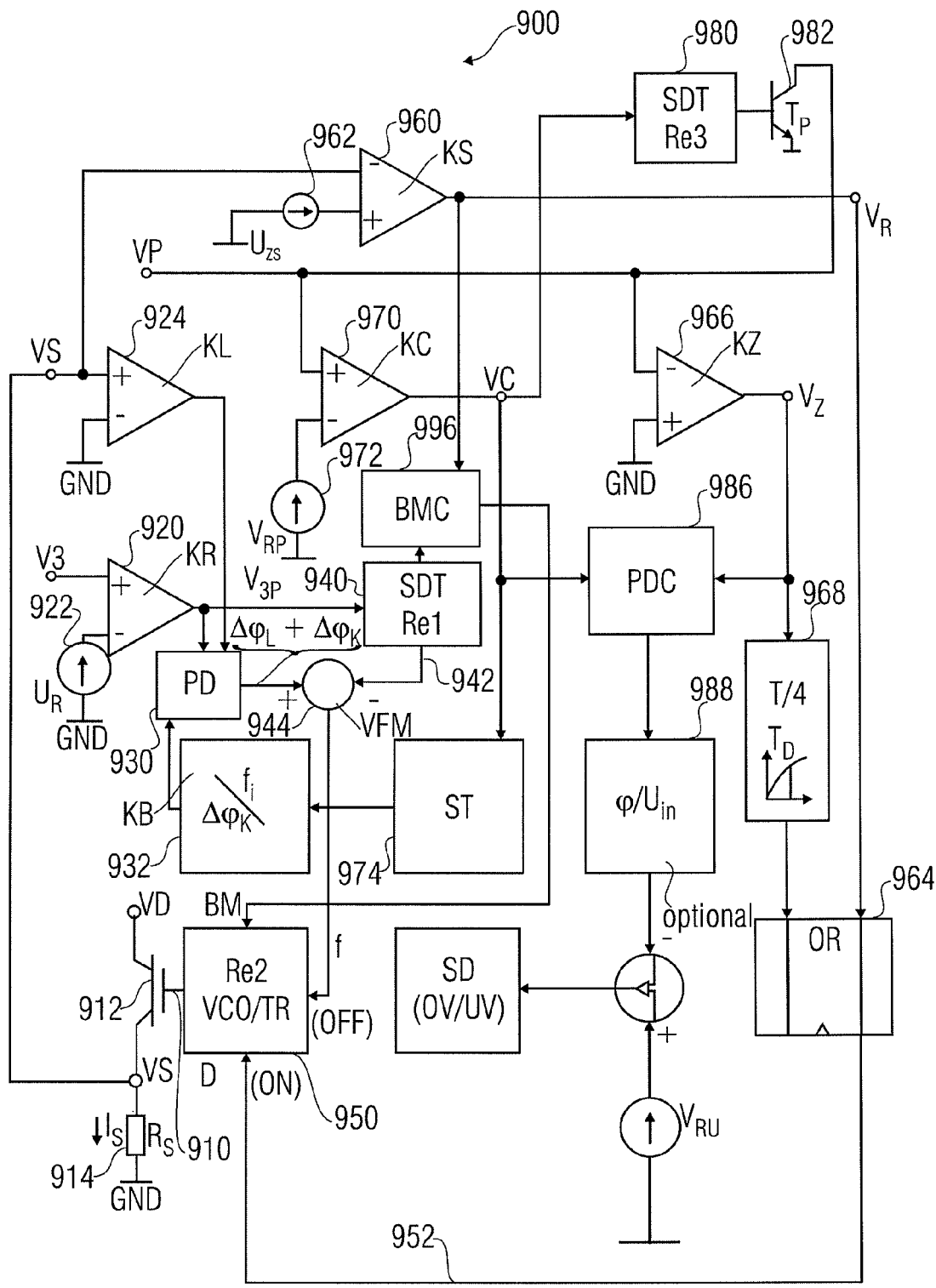
FIG. 9 is a block diagram of an inventive control circuit for a resonance converter in an integrated circuit.

FIG. 9 depicts a block diagram of an inventive control circuit for a resonance converter in accordance with a further embodiment of the present invention. The circuitry according to FIG. 9 is designated by 900 in its entirety and shows a control circuit for a resonance converter based on an auxiliary voltage $V_3$ (further also referred to as $U_3$), a shunt voltage $V_S$ describing a current flowing through a switch of the switch unit, as well as a pump voltage $V_P$ describing a voltage curve at a node of a pump circuit.

In other words, circuit 900 receives shunt voltage $V_S$, auxiliary voltage $U_3$ as well as pump voltage $V_P$ and generates, based on the three quantities mentioned, a control signal 910 for a switch, i.e., for example, a gate control signal for an IGBT transistor 912. Even though the IGBT transistor 912 is depicted in circuit 900, it is no integral part of the control circuit, but is a part of the switch unit as has already been described in detail above. Further, the shunt voltage $V_S$ is generated, for example, by a shunt resistor 914 connected, for example, between an emitter terminal of IGBT transistor 912 and a reference potential GND.

It shall be noted that circuitry 900 may be used in connection with various input networks, for example according to FIG. 1B, 1C, 1D, 2A, 2B, 2C or 2D, the IGBT transistor 912 representing a switch occurring in the arrangements mentioned. In addition, shunt resistor 914 represents one of the switch current detection means previously described. However, the shunt resistor alternatively represents a detection of a current flow from the input network to an input-side terminal of a resonant transformer arrangement as is set forth, for example, using FIG. 2F. In addition, auxiliary signal $V_3$ represents either a voltage auxiliary signal or a current auxiliary signal as occurs, for example, at the voltage auxiliary output 2060 or at a current auxiliary output 2062 in accordance with 2F. Auxiliary signal $V_3$ additionally represents, for example, an auxiliary voltage as has been consistently designated by $U_3$ in the previous description, i.e. a voltage present at a parallel tap of the resonant transformer arrangement, which is at least approximately proportional to an output voltage $U_2$ of the resonant transformer arrangement.

Circuitry 900 includes a first reference value comparator 920 (KR) comparing auxiliary voltage $V_3$ with a predefined reference value, for example represented by a first reference voltage source 922 with a voltage value $U_R$, so that information about a respective comparison result is available at an output of first reference value comparator 920. The first reference value represented by first reference voltage source 922 may also be zero, for example, so that first reference voltage source 922 might be dispensed with.

A second reference value comparator 924 (KL) further compares the shunt voltage $V_S$ (or another signal describing a current flowing through a switch of the switch unit) with a second predefined reference value. The second predefined reference value is represented, for example, by a second reference voltage source coupled to a reference input of second reference value comparator 924. In the example shown, however, the reference value is set to zero so as to detect a zero crossing of shunt voltage $V_S$. For this reason, the reference input of the second reference value comparator 924 is directly coupled to reference potential GND. Thus, information about the comparison result is present at the output of second reference value comparator 924. It shall also be noted, further, that the output signal of first reference value comparator 920 is referred to as $V_{3P}$, whereas the output signal of second reference value comparator 924 is referred to as $V_{RP}$.

The output signal $V_{3P}$ of first reference value comparator 920, and output signal $V_{RP}$ of second reference value comparator 924 are further supplied to a phase detector 930. Phase detector 930 further receives a correction signal from a correction block 932 (KB). Thus, phase detector 932 determines a phase difference between signals $V_{3P}$ and $V_{RP}$, and corrects the phase difference using a correction angle $\Delta\phi_K$ provided by correction block 932. Thus, a signal which describes a sum of a phase difference $\Delta\phi_L+\Delta\phi_K$ is provided at the output of phase detector 932, $\Delta\phi_L$ describing a phase difference (with regard to an operating frequency) between a moment when auxiliary voltage $V_3$ crosses an associated reference value, and a moment when shunt voltage $V_S$ crosses an associated reference value. A more detailed definition of phase difference $\Delta\phi_L$ will be found, further, with regard to a description of FIG. 3H. Further, phase correction angle $\Delta\phi_K$ is selected to compensate for a phase shift between a switch current (for example flowing through IGBT transistor 912) and a load alternating current $I_L$ flowing trough a resonant circuit of the resonant transformer arrangement. For more detailed information with regard to the phase correction angle, please refer to the explanations with regard to phase detector 544 according to FIG. 5.

Output signal $V_{3P}$ of first reference value comparator 920 is further supplied to a switching detection means 940, which also includes a first regulator and which is also referred to as SDT Re1. Means 940 describes a respective phase difference reference value 940 in dependence on whether a switching occurs on signal $V_{3P}$. Means 940 may have, for example, a similar function as switching detection means 382b and first regulator 382c of circuit 380 according to FIG. 3H. Alternatively, means 940 may also take on the task of first regulator 560 of circuitry 500 according to FIG. 5.

A combiner 944 receives the output signal of phase detector 930 and, in addition, phase reference value 942 of means 940, and adds or subtracts the values mentioned. Also, an output signal of combiner 944 acts on a second regulator 950 controlling a voltage-controlled oscillator (VCO) and setting the operating frequency f thereof. The operating frequency of the voltage-controlled oscillator determines a period duration between two successive turn-on operations of the switch (i.e., for example, of IGBT transistor 912) and/or between two successive turn-off operations of the switch. A driver may optionally also be connected between the voltage-controlled oscillator and the switch.

The voltage-controlled oscillator (VCO) or the driver is supplied with a turn-on signal 952 in the process, the activation of which indicates that the switch is to be turned on.

The generation of turn-on signal 952 will therefore be described below. To this end, shunt voltage $V_S$ is supplied to a third reference value comparator 960 comparing the shunt voltage with a third reference value. The third reference value here is represented, for example, by the third reference voltage source 962 connected to the reference input of third reference value comparator 960.

Third reference value comparator 960 provides, at its output, information indicating whether shunt voltage $V_S$ is higher or lower than the third reference value. Reference voltage source 962 may be selected such that a zero voltage switching of the switch mentioned may be achieved at least approximately. The output signal of third reference value comparator 960, also referred to as $V_R$, is thus supplied to an OR operation 964, the turn-on signal 952 resulting from the OR operation 964.

In addition, pump voltage $V_P$ is compared to a fourth reference value in a fourth reference value comparator 966 (KZ). The fourth reference value may be represented, for example, by a fourth reference value voltage source connected at a reference voltage input of fourth reference value comparator 966. In the embodiment shown, however, the reference value is selected to be zero, so that the reference input of fourth reference value comparator 966 is set to be at reference potential GND. An output of fourth reference value comparator 966 provides an output signal also referred to as VZ. Output signal VZ of fourth reference value comparator 966 is further supplied to a delaying means 968 which delays the output signal of fourth reference value comparator 966 by about ¼ period duration (relative to the operating frequency). The output signal of delaying means 968 is further supplied to OR operation 964. Thus, turn-on signal 952 is activated as soon as shunt voltage $V_S$ crosses the third reference value (in a predefined direction). In addition, turn-on signal 952, delayed by the delay time of delaying means 968, is activated following a zero crossing of pump voltage $V_P$ (in a predefined direction). A moment of the actual activation of turn-on signal 952 depends on which of the above-mentioned events occurs sooner, as is defined by OR operation 964.

Circuitry 900 further includes a fifth reference value comparator 970 (KC) comparing pump voltage $V_P$ with a fifth reference value. The fifth reference value is represented by a fifth reference voltage source 972 coupled to a reference input of fifth reference value comparator 970. An output signal of fifth reference value comparator 970 indicates whether pump voltage $V_P$ is smaller or higher than the fifth reference value. Further, the output signal of fifth reference value comparator 950 is referred to as VC. Output signal VC of fifth reference value comparator 970 is further supplied to a sampling means 974 (also referred to as FP) which samples the output signal VC during turn-on of circuitry 900, or following turn-off of circuitry 900, and therefrom determines, e.g., a resonant frequency of an input network of the resonance converter. Sampling means 970 then supplies the information thus obtained to the correction block 932, so that correction block 932 may determine the phase correction angle $\Delta\phi_K$ on the grounds of resonant frequency $f_r$, for example.

Output signal VC of fifth reference value comparator 970 is further supplied to a switching detection means 980 coupled to a third regulator. In association with the third regulator, switching detection means 980 generates a control signal for a pump regulation transistor $T_P$ so as to regulate pump voltage $V_P$ to have a predefined value. In other words, pump regulation transistor 982, also referred to as $T_P$, has an effect on pump voltage $V_P$. Circuitry 900 according to FIG. 5 depicts a simple manner of wiring pump regulation transistor 982, a collector terminal of pump regulation transistor 982 being directly coupled to pump voltage $V_P$. Coupling between the collector terminal of pump regulation transistor 982 and the input of fifth reference value comparator 970, however, may also include a resistive voltage divider, for example, as is depicted, e.g., in FIG. 7A. In other words, pump regulation transistor 982 is not necessarily part of circuitry 900, but the voltage which is referred to as $V_P$ in the circuitry 900 according to FIG. 9 represents, for example, the voltage present at the seventh terminal ($V_P$) of integrated control circuit 744 according to FIG. 7A.

In addition, both the output signal VZ of third reference value comparator 966 (KZ) and output signal VC of fifth reference value comparator 970 (KC) are supplied to second phase detector 986. Second phase detector 986 thus determines a phase difference (in relation to the operating frequency) between a time when pump voltage $V_P$ exhibits a zero crossing, and a time when pump voltage $V_P$ crosses the fifth reference value. An angle-to-voltage converter 988 then optionally converts the angle information provided by second phase detector 986 into a voltage $U_{in}$. The angle information is then compared (either directly or in the form of a voltage) with one or several angle threshold values. The comparison results of the angle values provided by second phase detector 986 (which may be represented as associated voltages, as the case may be), which are compared with angle threshold values, are subsequently used to control a protective circuit. If the phase difference detected by second phase detector 986 exceeds a first boundary value, control circuit 900 may be turned off, for example. On the other hand, a turn-off may occur, alternatively or additionally, if the phase difference detected by second phase detector 986 falls below a second angle threshold value. Thus, an excess voltage turn-off and/or an undervoltage turn-off may be achieved.

In other words, FIG. 9 depicts an inventive implementation of the control circuit in an integrated circuit. In the process, a phase difference, which is optionally corrected by a certain amount $\Delta\phi_K$ as compared with phase difference $\Delta\phi_L$ by correction block 932 (KB), is initially generated by comparators KL (second reference value comparator 924) and KR (first reference value comparator 920), so that the signal $\Delta\phi_K+\Delta\phi_L$ is formed.

In addition, circuitry 900 includes a possibility of activating a burst mode wherein the switch (e.g. IGBT transistor 912) does not switch regularly, or continuously, but alternatingly generates a packet of switching pulses, and, following such a packet, remains inactive for an idle period which is longer than double a time interval between successive switching pulses within a packet. Activation and deactivation of the burst mode is achieved via a burst mode control 996 which receives both an output signal from means 940 and the output signal VR of third reference value comparator 960.

If signal $V_{3P}$ present at the output of first threshold value comparator 920 (KR) uninterruptedly switches to "high" (i.e. to an active state) in each switching period even though a maximum frequency has been reached, the unit 940 (SDT) is activated to set an upper limit to the frequency f via the combiner, or comparator, 944 (VFM). At the same time, block BMC is activated in this case, and it generates a burst mode (BM) so as to maintain the output voltage at a constant level and to limit it.

In addition, a verification is performed, in the burst mode, via the reverse current comparator, or third reference value comparator, 960 (KS) on the grounds of switch current $I_S$ as to whether a zero-voltage switching (i.e. switching the switch into a state wherein the voltage present across same becomes zero) is possible. If this is not the case, i.e. if it is found, because of output signal $V_R$ of third reference value comparator 960, that zero-voltage switching is not possible, so that a high-loss state will result in the switch, or in the IGBT transistor, 912, the burst-mode operation will be terminated via burst mode control 996 (BMC).

The frequency, or operating frequency, is generated, or set, via a signal from a combiner, or comparator, 944 (VFM)—the signal also being referred to as f(OFF) and being supplied to second regulator 950—in that a turn-off moment of a pulse width modulation (PWM) is generated. In other words, signal f(OFF) from the combiner, or comparator, 944 is used for setting of the operating frequency by second regulator 950. Using a digital pulse width modulation, the frequency defines, for example, the time duration between two successive turn-off moments at which the switch is turned off. In other words, if a previous turn-off moment as well as a new frequency (which results from a preceding frequency and a frequency change which may possibly be dependent on signal f(OFF)) is known, the next, or subsequent, turn-off moment may be determined therefrom.

In addition, the reverse-current comparator (i.e. third reference value comparator 960) generates the signal VR, which serves as a turn-on signal, as soon as the voltage present at the switch has gone back to zero, and a reverse current flows through the shunt resistor 914 ($R_S$). The turn-on signal 952, also referred to as D(ON), determines, in the process, when the switch is turned on. In other words, turn-on is effected by turn-on signal 952, wherein a duty cycle is thus tracked, while the frequency, or operating frequency, determines a power transmission behavior.

Also, with circuit 900 according to FIG. 9, node $V_P$ of the charge pump, or pump voltage, $V_P$ is connected to a regulator comparator KC, i.e. to fifth reference value comparator 970, which passes on, via a reference VRP, a signal to transistor, or pump regulation transistor, 982 (TP) via block SDT (980) as soon as signal VC switches to "high" (i.e. to an active state).

Moreover, signal VC (at the output of fifth reference value comparator 970) generates, in a starting operation, an inventive sampling of the input frequency so as to initialize in advance, via circuit 974 (ST), a phase correction in correction block 932 (KB) for regulation operation.

Moreover, signal VZ at the zero-crossing comparator KZ (i.e. at the output of fourth reference value comparator 966) generates a restarting signal which, via a time delay 968 of ¼ period duration (in relation to the operating frequency), alternatively turns on the IGBT transistor 912 (generally: the switch) if signal $V_R$ at the output of third reference value comparator 960 (KS) does not switch due to a lack of zero voltage switching (ZVS) (non-zero voltage switching mode, or non-ZVS mode).

Finally, a phase difference between signals VC and VZ (present at the outputs of fifth reference value comparator 970 and fourth reference value comparator 966, respectively) is evaluated via second phase comparator 986 (block PDZ), and a up-to-date input voltage from the frequency (or operating frequency) and the maximum slew times is calculated therefrom. If the input voltage (i.e., for example, the voltage of energy source 710) exceeds a maximum boundary value, a shut-down signal SD (OV/UV), which causes, for example, shut-down of control circuit 900, is triggered by a comparison with a threshold, or threshold voltage, $V_{RU}$. However, the same signal may also be used as an undervoltage monitoring if the phase difference, based on the period duration, becomes too large.

In summary, it may thus be stated that FIG. 9 represents a typical inventive configuration which may be preferably employed when a so-called parallel transformer output is used, as has been described with reference to FIGS. 3 to 6. Specifically, with a parallel transformer output, the output voltage of the auxiliary tapping, or of the auxiliary output, will always be proportional to an alternating voltage of the output voltage.

In other words, a parallel auxiliary output is typically broad-band, so that the auxiliary voltage (referred to as $V_3$ in FIG. 9) will map the output voltage present at the output of the resonant transformer arrangement, including a curve shape (possibly with a certain phase shift). In other words, with a parallel transformer output, no substantial low-pass filtering occurs, so that the auxiliary voltage (e.g. $V_3$) carries directly usable phase information about a phase position of the output voltage present at the output of the resonant transformer arrangement.

Figure 10:
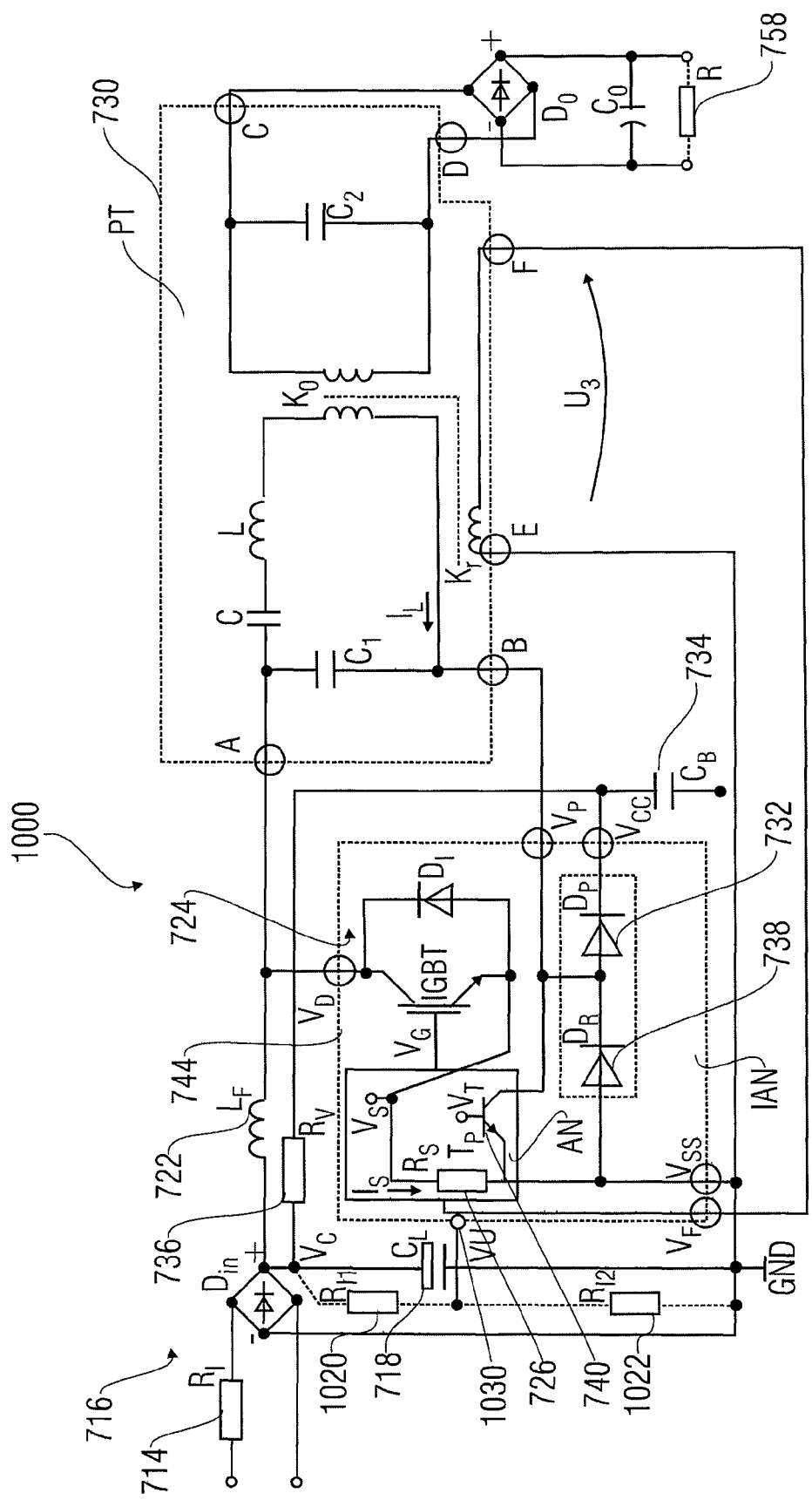
FIG. 10 is a circuit diagram of an inventive resonance converter in a fully integrated embodiment with an auxiliary output fed in parallel.

FIG. 10 depicts a circuit diagram of an inventive resonance converter having a parallel auxiliary output. The circuitry of FIG. 10 is further designated by 1000 in its entirety. It shall be noted here that circuitry 1000 essentially matches circuitry 700 according to FIG. 7A, so that identical means in both circuitries are designated by identical reference numerals. Thus, reference shall be made, in this respect, to the configurations with regard to circuitry 700.

With circuitry 1000 according to FIG. 10, there is the possibility, optionally, of tapping the input voltage, i.e. the voltage present across filter capacitance 718, using a voltage divider consisting of two resistors 1020, 1022, and of supplying it to control circuit 744 via a terminal 1030 (VU). Control circuit 744 may then evaluate the respective information about the input voltage to implement, for example, a protective circuit or to set, for example, the reference values, or reference voltages, as a function of the input voltage.

In other words, FIG. 10 initially depicts a fully integrated variant of a configuration of a resonance converter in accordance with the concept which includes an auxiliary winding fed in parallel. In the case shown, the IGBT transistor and the (associated) free-wheeling diode $D_I$ (together referred to as switch 724), diodes 738 ($D_R$) and 732 ($D_P$) as well as auxiliary transistor 740 ($T_P$) and the sense resistor, or shunt resistor, 726 ($R_S$) may be integrated in one housing.

Normally, observation of the input voltage via the voltage divider consisting of resistors 1020 ($R_{f1}$) and 1022 ($R_{f2}$) is not required if signal $V_P$ (i.e. pump voltage $V_P$) is used for indirectly determining the input voltage. However, with the indirect determination, detection errors due to tolerances are to be expected, so that additional detection of the input voltage (e.g. via voltage divider 1020, 1022) is useful, advantageous or required in some cases.

Figure 11:
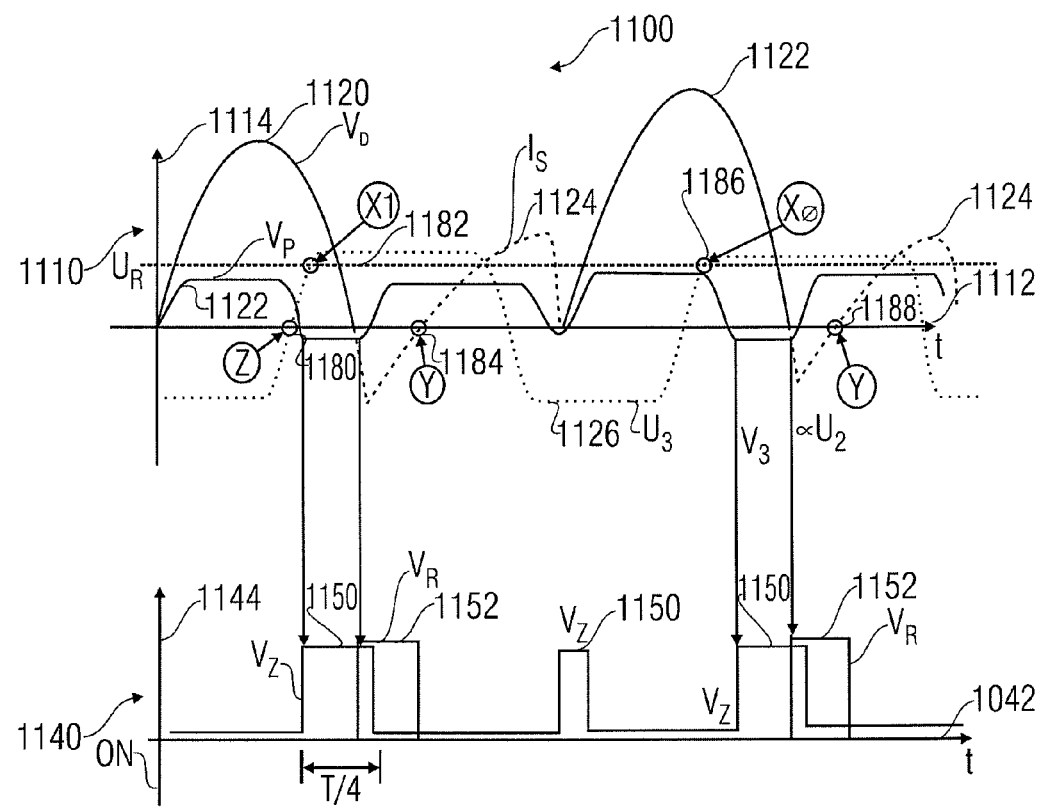
FIG. 11 is a graphical representation of time curves of signals in an inventive resonance converter having an auxiliary output fed in parallel.
Figure 11:
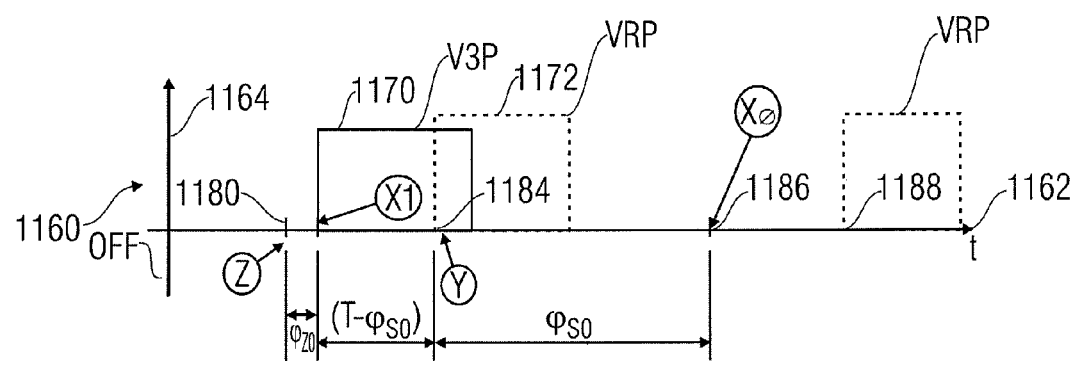

FIG. 11 shows a graphical representation of time curves of signals in an inventive resonance converter having a parallel auxiliary output. The graphical representation of FIG. 11 is designated by 1100 in its entirety. The first graphical representation 1110 describes, for example, a voltage $V_D$ present at a terminal of the switch, a pump voltage $V_P$ and a switch current $I_S$ as a function of time, wherein the time is plotted on an abscissa 1112, and wherein a value of the respective quantities is plotted on an ordinate 1114. Graphical representation 1100 applies, for example, to a topology as has been described using FIG. 3H, 5, 6, 7A, 9 or 10.

A first curve shape, drawn by a thin continuous line, describes voltage $V_D$ present at a terminal of the switch, for example at the collector terminal of the IGBT transistor according to FIG. 7A, 8, 9 or 10. Further, the first curve shape is designated by 1120. A second curve shape, drawn by a continuous bold line, describes a voltage $V_P$ present at a pump node of a pump circuit (for example at the second input-side terminal of resonant transformer arrangement 730, which is also referred to as B, or at the terminal of integrated control circuit 744, which is also referred to as $V_P$). The second curve shape is designated by 1122. A third curve shape 1124, drawn by a stroked line, describes switch current $I_S$ flowing through the switch or through the shunt resistor $R_S$ connected in series with the switch (e.g. shunt resistor 726 or shunt resistor 824 or shunt resistor 914). A fourth curve shape 1126, drawn by a dotted line, further describes auxiliary voltage $U_3$ (also referred to as $V_3$ in FIG. 9) present at the parallel auxiliary output, or voltage auxiliary output, of the resonant transformer arrangement. Further, it is assumed here that auxiliary voltage $U_3$ is proportional to output voltage $U_2$ present at the output of the resonant transformer arrangement.

Graphical representation 1110 further shows, as a bold stroked line, first reference voltage $U_R$ of first reference voltage source 922 according to FIG. 9.

A second graphical representation 1140 further describes the generation of a turn-on signal for the switch. Again, time is plotted on an abscissa 1142, whereas an ordinate 1144 depicts the magnitudes of the respective signals. Graphical representation 1140 shows, on the one hand, signal $V_Z$ at the output of the fourth reference value comparator 966 (KZ) according to FIG. 9, wherein signal $V_Z$ is characterized by a dotted line, and wherein signal $V_Z$ will always take on an active state when pump voltage $V_P$ is negative. In addition, graphical representation 1140 depicts, in a further curve shape 1152 drawn as a bold continuous line, a time curve of signal $V_R$ at the output of third reference value comparator 960. Signal $V_R$ will always be active when switch current $I_S$ exhibits a negative polarity, i.e. when a reverse current flows through the switch.

A third graphical representation 1160 further describes a generation of a turn-off time for the switch. Again, time is plotted on an abscissa 1162, whereas an ordinate 1164 describes the magnitudes of the respective signals. A curve shape 1170 describes signal $V_{3P}$ at the output of first reference value comparator 920 (KR). Signal $V_{3P}$ is characterized by a continuous line. Signal $V_{3p}$ will always be in an active state when auxiliary voltage $V_3$ is larger than voltage $U_R$ of first reference voltage source 922. Graphical representation 1160 further shows signal $V_{RP}$ at the output of second reference value comparator 924 (VL). Signal $V_{RP}$ is characterized by a stroked line. In addition, signal $V_{RP}$ will always be active when switch circuit $I_S$ flows in a forward direction.

Moreover, graphical representation 1160 describes a phase angle $\phi_{Z0}$ between a point in time when auxiliary voltage $U_3$ exhibits a zero crossing in an ascending direction, and a further point in time when auxiliary voltage $U_3$ reaches the value of reference voltage $U_R$.

It shall further be noted that the moment when auxiliary voltage $U_3$ exhibits the zero crossing in a positive direction is designated by Z, or 1180. In addition, a first moment when auxiliary voltage $U_3$ reaches the value of reference voltage $U_g$ is designated by X1, or 1182. A first moment when switch current $I_S$ exhibits a zero crossing in an ascending direction (i.e. a transition from a reverse current to a forward current) is designated by Y, or 1184. A second moment when auxiliary voltage $U_3$ reaches the value of reference voltage $U_R$ is further designated by X0, or 1186. A second moment when switch current $I_S$ exhibits a zero crossing in an ascending direction is further designated by Y, or 1188.

In other words, for explaining a mode of operation of the configuration of the present invention with a parallel auxiliary tapping of the transformer, FIG. 11 shows the time curve of switch voltage $V_D$, of switch current $I_S$ and of auxiliary voltage $V_P$ as well as, additionally, of auxiliary output voltage $V_3$ and an associated reference voltage $U_R$. The designations $U_3$ and $V_3$ will be used as synonyms below.

Since voltage $V_3$ minus the forward voltages of two diodes (for example, diodes D5-D8 according to FIG. 7A) is proportional, in terms of its amplitude, to output voltage $U_O$ (present, for example, across direct current load 758), this amplitude may be compared with reference voltage $U_R$, and thus a constant output voltage may be set or regulated.

The turn-on and turn-off signals for switch S of the converter (i.e., for example, for the IGBT transistor) are generated as follows: When the switch voltage $V_D$ (i.e. either the voltage present at one of the terminals of the switch, or the voltage present across the switch) returns to zero, the third threshold value comparator 960, i.e. comparator KS according to FIG. 9, will switch through via detecting a reverse current in the (free-wheeling) diode $D_F$, so that signal $V_R$ at its output goes to a "high" level, or to an active state. By means of the signal $V_R$ mentioned, the switch is immediately turned on (due to the OR operation 964 by means of which the turn-on signal 952 is generated from signal $V_R$). In the event that the zero voltage switching (ZVS) is not achieved, third threshold value comparator 960, i.e. comparator KS, would not switch. In order to nevertheless guarantee reliable turn-on, a zero crossing of the voltage present at node VP, i.e. a zero crossing of pump voltage $V_P$, is therefore observed, so that fourth reference value comparator 966 (comparator KZ) will switch through (in response to the zero crossing), and so that switch S is redundantly turned on with a time delay of about a quarter of a period duration T by means of OR operation 964. In FIG. 11, this is shown in the second temporal representation 1140 (diagram "ON") with regard to waveforms 1150 of $V_Z$ and 1152 of $V_R$.

In addition, FIG. 11 depicts, in the third graphical representation 1160 (diagram "OFF"), a turn-on of second reference value comparator 924 (comparator KL) when switch current $I_S$ reaches a zero crossing, and a turn-off when switch S is turned off. A phase angle between turn-on of second reference value comparator 924 (KL) and a response of first reference value comparator 920 (comparator KR) when reference value $U_R$ is reached is referred to as angle $\phi_{S0}$, which is an expression of a magnitude of the load. This value is stored once it has been detected by first phase detector 930 (PD) according to FIG. 9, and is superimposed by the voltage value $V_3$ to be regulated, which is approximately proportional to output voltage $U_0$, since it is thus possible to determine the regulator parameters as a function of the load from the current phase angle. The voltage detector and two-point regulator 940 (SDT Re1) thus forms only one signal having two states which indicates whether the output voltage is exceeded or fallen below, i.e. whether or not the output voltage is larger than the reference value defined by reference voltage source 922. If the load is small (high load resistance), the value resulting at comparator 944 (VFM) will be smaller, so that second regulator 950 (Re2), which contains the voltage-controlled oscillator (VCO) and a driver TR, will generate a smaller regulating constant for increasing or decreasing the frequency, or operating frequency, f. In the event of a higher load with a smaller phase angle $\phi_{S0}$, however, a larger regulating constant will be generated which is able to regulate the load fluctuation faster. As soon as signal $V_3$ does not reach the reference value, only the previously stored values of the phase shift will be transferred, so that during the transition from a light load to a full load, one initially operates with a smaller regulating constant, and thus avoids instability. On the other hand, in the transition from full load to no-load or small load, the regulating constant is always immediately adjusted via the load angle, so that in this case, too, overshooting is avoided. Thus, the regulator parameters are always adjusted to the loading condition and to the direction of the load change, and they will also not depend on the input voltage. Graphical representation 1160 (diagram "OFF") of FIG. 11 depicts the case where the reference voltage is not reached by $V_3$, and thus, no phase angle may be detected within this period duration. This characterizes the case of a load step transition from a smaller to a larger load (smaller load resistance).

FIG. 12 depicts a general configuration of the regulation concept, wherein the output voltage of resonant transformer arrangement 1214, or of load resonant circuit LRK, is coupled out via a parallel tapping (voltage auxiliary output 1240, also referred to as $U_S$) and is subsequently compared with a reference voltage $U_R$. The comparison may be effected via a combiner or comparator 1278, as is shown in FIGS. 7A-9. Alternatively, use may be made of an analog/digital converter which detects the regulation deviation in a more precise manner than the two-point regulator 940 (Re1) used, for example, according to FIG. 9. When using the two-point regulator 940 (Re1), a phase signal which is observed between auxiliary voltage $U_3$ and switch current $I_S$, or $I_S'$, or load alternating current $I_L$, or $I_L'$, may optionally be detected as an assisting measure. To this end, a zero crossing, for example, of one of the currents mentioned may be detected in time via a current detection means SIE. By means of a phase comparison within phase detector 1274 (PD), a general phase angle $\phi$ is determined which is only dependent on the load and which may also be related to a reference angle $\phi_R$, so as to generate a regulation parameter which is dynamically adjusted in each case, and to pass it on to regulator 1290 (FER) for generating a suitable frequency change.

In addition, a proportional current $I_3$ which is proportional to the output current of the load network and which will also compared to a reference value $I_R$ (comparator or combiner 1280) may be generated by a further auxiliary output IE (e.g. by current auxiliary output 1242) of resonant transformer arrangement 1214, or of load network LRK. This value, or reference value, $I_R$ may be set such that thereby, a maximally admissible load current is observed in the event of overload or of a short circuit, so that a suitable frequency change is forced by regulator 1290 (FER) for respectively limiting the load current, even if one tried to regulate the voltage by means of performing a voltage regulation of the output. Thus, a current limitation regulator $I_R$ has priority over the voltage regulator $U_R$ in the event of an overload or a short circuit. Alternatively or additionally, the phase regulator, however, may also take on this task in that the smallest admissible phase angle $\phi_{Rmin}$ in relation to a maximally admissible load is observed and must not be fallen below by the function of regulator 1290 (FER).

In other words, if it is found that the angle determined by phase detector 1274 reaches a minimally admissible value, a further change of operating frequency f for increasing a power transmission of resonant transformer arrangement 1214, for example, may be prevented. The method mentioned may possibly not be as accurate with regard to current limitation (in comparison with direct monitoring of the output current via current auxiliary output 1242) because phase angle $\phi$ may shift, in a zero crossing, by a value of $\Delta\phi_K$, in relation to the load current zero crossing, due to the influence of input network 1212 (SE). However, the shift mentioned is not significant and will maximally be +/−10 to 15° in all cases of practical relevance, and cannot exceed a maximum value of +/−30°.

Figure 2G:
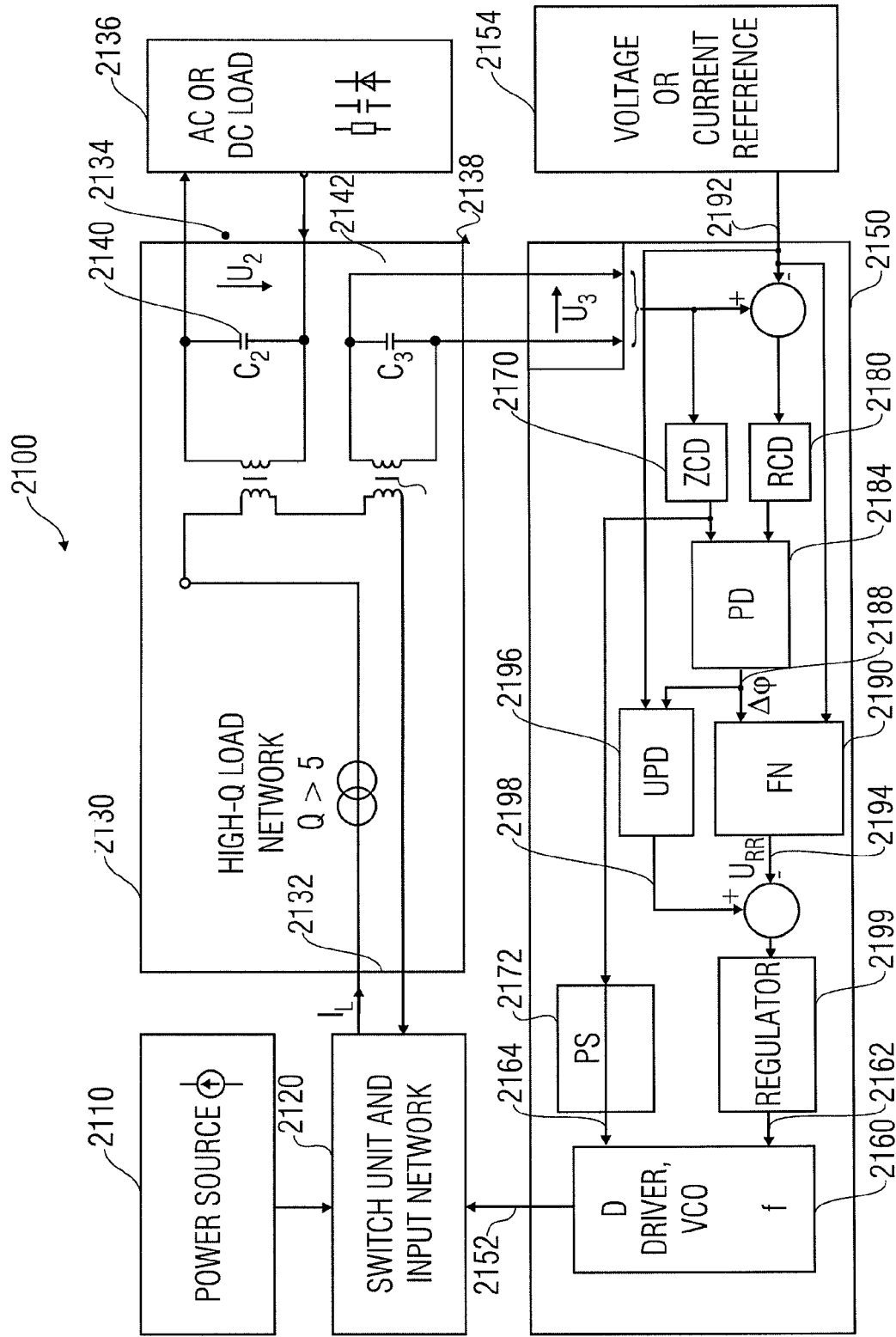
FIG. 2G is a block diagram of a resonance converter in accordance with a configuration "C" of the present invention.
Figure 7B:
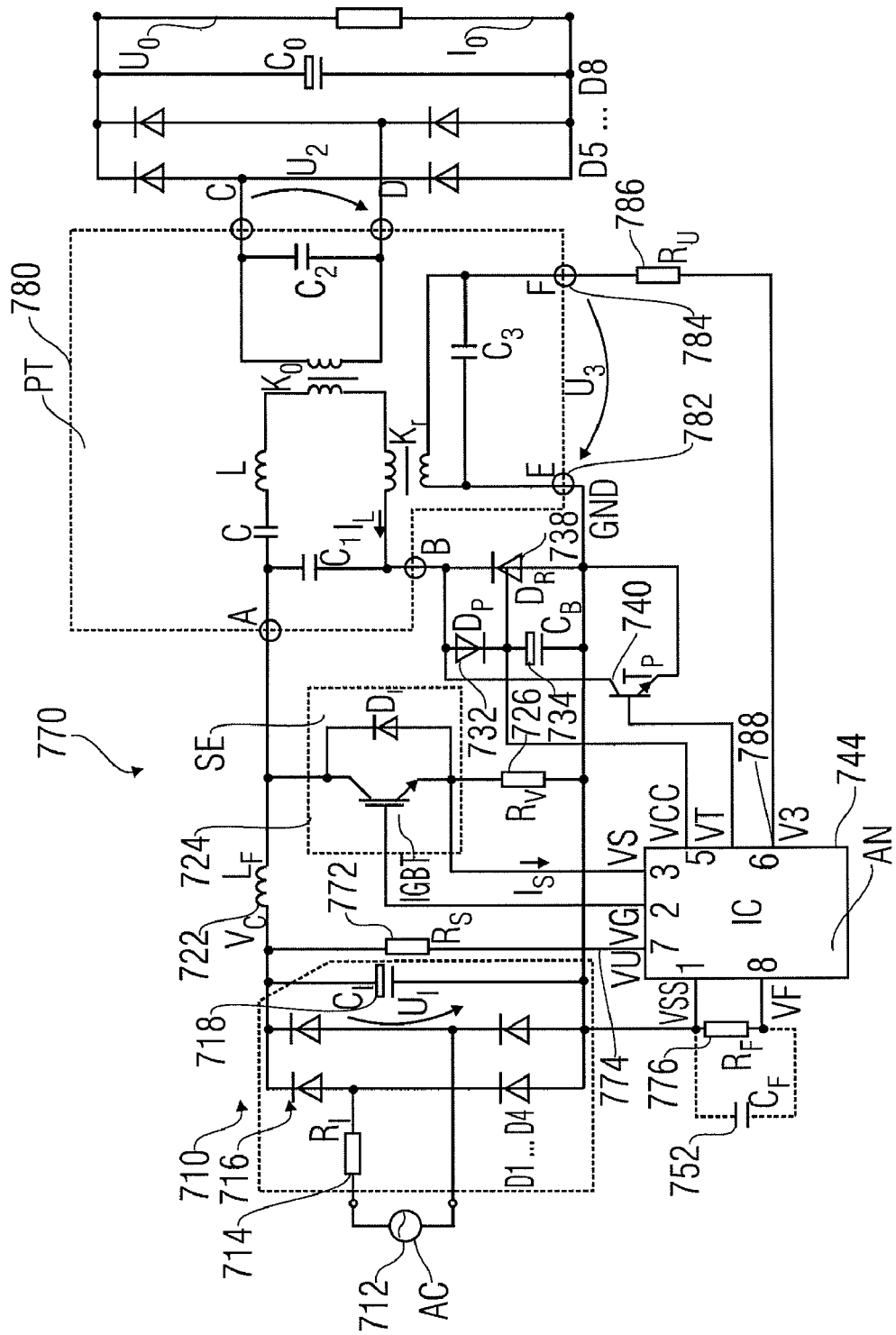
FIG. 7B is a circuit diagram of an inventive resonance converter in a class-E topology with serial coupling-out of an auxiliary signal from the load current using a control IC having eight terminals.

It shall be pointed out that an inventive configuration having a parallel transformer output, or a parallel auxiliary output of the resonant transformer arrangement, is not always possible for technical reasons. For example, a configuration having a parallel transformer output, wherein the output voltage of the auxiliary tapping will always be proportional to an alternating voltage of the output voltage, is not possible for technical reasons, if, for example, only one sinusoidal signal may be generated from a mechanical resonance. For example, with piezo transformers, in many cases an auxiliary output according to FIG. 2G is given wherein the output signal and the auxiliary signal are serially coupled out from the load current (in a resonant circuit in the resonant transformer arrangement). FIG. 7B depicts an inventive implementation of this configuration. Thus, on the one hand, the control concept is simplified even more with regard to feedback in that the signal, or auxiliary signal, $U_3$ represents a pure sinusoidal voltage of the basic frequency of the transformation. Therefore, this voltage may be given to an integrated component via a single resistor, at which component it may be held at the zero potential, and wherein the current coming from the resistor may be evaluated as a sinusoidal signal. With the voltage output according to FIG. 7A, however, a higher signal-to-noise ratio becomes necessary, so that one should detect the trapezoid signal more accurately via an external voltage divider (for example with resistors 784 ($R_{U1}$), 750 ($R_{U2}$)). However, signal $U_3$ thus loses a direct phase information, so that a different control concept and/or regulation concept will be necessary and/or expedient than in circuitry 900 described with reference to FIG. 9.

In the following, first, the basic mode of operation of the present invention will be described by using serial coupling-out of the auxiliary voltage with regard to FIG. 2G. Then, with reference to FIG. 13A, an equivalent circuit diagram of the piezo transformer used in connection with the mentioned embodiment will be described, before further details of the present invention will be described with reference to FIGS. 13B to 13F. Subsequently, further embodiments of the present invention will be discussed with regard to FIGS. 14 and 16G. A particular regulation concept for generating a variable reference voltage will further be described with reference to FIGS. 16A to 16E.

FIG. 2G shows a block diagram of an inventive resonance converter by using serial coupling-out of an auxiliary signal. The circuitry according to FIG. 2G is designated by 2100 in its entirety. A power source 2110 provides energy or power to an input network 2120. The input network 2120 comprises a switch unit as well as possibly additional reactive elements and serves, overall, for generating an excitation on the input side of a resonant transformer arrangement 2130. The resonant transformer arrangement 2130 can, for example, be seen as a load network with high Q, with Q>5. The switch unit 2120 provides, for example, a load alternating current $I_L$ to the load network of high Q, or, excites at least such a load alternating current $I_L$ in a resonant circuit of the resonant transformer arrangement, respectively. For that purpose, an input 2132 of the resonant transformer arrangement 2130 is coupled to an output of the input network or an output of the switch unit, respectively. Further, the resonant transformer arrangement comprises an output 2134 for providing an output voltage (typically designated by $U_2$) or an output current for a load network 2136. The load network 2136 can, for example, be an alternating current load or a direct current load, as has already been described above.

Further, the resonant transformer arrangement 2130 comprises an auxiliary output 2138 for providing an auxiliary voltage or auxiliary signal, respectively, which has a substantially fixed phase position to a load alternating current $I_L$ through a resonance circuit of the resonant transformer arrangement. The output 2134 of the resonant transformer arrangement 2130 is supplied, for example, via a first output tap or output tapping, respectively, of the transformer arrangement, while, on the other hand, the auxiliary output 2138 is supplied via a second tap of the resonant transformer arrangement 2130. The first tap of the resonant transformer arrangement is preferably, but not necessarily, galvanically separated from the second tap of the resonant transformer arrangement. Further, preferably, but not necessarily, a second capacitance 2140 (C2) is connected in parallel to the output 2134, while a third capacitance 2143 (C3) is connected in parallel to the auxiliary output 2138 of the resonant transformer arrangement. The capacitances 2140, 2142 are, preferably, designed to adjust or influence, respectively, a phase relation between the load current $I_L$, the output voltage $U_2$ and the auxiliary voltage $U_3$ at the auxiliary output 2138.

The circuitry 2100 further comprises a control circuit or control unit 2150, respectively, which generates the auxiliary signal or the auxiliary output $U_3$, respectively, from the auxiliary output 2134 of the resonant transformer arrangement 2130, and generates a control signal 2152 for the switch unit in the input network based thereon. The control circuit or control unit, respectively, generates a voltage reference and/or a current reference itself or receives the voltage reference and/or current reference from a reference provision means 2154.

Further, the control unit 2150 comprises a driver 2160 for generating the control signal 2152 for turning on and/or turning off the switches of the switch unit in the input network 2120. In an extended sense, the driver comprises a variable oscillator, which means, for example, a voltage controlled oscillator VCO or a digital circuitry for generating a signal with a predetermined frequency or period duration. Thereby, the driver 2160 is designed to receive frequency information f, which is used for adjusting a period duration of the control signal 2152. Further, the driver 2160 is designed to allow adjustment of a duty cycle. For that purpose, the driver receives a turn-on signal 2164, which indicates that at least one switch in the switch unit of the input network 2120 is to be turned on. Turn-off times, when the switch in the switch unit in the input network 2120 is to be turned off, are determined by the information 2162 about the frequency.

In the following, it will be described how information 2162 about the frequency as well as the turn-on signal 2164 is generated.

For that purposes, on the one hand, the auxiliary voltage $U_3$ is supplied to a zero crossing detector 2170, which detects the zero crossing of the auxiliary voltage $U_3$. The zero crossing detector 2170 is also designated by ZCD. An output of the zero crossing detector 2170, which describes zero crossings of the auxiliary voltage $U_3$, is further supplied to a phase shifter 2712 (PS). The delay means 2170 is designed to delay the output signal of the zero crossing detector 2710 with regard to a phase by about 60 to 90° (in relation to a period duration of an operating frequency of the driver, by which the driver switches the switch in the switch unit of the input network 2120 on and off). The output signal of the zero crossing detector 2710 delayed by the delay means 2172 serves thus as the turn-on signal 2164 for the driver, which directs the driver to turn on the switch in the switch unit.

Further, the control unit 2150 comprises a reference value comparator 2180, which compares the auxiliary voltage $U_3$ to a predetermined (fixed or variable) reference value and provides an output signal, which indicates when the auxiliary voltage $U_3$ crosses the reference value. The reference value comparator 2180 is also referred to as reference crossing detector (RCD).

A phase detector 2184 receives both the output signal of the zero crossing detector 2170 and of the reference value detector 2180 and determines a phase difference 2188 or $\Delta\phi$ between the two signals. Thus, in connection with the reference value, the phase difference 2188 is a measure for an amplitude of the auxiliary voltage $U_3$.

Thus, a functional network 2190 receives the phase difference 2188 from the phase detector 2184, as well as the reference value 2192 from the reference value provision means 2154. The functional network 2190 calculates information 2194 about an amplitude of the auxiliary voltage $U_3$ from the phase difference 2188 and the reference value 2192. The information 2194 about the amplitude is also designated by $U_{RR}$. Further, an amplitude target value provision means 2196 receives the reference value 2192 as well as additionally the phase difference 2188 and generates an amplitude reference value 2198 based thereon. A difference determiner (difference calculator) receives the amplitude reference value 2198 as well as the amplitude information 2194, forms the difference there from and provides the result to a regulator 2199. Thus, the regulator 2199 generates frequency information 2162 based on the difference of the amplitude reference value 2198 and the amplitude 2194, to adjust the operating frequency of the driver or the oscillator or the timer included in the driver, respectively. Preferably, the regulator 2199 is designed to adjust the difference between the amplitude reference value 2198 and the amplitude information 2194 representing a regulation deviation (control deviation) to zero.

The regulator 2199 can, for example, be a proportional regulator or proportional integral regulator, but other possible regulator embodiments, such as a pure integral regulator, are also possible.

Thus, merely based on the auxiliary voltage $U_3$, the circuitry 2100 allows adjustment of the turn-on time of the switch or the switches in the switch unit 2120, as well as amplitude regulation. The shown amplitude regulation has the significant advantage that the control circuit 2150 has merely the zero crossing detector 2170 and the reference value comparator 2180 as analog components. All other signals are defined by phases and not amplitudes, and can thus be digitalized, for example, by time measurement. In other words, analog further processing becomes unnecessary due to the conversion of the auxiliary voltage $U_3$ into digital signals with the help of the zero crossing detector 2170 and the reference value comparator 2180, at the earliest possible time. Based on the fact that the auxiliary output voltage $U_3$ is mainly sinusoidal, further, the amplitude of the auxiliary voltage $U_3$ can be inferred from the switching times of the zero crossing detector 2170 and the reference value comparator 2180, which allows a very effective regulation of the output voltage $U_2$ of the resonant transformer arrangement 2130.

Further, it should be noted that optionally the generation of the variable amplitude reference value 2198 can be omitted, and that instead a fixed amplitude reference value depending on the reference value 2192 can be used. In that case, means 2196 is omitted.

Further, the amplitude reference value generator 2196 can adapt or correct, respectively, the amplitude reference value 2198 in dependence on an input voltage provided by the power source 2110. The amplitude $U_3$, which means the amplitude information 2194 can optionally be used in forming the amplitude reference value 2198.

For further understanding, an equivalent circuit diagram of a piezo transformer for usage in combination with a circuitry according to FIG. 2G will be described with regard to FIG. 13A.

Figure 13A:
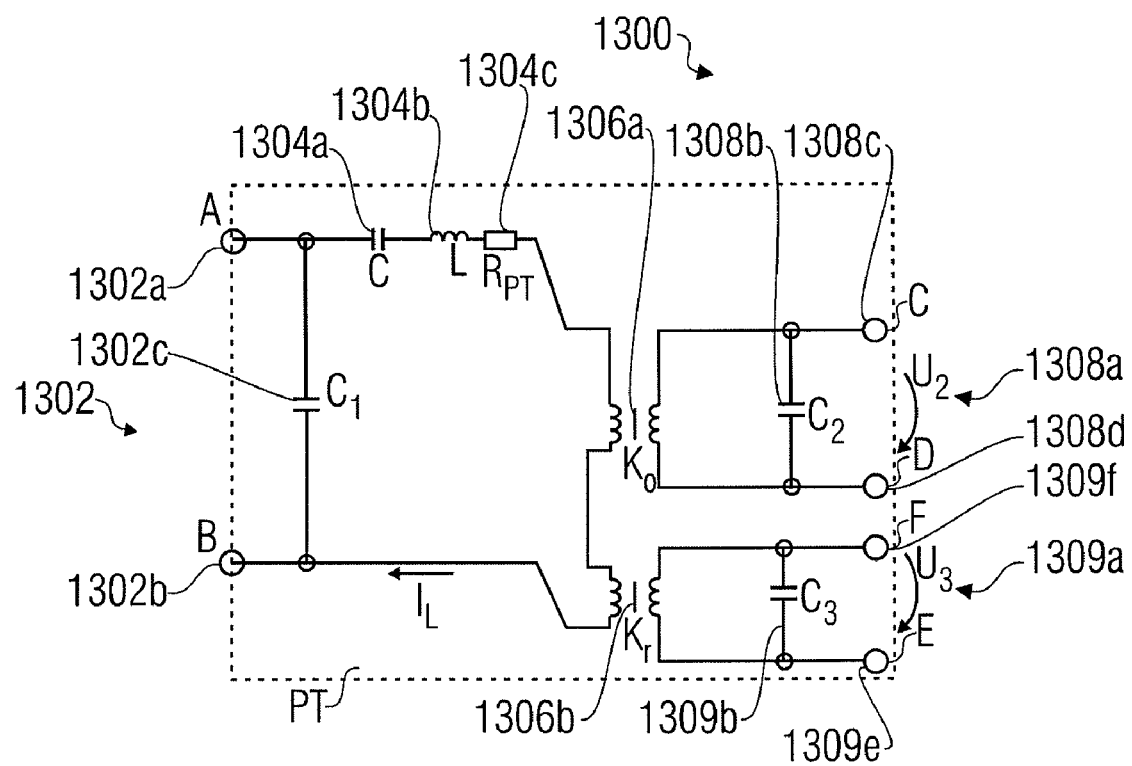
FIG. 13A is an equivalent circuit diagram of a piezo transformer having a serially coupled-out auxiliary output.

On the basis of the implementation of the application in FIG. 7B with a serial output voltage detection at a load network in the form of a piezo transformer PT, FIG. 13A shows a typical electric equivalent circuit diagram of a piezo transformer with the voltage transformation ratios $k_0$ and $k_r$.

The piezo transformer according to FIG. 13A is designated by 1300 in its entirety. The piezo transformer 1300 has, for example, an input 1302 with a first input terminal 1302a (A) and a second input terminal 1302b (B). The equivalent circuit diagram 1300 of the piezo transformer has further a capacitance 1302c on the input side, which is connected in parallel to the input 1302. Further, the equivalent circuit diagram 1300 comprises a resonant circuit consisting of a series connection capacitance 1304a, inductance 1304b and resistor 1304c, through which a load alternating current $I_L$ flows. Further, the equivalent circuit diagram 1300 comprises a first transformer 1306a, through which the load alternating current $I_L$ flows from the input side, and a second transformer 1306b, through which load alternating current $I_L$ flows also from the input side. In other words, the two transformers 1306a, 1306b are connected in series on the input side, which is characteristic for the described configuration of a piezo transformer.

An output of the first transformer 1306a provides an output voltage $U_2$ at the output 1308a of the piezo transformer. A second capacitance 1308b ($C_2$) is connected in parallel to the output of the first transformer 1306a, which has a transformation ratio of $k_0$. Further, it should be noted that the output 1308 of the piezo transformer 1300 comprises a first terminal 1308c (C) and a second terminal 1308d (D).

Further, an output of the second transformer 1306b provides the auxiliary voltage $U_3$ at an auxiliary output 1309a. The second transformer 1306b has a voltage transformation ratio $k_r$. A capacitance 1309b ($C_3$) is connected in parallel to the output of the second transformer 1306b. Further, the auxiliary output 1309a comprises a first terminal 1309e (E) as well as a second terminal 1309f (F), between which the auxiliary voltage $U_3$ is provided.

In other words, FIG. 13A shows a typical electrical equivalent circuit diagram of a piezo transformer PT with voltage transformation ratio $k_0$ and $k_r$.

Thereby, the voltage or auxiliary voltage, respectively, $U_3$ is generated at 1309b ($C_3$), wherein the voltage $U_3$ is always proportional to the load current $I_L$. Further, from the context described with regard to the equivalent circuit diagram 1300, it results that the output voltage $U_0$, for example a voltage at an output of a rectifier network which is coupled to the output 1308 on the input side, can only be detected approximately proportional to a voltage detection, when an output load R, which is coupled to the output 1308a is small enough compared to the impedance $i/\omega C_2$ (see output load R in FIG. 13B). In other words, if a high-impedance ohmic load is connected to the output 1308a, and further, a high-impedance ohmic load is connected to the output 1309a, it applies that the auxiliary voltage $U_3$ is approximately proportional to the output voltage $U_2$. If, however, the resistor of the resistive load connected to the output 1308a is not significantly higher than the impedance of the capacitance 1308b, this proportional context is disturbed.

In order to obtain, for example, an error of less than 1% of the output voltage (which means to obtain it that thereby the proportional relation between the output voltage $U_2$ and the auxiliary voltage $U_3$ is valid with sufficient accuracy), the equivalent resistor of an imaginary alternating current load (at the output 1308) must have more than seven times the value of the impedance of the capacitance 1308b ($C_2$). Thus, the regulating range of the piezo transformer, which is designed for an ohmic nominal load R of about the same quantity as the output impedance $1/\omega C_2$, is not adjustable to a constant output voltage up to the full load. However, a piezo transformer can be designed such that it is operated only in this range of an increased ohmic load, and thus already accomplish a regulation according to FIG. 13E, as will be described below.

According to one aspect of the present invention, the consideration is of relevance that the resonance converter should be implemented such that an impedance of a load connected to the output 1308 of the piezo transformer 1300 is at least as high as an impedance of the capacitance 1308b, preferably at least twice as high as the impedance of the capacitance 1308b. Further, it is preferred to ensure that the impedance of the load is at least five times as high as the impedance of the capacitance 1408b.

Figure 13B:
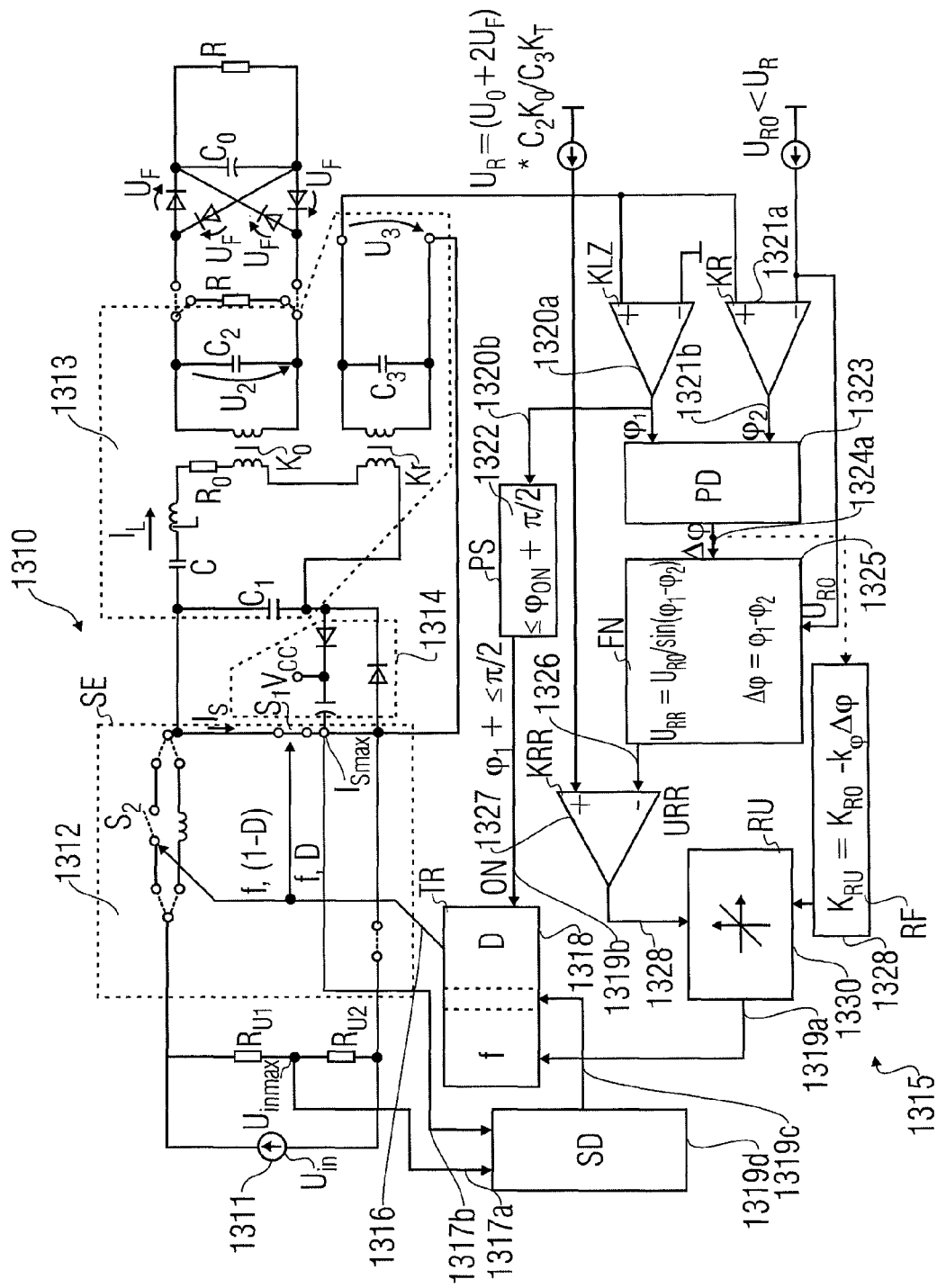
FIG. 13B is a block diagram of an inventive resonance converter using an output signal of a serially coupled-out auxiliary output both for specifying a turn-on moment of a switch unit and for regulation the operating frequency.

FIG. 13B shows a block diagram of an inventive resonance converter with a regulation based on the auxiliary voltage $U_3$ coupled-out in a serial way. The circuitry according to FIG. 13B is designated by 1310 in its entirety. The circuitry 1310 is fed from a voltage source 1311, which provides a regulated or unregulated (possibly pulsed) direct voltage. The voltage source 1311 provides energy to an input network 1312, which also comprises a switch unit with at least one switch. The input network can be a network as has already been described above. Further, different options of the input network are designated by dotted lines. In other words, the input network 1312 is coupled to the voltage source 1311 on the input side. Further, the input network 1312 is coupled to an input of a resonant transformer arrangement 1313 on the output side. While a first output terminal of the input network 1312 is directly coupled to a first input terminal of the resonant transformer arrangement 1313, a second output terminal of the input network 1312 is coupled to a second input terminal of the resonant transformer arrangement 1313 via a pump circuit 1314. The pump circuit here essentially corresponds, with regard to its structure, to the pump circuit described with reference to FIG. 7A, and serves to provide a supply voltage $V_{CC}$ for the control circuit.

Further, preferably, the resonant transformer arrangement 1313 comprises a piezo transformer, as described with regard to FIG. 13A. The output of the resonant transformer arrangement 1313 is further alternatively (or simultaneously) coupled to an alternating current load (for example an ohmic resistor R) or a direct current load (for example a resistive load supplied via a rectifier arrangement), as indicated in FIG. 13B.

With regard to the direct current load or the alternating current load, the above explanations apply.

Further, the circuitry 1310 comprises a control circuit 1315, which receives the auxiliary voltage $U_3$ and generates a control signal 1316 for at least one of the switches in the input network 1312 based thereon. Further, optionally, the control circuit 1315 can obtain information 1317a about the input voltage $U_{in}$ of the voltage source 1311. Further, optionally, the control circuit 1315 can obtain information 1317b about a quantity of a current flow through at least one switch of the input network 1312 (for example in the form of a voltage tapped across a shunt resistor).

Further, the control circuit 1315 comprises a driver 1318, which has a similar function as the driver 2160 according to FIG. 2G. Thus, the driver 1318 receives frequency information 1319a, which corresponds to frequency information 2162, as well as a turn-on signal 1319b, which corresponds to the turn-on signal 2164. Additionally, the driver 1318 can optionally receive a control signal 1319c from a protection circuit 1319d, wherein the driver 1318 can be deactivated by the protection circuit 1319d via the control signal 1319c, if the protection circuit 1319d determines an overvoltage or an undervoltage, respectively, for example due to the signal 1317a, or if the protection circuit 1319d determines, for example, another error condition like an overcurrent through the switch, for example via the signal 1317b.

In the following, the further layout of the control circuit 1315 will be described. A first reference value comparator 1320a compares the auxiliary voltage $U_3$ with a first predetermined reference value, which is equal to zero in the shown example. The reference value comparator 1320a is also designated by KLZ. Thus, a signal 1320b indicating whether the auxiliary voltage $U_3$ is higher or smaller than zero is applied to the output of the reference value comparator 1320a. Further, the control circuit 1315 comprises a second reference value comparator 1321a, which compares the auxiliary signal $U_3$ with a second reference value, which defines $U_{RO}<U_R$ by a second reference voltage. The reference value comparator 1321a is also designated by KR and provides an output signal 1321b, which carries information whether the auxiliary voltage $U_3$ is higher or smaller than the second reference voltage $U_{RO}$. A phase shifter 1322 receives the signal 1320b from the first reference value comparator 1320a and delays the signal 1320b by a phase shift in a range between 60° and 90° in relation to the operating frequency of the driver. In other words, the phase shifter 1322 effects a phase delay between 0° and 90° (or only between 0 and π/2 rad, respectively), and generates the turn-on signal 1319b by the stated delay of the signal 1320b. In other words, the turn-on signal 1319b is active with a phase delay in a range between preferably 60° and 90° after a zero crossing of the auxiliary voltage $U_3$.

Further, a phase detector 1323 receives the output signal 1320b of the reference value comparator 1320a, as well as the output signal 1321b of the reference value comparator 1321a and forms a phase difference signal 1324a describing a phase shift between the signals 1320b and 1321b, based on the signal 1320b. Here, it should be noted, that, for example, φ1 designates a phase position of a rising or falling edge of the signal 1320b, and that φ2 designates a phase position of a rising or falling edge of the signal 1321b, wherein an arbitrary signal of the operating frequency f can serve as reference. A functional network 1325 further receives the phase difference signal 1324a as well as either the second reference voltage $U_{RO}$ or information about the second reference voltage $U_{RO}$, and calculates an amplitude 1326 of the auxiliary signal $U_3$ from the mentioned input quantities, wherein the amplitude 1326 is also designated by $U_{RR}$. For the calculation, the following applies:

$$U_{RR} = \frac{U_{R0}}{\sin\Delta\varphi}$$

with $\Delta\varphi = \varphi_1 - \varphi_2$.

In other words, the functional network 1325 calculates the amplitude 1326 from the knowledge of the second reference value $U_{RO}$ as well as the phase shift sf between a first time, when the auxiliary voltage $U_3$ shows a zero crossing, and a second time when the auxiliary voltage $U_3$ has the second reference value $U_{RO}$ or crosses the same, respectively.

Further, a third reference value comparator 1327 compares a third reference voltage $U_R$ with the amplitude information 1326 and provides a direction signal 1328, which indicates whether the amplitude value 1326 is higher or smaller than the third reference voltage $U_R$. A regulating amplification adjustment means 1328 receives the phase difference signal 1324a and determines further a regulating amplification $k_{RU}$ as a function of the phase difference $\Delta\varphi$, which is provided by the phase detector 1323. The regulating amplification determination means 1328 calculates, for example, the regulation amplification $k_{RU}$ according to the linear relation $$k_{RU} = k_{R0} - k_\varphi \Delta\varphi.$$

$k_{RU}$ and $k_\varphi$ are thereby, for example, constant values, but can also be selected in dependence on the environmental conditions (for example the input voltage $U_{in}$).

A regulator 1330 (RU) receives both the direction information 1328 and the regulation amplification $k_{RU}$ and generates frequency information 1319a for the driver 1318. The regulator 1330 increases or decreases the frequency information 1319a in dependence on the direction information 1328. If, for example, the amplitude information 1326 is higher than the third reference voltage $U_R$, the regulator 1330 will change the frequency information 1319a such that the operating frequency of the driver 1318 changes away from a resonance frequency of the resonant transformer arrangement 1313. Otherwise, the regulator 1330 changes, for example, the frequency information 1319a such that the operating frequency of the driver 1318 moves towards the resonance frequency of the resonant transformer arrangement 1313. The regulation amplification $k_{RU}$ indicates by how much the regulator 1313 changes the frequency information 1319a in one step (or per time unit, respectively). Such a regulation is useful since the phase difference $\Delta\phi$ carries information about the load, wherein with high load (low resistor of the load at the output of the resonant transformer arrangement 1313), a faster regulation is desirable than with a small load, to avoid instability and to obtain a sufficiently fast regulation at the same time.

Further, it has to be noted that ideally the following relation applies between the auxiliary voltage $U_3$ and the load alternating current $I_L$:

$$U_3 = \frac{I_L}{k_R} \frac{1}{j\omega C_3}$$

Thus, ideally, it applies that the auxiliary voltage $U_3$ has a phase shift of exactly 90° with regard to the load alternating current $I_L$. This fact can be used for determining the turn-on time by the turn-on signal 1319b in the shown manner.

Further, it has to been noted that preferably the following relation applies for the third reference voltage $U_R$:

$$U_R = (U_0 + 2U_F) \cdot \frac{C_2 \cdot k_0}{C_3 \cdot k_r}$$

Thereby, $U_0$ is the desired output voltage at a direct current load (after the rectifier), $U_F$ is a forward voltage of a rectifier diode, $C_2$ and $C_3$ describe the second capacitance and the third capacitance of the resonant transformer arrangement 1313, and $k_0$ and $k_r$ describe the voltage transformation ratios of the two transformers of the resonant transformer arrangement 1313. In the above equation, typically, all quantities on the right side are either constants or known or given, respectively, so that the third reference voltage $U_R$ can be easily calculated.

Figure 13C:
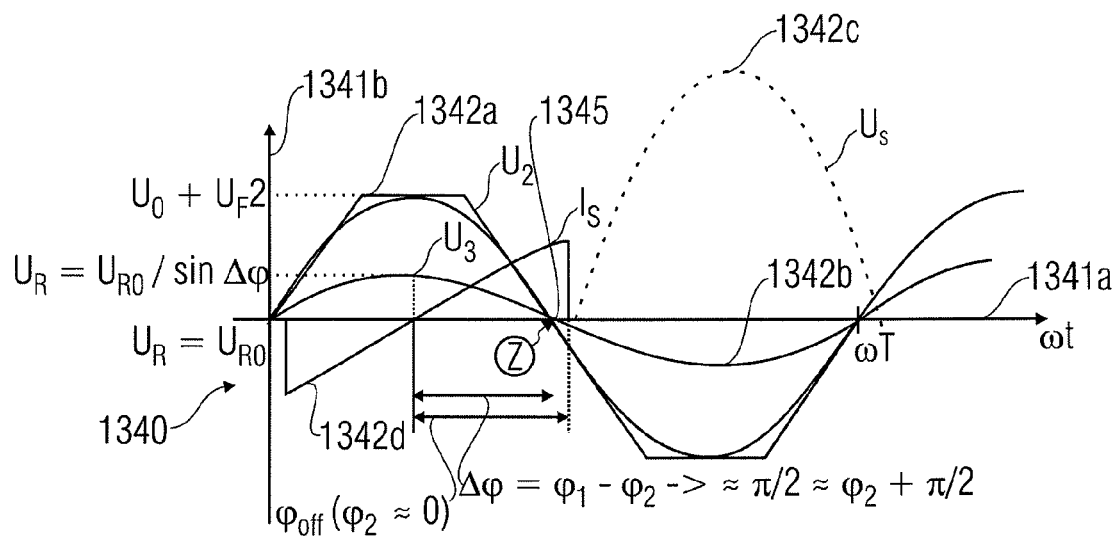
FIG. 13C is a first graphical representation of temporal waveforms in a resonance converter according to FIG. 13B.

FIG. 13C shows a graphical illustration of a time curve of signals as they occur in the resonance converter according to FIG. 13B. The graphical illustration of FIG. 13C is designated by 1340 in its entirety. A time, normed with operating circle frequency, is plotted on an abscissa 1341a. An ordinate 1341b describes a quantity of the shown curve shapes.

A first curve shape 1342a describes the output voltage $U_2$ at the output of the resonant transformer arrangement, wherein it is assumed that a direct current load consisting of a rectifier arrangement (e.g. bridge rectifier), load capacitor and resistive load is connected to the output of the resonant transformer arrangement. In that case, it is assumed that the output voltage $U_0$ indicates a curve approximating a trapezoidal shape. A maximum value of the output voltage $U_2$ is approximately $U_{2,max} = U_0 + 2 \cdot U_F$, wherein $U_0$ is the output voltage at the direct current load (which means at the resistive load after the rectifier circuit) and wherein $U_F$ describes a forward voltage of the diode used in the rectifier circuit.

A second curve shape 1342b describes the auxiliary voltage $U_3$ at the serially coupled-out voltage auxiliary output. The auxiliary voltage $U_3$ is approximately sinusoidal, since the load current $I_L$ through the resonant circuit of the resonant transformer arrangement is approximately sinusoidal due to the assumed high Q of the resonant transformer arrangement (while, however, harmonics causing a non-sinusoidal curve shape are highly damped.

A third curve shape 1342c describes a switch voltage $U_S$ across a switch of the switch unit. It has to be considered that the switch voltage $U_S$ assumes only very small or negligible values, as long as a reverse current flows through a freewheeling diode connected in parallel to the switch, or as long as a forward current flows through the switch.

Further, a fourth curve shape 1342d shows the switch current $I_S$ through the switch (including the reverse current through the reverse diode).

Further, the graphical illustration 1340 shows the third reference voltage $U_R$, which is in the shown case equal to the amplitude $U_{RR}$ of the auxiliary voltage $U_3$:

$$U_R = \frac{U_{R0}}{\sin\Delta\varphi}$$

In the shown configuration, further, at least approximately $U_R = U_{R0}$ applies, since approximately the following applies:

$$\Delta\phi = \phi_1 - \phi_2 \approx \pi/2 \approx \phi_2 + \pi/2.$$

It applies:

$$\phi_2 \sim 0.$$

Figure 13D:
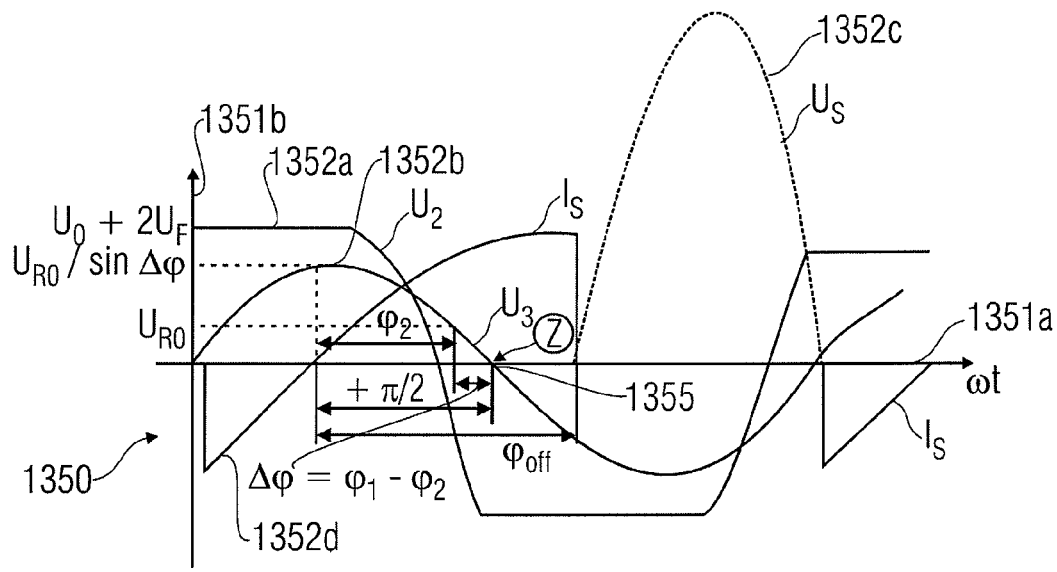
FIG. 13D is a second graphical representation of temporal waveforms in a resonance converter according to FIG. 13B.

FIG. 13D shows, in a similar way to FIG. 13C, a graphical illustration of signals, which can occur in the resonant transformer arrangement 1310 according to FIG. 13B in a certain operating state. The graphical illustration of FIG. 13D is designated by 1315 in its entirety. Again, the time normed to the operating circle frequency $\omega$ is plotted on an abscissa 1351a. An ordinate 1351b describes the quantity of the plotted curve shapes.

A first curve shape 1352a describes the output voltage $U_2$ at the output of the resonant transformer arrangement. A second curve shape 1352b describes the auxiliary voltage $U_3$ at the serially coupled-out auxiliary output. Here, it should be noted, that in the graphical illustration 1350 a significant phase shift exists between the output voltage $U_2$ and the auxiliary voltage $U_3$, while the output voltage $U_2$ and the auxiliary voltage $U_3$ are almost in-phase in the graphical illustration 1340. In the curve shapes 1350, further, $U_{R0} < U_R$ applies.

Further, the graphical illustration shows a third curve shape 1352c, which describes the voltage $U_S$ across the switch of the switch unit. Further, a fourth curve shape 1345d describes the current $I_S$ through the switch of the switch unit.

Figure 13E:
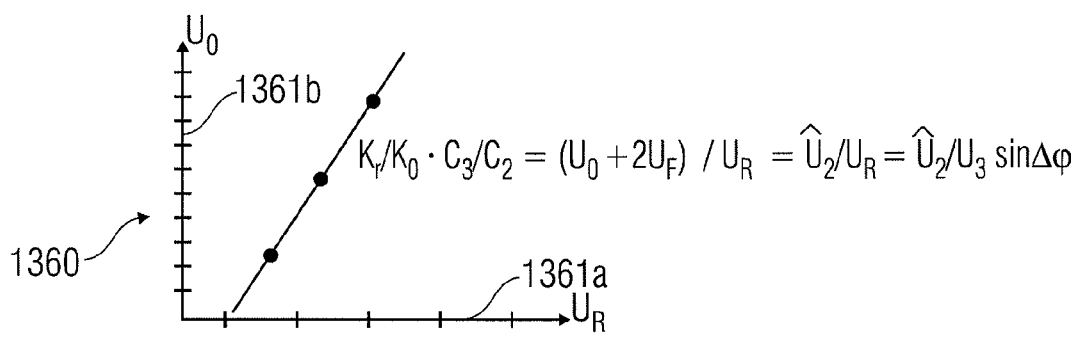
FIG. 13E is a graphical representation of a connection between a reference voltage $U_R$ and a load voltage $U_O$ at a small load.

FIG. 13E shows further a graphical illustration of a relation between the third reference voltage $U_R$ and the output voltage $U_0$ at a direct current load. The following applies:

$$\frac{\hat{U}_2}{U_R} = \frac{U_0 + 2U_F}{U_R} = \frac{k_r}{k_0} \cdot \frac{C_3}{C_2} = \frac{\hat{U}_2}{\hat{U}_3 \sin\Delta\phi}$$

The graphical illustration 1360 of FIG. 13E illustrates this relation, wherein the third reference voltage $U_R$ is plotted on an abscissa 1361a, and wherein the voltage $U_0$ at the direct current load is plotted on an ordinate 1361b.

With regard to FIGS. 13B-13E, it will be described according to an aspect of the present invention, how the output voltage $U_O$ is regulated in the inventive resonance converter 1310 according to FIG. 13B. It should be noted that a piezo transformer can be designed such that it is operated only in the above stated range of an increased ohmic load, and that thus already a regulation according to FIG. 13E can be obtained. For example, it would be possible for a regulation to observe a maximum value of the sinusoidally coupled-out voltage or auxiliary voltage $U_3$, respectively, and to compare the same to a reference $U_R$, as is shown in FIGS. 9-11.

Alternatively, a reference value $U_R$ can be used, which is smaller than the value of the output voltage to be regulated according to the equation relation according to FIG. 13E. In other words, if an output voltage $U_O$ is to be obtained at the direct current load, the amplitude of the auxiliary voltage $U_3$ has to be adjusted or regulated to the value adjusted or regulated to the value $U_R$. However, a value, which is smaller than $U_R$, can be selected for the first reference voltage $U_{R0}$. In that case, a function of the associated angle $\sin(\Delta\phi)$ has to be formed according to FIG. 13E and FIGS. 13C and 13D, which mathematically determines the maximum value and supplies the same to a comparator FN, as shown in FIG. 13B. This value is compared to the reference value $U_R$ according to FIG. 13B, and a corresponding frequency change is adjusted via the regulator 1313 (RU), to keep the deviation between the voltage or reference voltage $U_R$, respectively, and the voltage $U_{RR}$ or the amplitude of the auxiliary voltage $U_3$ calculated in the functional network 1325, respectively, always at zero or at least to minimize the same, respectively.

This can be performed by the reference value comparator 1327, but alternatively via a comparator, which supplies the deviation (between the reference value $U_R$ and the calculated amplitude $U_{RR}$) more accurately quantized to the regulator 1330, to thereby increase the regulating speed.

Further, the first reference value comparator 1320a (KLZ) detects a zero crossing of the voltage signal or the auxiliary voltage $U_3$, respectively, wherein the zero crossing is designated by 1345 (Z) or 1355 (Z) in FIGS. 13C and 13D. The second reference value comparator 1321a (KR) detects a moment when the voltage or the auxiliary voltage $U_3$, respectively, exceeds the reference voltage $U_{R0} \leq U_R$. The functional network 1325 forms the amplitude information 1326 is formed from the phase angle $\Delta\phi$ between the switching moments of the two reference value comparators 1320a (KLZ), 1321b (KR), which is, for example, designated as reference voltage $U_{RR}$ to be compared.

Further, for adjusting an appropriate regulating parameter (regulator amplification), the phase angle $\Delta\phi$ can be used, to adjust an appropriate regulation amplification in dependence on the quantity of a dynamical load step transition $k_{RU}$ according to the mapped function via the regulator functional network 1328 (RF).

However, this function is only effective with deviations of the output voltage, and thus not in a static case of an adjusted deviation with a stable adjusted phase angle $\Delta\phi$. In other words, if the phase difference $\Delta\phi$ is approximately constant and merely an amplitude of the auxiliary voltage $U_3$ (and thus the amplitude of output voltage $U_O$) varies slightly around a target value (defined, for example, by the third reference voltage $U_R$, the regulator amplification $k_{RU}$ is almost constant, and the output signal of the third reference value comparator 1327 decides, whether the regulator 1330 increases or decreases the frequency information 1319a. However, the quantity of the increase or decrease of the frequency information 1319a is constant due to the constant regulator amplification $k_{RU}$.

Further, FIG. 13B shows how the turn-on moment of the switches (controlled by the turn-on signal 1319b) is generated via a phase shift of, for example, approximately $+90°=\pi/2$, at the driver or the driver means 1318 (TR), respectively. Further, a relative turn-on time D is determined via the turn-on moment.

Thereby, a determination of the frequency or operating frequency f, respectively, is given via the regulator 1330 (RU), but a determination of the relative turn-on time D via the re-turn-on signal 1319b (ON), which synchronizes the turn-on moment. The above-described function (of synchronization) has the advantage that a re-start of, for example, the switch S1 of the switch unit (or, for example, the two switches S1 and S2) is synchronized with a zero crossing of the load current $I_L$.

The described solution advantageously differs, e.g., from the solution according to U.S. Pat. No. 5,866,968 in that a turn-on moment is always optimum, even when the input voltage (for example of the voltage source 1311) changes simultaneously to the load within wide limits. Thus, the load current is approximately in-phase with the zero crossing of the switch current, even when the input network 1312 (SE) can shift the zero crossing slightly by a maximum of +/−10 to 15°.

In order to avoid turning on that is too late, the phase angle of the phase shifter circuit 1322 (PS) can also be adjusted to be smaller, which means, for example, between 60° and 90°. Thereby, a delay is compensated by the driver circuit 1318 (TR) and the switches of the switch unit themselves (for example the switches S1 and S2), so that the switch in the switch unit or the switches in the switch unit, respectively, always turn on prior to the moment when the current in the switches becomes positive. Prior to the above-mentioned moment, in accordance with the invention, freewheeling diodes $D_I$ take on the reverse current flowing in the switch, as is shown for the case of class E according to FIG. 1D in, for example, FIG. 7A and FIG. 7B.

In all other configurations, too, identical diodes are to be arranged antiparallel with the switches according to FIGS. 1 and 2. In other words, according to the invention, it is preferred to use transistors as switches, and to connect a freewheeling diode in parallel to the load path of the transistors (which means, for example a drain-source path or a collector-emitter path), so that the freewheeling diodes take over the current in a reverse direction.

Thus, the described turn-on method, which means the generation of a turn-on signal 1319b based on a zero crossing of the auxiliary voltage $U_3$ and a corresponding time delay, solves generally and independent of topology, the object to allow zero voltage switching (ZVS) or another optimum switching-on close to zero voltage switching conditions (ZVS conditions) and to simultaneously cover a large input and load range, as well as to allow an extensive variability of the input network.

It is a prerequisite for the applicability of the above-mentioned concept that zero voltage switching (ZVS) is possible at all operating points of the converter, so that reactive energy in a load circuit or an input resonance circuit of the piezo transformer (PT) is always able to cause or allow the voltage at the switches to reach a zero-value in a resonant or quasi-resonant way.

Here, a margin of a reverse current time in the switches is advantageous, to always obtain an optimum turn-on point at tolerance variations in all operating cases, particularly at transient dynamic junctions, without leaving zero voltage, switching (ZVS).

The above method for determining the correct turn-on moment achieves that the sinusoidal signal generated from the voltage or auxiliary voltage $U_3$, respectively, shows no interference with respect to possible superimposed harmonics, in the case of a high load circuit Q (Q>5) of the load resonance circuit consisting of inductance L and capacitance L with respect to the output load.

Thus, unlike U.S. Pat. No. 5,866,968, the quantity of the voltage amplitude of the auxiliary voltage $U_3$ is freely selectable, without resistive load of the signal $U_3$ or the voltage auxiliary output, respectively, which could make the phase position of the turn-on moment smaller, without recognizable advantages for the solution.

Detecting a reverse switch current for generating the turn-on signal however, would be less reliable, because this signal is often superimposed with harmonics, which result from the excitation of harmonics in an input circuit of the load network of a piezo transformer or another transformer. These harmonics can occur both by parasitic vibrations across the switch capacitance and parasitic power inductances of the electric connections, and can also be effected by harmonics of the piezo transformer or another load network itself.

Further, with missing zero voltage switching (ZVS), the turn-on signal generated via the phase shifter 1322 (PS) always gives the optimum turn-on moment, where the oscillation of the load resonant circuit is maintained. Thus, the influence of the input network on the optimum and reliable operation is mostly suppressed, if no erroneous dimensioning of the arrangement exists, where, for example, the input capacitance $C_1$ of the load network has been made too large. Thereby, the resonant circuit consisting of capacitance C and inductance L with high Q operates as filter, which only transforms the base frequency of the desired resonance and thus guarantees in-phase turning-on of the switches.

Figure 13F:
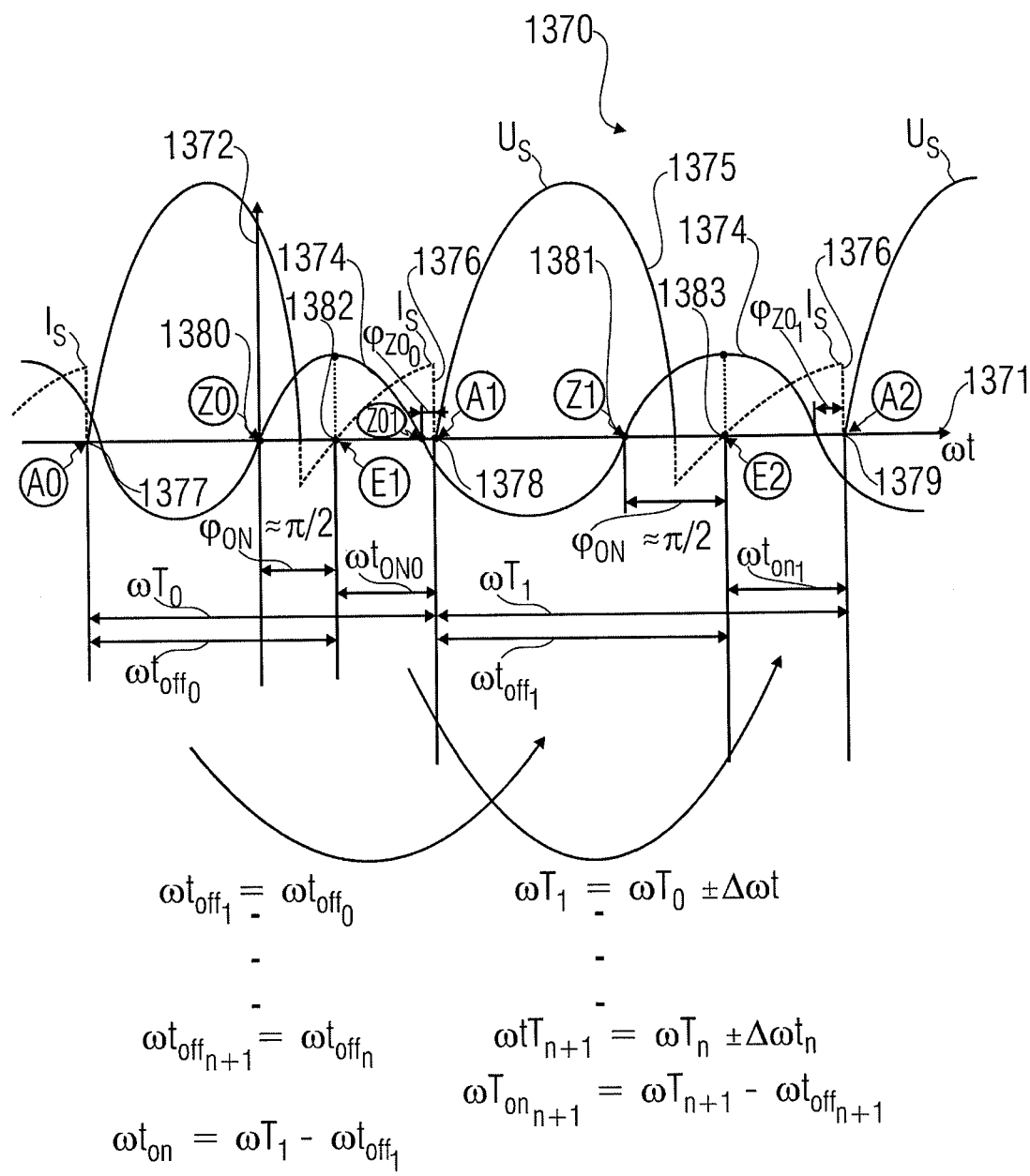
FIG. 13F is a third graphical representation of temporal waveforms in a resonance converter according to FIG. 13B for illustrating the regulator behavior.

FIG. 13F shows a further graphical illustration of time curves, which occur in an operation of the inventive resonance converter according to FIG. 13F. The graphical illustration of FIG. 13F is designated by 1370 in its entirety. The time, normalized to the operating angular frequency ω is plotted on an abscissa 1371. An ordinate 1372 describes a quantity of the plotted curve shapes. Further, the graphical illustration 1370 shows a first curve shape 1374 describing the auxiliary voltage $U_3$. A second curve shape 1375 describes a switch voltage $U_S$ at a switch or across a switch, respectively, of the switch unit. Further, a third curve shape 1376 describes the switch current $I_S$ through the corresponding switch of the switch unit.

Further, the graphical illustration 1370 shows moments 1377 (A0), 1378 (A1), 1379 (A2) when the above-mentioned switch is turned off, so that the current flow through the switch returns to zero. The graphical illustration 1370 further shows moments 1380 (Z0), 1381 (Z1), when the auxiliary voltage $U_3$ shows a zero crossing in increasing direction (which means, for example, from negative towards positive values). Further, the graphical illustration 1370 shows moments 1382 (E1), 1383 (E2) when the switch current $I_S$ has a zero crossing.

In other words, FIG. 13F shows the basic principle of the invention according to an aspect of the present invention with regard to control of frequency or operating frequency f and relative turn-on time D. A moment of turning-off the current $I_S$, for example through the switch S1, designated by 1377 or A0, respectively, is detected in the control circuit 1315 or is known to the same. Subsequently, a zero crossing of the auxiliary voltage $U_3$ detected by the first reference value comparator 1320a (KLZ) is evaluated and effects turning-on of the switch S1 with a phase shift of 90° or another fixed phase shift of a minimum of 60° and a maximum of preferably 90°. A relative turn-off time $\omega T_{OFF0}$ is measured via a timer. At a moment 1378 (A1), the switch S1 switches off again or is turned off, respectively, wherein a whole (relative) period duration $\omega T_0$ results from a frequency currently adjusted via the voltage-controlled oscillator (VCO).

In other words, if the moment 1377 (A0), when the switch was turned-off the last time, is known, and if further the operating frequency f or the associated period duration T (to be calculated as reciprocal or frequency f), respectively, is known, the time interval between the previous turning-off 1377 (A0) and the next subsequent turning-off 1378 (A1) of the switch has the duration T.

In the case of a frequency rise, a time interval $\Delta \omega t$ is subtracted from the already stored previous period duration $\omega T_{0-1}$ across the regulator 1330 (RU), to obtain the current period duration $\omega T_0$. In frequency reduction, further, the time interval $\Delta \omega t$ is added to the already stored previous period duration. A new turn-off moment is again detected via the beginning of a timer, and the previous stored relative turn-off time $\omega t_{OFF0}$ is used to determine again the turn-off moment from the previous period duration $\omega t_0$, by establishing the difference as relative turn-on time $\omega t_{ON0}$, calculated from the moment 1382 (E1) onwards, according to $\omega t_{ON0} = \omega t_{OFF0} - \omega T_0$. This process proceeds continuously, so that the calculation of the turn-on time and the correct turn-on moment as well as the current frequency or operating frequency is solved with this constantly recurring algorithm. Thus, the described integrating method from period to period of the operating frequency of the resonance converter generates thus a fastest possible regulation of the output voltage, the power or the output current, respectively, which a periodically switching converter allows with regard to its regulating path.

Further, the respectively required frequency change can be adjusted according to the requirements of stability, regulating speed and other parameters via the regulator 1330 (RU), without leaving optimum turning-on, and by tracking the relative turn-on time in all cases of a variable load, a variable input voltage and possibly a variable input network of the converter or piezo transformer PT in dependence on the frequency.

In other words, the inventive concept for determining the turn-on and turn-off moments of the switch in the switch unit is based on a strictly separated adjustment of the turn-off moments 1377, 1378, 1379 (A1, A2, A3) of the switch and the turn-on moments 1382, 1383 (E1, E2) of the switch. A time interval between the turn-off moments is thereby merely defined by the frequency information 1319a provided by the regulator 1330 (RU), wherein a time interval between two subsequent turn-off moments is defined as period duration T belonging to the operating frequency f. The turn-on moments, when the control signal 1316 for the switch is generated, are further synchronized with (for example rising) zero crossings of the auxiliary voltage $U_3$, which are, for example, designated by 1380 and 1381 (Z0, Z1). Thus, the control signal 1316 for the switch is merely generated based on the above-mentioned zero crossings of the auxiliary voltage $U_3$ by a phase delay in the phase shifter 1322 (in combination with a phase delay of the driver 1318), so that the turn-on signal 1316 is delayed between 60° and 90° (with regard to the period duration T of the operating frequency f) in relation to the zero crossings 1382, 1383 of the auxiliary voltage $U_3$.

In dependence on how strong an overall change of the operating frequency f or the associated period duration T, respectively, is the delay means 1322 can be designed to delay the output signal 1320b of the first reference value comparator 1320a, for example by a fixed predetermined time, or to adjust the delay time for example dynamically to a quarter of the current period duration T. Generally, it is preferred that the delay of the delay means 1322 or the phase shifter 1322, respectively, lies in a range between one sixth of the period duration T associated to the operating frequency f and one quarter of the period duration T.

Figure 14:
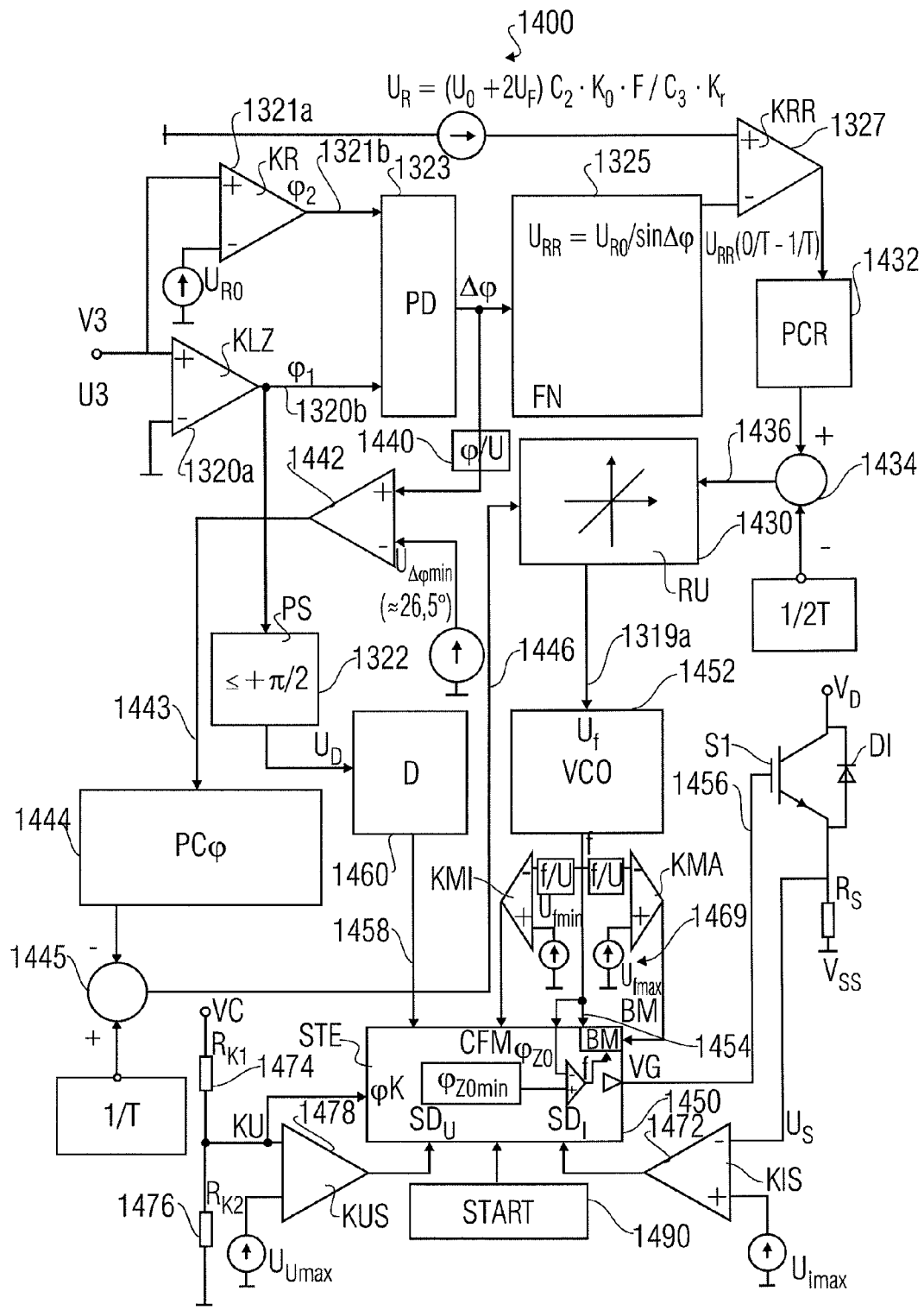
FIG. 14 is a block diagram of an inventive integrated control circuit for a resonance converter for regulating a load voltage or a load current using a serially coupled-out auxiliary voltage.

FIG. 14 shows a block diagram of a further inventive control circuit for a resonance converter by using a serially coupled-out auxiliary voltage $U_3$ or $V_3$, respectively. The circuitry according to FIG. 14 is designated by 1400 in its entirety. It should be noted that here the designation $V_3$ is used synonymously to the designation $U_3$ for the serially coupled-out auxiliary voltage.

It should be noted that the circuitry 1400 according to FIG. 14 has significant similarities with the circuitry 1300 according to FIG. 13B. For that reason, equal means are here designated by equal reference numbers and are not explained again. Rather, reference is made to the explanations with regard to FIG. 13B. However, it should be noted that a regulator 1430 of the circuitry 1400 differs from a regulator 1330 of the circuitry 1300.

In the circuitry 1400, a pulse code regulator 1432 receives the output signal of the third reference value comparator 1327. Together with a combiner 1434, the pulse code regulator 1432 generates a control signal 1436 for the regulator 1430, wherein the control signal 1433 assumes two values in dependence on the output signal of the reference value comparator 1327. For example, the pulse code regulator 1432 can be designed in combination with the combiner 1434 to adjust the control signal 1436 to a first value when a first value is present at the output of the reference value comparator 1327, and to adjust the control signal 1436 to a second value when a second value is present at the output of the reference value comparator 1327. The first value of the control signal 1436 can, for example, be an inverse of the second value of the control signal 1436. In other words, the control signal 1436 can, for example, assume the two values +x/T and −x/T in dependence on the output signal of the reference value comparator 1427, wherein x is, for example, a constant in a range between 0 and 0.5, and wherein T is the period duration associated to the operating frequency f.

Then, the regulator 1430 receives the control signal 1436 and decreases or increases the operating frequency in dependence on the value of the control signal 1436. For that purpose, the regulator 1430 provides frequency information 1319a, for example in the form of a digitally represented value or in the form of a control voltage $U_S$. It should be noted that the control signal 1436 not only indicates to which direction the frequency is to be changed by the regulator 1430 but also to what degree the frequency is to be changed (for example per time step, per period or per time unit).

The circuitry 1400 according to FIG. 14 further comprises monitoring a minimum phase shift $\Delta\phi$. For that purpose, information about the phase shift $\Delta\phi$ is tapped at the output of the phase detector 1323 and optionally converted into a voltage or another electrical representation, such as is designated by the optional angle voltage converter 1440. A fourth reference value comparator 1442 compares the angle value $\Delta\phi$ with a minimum phase shift $\Delta\phi_{min}$ and provides thus an output signal 1443 indicating whether the phase shift $\Delta\phi$ is smaller or higher than the minimum phase shift $\Delta\phi_{min}$. The minimum phase shift $\Delta\phi_{min}$ is preferably selected in a range between 15° and 40°, wherein it has turned out that very good results can be obtained in a range between 20° and 30°. In a preferred embodiment, the minimum phase shift $\Delta\phi_{min}$ is, for example, adjusted to 26.5°.

Further, a frequency limitation means 1444, 1445 generates a control signal 1446 avoiding a reduction of the frequency through the regulator 1430, when the phase shift $\Delta\phi$ reaches the minimum phase shift $\Delta\phi_{min}$ or falls below the same.

Further, the circuitry 1400 comprises a driver 1450. A voltage-controlled oscillator (VCO), which can alternatively be replaced by a means for digital frequency generation, generates a control signal 1454 of the operating frequency f based on the frequency information 1319 and provides the same to the driver 1450. Thereby, the control signal 1454 serves mainly for generating turn-off moments for the switch (here symbolized by the IGBT transistor S1 with the free-wheeling diode $D_f$ connected in antiparallel. In other words, a switch driver switches a control signal 1456 off for a driver, when, for example, a rising or falling edge appears in the control signal 1454.

The driver 1450 further receives a turn-on signal 1458, which is generated by a turn-on signal generation means 1460 from the signal generated by the phase shifter 1322. Thereby, the turn-on signal 1458 corresponds substantially to the output signal of the phase shifter 1322, wherein the turn-on signal generation means 1460, for example, also performs level conversion.

The driver 1450 typically turns on the control signal 1456 in response to receiving the turn-on signal 1458.

Further, the circuitry 1400 comprises a means for monitoring the frequency generated by the (voltage-) controlled oscillator 1452. The frequency monitoring means 1464 compares the frequency generated by the (voltage-) controlled oscillator 1452, for example with a minimum frequency $f_{min}$ and signals to the driver 1450 when the same falls below the minimum frequency $f_{min}$. Further, alternatively or additionally, the frequency monitoring means 1464 compares the frequency generated by the (voltage-) controlled oscillator 1452 with a maximum frequency $f_{max}$ and signals an exceeding of the maximum frequency $f_{max}$ to the driver 1450. The frequency monitoring means 1464 performs, for example, a frequency voltage conversion based on the control signal 1454 provided by the oscillator 1452, so that voltage information is present, which describes the operating frequency f of the voltage-controlled oscillator 1452. The above-mentioned voltage can be compared with a reference voltage $U_{fmin}$, which represents a minimum allowable frequency, and the result of the comparison provides information about whether the operating frequency f falls below the minimum allowable frequency $f_{min}$. Analogously, the above-mentioned voltage depending on the frequency can be compared with a further reference voltage $U_{fmax}$, representing the maximum frequency $f_{max}$, and the result of the comparison gives information about whether the operating frequency f exceeds the maximum allowable frequency $f_{max}$.

In the case of exceeding the maximum allowable frequency $f_{max}$ or when it falls below the minimum allowable frequency $f_{min}$, the driver 1450 can be turned off, for example.

As already briefly designated by regard to FIG. 13B, it can further be monitored whether a current flow through the switch (e.g. through S1) exceeds a maximum allowable value. For that purpose, the current flow through the switch S1 is converted into a voltage, which is here designated by $U_S$ (and which is not be confused with the voltage $U_S$ across the switch, shown in FIGS. 13C, 13D and 13F) by using a shunt resistor 1470. If the voltage $U_S$ across the shunt resistor $R_S$ exceeds a maximum allowable value (here: $U_{imax}$) which can be detected by a reference value comparator 1472 (KIS), an overcurrent condition is signaled to the driver 1450, which can, for example, result in turning-off the driver 1450.

Further, an input voltage $V_C$ can be evaluated, which is, for example, provided to the circuitry 1400 by the voltage source

1411. Since the voltage $V_C$ is higher than 50 Volt in many applications, it is preferred to generate a voltage $V_U$, which is a downscaled copy of the voltage $V_C$, by a resistive voltage divider consisting of two resistors 1474, 1476 ($R_{V1}$, $R_{V2}$). By comparing the voltage $V_U$ with a reference voltage $U_{Umax}$ in a reference value comparator 1478, further, a signal can be generated, which indicates an overvoltage condition to the driver 1450, and thus results in turning-off the driver. Further, the voltage $V_U$ can be used to adjust a correction angle $\phi_K$ in dependence thereon.

The driver 1450 can optionally be designed to perform a burst mode operation, which means to send only individual packets of control impulses to the switch, with distinct breaks in-between the same, as is known. The burst mode can for example be activated in response to determining exceeding of the maximum frequency $f_{max}$. Further, the burst mode can be activated when the phase angle $\phi_{Z0}$, as defined for example with regard to FIG. 3D, falls below a minimum value $\phi_{Z0min}$.

In other words, FIG. 14 shows a control circuit, which is based on the principle of serially coupling-out the voltage or auxiliary voltage $U_3$, respectively, to the load described in FIG. 13. Thereby, first, the threshold comparators 1321*a*, 1320*a* (KR, KLZ) determine the phase difference $\Delta\phi$. Then, a maximum value $U_{RR}$ (of the auxiliary voltage $U_3$) (to be compared), is determined by the functional network 1325 (FN). If a rated phase angle $\Delta\phi_N$ is close to 90° (for example in a range between 75° and 105°), a function formation in the functional network 1325 (FN) is simplified in that the sinusoidal function (sin $\Delta\phi$) (at least approximately) equals one. In that case, the reference voltage $U_{RR}$ (the amplitude of the auxiliary voltage $U_3$) is equal to the reference voltage $U_{R0}$.

By comparing the reference voltage $U_{RR}$ (or the amplitude of $U_3$) to the target value, respectively, represented by the reference voltage $U_R$, an impulse of zero (0/T) or an impulse of one (1/T) is determined as impulse per period duration of a sinusoidal oscillation of the auxiliary voltage $U_3$ via the reference comparator 1327 (KRR). This value is compared to a value of ½/T. Thus, the regulator 1330 (RU) is controlled, so that the regulator 1330 generates a frequency change. For example, the regulator 1330 generates a frequency reduction in the case of an impulse of zero at the pulse code regulator (PCR), and a frequency rise in the case of an impulse of one at the pulse code regulator 1432. Thus, the pulse code regulator 1432 merely passes a regulation deviation, which can vary with a fixed distance value of ½ around a means value of ½ or 0, to the regulator 1330 (RU), and can thereby generate a frequency-dependent preamplification, in order to adapt the regulation speed of a respective application at different resonant frequencies of the load network to the possible reaction speed of the regulation path (controlled part of the system). The quantity of the frequency change can thus depend on the respective frequency itself or can also be constant, in an embodiment, which is not shown.

Further, a voltage-controlled oscillator 1452 (VCO) or another frequency adjustment means is operated from the result of the regulator 1330, which generates a frequency or operating frequency f, respectively, which is passed on to the control means or the driver 1450 (STE), respectively, and which is passed on to the switch S1 via the output VG of the driver 1450, in order to control the respective converter or resonance converter.

Thereby, the switch S1 can also be only one of several switches S1, S2, S3 and/or S4 operated out of phase. If two switches S1 and S2 are present, the same are typically or preferably, respectively, operated in push-pull and further, a dead time exists between the turn-on intervals. This dead time is calculated by transforming the relative turn-on time of the switch S1 controlled by the driver 1450 or the control means STE, respectively, to the other switches in phase or by 180° out of phase. This is performed via the reference value comparator 1320*a* (KLZ), for example by realizing the phase shift via the phase shifter network 1322 (PS), and by thus forming a relative turn-on time D from the turn-off moment and the synchronized turn-on moment, as is described with regard to FIG. 13F.

Thus, this function can be applied to all converter types according to FIGS. 1 and 2, so that a universal circuit and control concept is given. By detecting the phase angle $\Delta\phi$, wherein the nominal phase angle $\Delta\phi_N$ should lie between 45° and 90°, the same can also be compared to a reference $\Delta\phi_{min}$. Since the load network can be designed equally for all converter types according to FIGS. 1 and 2, the minimum phase angle $\Delta\phi_{min}$ is a normed measure for a maximally possible power transmission of an inventive arrangement, such as a piezo transformer, as load network.

The minimum or minimum allowable, respectively, phase angle, however, depends on the selection of the nominal phase angle. If it falls below the minimum allowable phase angle $\Delta\phi_{min}$, a signal of zero (0/T) or one (1/T) is generated via a further regulator circuit 1444 (PC$_\phi$), which is compared to a (constant) signal 1/T. Thus, a limitation of the frequency is performed, wherein the frequency is not decreased any further after the minimum allowable, respectively, phase angle $\Delta\phi_{min}$ has been achieved. If, for example, a short circuit occurs at the load, a higher current $I_L$ through the load circuit would form in the first instant, which could cause that the same falls below the minimum phase angle $\Delta\phi_{min}$. In that case, the regulator 1430 (RU) could try to lower the frequency to obtain an increase of the output voltage, in order to achieve that the auxiliary voltage $U_3$ matches the reference voltage $U_R$ again, based on a comparison with the reference value $U_R$ predetermined according to FIG. 13E and possibly corrected by a factor F in the circuitry 1400 according to FIG. 14.

In order to avoid that a reference value of an application, which is adjusted too large, causes the converter to be overloaded by external alignment of $U_R$, the regulator 1444 (PC$_\phi$) limits the frequency towards the bottom, so that an overresonant operation of the resonance converter is ensured. A correct association of the voltage divider $R_{U1}$ and $R_{U2}$, or the voltage proportional current feed $R_U$ across the terminal $V_3$ according to FIG. 7B and FIG. 14 is a prerequisite for this limitation. Thereby, a limitation of the minimum allowable frequency is given, independent of the resonance frequency of the resonant circuit consisting of inductance L and capacitance C.

Thus, the internal fixed reference $U_{R0}$ of the control circuit or the control IC according to FIG. 13B or FIG. 14 determines together with the minimum phase angle $\Delta\phi_{min}$, which maximum load current is possible in the load circuit, in dependence on the current feed across $R_U$ and the coupling-out across $\omega C_3$. Further, since it can be assumed that such a load circuit in the closed loop is always operated in an overresonant way, which frequently offers the advantage of maximum efficiency when using a piezo transformer as load circuit, the limitation of the minimum phase angle to the value $\Delta\phi_{min}$ ensures that the regulation is maintained in an overresonant way, independent of the nominal reference value for the output voltage $U_R$, and thus for the output power or for the output current, and thus does not fall out of step by falling below the resonance point of the resonant circuit consisting of inductance L and capacitance C. Thus, the regulator 1430 (RU) does not fall below a minimum output voltage $U_f$ for generating a minimum frequency or operating frequency f, respectively.

If the regulation mechanism according to FIG. 13F is carried out, which means, a stepwise change of the period duration is determined via a digital regulation, whereby the operating frequency if also changes as reciprocal of the period duration, the regulator 1430 (RU) generates a time interval $\Delta\omega t$ instead of a voltage $U_f$, which is added to a stored previous period duration or subtracted from the stored previous period duration. In that case, the voltage-controlled oscillator 1452 is typically replaced by a digital means for generating a frequency with the period duration T, and the frequency monitoring means 1464 comprises, for example, digital reference value comparators, which evaluate the period duration T or the operating frequency f reciprocal thereto.

A start-up process for the circuitry 1400 is performed, for example, such that a frequency lying, for example, 15 kHz-50 kHz above the resonance frequency of the load circuit consisting of conductance L and capacitance C is adjusted by a starting block 1490 (START). Further, for example, a fixed turn-on time $D_{start}$ is adjusted in a range between typically 30% and 50% by the start block 1490.

The starting frequency, to which the operating frequency if is adjusted at the start by the start block 1490 can, for example, be adjusted by a capacitance $C_F$ via an external input (e.g. input VF according to FIG. 7B). If the mentioned capacitance $C_F$ is omitted, the frequency is, for example, alternatively adjusted by a corresponding resistor $R_F$ together with the desired output voltage $U_0$. According to the invention, after detecting a sufficient voltage signal $U_3$ or $V_3$, respectively, the above-described regulation mechanism is put in operation, so that frequency and turn-on time are adjusted by the process described with regard to FIG. 13F (in combination with FIGS. 13A-13E), or by a similar process in the circuitry 1400 according to FIG. 14. The adjustment of frequency and turn-on time is thereby performed, for example, via a voltage-controlled oscillator (VCO), wherein typically out-of-phase turning-on of the switch takes place using the phase shifter 1322.

Further, according to the invention, for saving additional feedback elements, such as galvanically separating optocouplers or further transformers, an adjustment to a constant load current $I_L$ is performed. The constant load current $I_L$ is measured such that it is not more than 50% to 100% above a maximum nominal current. According to the invention, this is obtained by selecting the transformation ratios $k_0$ and $k_r$ of the piezo transformer PT or another load resonant circuit according to FIG. 7B or 13B, such that the transformation ratios, together with the capacitances $C_2$ and $C_3$, result in a desired value, which results after impedance matching of the equivalent load R in relation to the output capacitance $C_2$ in the nominal load case (or, which result after impedance matching of the equivalent load R in relation to the output capacitance $C_2$ in the load case, respectively).

Since in most cases the described converter starts with an output voltage of zero ($U_0$=0), the current changes only slightly with appropriate dimensioning of the predetermined parameters, until it reaches approximately the nominal current of the nominal load, as long as the nominal load $R_N$ is applied to the output (of the resonant transformer arrangement). If a smaller load than the nominal load is applied, an input voltage-dependent phase correction angle $\phi_k$ will be generated via the tap $V_U$ of the input voltage $V_C$, which is processed with the turn-off load angle $\phi_{ZOn}$ illustrated in FIG. 13F, to form a correction factor F of the reference voltage $U_R$, such that the angle resulting from this calculation does not exceed or fall below a threshold. Thereby, a function of the angle $\phi_k$ falling in a linear, exponential or another continuous way with the input voltage $V_C$, is formed, which is linearly subtracted from the angle $\phi_{Z0}$ or linearly added to the angle $\phi_{Z0}$. Thereby, a fixed internal function of the control circuit is used, which can, however, also be impressed externally or influenced externally, respectively, when further pins of an integrated circuit (IC) or additional trim inputs were used.

Additionally, an adaptation to the input network, in the case of FIG. 7B to the value of the inductance $L_f$, can be performed via a series resistor $R_V$ according to FIG. 7B. When in this case $L_f$ has been selected in the vicinity of the resonance frequency of the load circuit consisting of capacitance C and inductance L, a smaller value has to be selected for $R_V$, to select a higher reference voltage at the input $V_U$. If a higher value has been selected for $L_f$, for example to obtain improved input current smoothing towards the network, a higher value has to be selected for $R_V$ in order to generate a smaller reference voltage $V_U$.

Further, an angle $\phi_{Z0}$ is determined, which carries information about how long (in relation to a period duration T) the switch is turned on, or how long forward current flows through the switch. According to FIG. 13F, the angle $\phi_{Z0}$ describes, for example, a phase difference between the moment when the auxiliary voltage $U_3$ shows a falling zero crossing (from positive to negative), and a moment when the switch is turned off. If the mentioned angle $\phi_{Z0}$ reaches an angle $\phi_{Z0min}$, which is typically between $-45°$ and $-80°$, a sufficient turn-on time can no longer be ensured. A turn-on time of zero would, for example, be obtained when the angle $\phi_{Z0}$ reached a value of $-90°$. In other words, the larger the quantity of the angle $\phi_{Z0}$ becomes, the smaller is the turn-on time of the switch. If the quantity of the angle $\phi_{Z0}$ exceeds a certain predetermined value, a sufficient turn-on time is no longer ensured. Therefore, in that case, a burst mode control (BM) is initiated. The mode of operation of the burst mode has been briefly discussed above, and thus reference is made to the above explanations.

With decreasing load (starting from a relative higher load), first, the reference voltage $U_R$ is reduced with the decreasing turn-off load angle $\phi_{Z0}$, so that the output voltage remains approximately constant. If it falls below a certain load, the resulting angle reaches a limit, for example in accordance with (7), so that a transition to the burst mode control or the burst mode operating state takes place, respectively.

During oscillation built-up of an impulse sequence of the burst mode, the reduced value of the reference voltage is always adjusted to an internal reference, for example the reference voltage $U_{R0}$. By determining the turn-off load angle $\phi_{Z0}$ occurring during oscillation built-up, in comparison to the input voltage function, for example according to (7), a decision is made whether the burst mode has to be maintained due to a low load, or whether the burst mode can be quit again with increasing load. A burst mode is also required when the starting frequency or a maximum frequency has been obtained, which is detected via comparator or reference value comparator KMA.

When further the reference according to FIG. 13C had been determined to a maximum phase angle of $90°=\pi/2$ during no-load operation or with minimum output load, the minimum possible phase angle $\Delta\phi_{min}$ according to FIG. 13B is $$\sin(\Delta\phi_{min})=(2/\pi)^2$$

$$\Delta\phi_{min}=26.5° \qquad (6)$$

under the assumption that the impedance $1/\Omega C_2$ of the capacitance is equal to the ohmic equivalent load of the load R at an output of a full bridge rectifier according to FIG. 13B, and when it is further approximately assumed that the forward voltages $U_F$ of the rectifiers D5-D8 are negligible compared with the output voltage $U_0$.

If these forward voltages, however, are considered within common limits, then, with common small voltages of 1 Volt to 40 Volt at the output, a compensation of the inflow of the forward voltage is given, compared to the output voltage by the required frequency distance from the resonance point at maximum load, by not allowing the smallest possible phase angle $\Delta\phi_{min}$, but by limiting the same to a somewhat higher value to not operate the converter in an underresonant way, and to thus bring the regulator circuit out-of step.

Thus, determining a standardized minimum phase angle (which means a minimum phase angle fixed by the control circuit) means a frequency- and circuit-independent operation of such converters with load circuits according to FIG. 13A. However, the minimum phase angle $\Delta\phi_{min}$ can also be fixed to a smaller or higher value. A smaller value is possible when the reference value of the output voltage to be regulated according to FIG. 13D has been determined to be smaller than the one determined in the relation according to FIG. 13E. A higher value is possible when, for example, a smaller power than the maximum transmittable power at the impedance equality at the output of the piezo transformer between capacitive and ohmic load is allowed, to thereby ensure a better stability of the output voltage in the underload range.

Further, FIG. 14 shows that a minimum and maximum frequency can be detected by corresponding threshold comparators KMI, KMA, if, for example, such a frequency range is determined by an additional trim input of an integrated control circuit, (control-IC). Thereby, the minimum frequency can be aligned approximately with the resonance frequency, so that the driver 1450 or the control unit STE, respectively, initiates the start process at a frequency above the minimum frequency (within a typical bandwidth of about 15 kHz to 30 kHz) via the START function (initiated by start block 1490). In other words, the start block 1490 achieves that the operating frequency at the moment of the start is about 15 kHz to 30 kHz above the minimum frequency. Thereby, an overresonant operation is guaranteed at all times, when a frequency generator starts at this maximum frequency $f_{max}=f_{min}+\Delta f_b$ and reduces the frequency step-by-step until an output current signal is observed via the auxiliary voltage $U_3$.

Further, an inventive monitoring circuit SDI of the switch current is given, if the same exceeds an allowed limit. This exceeding is determined via the comparator or reference value comparator 1472 (KIS), when a maximum value of the switch current in the shunt resistor or sense resistor $R_S$, respectively, has been exceeded. In other words, the reference value comparator 1472 generates a signal at the input $SD_I$ of the driver 1450, if a switch current, which is too high, is determined. Thereby, indirect monitoring of heating the switch is given, so that a certain thermal load, caused by an effective value or RMS value of the switch current, respectively, cannot be exceeded. If the switch current level is only exceeded briefly, in an impulse, but periodically, this can also be detected by a monitoring circuit according to the invention, for example when zero voltage switching (ZVS) is missing. A short-term, impulse-like (possibly periodically appearing) exceeding of an allowable switch current level can, for example, be briefly blocked out (suppressed) at a starting process, so that, for example, missing zero voltage switching (ZVS) would be tolerated in a starting case. With dynamically starting transient transmissions and, for example, at a start of the burst mode, such a block-out circuit is also useful or required.

In other words, the driver 1450 is designed to deactivate the switch, if either a current, which is higher than a current limit, flows longer through the switch than a first time period, or if the current through the switch only briefly, but periodically recurring, exceeds the current limit for a second time period. However, the driver 1450 does not deactivate the switch when the current flow through the switch exceeds the current limit only for a sufficiently short time period, which is shorter than the first time period.

Further, monitoring the input voltage $V_C$ is possible via the reference value comparator 1478 (KUS), so that when a maximum value is exceeded, the converter can be turned off via the function SDU or a control signal $SD_U$, respectively.

However, as has been explained, the above-mentioned voltage monitoring of the input voltage $V_c$ can be simultaneously used via the function $\phi_k$, in order to perform further regulation of the output voltage or the output current. Therefore, the following simplified dependence $$\Delta\phi+\phi_{Z0}+k_u V_C=\phi_{ref} \qquad (7)$$

is used. Factor $k_u$ describes a voltage division ratio through the voltage divider 1474, 1476 and can thus be adjusted via the resistor divider 1474, 1476 or the associated resistances $R_{V1}$, $R_{V2}$, respectively. Thereby, the operating range of the converter is determined with regard to the required input voltage range.

Thus, with constant input voltage, according to an aspect of the present invention according to (7), an approximately constant sum of the phase angles described in FIGS. 13C and 13D has to be adjusted to ensure a constant output voltage in the case of higher loads. As soon as the phase angle $\Delta\phi$ falls below a certain value, the proportionality of the relation in FIG. 13E is no longer given. With regard to a limit corresponding to the accuracy requirements, additionally, according to the invention, a regulation can be adjusted below a limit $\Delta\phi_{grenz}$ (which means if $\Delta\phi$ is smaller than $\Delta\phi_{grenz}$) where the function according to (7) is guaranteed. Particularly in the case of short circuit and overload, an approximately constant load current is adjusted, which is often desired in the case of an overload in current supplies.

Further configurations of the invention are a combined electrode of the piezo transformer for generating the load current proportional signal and the current supply for controlling the converter. In other words, the auxiliary voltage $U_3$ at the serially coupled-out auxiliary output can simultaneously be used for supplying the control circuit, whereby, for example, the above-described pump circuit can be omitted.

Further, the output of the piezo transformer can comprise a center electrode, so that only two rectifier diodes are required for generating the rectified DC output voltage (compare FIG. 13B), instead of four diodes of a bridge rectifier.

Further, in a further embodiment, a start block 1490 or a startup circuit (START) can be modified such that the start block reduces the frequency or operating frequency f, respectively, starting at an adjustable maximum frequency, incrementally and recurring for so long until a sufficiently high signal is detected at the auxiliary output or at the auxiliary electrode, respectively, for generating the load current proportional signal, which indicates the overresonant transformation of the piezo transformer. Then, the frequency can be slowly reduced, until a reverse current is observed in the switch, which suggests a resonant operation of the piezo transformer with zero voltage switching characteristic (ZVS characteristic). Detecting a reverse current through the switch can, for example, be performed by a reference value comparator similar to the comparator 1472 (KIS), wherein the configuration of the reference value comparator 1472 is in that case adapted to detect a reverse current (which means a current in reverse direction) and not an overcurrent (as shown in FIG. 14), which means a too high current in forward direction, but.

Only after determining the characteristic (which means the presence of a reverse current through the switch or a zero voltage switching), the actual regulator is put in operation, which performs merely a control of the turn-on time in that a voltage-controlled oscillator (VCO) generates a certain positive turn-on time in accordance with (4) or (4a), or in that another method is used according to FIG. 7A or 7B in correspondence with the implementation of the auxiliary tapping, or of the auxiliary output, of the load circuit.

Here, the circuitry according to FIGS. 13 and 14 and according to FIG. 7B is particularly robust, since control of the overall regulator functionality is possible loss-free or with low loss from a sinusoidal oscillation proportional to the load current.

An overall turn-on time (of the switch) can be longer than the time where the switch current flows in positive direction, wherein the time where the switch current flows in positive direction is referred to as positive turn-on time. The whole turn-on time is, for example, determined either by detecting a reverse current signal and by subsequent immediate turning-on of the switch, or according to a method by using a serial auxiliary tap with load-current phase proportional turning-on according to FIG. 13F. In other words, the switch can either be turned on directly after detecting a reverse current, or with a certain predetermined time or phase delay after a (rising or falling) zero crossing of the auxiliary voltage $U_3$.

The positive turn-on time occurs by determining the time difference between the switch current zero crossing or the turn-on moment (for example if the turn-on moment coincides at least approximately with the switch current zero crossing) and turning-off of the switch.

A regulation can alternatively or additionally, respectively, be adjusted or designed, respectively, by alternatively or additionally reducing the frequency during loss of the reverse current signal for so long, until a reverse current is detected again. In other words, if it is detected that no reverse current flows during a period duration T, then, in response, the operating frequency is reduced, or changed towards the resonance frequency of the resonant transformer arrangement, respectively.

Further, there are several possibilities to activate the burst mode. For example, switching to a burst mode control can be performed, when a loss of the reverse current signal is detected, since in that case, typically, the output voltage becomes too high (e.g. with too small load and maximum input voltage).

Adjustment of a duty cycle of the burst mode control is also performed by detecting the phase difference between the switch current and the load current as well as the input voltage, when a method, or circuit concept, according to FIG. 7A with parallel coupling-out of the auxiliary signal is used.

In all cases, it is advantageous to change to the burst mode, if despite (previous) frequency increase, the output voltage has been detected to be too high, and a maximum allowable frequency or maximum frequency $f_{max}$, respectively, has already been reached. For example, in the case of serial coupling-out according to FIG. 7A and according to FIGS. 13 and 14, burst mode control is useful, if either the maximum frequency or maximum allowable frequency $f_{max}$, respectively, has been reached, and the output voltage remains too high, or when missing zero voltage switching (ZVS) is detected, which may be detected, for example, via a reverse current comparator 960 (KS) according to FIG. 9 (the reverse current detection according to FIG. 9 being transferable to the other circuitries, too).

Burst mode control is even more effective in the case of serial coupling-out, by determining a minimum allowable phase angle $\phi_{Z0min}$, wherein a phase angle can or may not fall below the same, wherein when the same falls below the minimum allowable phase angle $\phi_{Z0min}$, the burst mode is used. Thus, for example, sampling a maximum frequency is no longer required in some cases. The minimum value $\phi_{Z0min}$ monitored or observed, respectively, at the driver 1450 or in the control unit STE, respectively, is always more than 0°, typically (with respect to quantity) 45°, so that a sufficient remaining turn-on time is ensured. $\phi_{Z0min}$ is preferably between 35° and 55°.

In order to find a value appropriate for the typical frequencies between 25 kHz and 500 kHz, the value $\phi_{OFFmin}$ should never fall below about 30°, which corresponds approximately to a turn-on time of 415 ns at a frequency of 200 kHz. This standardization is again independent of the topology, and can thus be applied to all converter types shown in FIGS. 1 and 2.

FIG. 16G shows a block diagram of an inventive resonance converter by using a serially coupled-out auxiliary voltage according to a further embodiment of the present invention. The circuitry according to FIG. 16G is designated by 1600 in its entirety. Since the circuitry 1600 is very similar to the circuitry 1310 showed with regard to FIG. 13B, equal means in the circuitries 1310 and 1600 are designated by the same reference numbers and are not described again herein.

Thus, generally, the circuitry 1600 comprises an energy source 1610, which can comprise, for example, a voltage source 1311. Further, the circuitry 1600 comprises an input network 1312 consisting of switch unit 1612 and an optional reactance network 1614. The switch unit 1612 can either comprise an inductance and merely one switch or two switches, as it is graphically illustrated. It should be noted that in the region of the source 1610, the input network 1312 and the resonant transformer arrangement 1313, equal letters (A, B, C, D) designate circuit nodes, which can be coupled to each other. The optional reactance network 1614 can, for example, comprise a serial inductance, a series resonance circuit, a parallel inductance or a parallel resonance circuit, which can be connected in series or in parallel between the switch unit 1612 and the resonant transformer arrangement 1313. Thus, different topologies of the input network 1312 result.

However, it should be noted that, e.g., all those topologies that have been described with reference to FIGS. 1B, 1C, 1D, 2A, 2B, 2C, and 2D could be used in the input network 1312. Thus, it is merely relevant that the input network 1312 generates excitation on the input side for the resonant transformer arrangement 1313, by switching at least one switch.

An output of the resonant transformer arrangement 1313 is further coupled to an output network 1616, which alternatively or in combination comprises an alternating current load or a direct current load with a rectifier and possibly a load capacitor, as has been described above.

A serially coupled-out auxiliary output of the resonant transformer arrangement 1313 provides, as has been described with regard to FIG. 13A or 13B, respectively, an auxiliary output voltage $U_3$, whose amplitude is proportional to a load alternating current $I_L$ in a resonance circuit of the resonant transformer arrangement.

A coupling-out network 1620 receives the auxiliary voltage $U_3$, and performs, if necessary, a level conversion, to, for example, displace the auxiliary output voltage $U_3$ into a level range, which can be processed in an integrated circuit. The coupling-out network 1620 can, for example, effect voltage division or voltage displacement, as will be explained below with reference to FIG. 15. Thus, the coupling-out network 1620 generates output signals 1622, 1624 representing the auxiliary voltage $U_3$. The reference value comparator 1320a, also referred to as zero crossing detector ZCD, receives the signal 1622 and generates information 1626, 1628, indicating when the auxiliary voltage $U_3$ has a zero crossing. The phase shifter or the delay means 1322, respectively, delays, for example, the signal or information 1626 by about 60° and generates thus the turn-on signal 1319b, which acts on the driver 1318 (with voltage-controlled oscillator and driver) in the way described with regard to FIG. 13B.

Further, a peak detector 1630 (PID) detects amplitude, effective value or amplitude-dependent information about the auxiliary voltage $U_3$. The information generated by the peak detector 1630 is designated by 1632. A combiner or comparator, respectively, 1634 combines the information 1632 from the peak detector 1630 with a reference value (for example reference value $U_{ref}$ or reference value $U_R$, respectively) from a reference value provision means 1636. The combiner or comparer 1634, respectively, can, for example, be designed to form a difference between the information 1632 and the reference value from the reference value provision means 1636. Alternatively, the combiner or comparator 1634 can also compare only the information 1632 with the reference value, and thus provide information, which indicates merely qualitatively, whether the information 1632 is higher or lower than the reference value. Thus, the combiner or comparator 1634 provides difference information or comparison information 1637 to a regulator 1638 (VR), which can, for example, be a proportional regulator, an integral regulator, or preferably a proportional integral regulator (PI regulator). Thus, the regulator 1638 provides frequency information 1319a to the driver 1318, analog to the regulator 1330 according to FIG. 13B. The frequency information 1319a determines for example, the operating frequency f of the driver 1318, in the above-described manner.

Further, the driver 1318 provides a turn-off signal 1640 to a phase detector 1642, wherein the turn-off signal 1640 indicates when the driver 1318 opens the switch in the input network 1312 or deactivates the control signal 1318, respectively. The phase detector 1642 forms, at least concerning the quantity, a phase difference between the signal 1628, which indicates a zero crossing of the auxiliary voltage $U_3$, and the output signal 1640, which indicates turning-off of the switch. Thus, the phase detector 1642 determines the turn-off phase angle, which is indicated for example, in FIG. 13F by $\phi_{Z0}$, and provides corresponding information 1644 to a burst mode regulator 1646. The burst mode regulator 1646 compares, for example, the received information 1644 about the turn-off phase angle $\phi_{Z0}$ with a minimum allowable turn-off phase angle $\phi_{Z0min}$ and activates, for example, the burst mode, if the actual turn-off phase angle $\phi_{Z0}$ becomes smaller than the minimum allowable turn-off phase angle $\phi_{Z0min}$.

Further, the burst mode regulator 1646 can detect, for example, when the phase angle reaches a predetermined value. In that case, the burst mode regulator 1646 sends a control signal to the driver 1318, which indicates that a maximum allowable operating frequency f is reached, and thus that the operating frequency f may no longer be increased. If the output voltage is still too high even after reaching the maximum allowable, operating frequency f detected in such a way, the burst mode regulator 1646 can again cause a transition of the driver 1318 into the burst mode. It should be noted that the reference value provision means 1636 can either provide a fixed or a variable reference value or a fixed or variable reference voltage $U_{ref}$, $U_R$, respectively, as will be explained below.

With reference to FIGS. 16A, 16B, 16C, 16D, 16E and 16F, an inventive mechanism for setting a variable reference voltage as well as for making a decision as to whether the burst mode is to be activated or deactivated will be described.

Therefore, FIG. 16A describes a block diagram of a circuitry for providing a variable reference voltage based on a forward-current/reverse-current ratio of a current flow through the switch.

The circuitry of FIG. 16A is designated by 1660 in its entirety. Circuitry 1660 includes a switch 1662 which may be, for example, part of an inventive input network. Switch 1662 may be, for example, the switch designated by S1, or the switch designated by S2, of the input network, alternatively, however, it may be one of the switches designated by S3 or S4. In addition, circuitry 1660 includes a switch current determination means 1664 designed to provide information 1666 about the switch current $I_S$ flowing through the switch. It is sufficient for the switch current determination means 1664 to provide information about when a reverse current, i.e. a current opposed to a forward direction, is flowing in the switch. If, for example, switch 1662 is a semiconductor switch, it will typically have a forward direction into which a current may flow in a normal operating state. A reverse current may be enabled, for example, by an additional device designed for that purpose, such as a free-wheeling diode (also referred to as $D_f$ within the framework of the present invention). However, the reverse current can typically not be turned off. In other words, the switch current determination means 1664 is at least designed to detect the direction in which the current flows through switch 1662.

In accordance with an embodiment shown with reference to FIG. 16F, the switch current determination means may be, for example, only a shunt resistor, or sense resistor, $R_S$ through which switch current $I_S$ flows and across which a voltage which is proportional to switch current $I_S$ (here referred to as $U_{rev}$) is therefore present.

A reference value comparator 1668 compares signal 1666, or voltage $U_{rev}$, with a reference value (e.g. 0 volt) to provide an output signal 1670 which indicates whether the current flowing through switch 1662 flows in a forward direction or in a reverse direction. A forward-time/reverse-time determination means 1672 determines a ratio between a first time duration (reverse-current time duration) during which a current flows through switch 1662 in the reverse direction, as well as, additionally, a second time duration (forward-current time duration) during which a current flows through switch 1662 in the forward direction. For example, forward-time/reverse-time determination means 1672 may be designed to determine, as the first time duration, the time duration between a beginning of a reverse current flow through switch 1672 (indicated by a change of state of signal 1670) up to a transition from a reverse current flow through switch 1662 to a forward current flow (indicated by a further change of state of signal 1670).

In other words, signal 1670 carries reliable information about a reverse-current time duration or, in short, reverse time. It is not so easy to determine a forward-current time duration, or forward time, in a reliable manner, since the forward time is ended by a transition to a vanishing current rather than to a reverse current. The forward-current time duration thus may be determined, for example, as the time duration between a point in time when a transition from a reverse current to a forward current (indicated by signal 1670) occurs, and a point in time when driver 1674 turns off switch

1662. Thus, the reverse-time/forward-time determination means is preferably designed to receive, from driver 1674, a turn-off signal 1676 instructing the driver to turn off switch 1662, or indicating that driver 1674 is turning off, or will turn off, switch 1662.

Thus, the reverse-time/forward-time determination means is in a position to both determine the reverse-current time duration $t_{rev}$ (reverse time) and the forward-current time duration $t_{onf}$ (forward time). In a preferred embodiment, reverse-time/forward-time determination means 1672 provides information 1678 describing a ratio between the reverse time and the forward time. It shall be pointed out that the reverse time is an actual reverse time during which, thus, a reverse current flows. The forward time further is a time duration during which a current actually flows through the switch in the forward direction, rather than being a time duration during which the control signal of the switch signals a turned-on state. Such a differentiation is necessary in some cases, since in some embodiments, the control signal of the switch is activated before a positive voltage is actually present across the switch, so that the control signal of the switch is turned on for a longer period than that during which a forward current actually flows through the switch. For this reason, the forward-current time duration, or forward time, will be referred to as $t_{onf}$ below so as to obtain a demarcation as compared with a time duration $t_{on}$ during which the control signal for the switch is active.

A functional unit 1680 further maps (possibly while taking into account other parameters such as the input voltage) the information 1678 provided by the reverse-time/forward-time determination means 1678 to a variable reference voltage 1682, also referred to as $U_{REF}$, which may take the place of, for example, the voltage or current reference 2154 according to FIG. 2G, or of reference voltage source 922 ($U_R$) according to FIG. 9, of reverse current source $U_R$ according to FIG. 13B, of reference voltage source $U_R$ according to FIG. 14, or of reference voltage source 1636 according to FIG. 16G. The manner in which variable reference voltage 1682 may be generated from information 1678 (i.e., for example, from the relation $$\frac{t_{rev}}{t_{onf}})$$

will be described below with reference to FIGS. 16B and 16C, 16D, 16E.

To this end, FIGS. 16C, 16D and 16E show a graphical representation of a switch current $I_S$ in various loading cases. The graphical representation of FIG. 16C is designated by 1686 in its entirety. A first graphical representation 1686a shows an example of switch current $I_S$ for a reverse-time/forward-time ratio of 1. The time is plotted on abscissa 1686b, whereas an ordinate 1686c describes switch current $I_S$. The time duration $t_{rev}$ during which a reverse current flows is approximately as long as time duration $t_{on}$ during which an actual forward current flows. Thus, the following applies to the reverse-time/forward-time ratio $$v_{RE} = \frac{t_{rev}}{t_{on}}:$$

$v_{RE} \approx 1$.

A second graphical representation 1687a shows, in a similar manner, a time curve of switch current $I_S$ for a reverse-time/forward-time ratio of near 0. Again, an abscissa 1687b shows the time, whereas an ordinate 1687c shows the switch current. Reverse time $t_{rev}$ in this case is considerably smaller than forward time $t_{on}$.

In addition, the third graphical representation 1688a shows a time curve of switch current $I_S$ for a reverse-time/forward-time ratio of 0.5, the time t being plotted on an abscissa 1688b, and an ordinate 1688c describing the switch current $I_S$.

In addition, FIG. 16B shows a graphical representation of the reverse-time/forward-time ratio $v_{RE}$ and of the variable reference voltage $U_{rev}$ as a function of load resistance R and of input voltage $U_{in}$.

The graphical representation of FIG. 16B is designated by 1690 in its entirety. An abscissa 1691a shows the load resistance R in a logarithmic form, i.e., for example, a magnitude of an ohmic alternating current resistor or of a direct current load which is coupled to an output of the resonant transformer arrangement via a rectifier and, as the case may be, in parallel with a load capacitor. In the graphical representation 1690, moreover, a minimally admissible load resistance $R_{L,min}$ as well as a maximally admissible load resistance $R_{L,max}$ are marked, wherein a burst-mode operation is typically activated in the event that a load resistor is larger than the maximally admissible load resistance $R_{L,max}$.

An ordinate 1691b describes the reverse-time/forward-time ratio $v_{RE}$, on the one hand, and the magnitude of the variable reference voltage $U_{REF}$, on the other hand. With a minimally admissible value $U_{in,min}$ of input voltage $U_{in}$, the ratio $v_{RE}$ will take on, for example, the value of 0 with the minimally admissible load resistance $R_{L,min}$, and will increase in a linear manner with the logarithm of the load resistance to a value of about 0.95 (generally to a value of between about 0.9 and 1.0), the value mentioned being reached once the load resistance reaches the maximally admissible value $R_{L,max}$. With the minimally admissible input voltage $U_{in,min}$, a point of the minimum load resistance $R_{L,min}$, with $v_{RE}=0$, is designated by 1692a (B), and a point of the maximum load resistance $R_{L,max}$ and $v_{RE} \approx 0.95$ is designated by 1692b (A).

For a maximally admissible input voltage $U_{in,max}$, the curve of $v_{RE}$ differs from that of the minimally admissible input voltage $U_{in,min}$. For a very small load resistance $R_L \ll R_{V_{er}}$, when the maximally admissible input voltage $U_{in,max}$ is present, the reverse-time/forward-time ratio will reach, for example, a value of 0.5, the respective starting point of the $v_{RE}$ characteristic curve being designated by 1692b (C). If, however, the load resistance reaches the maximally admissible value $R_{L,max}$, the reverse-time/forward-time ratio $v_{RE}$ will approximately increase to the same value it exhibits also with the minimally admissible input voltage $U_{in,min}$.

In other words, the end point of the $v_{RE}$ characteristic curve for the maximally admissible load resistance $R_{L,max}$ is approximately independent of input voltage $U_{in}$ (with an end point of 1692b). It shall further be noted that for the maximally admissible input voltage $U_{in,max}$ and the minimally admissible load resistance $R_{L,min}$, the reverse-time/forward-time ratio $v_{RE}$ takes on a value of between 0.5 and 0.75.

The graphical representation 1690 further depicts a desired curve of variable reference voltage $U_{REF}$ as a function of the load resistance of which the logarithm has been taken. It is shown that variable reference voltage $U_{REF}$ should drop in a linear manner with the logarithm of the load resistance. It may thus be seen that the reverse-time/forward-time ratio $v_{RE}$ may be mapped to the variable reference voltage $U_{REF}$ by means of a linearly mapping function. The linear mapping may be defined by two points associated with each other. For example, the mapping mentioned may be defined in that the presence of the minimum input voltage $U_{in,min}$, curve point 1692a is to be mapped to a point 1694a and that, in addition, point 1692b is to be mapped to a point 1694b. In other words, when a minimally admissible input voltage $U_{in,min}$ is present, a reverse-time/forward-time ratio of $v_{RE}=0$, for example, is to be mapped to a first value $U_{REF1}$. In addition, for the minimum input voltage $U_{in,min}$, a value of $v_{RE}=0.95$ (or a value of $v_{RE}$ taken from a range between about 0.9 and 1.0) is to be mapped to a second value $U_{REF2}$ of variable reference voltage $U_{REF}$. Thus, a linear mapping of the reverse-time/forward-time ratio $v_{RE}$ to the variable reference voltage $U_{REF}$ is defined by the mapping specification mentioned at least for minimum input voltage $U_{in,min}$.

For the maximum input voltage $U_{in,max}$, a changed mapping specification of the reverse-time/forward-time ratio $v_{RE}$ regarding variable reference voltage $U_{REF}$ applies. For example, for the maximum input voltage $U_{in,max}$, a reverse-time/forward-time ratio of $v_{RE}=0.6$ (of a reverse-time/forward-time ratio $v_{RE}$ of a range between 0.5 and 0.75) is to be mapped to the first value $U_{REF1}$ of variable reference voltage $U_{REF}$. On the other hand, for the maximum input voltage $U_{in,max}$, the reverse-time/forward-time ratio $v_{RE}$ of about 0.95 (or of a range of between 0.9 and 1.0) is to be mapped to the second value $U_{REF2}$ of variable reference voltage $U_{REF}$. By means of the two associations mentioned, again, linear mapping between the reverse-time/forward-time ratio $v_{RE}$ and variable reference voltage $U_{REF}$ is ensured.

In other words, it is preferred to map the reverse-time/forward-time ratio $v_{RE}$ to a variable reference voltage $U_{REF}$ by means of linear mapping, the variable reference voltage $U_{REF}$ decreasing as the reverse-time/forward-time ratio $v_{RE}$ increases. In a preferred embodiment, parameters of the mapping may be influenced as a function of input voltage $U_{in}$ to ensure that an influence of input voltage $U_{in}$ on variable reference voltage $U_{REF}$ is minimized.

In a further preferred embodiment, the reverse-time/forward-time ratio $v_{RE}$ may also be evaluated to decide whether the resonance converter is switched to a burst-mode operation. If, for example, a threshold value ranging between 0.8 and 1.0 is reached by the reverse-time/forward-time ratio $v_{RE}$, the burst mode may be activated in response thereto. Thus, the reverse-time/forward-time ratio $v_{RE}$ may have double significance—on the one hand for setting the variable reference voltage $U_{REF}$ and on the other hand for activating the burst mode.

Figure 17:
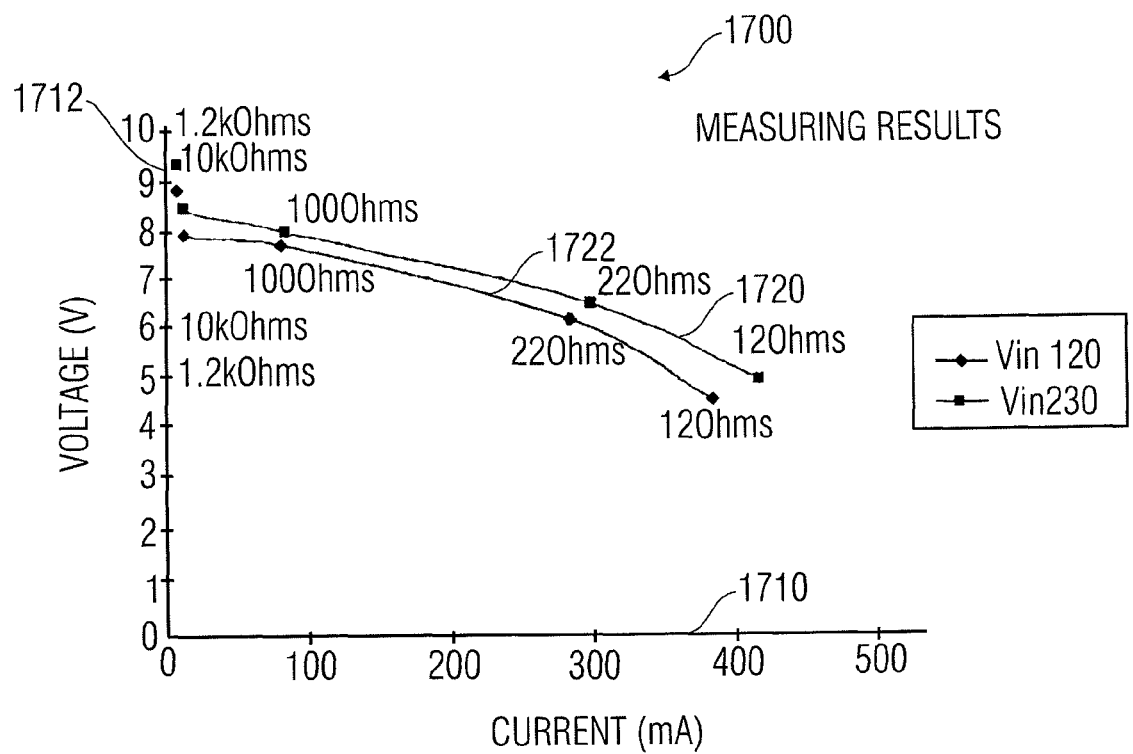
FIG. 17 is a graphical representation of measuring results with an auxiliary tapping ZA according to FIG. 16G for synchronizing the turn-on moment and for regulating by means of a peak detector PED (1630) and a comparative means (1634) when using a constant reference $U_R$ in block RW (1636) for regulating an approximately constant output voltage.

FIG. 17 shows a graphical representation of measuring results in a circuitry having an auxiliary tapping ZA according to FIG. 16G for synchronizing the turn-on moment and for regulating via a peak detector PED (1630) and a comparative means (1634) when using a constant reference $U_R$ in block RW (1636) for regulating an approximately constant output voltage. The graphical representation of FIG. 17 is designated by 1700 in its entirety.

An abscissa 1710 shows a current (e.g. an output current present at an output of the resonant transformer arrangement, or a current flowing through a load coupled to the output of the resonant transformer arrangement) in a range between 0 and 500 mA. An ordinate 1712 describes a voltage (e.g. an output voltage U0) ranging between 0 and 10 volt. A first curve 1720 describes the voltage as a function of the current at an input voltage Vin of 230 volt AC. A second curve 1722 describes the voltage as a function of the current at an input voltage Vin of 120 volt AC. In addition, associated resistances of the output load $R_L$ (12 Ohms, 22 Ohms, 100 Ohms, 1.2 kOhms, 10 kOhms), which describe a ratio between current and voltage are plotted for various points on curves 1720, 1722.

FIG. 18 shows a graphical representation of measuring results in a circuitry having an auxiliary tapping ZA according to FIG. 16G for synchronizing the turn-on time and for regulating via a peak detector PED (1630) and a comparator (1634) when generating a variable reference $U_R$ in block RW (1636) according to FIGS. 16G and 19 by an optocoupler OK for feeding back the output voltage to a further external comparative means VEX for generating the variable reference UR mentioned for regulating a constant output voltage U0 at a light load up to full load, and for regulating an approximately constant output current flowing through load RL in the event of an overload and a short circuit by limiting reference UR to a maximal constant value in such a case.

In other words, FIG. 18 shows measuring results at a circuitry according to FIGS. 16G and 19, respectively, wherein a signal of the auxiliary tapping is used to determine the turn-on moments of the switch. In addition, a peak value of the signal of the auxiliary tapping is determined in peak detector 1630, and is compared, in comparator 1634, to a variable reference, or reference voltage, $U_R$, generated in block RW. The variable reference voltage is dissipated by feeding back the output voltage (or, alternatively, the output current), via an optocoupler, to means RW for generating the variable reference voltage.

The graphical representation of FIG. 18 is designated by 1800 in its entirety. An abscissa 1810 describes a current, or output current (e.g. an output current present at an output of the resonant transformer arrangement, or a current flowing through a load coupled to the output of the resonant transformer arrangement) in a range between 0 and 1000 mA. An ordinate 1812 describes a voltage, or output voltage (e.g. an output voltage U0) ranging between 0 and 7 volt.

A first curve 1820 describes the voltage as a function of the current for an input voltage Vin of 120 volt AC, a second curve 1822 describes the voltage as a function of the current for an input voltage Vin of 180 volt AC, and a third curve 1824 describes the voltage as a function of the current for an input voltage Vin of 250 volt or 330 V AC.

FIG. 19 depicts a block diagram of an inventive circuitry for setting a variable reference $U_R$ for use, for example, in connection with circuitries according to FIGS. 2F, 2G, 3H, 3I, 5, 6, 7A, 7B, 8, 9, 10, 12, 13b, 14 and 16G.

The circuitry of FIG. 19 is designated by 1900 in its entirety.

An output voltage U0 present at a load 1616 (the load 1616 being representative for any direct current load or alternating current load, preferably, however, of a direct current load) is supplied, directly or via an optocoupler control circuit, to an input of an optocoupler 1910. The output of the optocoupler is coupled to a first input of a reference-voltage provision means 1920. A second input of the reference-voltage provision means 1920 receives a reference voltage $U_{R0}$ which is preferably (but not necessarily) fixed. Reference-voltage provision means 1920 is further designed to derive a variable reference voltage UR (or, generally, a variable reference value or a variable reference signal) by combining the signal received from the output of the optocoupler 1910, and the fixed reference voltage UR0. The reference-voltage provision means thus corresponds to the reference-value provision means 1636, apart from the provision of a variable reference voltage.

Variable reference voltage UR may be generated, for example, directly by combining the output signal of the optocoupler and reference voltage UR0. Alternatively or optionally, however, a further regulator 1930 (e.g. a proportional regulator, an integral regulator, a proportional/integral regulator or another regulator) may generate the variable reference voltage UR from a combination of the output signal of the optocoupler and the fixed reference voltage UR0.

The variable reference voltage provided by the reference-voltage provision means 1920 may take the place, for example, of reference voltage $U_R$ described within the framework of the present description, or may alternatively or additionally replace one of the other reference voltages or reference values described. The variable reference voltage UR supplied by reference-voltage provision means 1920 is further supplied to a combiner, or comparator, 1634 which compares variable reference voltage UR with an output signal of peak detector 1630, and/or determines a difference between the output signal of peak detector 1630 and variable reference value UR. Further, output signal 1637 of combiner, or comparator, 1634 is supplied to regulator 1638.

Reference-voltage provision means 1920 is thus designed to obtain, from optocoupler 1910 (directly or via a signal processing, or level conversion), a signal which describes the current flow through the electrical load, or load resistor, RL, or the voltage present at the electrical load, or load resistor, RL, and/or which is derived from the current flow through the electrical load or from the voltage present across the electrical load. Reference-voltage provision means 1920 is thus designed, all in all, to set the variable reference quantity provided by it (reference voltage UR, reference current IR or reference signal) as a function of the output voltage U0 or the current flowing through the load. A galvanic separation between the output of the resonant transformer arrangement and the input of the reference-value provision means is achieved by the intermediate optocoupler.

Generally speaking, for improving the regulation accuracy it is advantageous to feed back a voltage which is rectified at the output load and proportional to the output voltage, or a current which is rectified and proportional to the output current, via a direct current feedback (for example, but not necessarily, using a galvanically separating optocoupler). The respective fed-back signal is preferably used to provide a variable reference value for one of the comparative means, or combiners, or difference value determiners. Thus, the output voltage or the output current present at the output-side resistive load may be regulated to take on a constant value by using the variable reference value which is based on the fed-back signal.

FIG. 20 shows a block diagram of an inventive configuration according to FIG. 19 and FIG. 16G as well as in accordance with claim 52. The circuitry according to FIG. 20 is designated by 2500 in its entirety. Since circuitry 2500 is very similar to circuitry 1600 according to FIG. 16G, identical features and signals are designated by identical reference numerals. The voltage source, or energy source, 1600 is formed, in circuitry 2500, by a bridge rectifying circuit having a downstream filter capacitance Cin. The input network 1312 is further formed by inductance Lf and a switch S1 which are connected in the manner shown. In addition, input network 1312 in circuitry 2500 includes a free-wheeling diode 2510 connected in parallel with switch S1. Circuitry 2500 further includes a piezo transformer 1313 which is coupled, on the input side, to input network 1312 and which further comprises an auxiliary tapping in addition to a transformer output. The transformer output of piezo transformer 1313 is coupled to an input of a bridge rectifier 2520. An output of bridge rectifier 2520 is further coupled to a parallel connection consisting of a filter capacitance Cout and a load resistor RL. Moreover, an input of an optocoupler 2530 (OK) is connected in parallel with load resistor RL.

A series connection consisting of a Zener diode 2540 and a resistor 2550 is connected in parallel with load resistor RL, so that an associated Zener voltage is present across the Zener diode when output voltage Uout present across load resistor RL is larger than the Zener voltage.

An input-side light-emitting diode of the optocoupler is further connected in parallel with resistor 2550, so that a magnitude of a current flow through the light-emitting diode of the optocoupler depends on the output voltage Uout. The output of the optocoupler is further coupled to a comparator, or difference determiner, 2560 which compares an output signal of optocoupler 2530 with a reference value 2570, and/or determines a difference between the output signal of the optocoupler and reference value 2570. An output signal of the comparator, or difference determiner, 2560 is supplied to a PI control, or PI regulation, 2580 forming a dynamic reference value 2590 from the output signal of the comparator, or difference determiner, 2560. Dynamic reference value 2590 takes the place of reference value $U_R$ provided in reference-value provision means 1636.

A control circuit further receives an auxiliary voltage U3 from the auxiliary output, or the auxiliary tapping, of piezo transformer 1313. Auxiliary voltage U3 serves, among other things, to synchronize the turn-on moments of switch S1, and/or to set a duty cycle of the switch. In addition, a peak value of the auxiliary voltage (or of the auxiliary signal) U3 is determined and is taken into account in regulating the operating frequency as has already been explained with reference to FIG. 16G.

In other words, FIG. 20 shows an arrangement of an inventive implementation according to FIG. 19 and FIG. 16G.

The following blocks of FIG. 20 are to be associated as follows in FIG. 16G: PWM 1318 corresponds to GO 1318; "synchronization" 1620 corresponds to RKN 1620 and ZCD 1320*a*; ADC converter 2591 corresponds to PED 1630; PI control 1638 corresponds to VR 1638; adjusting duty cycle 1322 corresponds to PS 1322.

The following blocks of FIG. 20 are to be associated as follows in FIG. 19: reference value 2570 corresponds to $U_{RO}$; dynamic reference value 2590 corresponds to $U_R$ in block RW 1920 (or 1636).

FIG. 21A shows a block diagram of an inventive implementation according to FIG. 22 as well as in accordance with claims 53 and/or 54. The resonance converter according to FIG. 21A is designated by 2600 in its entirety.

The input network consisting of voltage source, or energy source, 1610 is structured in the same manner as resonance converter 2500 according to FIG. 20. In addition, resonance converter 2600 includes a piezo transformer which preferably has, but need not necessarily have, an auxiliary tapping, or an auxiliary output. An input of a bridge rectifier 2610 is coupled to an output of the piezo transformer. The output of bridge rectifier 2610 is coupled to an external reference-voltage provision circuit 2620 (VREX) via an LC filter, or n filter designed as a low-pass filter. The external reference-voltage provision means includes an optocoupler 2622, the input-side light-emitting diode of which is controlled as a function of the output voltage Uout present at the output of the bridge rectifier, or at the output of the LC filter connected downstream from the bridge rectifier.

The external reference-voltage provision means further includes a PI regulator circuit, or PI control circuit, 2628 which acts upon the current flowing through the light-emitting diode of the optocoupler. The PI regulator circuit includes two capacitances 2630 (Cd1) and 2632 (Cd2) as well as three resistors 2634 (R4), 2636 (R6) and 2638 (R5) connected in the manner shown. The PI regulator circuit, or PI control circuit, 2638 further acts upon the Zener reference 2540 so as to set a Zener voltage of the Zener reference (e.g. of a standard switching circuit of the TL431 type available, for example, from Texas Instruments). To this end, the PI regulator circuit, or PI control circuit, is coupled to a control terminal of Zener reference 2540. The voltage set causes a current flow through the input of the optocoupler, controlled by T1 according to FIG. 21B.

An output signal of the optocoupler is supplied to a linear voltage-controlled oscillator 2650 as a control signal. The output of optocoupler 2622 is preferably connected via a resistor R3 with regard to a fixed voltage reference $U_{ref,1}$ and/or $U_{ref}$, and for noise suppression, a capacitance C3 is connected to ground, so that the linear VCO may receive a low-noise signal from node 2680 against ground.

In other words, a rectified voltage proportional to the output voltage (Uout or U0) present at the output load, or a rectified current proportional to the output current ($I_0$, $I_R$), is coupled out via a direct current feedback, such as via a galvanically separating optocoupler 2622.

The input signal of the direct current feedback, or of the optocoupler, is generated in that a signal proportional to the output voltage or to the output current is initially compared with a reference value ($U_{R0}$) (IC1, PI control, R5, R6). Thereafter, the comparison result ($U_R$) is supplied to the direct current feedback (e.g. to optocoupler 2622, including its output-side connection), and is then supplied to a voltage-controlled oscillator (VCO) from the output of the direct current feedback (for example directly, or via a regulator) so as to regulate the output voltage to take on a constant value (for example in that the fed-back signal acts on a frequency of the voltage-controlled oscillator). A duty cycle of the switch unit is further set such that the duty cycle preferably has a linear relation to the frequency of the voltage-controlled oscillator.

In addition, it shall be pointed out that the following blocks of FIG. 22 are to be associated as follows in FIG. 21A: linear voltage-controlled oscillator (VCO) 2650 corresponds to GO 1318; RKN, ZCD and PS according to FIG. 22 are not shown in FIG. 21A. Thus, no synchronization is used in circuitry 2600 according to FIG. 21A.

FIG. 21B depicts an electrical equivalent circuit diagram of reference 2540 (also referred to as IC 1).

The anode of reference 2540 is coupled to a reference point. The cathode of reference 2540 is coupled to an input-side terminal of the optocoupler. Thus, reference 2540 and the input of optocoupler 2622 are connected in series between the output terminals for providing the rectified output voltage Uout. A reference input of reference 2540 further receives a constant reference voltage, for example reference voltage $V_{R0}$, or $U_{R0}$.

The emitter of optocoupler 2622 as well as a terminal of capacitance C3 are connected to the same reference potential as that terminal of switch S1 which is connected to the anode of free-wheeling diode 2510.

FIG. 22 depicts a block diagram of an inventive circuitry having a means for feeding back an output voltage via an optocoupler.

The circuitry of FIG. 22 is designated by 2700 in its entirety. Circuitry 2700 is based on circuitries 1600 according to FIGS. 16G and 1900 according to FIG. 19, so that the same features, or signals, are designated by the same reference numerals. Therefore, reference shall be made, in this respect, to the above configurations.

Circuitries 2700 and 2600 differ from circuitry 1900 according to FIG. 19 essentially in that in circuitry 2700, a comparison, or a difference determination, is performed between the output quantity (output voltage, or output current) present at the load, and a reference value (reference voltage, or reference current) present on the input side of the optocoupler. In other words, in circuitry 2700, the optocoupler receives, for example, an input voltage which equals a difference between the output voltage $U_0$ present at the load and a predefined reference voltage $U_{R0}$. This may be achieved, for example, in that a Zener diode is connected in series with the light-emitting diode of the optocoupler in parallel with load $R_L$, so that a voltage which corresponds to the difference between output voltage U0 and the Zener voltage of the Zener diode is approximately present across the light-emitting diode.

In addition, FIG. 7B depicts a circuit diagram of an inventive resonance converter in accordance with an embodiment of the present invention using a serially coupled-out auxiliary voltage $U_3$. The circuitry of FIG. 7B is designated by 770 in its entirety. Since circuitry 770 is very similar to circuitry 700 according to FIG. 7A, identical means, or signals, are designated with the same reference numerals and will not be described once again here. Circuitry 770 differs from circuitry 700 in that, for example, input voltage $V_U$, supplied by energy source 710, is provided via a resistor 772 ($R_V$) to an input-voltage terminal $V_U$ 774 of integrated control circuit 744. Thus, integrated control circuit 744 may evaluate the information about the input voltage, as is advantageous, for example, within the framework of setting a variable reference voltage $U_{REF}$ or in the framework of protective circuits.

In addition, circuitry 770 comprises a resistor 776 which replaces capacitance 752, or with which capacitance 752 is connected in parallel, and which may be used for setting at least one operating parameter of integrated control circuit 744. Also, resistor 736 is dispensed with in circuitry 770. Also, sampling of the pump voltage present at the second input-side terminal of the resonant transformer arrangement (using voltage divider 754, 756) is dispensed with in circuitry 770. The most striking difference between circuitry 700 and circuitry 770, however, is that in circuitry 770, a resonant transformer arrangement 780 having a serial coupling-out of auxiliary voltage $U_3$ is used, as has been described, for example, with reference to FIGS. 13A and 13B.

In other words, output voltage $U_3$ is essentially proportional to the load alternating current $I_L$ flowing through a resonant circuit of the resonant transformer arrangement 780. A first terminal 782 of the auxiliary output is coupled to the reference potential, whereas, on the other hand, a second terminal 784 of the auxiliary output is coupled to a terminal 788 ($V_3$) of integrated control circuit 744 via a series resistor 786 ($R_U$).

Figure 15:
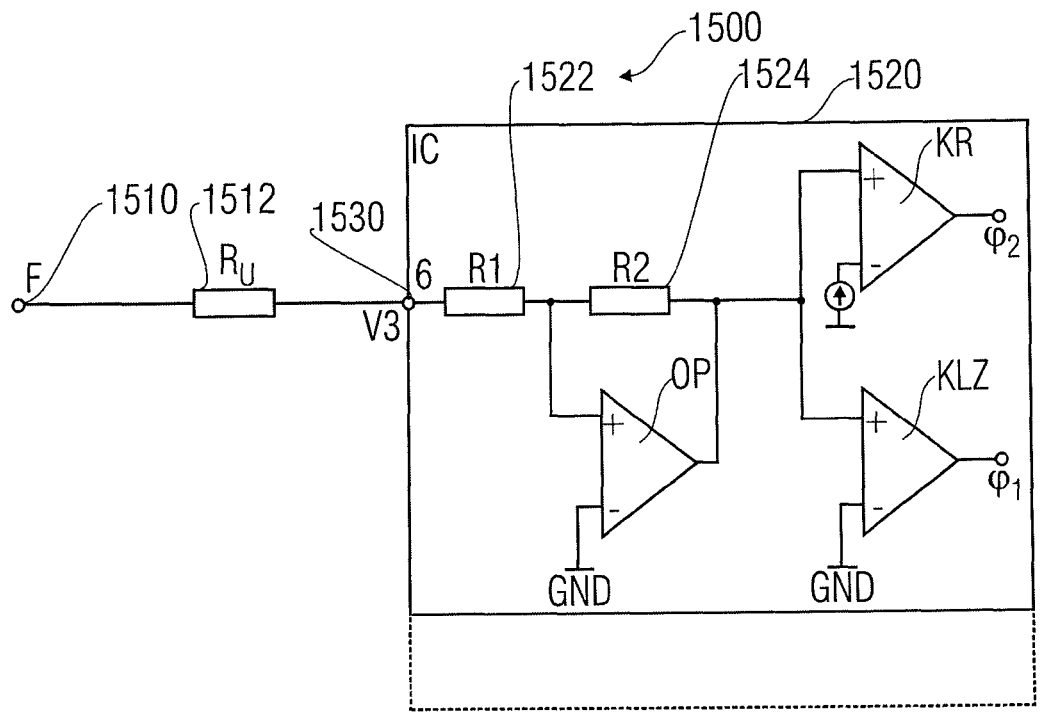
FIG. 15 is a circuit diagram of a circuitry for performing a level conversion on an auxiliary signal from negative to positive values and for comparing the auxiliary signal with reference values.

FIG. 15 further depicts a circuitry for the conversion, or level conversion, of a signal from an auxiliary output of a resonant transformer arrangement. The circuitry according to FIG. 15 is designated by 1500 in its entirety. It may be employed in a particularly advantageous manner when the auxiliary output of the resonant transformer arrangement may be set to any potential desired. In particular, the use of circuitry 1500 according to FIG. 15 is advantageous when the auxiliary output may be set to reference potential GND of the circuitry, as is possible within the framework of the present invention. A signal 1510 present at an auxiliary output of the resonant transformer arrangement is supplied to an integrated circuit 1520 via a series resistor 1512 ($R_U$). Integrated circuit 1520 includes, for example, an inverted operational amplifier circuit having resistors 1522, 1524, at the input 1530 ($V_3$) of which the input signal 1510 is applied across series resistor 1512 ($R_U$). The inverting operational amplifier subsequently passes on the invertingly amplified signal 1510 to the reference value comparator for further processing, as has been described, for example, using FIG. 9, 13B, 14 or 16G. It shall be noted that circuitry 1500 may replace, for example, input network 1620 according to FIG. 16G.

Crucial ideas in accordance with various aspects of the present invention will be summarized again below so as to facilitate understanding of the present invention.

The basic principle in accordance with one aspect of the present invention is that a converter is initially used which preferably comprises a structure in accordance with one of the circuit diagrams shown in FIGS. 1B, 1C, 1D and 2A, 2B, 2C and 2D and which is operated in resonance, and/or in an environment of +/−50% of the resonant frequency. Thus, a switch means which is fed by a source, or energy source, is used for controlling a "converter" (e.g. piezo transformer PT) which, in turn, drives a variable load. As has been shown, for example, in FIG. 1 of WO 2004/055962 A1, only one load current itself has so far been detected, possibly via a galvanically separating feedback element RK, with regard to its phase zero crossing or to a reference value which may also be a maximum value, and compared with the switch current with regard to its phase position. The phase preregulation has been supplemented and superimposed by an input voltage detection and a load voltage detection, also via feedback element RK, which have both been connected to the regulator circuit so as to further improve the dynamics (by means of input voltage detection) and accuracy of the regulation (by means of load-voltage detection). However, without load-voltage detection, the accuracy achieved with a regulation is not comparable to that of a primary current regulation with a conventional flyback converter (cf. DE 100 60 344 A1 and DE 101 43 016 A1). In other words, in accordance with the prior art, sufficiently accurate regulation is not possible without feeding back the load voltage and thus using a high-cost optocoupler or a magnetic transformer.

FIG. 1A depicts the prior art to date, wherein voltage or current detection (UE or IE) at the load network is required in order to obtain a precise output voltage or a precise output current. In those cases where galvanic insulation to the output is not required, this feedback involves less effort, but in most cases requires several signals if one wants to design regulation to be accordingly dynamic and fast without jeopardizing the stability of the regulator circuit. Thus, even with low-cost methods of feedback, when galvanic insulation is not required, several signals are necessary in order to implement a background phase regulation. As may be seen from FIG. 1A, a background phase regulation may be implemented in that a further signal detecting the load current of the load resonance network is fed back, in addition to the output voltage or the output current, by a circuit PD and/or by a phase detector 1040.

This disadvantage may initially be at least partially remedied in that according to FIG. 2F, on the one hand, an electrode having a load-current-proportional output of the converter (PT) and/or load network or resonant transformer arrangement 2030 is used to feed back the signal of the load current from the output to the input in a galvanically separated manner. In addition, according to FIG. 2G, on the other hand, only one switch current detection and, as the situation may be, one input voltage detection is evaluated. A phase difference between the load current and the switch current is now obtained, on the primary side, according to FIG. 2F, from the load-current-proportional signal and the switch current. In addition, a fraction of the turn-on time is obtained and/or generated, respectively, for implementing a control, from a function of the input voltage and a function of the phase angle between the switch current and the load current in accordance with (4) or (4a) (see FIG. 2G). In addition, a turn-off time is determined, as the situation may be, in accordance with (2) or (2a) (cf. FIG. 2.2).

Thus, the following applies:

$$\phi_D = \phi_0(U_{in}) - \phi_{LS}(R_L) \quad (4)$$

(phase description)

$$t_{on} = t_0(U_{in}) - t_{LS}(R_L) \quad (4a)$$

(time description)

$$\phi_{1\text{-}D} = \phi_{1\text{-}0}(U_{in}) \quad (5)$$

(phase description)

$$t_{off} = \phi_{1\text{-}0}(U_{in}) \quad (5a)$$

(time description)

A low level of regulation accuracy is achieved in the process, which, however, corresponds to a primary current regulation in flyback converters. Since the phase difference between the switch current and the load current from the equivalent circuit diagram of the load circuit corresponds, as it were, to the phase shift between the output capacitance of the load network and/or piezo transformer and the load itself, or since said phase difference may be selected, in the case of the class-E converter according to FIG. 1D, and with all converters of FIGS. 2A, 2B, 2C and 2D, with a correction factor of the superimposed input current flowing in the switch, such that the superimposed input current marginally shifts the zero crossing of the current flowing in the switch relative to the current resulting from the load network, the correction factor being constant and approximately equaling one, the load resistor is determined in a relatively precise manner from the phase difference because of the impedance adjustment of the load network, or piezo transformer, at full load.

In addition, use may be made, for example, of a property of the class-E converter according to FIG. 1D, specifically the property that with adjusted dimensioning of the load network, or piezo transformer, and of the input choke coil, the turn-on time is formed from a fraction which decreases as the load resistance increases, and from a fraction which also decreases as the input voltage increases. In other words, the turn-on time decreases as the load resistance increases, and also decreases as the input voltage increases.

The functions of phase difference angles between the load current and the switch current, and/or of the input voltage, are in each case linear functions for forming the turn-on time which may be integrated in a control circuit in a simple manner.

In a preferred embodiment, a class-E converter is dimensioned as follows: the maximum turn-on time is specified to range between D=0.4 and D=0.7, so that the required value of the output voltage is still reached with a minimum input voltage and a maximum load (minimum load resistance). Based thereon, the input capacitance of the load network and/or piezo transformer PT is set to be sufficiently small so that a zero voltage switching is achieved at the point mentioned (with a minimum input voltage and a maximum load). This dimensioning results from solving the differential equation system of the class-E converter with a respective value of the input choke coil and/or input inductance.

The value of the input choke coil is to be selected such that a resonant frequency arises with the input capacitance of the load network and/or piezo transformer of between 100%, and up to 10% of the resonant frequency of the mechanical load circuit of the piezo transformer arises in order to keep a phase shift between the load current and the switch current at a sufficiently low level, and to guarantee the properties mentioned of equations (4) and (5).

Due to the approximate proportionality of the turn-on time with the frequency, a control of the output voltage which is sufficiently accurate is thus achieved in this case. For controlling a constant output current, e.g. in the event of an overload (limitation of the maximum power), only the phase angle between the load current and the switch current is regulated, or set, to have a constant value near 45°.

However, the above-described implementation is not ideal with regard to an accuracy of the output voltage when the load circuit and/or piezo transformer is to operate within a large input and load range, and when process tolerances of the load circuit and/or piezo transformer and of the input choke coil, including tolerances of a non-matched control circuit, exceed certain boundary values. For example, tolerances of more than 10% in all components and/or in the driver circuit would not be suitable to ensure a level of accuracy and/or tolerance of the output voltage of less than +/−10% in total.

Since the output voltage itself, or the output current, are not detected with regard to their magnitudes in the first implementation described, but since only a phase position is evaluated, direct regulation is not possible and is therefore replaced by a parameter-dependent control In other words, based on a detection of the phase angle, or of the phase difference between the load current and the switch current (as a measure of the magnitude of the load) and possibly additionally based on the input voltage, the turn-on time is set (for example by influencing the operating frequency f) such that control of the resonance converter results.

In order to improve the above-described first implementation of an inventive configuration, the considerations set forth below may be taken into account. For example, one of the load resonance converters according to FIG. 3A may initially be simplified in that one regards only that load network as a series resonant circuit which divides the current into a capacitive load $C_2$ and a resistive load R. Since the load network of a piezo transformer PT is preferably designed, for achieving maximum efficiency of piezo transformer PT, such that the impedances of the maximally admissible load R and of the constant output capacitance $C_2$ which is parallel thereto are approximately similar in size near the resonant frequency of piezo transformer PT, it is ensured that the phase angle between the currents flowing through load R and capacitive load $C_2$ will change between 90° and approx. 45° when the load range varies from no-load to full load. The resonant frequency ($f_{res}$) results from the values of inductance L and capacitance C. Thus, the phase angle (between the currents flowing in load resistor R and capacitance $C_2$) is a sufficiently variable quantity which may be expediently evaluated in systems comprising a piezo transformer, but also in other, similar designs (having a different kind of resonant transformer arrangement).

FIG. 13B further illustrates how, by means of transformational coupling-out of output voltage $U_2$ to a voltage, or auxiliary voltage, $U_3$, a signal which is proportional to the alternating output voltage of an alternating current load R and which may be fed back in a galvanically separated manner, may be generated in order to control the converter and/or to enable regulation of the converter.

FIG. 3C illustrates the case when a direct current load R is operated via a rectifier bridge consisting of four diodes D1, D2, D3, D4 in combination with a load capacitor $C_0$, it being possible to couple out a voltage, or auxiliary voltage, $U_3$, which is also proportional to the alternating output voltage $U_2$, via the auxiliary winding with the transformation ratio $k_r$. This implementation (as has been depicted, for example, using FIG. 3B or 3C) is not always achievable, in technological terms, in piezo transformers PT, but may be achieved for conventional resonance converters by adding a conventional transformer at the output of a piezo transformer.

If, as has been described above, such a voltage, or auxiliary voltage (e.g. $U_3$), proportional to the alternating output voltage (e.g. $U_2$) of a load resonance network is coupled out, two voltages $U_2$, $U_3$ will result according to FIG. 3D which are shifted in phase by a specific amount, depending on the load, relative to the load current.

If the phase shifts $\phi_{L0}=\phi_{LZ}+\phi_{Z0}$ are plotted over a logarithm of the output direct current $I_0$, one obtains a function which is (according to FIGS. 3E and 3F) independent of the input voltage (e.g. $U_{in}$), which is largely linear and which is slightly curved only in the event of no-load, i.e. with very small currents.

FIG. 3G shows how this circumstance can be benefited from, in accordance with the invention, to set a constant current $I_0$ at the output. In a control circuit (e.g. circuit 378c), the logarithm of the output current detected is taken and translated (for example in circuit 378e) into a linear function LIN=$\phi_0$−$k_\phi$x. The linear function LIN is compared with a phase difference 376g provided by phase detector 376f so as to influence the load current. The phase difference 376g provided by phase detector 376f results from a comparison of a phase position between the zero crossing of the load current at comparator 376e (KL) and a phase position of auxiliary output voltage $U_3$ compared with a reference $U_R$ at comparator 376c (KR).

In other words, phase detector 376f provides a phase difference between a first moment when load current $I_L$ (detected by switch current $I_S$) comprises an ascending zero crossing (from a negative value toward a positive value), and a second moment when auxiliary output voltage $U_3$ crosses a reference value represented by reference voltage source $U_R$. In other words, phase detector 376f provides, for example, phase difference $\phi_{L0}$ according to FIG. 3D.

FIG. 3H shows how, in accordance with the invention, an output voltage which is constant at small loads is set and, at the same time, a characteristic curve is generated which decreases, in the event of higher loads, with the logarithm of the output current. Auxiliary output voltage $U_3$ is evaluated via a peak detector 382b (SDT) which may also be a comparator only. A phase reference $\Delta\phi_0$ which, in turn, is compared with the result of phase detector 376f (PD) and/or with an observed phase difference $\Delta\phi_L$, is generated via a first regulator 382c (Re1). The result is provided to a second regulator 382e (Re2) via a comparator, or combiner, 382d $V_\phi$, the second regulator influencing the load current. Thus, various output voltage characteristic curves can be set and varied, in accordance with the invention, via the phase angle and the signal which is proportional to the output voltage.

FIG. 3I depicts a regulation of a constant output voltage. Only the voltage signal $U_3$ of the auxiliary winding which is proportional to the output voltage is compared with a reference value $U_R$ by a comparator, and load current $I_L$ is readjusted via a two-point regulator 392b (RE) fed by a peak detector 392a (SDT), so that peak detector 392a oscillates between the state of the reference value comparator 376c (KR) switching through (voltage at the output is too high) and the peak detector 376c or of comparator KR not switching (voltage at the output is too small).

In accordance with a further aspect of the present invention, the detection of a quantity proportional to the piezo transformer output voltage (PT output voltage) is preferred, since this quantity at the same time allows to detect the voltage directly at the load and to compare it with a reference value. The deviation of the voltage difference may then be fed back to a regulator and, additionally, to a voltage-controlled oscillator (VCO) for controlling the switch unit of the converter, or resonance converter. Additionally, this voltage (i.e. the auxiliary voltage proportional to the output voltage of the resonant transformer arrangement) offers the possibility of comparing the phase zero crossing thereof with that of the load current detected in a closed switch of the switch unit.

In accordance with one aspect of the present invention, the phase position between the capacitive load voltage and the overall load current may be directly detected as a measure of the magnitude of the load or the magnitude of the dynamic reloading of a DC buffer capacitor in parallel with the load, independently of the input voltage ($U_{in}$) when, at the same time, the magnitude of the capacitance at the piezo transformer output (PT output) is known. Thus, the load resistance may be determined independently of the input voltage from the phase position and the piezo transformer output capacitance (PT output capacitance) $C_2$. Thus, one can immediately dynamically counteract any rapid load changes, even if what is dealt with is the reloading of a buffer capacitor in parallel with the load. On the other hand, regulation of the output voltage at the load may be implemented even without such a phase regulation, only for detecting a signal proportional to the piezo transformer output voltage, in that the maximum value of this signal is compared with a reference signal, and wherein the voltage deviation is fed back to the switch unit via a voltage-controlled oscillator (VCO) for regulating a frequency.

The fed-back signal need not necessarily be rectified, but it is sufficient, for example, to only observe whether the signal exceeds a (predefined) reference value, so that too high an output voltage is detected, and so that a frequency change (e.g. an overresonant increase in the frequency) for controlling the switch unit is performed via a regulator (e.g. integrator). As soon as the reference signal is no longer exceeded, the frequency is again changed in the opposite direction (e.g. an overresonant decrease is performed) in the manner of a two-point regulation, for example.

In accordance with one aspect of the present invention, as an effective implementation of the last-mentioned approach, an auxiliary electrode of the load network is suggested for adjustment to a desired reference value of the output voltage. The auxiliary electrode may be configured as a galvanically insulating auxiliary electrode of the piezo transformer so as to provide a signal, which is proportional to the alternating output voltage signal, at the piezo transformer. The galvanic insulation will be required only if the load side needs to be galvanically separated from the source side, as is required, for example, with off-line current supplies (e.g. loaders or adapters for mobile electronics such as laptops, etc.).

In addition, in accordance with one aspect of the present invention, the current supply for controlling the converter, and/or the current supply of the control circuit is implemented from an input electrode of piezo transformer PT, so that the solution mentioned can compete with a conventional flyback-converter solution in terms of simplicity and of the number of devices. At the same time, however, the inventive solution provides the advantages mentioned with regard to structural height and efficiency factor.

For implementing the current supply of a primary-side control circuit of the converter, in accordance with one aspect of the present invention, an electrode of the piezo transformer which forms the low-voltage side is guided via a pump circuit. Via a fast diode, the pump circuit supplies an operating voltage, and/or makes available, via the fast diode, an operating voltage for the integrated control circuit (by loading, for example, a loading capacity via the fast diode). In addition, a current flow in the opposite direction is implemented via a reverse diode. In other words, a second input-side terminal of the resonant transformer arrangement is coupled to the pump circuit and thus forms, in accordance with the definition, a pump node. The potential of the node, or pump node, mentioned (which is coupled to a reference potential via a parallel connection from a first diode and a capacitance, on the one hand, and a reverse diode, on the other hand) is used, in accordance with one aspect of the present invention, to determine an input frequency at the starting operation, the input frequency arising in a class-E circuit between the input choke coil and the primary-side capacitance $C_1$ of the piezo transformer (and/or by means of interaction of the input choke coil and the primary-side capacitance $C_1$).

Once this frequency has been determined during oscillation buildup, or once, in the case of a non-inductance half-bridge circuit, an input frequency has not been found, the control circuit may generate, in the event of a class-E circuit, a phase correction function which is required due to the input current of the choke coil being superimposed on the load current.

In accordance with a further aspect of the present invention, this correction not only enables a mapping of the load resistance which is independent on the input voltage, but also enables observation of the input voltage itself in that the signal of the pump node is also compared with a reference signal proportional to the supply voltage. Thus, a time difference between leaving the reference value and reaching the zero crossing is determined as a value proportional to the input voltage. In other words, a time difference between a zero crossing of the signal at the pump node and an arrival of the signal of the pump node at a reference value is a measure of the input voltage.

In accordance with its various aspects, the present invention thus achieves a plurality of objects as will be set forth below. The present invention uses a converter, or resonance converter, having a high-Q load circuit (Q>5) and evaluates the entire load circuit current indirectly via detecting a switch current which carries this load circuit current (or a current having a specified phase and/or amplitude relation to the load circuit current). If an input current is superimposed on this current in the switch at the moment of the zero crossing, a phase correction will be performed from the observation of the input frequency at the oscillation buildup of the converter. In accordance with this method, the control circuit may also detect whether a class-E circuit or a non-inductive half-bridge circuit was used, and it may equally control both.

Furthermore, the high-Q load circuit is preferably implemented by a piezo transformer (PT) which offers the possibility of configuring an auxiliary electrode which is galvanically insulated from the secondary side and which carries a signal which is proportional to the output voltage of piezo transformer PT. Thus, a regulation with galvanic insulation is possible without having to use an additional device, such as an optocoupler or a magnetic transformer. At the same time, this signal of the auxiliary electrode forms a feedback of the phase information of the capacitive voltage present at the output of piezo transformer PT and of the amplitude of this voltage in a signal, so that both fast phase regulation, by means of a comparison with the zero crossing mentioned of the load current via the switch current, for compensating for dynamic load fluctuations, and a regulation of the output voltage itself may be implemented.

Therefore, the present invention is preferably suited for galvanically separating current supplies of small structural heights and high efficiency factors, for which the expense of additional components is to be kept small. In addition, the present invention is equally applicable to alternating current loads and to direct current loads fed by output-side rectifiers.

In accordance with a further aspect, the present invention achieves the object of fully achieving a control or regulation of the output voltage or the output current by means of a single signal fed back from an auxiliary tapping of a load resonance converter and galvanically insulated from the output load. In this respect, it is not even absolutely necessary to evaluate the current in accessible input-side components in order to obtain suitable information about a phase position and the output quantities themselves. By constructing a suitable auxiliary tapping of a load resonance converter with a high-Q load circuit, and, under certain circumstances, by constructing one with a lower-Q load circuit (Q<5), one may obtain, from one single signal, all necessary information required for fully controlling or regulating the output voltage or the output current to take on a constant value. In addition, signals which may be noisy on the input side (such as switch currents or input currents of the load resonance network) are not even required anymore for generating correct regulation. However, such switch currents will be indirectly detected, with regard to their phase positions, from the phase position of the load current itself via of an auxiliary tapping if they are required for a regulation. If the phase positions of switch currents are nevertheless detected (e.g. directly), they may be used to determine the input network by utilizing a phase shift between the load current, detected via the auxiliary tapping, and a switch current so as to determine both the quantity of the present input voltage and the resonant frequency of the input network if such a resonant input network exists.

In accordance with one aspect, it is thus to a considerable extent that the present invention simplifies controlling and regulating of a load resonance converter by means of an auxiliary tapping, which provides all signals required therefore, in comparison with the solutions existing to date by avoiding, above all, high-effort galvanically-separating feedback elements. An inventive auxiliary tapping may be integrated into the load circuit at low cost, for example by using a piezo transformer with an auxiliary tapping.

In accordance with a further aspect, the present invention further achieves the object of overcoming above-described disadvantages of resonance converters with a piezo transformer as a load network with regard to an expensive feedback conventionally used, but to exploit, at the same time, the advantages of the resonance converters over conventional flyback converters with regard to efficiency factor and reduced structural height. The present invention differs from conventional circuitries for example in that in a plurality of conventional configurations, only a current or a voltage of the load network is compared with a voltage quantity or turn-on and/or turn-off quantity, observed at the switch unit, of the switch unit rather than comparing a current of the load network or of a quantity proportionally derived therefrom, in terms of phase and/or amplitude, with a voltage or current quantity present at the output of the load network, the voltage or current quantity, in turn, either serving the capacitive reactive current present across a capacitance in parallel with a load, and serving the resistive active current of the load itself, or serving the current of a dynamic reload of a direct-current buffer capacitance in parallel with the load.

In other words, in accordance with the present invention, a current or a voltage of the load network, and/or a quantity proportionally derived therefrom, is compared, in terms of phase and/or amplitude, with a voltage quantity or turn-on or turn-off quantity, observable at the switch unit, of the switch unit, or with a voltage or current quantity arising at the output of the load network, rather than a current of the load network or of a quantity proportionally derived therefrom, in terms of phase and/or amplitude, with a voltage or current quantity arising at the output of the load network, the voltage or current quantity, in turn, either serving the capacitive reactive current present across a capacitance in parallel with a load, and serving the resistive active current of the load itself, or serving the current of a dynamic reload of a direct-current buffer capacitance in parallel with the load.

Even though a phase shift between a quantity of the switch unit and a quantity of the load current in the load network has been used, by previous solutions, as a basis for regulating the load, such previous solutions have not used a quantity of the load current, which may be determined, for example, as a switch current with a closed switch, with a quantity of the capacitive or resistive portion of the load current which splits up into a resistive and a capacitive load. In other words, it is not known, in accordance with the prior art, to link an entire load alternating current $I_L$, for example, with a current flow only through a resistive load or only through an output capacitance present at the output of the resonant transformer arrangement so as to infer an unknown load at the output of the resonant transformer arrangement and to perform the regulation as a function of the determination of the unknown load.

In accordance with an aspect of the present invention, the output voltage may be dynamically regulated particularly well if one possesses both information about the magnitude of the output voltage and information about the active output current with regard to its phase position to an overall current which flows in the load circuit and which splits up into an active current and a reactive current at the output of the transformation network. By means of such a differentiation between active current and reactive current at the output of the transforming load network, the dynamic and static performance of the circuit may be better detected overall as soon as, e.g., a memory element is used at the output for buffering the energy.

Also, in accordance with a further aspect of the present invention, it is not known from the prior art to couple out a signal from the load network in a galvanically separating manner, the signal representing an only capacitive or, alternatively, only resistive fraction of the load current, and in such a manner that an observation of the phase difference from a current corresponding to the entire load circuit current, or from a voltage which is derived therefrom and is present in the switch unit may be evaluated.

With conventional solutions, what is also disadvantageous is the fact that the load current must be generated from a device which additionally acts in a transformational manner and which is not already contained in the load circuit. Therefore, it is desirable to determine the load current from the switch unit, in a manner similar, e.g., to the description given in U.S. Pat. No. 6,002,214, in order to save additional transformers in the load circuit rather than—as is the case, for example, with a galvanically separate load—having to detect the current with regard to its phase position directly at the load and having to feed it back to the primary control circuit. At the same time and unlike U.S. Pat. No. 6,002,214, direct detection of the output voltage makes sense with regulated direct current loads, for example, which output voltage may be derived from the load circuit on a side of the load circuit which is galvanically separate from the output. Unlike in U.S. Pat. No. 5,872,419, however, the voltage detected should not be galvanically connected to the output, not even to just one output electrode, however a signal which is proportional in time to the output voltage, or a signal which is proportional in time to the output current, being fed back in a galvanically separate manner to the input-side control circuit. Unlike U.S. Pat. No. 5,866,968, it is also desirable to use an electrode which is galvanically separate from the output for detecting a phase signal and, at the same time, for detecting the output voltage signal itself.

In addition, it has been detected in accordance with one aspect of the present invention that the relative turn-on time can no longer be kept constant and must be tracked when the input voltage is changed within wide limits. This is achieved, for example, by the inventive setting of the turn-on moment by generating a turn-on signal for the driver of the switch unit.

In addition, the present invention enables to operate various topologies of a load resonance converter using one and the same control principle in that a phase difference between the entire load current and a voltage present at the reactive (capacitive) part of the load, or a current flowing through the load, is detected. On the basis of the detection mentioned, the load resonance converter may be controlled, a detection of the load voltage itself being possible at the same time.

The present invention thus overcomes the following disadvantages of known circuitries in accordance with the prior art:

Auxiliary tappings for a galvanically separate evaluation of a resonant load circuit in a load resonance converter, for example formed by a piezo transformer, have so far not been proportional to the output voltage and proportional to the output phase at the same time, so that separate feedback of the output voltage and/or of the output phase has been required to date in order to regulate a resonance converter to have a constant output voltage or output power in all required cases of operation (short circuit, no-load, variable load, variable input voltage).

Auxiliary taps have so far not been implemented in a manner of complete galvanic separation from the input and output electrodes of a piezo transformer, so that complete galvanic separation for simplifying control without expensive feedback elements such as optocoupler has so far not been possible. Furthermore, a potential shift of such auxiliary tappings with regard to the input electrodes by input-side current supply circuits such as pump circuits has not been possible so far when, for example, a common mass potential is required between at least one input electrode and/or one output electrode as well as one auxiliary electrode and/or auxiliary tapping.

So far, there has not been a technical solution for simultaneously performing a load detection, independently of the input voltage, on account of a phase angle between a switch current of the switch unit of a resonance converter and an output voltage and/or an output current of the resonance converter, and evaluating the magnitude of the output voltage itself from one of these two phase signals.

So far, no correction of the signal, of a galvanically separate auxiliary tapping, which is proportional to the phase position of a switch current of a resonance converter, and of a signal proportional to the output voltage and/or to the output current has generally been determined for various candidate topologies of a load resonance converter.

So far, it has not been possible to realize, within the framework of controlling a load converter, a detection of the magnitude of the input voltage from phase signals of a circuit serving, at the same time, as the current supply of for control, rather than from a resistive or other input divider.

So far, one has not known of a regulation and/or control of a load resonance converter from only one single signal which is fed back, in a manner in which it is galvanically insulated, to the output from an auxiliary tapping, the signal both rendering the output voltage or the output current regulatable, on the one hand, and evaluating a phase position which allows to operate the switch unit under ideal conditions, on the other hand So far, one has not known of a detection of the resonant frequency from the system of such a load resonance converter and/or from phase signals or amplitude signals of an auxiliary tapping which is fed back in such a manner that it is galvanically insulated from the output.

Once again, the present invention will be generally summarized below. The present invention provides a regulated resonance converter consisting of a source QU, an input network EN with a switch unit SE, a high-Q load network LN, an output network with a load AN, and a feedback circuit RK with a regulator unit RE, the load network forming a load alternating current source LWQ, carrying a load alternating current IL, to the load which feeds this load alternating current IL to a capacitive fixed load C2, in parallel with a variable resistive load RL, and at the same time possesses a second transforming output ZA of a further capacitive fixed load C3 which is proportional to the voltage present at the capacitive fixed load C2, or to the load alternating current IL, and which is temporally detected as an auxiliary signal HSL with regard to the phase of reaching its voltage or current zero crossing ND, and/or a defined reference value RW, and/or its maximum value MW, so that either only the amplitude MW of a temporal reference value RW, and/or also/only the phase of auxiliary signal ND, or additionally, in the event of the phase detection, also a phase shift relative to the zero crossing of a switch NDS of switch unit SE, or at the turn-off moment of a switch of switch unit NSA is detected, and so that a phase signal and/or an amplitude signal are compared with an associated reference value and are formed, via an amplifier/regulator VR, into an error signal SF which drives a controlled oscillator GO which generates a frequency for controlling the switch unit, and/or generates, independently of or depending on the control frequency, the turn-on moment EM of the controlled oscillator GO driving the switch unit SE, so that either the zero crossing of switch NDS relative to the zero crossing of auxiliary signal HSL of a second transformer output ZA comprises a steadily constant phase difference PD<30° with regard to current-current of with regard to voltage-voltage by regulating output voltage, output current, or output power, by turning on the switch approximately in the zero crossing of the switch current or switch voltage NDS, or so that a regulation is made to a variable load-dependent phase difference PDL between the switch current or switch voltage zero crossing NDS and the zero crossing ND of auxiliary signal HSL by mapping a phase difference between the auxiliary signal HSL and the output signal ASL to the variable load-dependent phase difference PDL in a linear or non-linear manner, and by simultaneously setting the frequency of the controlled oscillator GO from the comparison of a temporal reference value RW or of the maximum value MW with a variable or fixed frequency RW via the regulator VR such that a variable relative turn-on time of the switch unit with regard to the turn-on moment EM will always result from a phase comparison, and so that a frequency of the controlled oscillator GO driving the switch unit SE will always result from a reference value comparison.

In accordance with a further aspect of the present invention, in the described resonance converter, the second transforming output ZA is a voltage transformer parallel to the output of the first transforming output AS.

In accordance with a further aspect of the present invention, in the regulated resonance converter, the second transforming output ZA is a current transformer connected in series with the output of first transforming output AS.

In accordance with a further aspect of the present invention, the regulated resonance converter is designed such that the second transforming output ZA is supplied by a second transformer N3 located in load network LN and connected in series with a first transformer N2 located in the load network and supplying output AS.

In accordance with a further aspect of the present invention, the regulated resonance converter is designed such that a capacitance C3 is connected in parallel with the second transforming output ZA and a with second transformer N3 located in the load network LN, and that at the same time, a capacitance C2 is connected in parallel with a first transformer N2 located in the load network and supplying output AS.

In accordance with a further aspect of the present invention, the regulated resonance converter is designed such that load network LN is a piezoelectric transformer.

In accordance with a further aspect of the present invention, the regulated resonance converter is designed such that switch unit SE is a half-bridge circuit having two serial power switches connected to the power source QU by nodes A and B, and load network LN being connected to the central node C thereof and to one of terminals A or B of power source QU by nodes B and C/D.

In accordance with a further aspect of the present invention, the regulated resonance converter is designed such that switch unit SE is a half-bridge circuit having two serial power switches connected to the power source QU, and load network LN being additionally connected, in series, to the central node C thereof and to one of terminals A or B of power source QU via an inductance and/or a capacitance by means of the respective terminals C and D, in that the capacitance or inductance is located either between node C of the half-bridge circuit and node C/D of the load network or/and between one of nodes A or B of power source QU and node B of load network LN.

In accordance with a further aspect of the present invention, the regulated resonance converter is designed such that switch unit SE is a half-bridge circuit having two serial power switches connected to the power source QU, and load network LN being connected to the central node C thereof and to one of the terminals of power source QU, in parallel with an inductance or/and a further parallel capacitance, which is connected, by its respective nodes C and D, between nodes B and C/D of load network LN.

In accordance with a further aspect of the present invention, the regulated resonance converter is designed such that switch unit SE is a series connection consisting of an inductance and a serial power switch S which are connected to power source QU by nodes A and B such that the series connection of the inductance and of the power switch S is located between nodes A and B of power source QU, and that its central node C is connected to one of terminals C/D or B of load network LN, and that the other node B of load network LN is connected to that node of power source QU to which power switch S is directly connected.

In accordance with a further aspect of the present invention, the regulated resonance converter is designed such that input source QU, switch unit SE of input network EN, load network LN and load AN form a circuit of class E in accordance with N. O. Sokal (1975).

In accordance with a further aspect of the present invention, the regulated resonance converter is designed such that power source QU is a voltage source with a predominantly small internal resistance.

In accordance with a further aspect of the present invention, the regulated resonance converter is designed such that output network AN consists of an ohmic resistor directly connected to nodes E and F of output AS of load network LN.

In accordance with a further aspect of the present invention, the regulated resonance converter is designed such that output network AN consists of a rectifier bridge BR and an ohmic resistor RL connected at the output of rectifier bridge BR, rectifier bridge BR being directly connected, by its input nodes E and F, to nodes E and F of load network LN.

In accordance with a further aspect of the present invention, the regulated resonance converter is designed such that a smoothing capacitance CO is connected in parallel with ohmic resistor RL.

In accordance with a further aspect of the present invention, the regulated resonance converter is designed such that a re-detection circuit RKN is connected at the output ZA of load network LN, the re-detection circuit RKN representing a highly resistive, constant impedance for load network LN, so that in comparison with output AS, only a small amount of power is taken.

In accordance with a further aspect of the present invention, the regulated resonance converter is designed such that auxiliary signal HSL of auxiliary output ZA is sampled with regard to its zero crossing, and that controlled oscillator GO having oscillator part VCO is turned on with a constant phase delay PS.

In accordance with a further aspect of the present invention, the regulated resonance converter is designed such that phase delay PS ranges between 50° and 80°.

In accordance with a further aspect of the present invention, the regulated resonance converter is designed such that phase delay PS ranges between 60° and 70°.

In accordance with a further aspect of the present invention, the regulated resonance converter is designed such that the phase delay of driver TR, inclusive of the switch delay of the switch unit of switch S or of switches S1 and S2 together, ranges between 10° and 40°.

In accordance with a further aspect of the present invention, the regulated resonance converter is designed such that the phase delay of driver TR, inclusive of the switch delay of the switch unit of switch S or of switches S1 and S2 together, ranges between 20° and 30°.

In accordance with a further aspect of the present invention, the regulated resonance converter is designed such that phase delay PS and the phase delay of driver TR, inclusive of the switch delay of the switch unit of switch S or of switches S1 and S2 together, range between 80° and 100°.

In accordance with a further aspect of the present invention, the regulated resonance converter is designed such that phase delay PS and the phase delay of driver TR, inclusive of the switch delay of the switch unit of switch S or of switches S1 and S2 together, range between 85° and 95°.

In accordance with a further aspect of the present invention, the regulated resonance converter is designed such that phase delay PS and the phase delay of driver TR, inclusive of the switch delay of the switch unit of switch S or of switches S1 and S2 together, are smaller than or equal to an angle of 90°, plus the phase delay resulting from the shift of the zero crossing of switch current IS relative to load current IL, so that the turn-on moment occurs approximately at the moment of the zero crossing of switch current IS, or with a phase delay of maximally 30° beforehand, in accordance with claim 1.

In accordance with a further aspect of the present invention, the regulated resonance converter is designed such that auxiliary signal HSL is sampled, with regard to its maximum value, by a peak detector PED.

In accordance with a further aspect of the present invention, the regulated resonance converter is designed such that auxiliary signal HSL is a voltage.

In accordance with a further aspect of the present invention, the regulated resonance converter is designed such that the sample of auxiliary signal HSL is compared with a constant reference value RW.

In accordance with a further aspect of the present invention, the regulated resonance converter is designed such that reference value RW is a voltage UREF.

In accordance with a further aspect of the present invention, the regulated resonance converter is designed such that the sample of auxiliary signal HSL is compared with a variable reference value RW.

In accordance with a further aspect of the present invention, the regulated resonance converter is designed such that variable reference value RW increases when a high ohmic load resistance RL of output network AN is present, and that RW decreases when a small ohmic load resistance RL of output network AN is present.

In accordance with a further aspect of the present invention, the regulated resonance converter is designed such that variable reference value RW increases approximately with the reciprocal of the logarithm of the decreasing ohmic load resistance RL of output network AN.

In accordance with a further aspect of the present invention, the regulated resonance converter is designed such that variable reference value RW increases when the time duration TREV of current IS, flowing in a negative direction during the turn-on time, of switch S or of one of switches S1 or S2 of switch unit SE becomes shorter than time duration TONF of current IS, flowing in a positive direction, of switch S or of one of switches S1 or S2 of switch unit SE.

In accordance with a further aspect of the present invention, the regulated resonance converter is designed such that variable reference value RW decreases to a constant final value EW when the time duration TREV of current IS, flowing in a negative direction, of switch S or of one of switches S1 or S2 of switch unit SE becomes equal to or only marginally shorter than time duration TONF of current IS, flowing in a positive direction during the turn-on time, of switch S or of one of switches S1 or S2 of switch unit SE.

In accordance with a further aspect of the present invention, the regulated resonance converter is designed such that variable reference value RW is formed from a linear descending or ascending function FKT, wherein the ratio VRE of time durations TREV and TONF has been formed, as an input value, by a time comparison unit RTM, in that the zero crossing of switch current IS is double-detected by a reverse current comparator KR, and that the time interval TREV represents the time duration between the two zero crossings of switch current IS, and the time interval TONF represents the time duration between the second zero crossing of switch current IS, by switching the reverse current comparator KR, and the turn-off pulse of signal PWM of the VCO (see FIG. 16A).

In accordance with a further aspect of the present invention, the regulated resonance converter is designed such that variable reference value RW as a function UREF is formed such that with a maximum output load resistance RL, a minimum value UREFMIN arises due to function FKT, which minimum value UREFMIN increases linearly with the logarithm of the output load resistance RL, and an approximately identical output voltage UO results independently of input voltage source QUSP, voltage UREF being formed in that an input-voltage corrected value UREF arises with a maximum load resistance RLMAX, and in that—with a minimum load resistance RLMIN and a minimum input voltage UMIN of input source QUSP—a ratio VRE of approximately zero leads to the maximum value UREFMAX of reference value UREF, and in that with a minimum load resistance RLMIN and a maximum input voltage UMAX of input source QUSP, a ratio VRE of approximately ½ leads to the same maximum value UREFMAX of reference value UREF (see FIGS. 16B and 16C, 16D and 16E).

In accordance with a further aspect of the present invention, the regulated resonance converter is designed such that variable reference value RW has, as the function UREF, a ratio VRE of maximum value UREFMAX to minimum value UREFMIN of between 2.0 and 2.3.

In accordance with a further aspect of the present invention, the regulated resonance converter is designed such that variable reference value RW has, as the function UREF, a ratio VRE of maximum value UREFMAX to minimum value UREFMIN of between 2G and 2.2.

In accordance with a further aspect of the present invention, the regulated resonance converter is designed such that variable reference value RW has, as the function UREF, a ratio VRE of maximum value UREFMAX to minimum value UREFMIN of between 2.13 and 2.15.

In accordance with a further aspect of the present invention, the regulated resonance converter is designed such that variable reference value RW has, as the function UREF, a ratio VRE of maximum value UREFMAX to minimum value UREFMIN of about 2.14.

In accordance with a further aspect of the present invention, the regulated resonance converter is designed such that the difference between the output signal of peak detector PED and reference signal UREF of reference value RW is switched to the input of a regulator VR which generates, at its output, control signal f for driving oscillator part VCO of controlled oscillator GO.

In accordance with a further aspect of the present invention, the regulated resonance converter is designed such that regulator VR is a PI regulator.

In accordance with a further aspect of the present invention, the regulated resonance converter is designed such that with a phase difference PD of more than a maximum value PDMAX between turn-off signal PWM of controlled oscillator GO and the zero crossing of auxiliary signal HSL, a burst mode of the oscillator is turned on, and that the burst mode is turned off at a value PDRET, of phase difference PD, which is reached, in turn, during the burst mode.

In accordance with a further aspect of the present invention, the regulated resonance converter is designed such that maximum value PDMAX of phase difference PD ranges between 80° and 50°.

In accordance with a further aspect of the present invention, the regulated resonance converter is designed such that maximum value PDMAX of phase difference PD ranges between 70° and 60°.

In accordance with a further aspect of the present invention, the regulated resonance converter is designed such that the smaller value PDMAX of phase difference PD ranges between 75° and 45°.

In accordance with a further aspect of the present invention, the regulated resonance converter is designed such that the smaller value PDMAX of phase difference PD ranges between 65° and 55°.

In accordance with a further aspect of the present invention, the regulated resonance converter is designed such that inductance LSE of the switch unit forms, along with input capacitance C1 of load network LN, a resonant frequency which is close to the resonant frequency of alternating current source LWQ.

In accordance with a further aspect of the present invention, the regulated resonance converter is designed such that inductance LSE of the switch unit forms, along with input capacitance C1 of load network LN, a resonant frequency which has a ratio of between 0.9 and 1.1 to the resonant frequency of alternating current source LWQ.

In accordance with a further aspect of the present invention, the regulated resonance converter is designed such that inductance LSE of the switch unit forms, along with input capacitance C1 of load network LN, a resonant frequency which has a ratio of between 0.75 and 1.25 to the resonant frequency of alternating current source LWQ.

In accordance with a further aspect of the present invention, the regulated resonance converter is designed such that inductance LSE of the switch unit forms, along with input capacitance C1 of load network LN, a resonant frequency which has a ratio of between 0.1 and 0.9 to the resonant frequency of alternating current source LWQ.

In accordance with a further aspect of the present invention, the regulated resonance converter is designed such that inductance LSE of the switch unit forms, along with input capacitance C1 of load network LN, a resonant frequency which has a ratio of between 0.1 and 1.0 to the resonant frequency of alternating current source LWQ.

In accordance with a further aspect of the present invention, the regulated resonance converter is designed such that switch S or switches S1 and S2 of switch unit SE is/are an IGBT.

In accordance with a further aspect of the present invention, the regulated resonance converter is designed such that switch S or switches S1 and S2 of switch unit SE is/are a field-stop IGBT having a low tail current and a short tail time.

In accordance with a further aspect of the present invention, the regulated resonance converter is designed such that a phase comparison between an output voltage or output current which is transformationally fed back to the input and the switch current is effected to obtain a phase difference PD, and that the amplitude is detected from one of the quantities of output voltage or output current, the amplitude being compared with a reference value for generating an error signals FS, and that a controlled oscillator GO, which controls switch unit SE, is driven such that the duty cycle is tracked, in a controlled linear or non-linear function, with the frequency, and that an input signal for controlling the controlled oscillator GO is generated from the comparison of error signal FS with phase difference PD (cf. FIG. 5 and FIG. 7A). The configuration mentioned is also referred to, in some places, as "configuration A".

In accordance with a further aspect of the present invention, the regulated resonance converter is designed such that a phase comparison between auxiliary tapping UE of load network LRK which is transformationally fed back to the input and the switch current is effected to obtain a phase difference PD, and that the amplitude is detected from one of the quantities of auxiliary tapping UE of load network LRK (auxiliary voltage UE) or of the output current of load network LRK which is transformationally fed back to the input, the amplitude being compared with a reference value for generating an error signals FS, and that a controlled oscillator GO, which controls switch unit SE, is driven such that the duty cycle is carried along, in a controlled linear or non-linear function, with the frequency, and that an input signal for controlling the controlled oscillator GO is generated from the comparison of error signal FS with phase difference PD (cf. FIG. 9, FIG. 11 and FIG. 12). The configuration mentioned is also referred to, in some places, as "configuration B".

It has thus been found, in accordance with one aspect of the present invention, that a resonance choke coil-free half-bridge converter or a class-E converter may be dimensioned, using a PT as a load network, such that solely the phase difference between a switch current, on the one hand, and the load-side alternating current of the load network, or the load-side alternating voltage of the load network, on the other hand, enables the magnitude of the load resistance to be determined. When, furthermore, the magnitude of the input voltage is known, a regulation or control of the output voltage of a resistive load connected downstream from a rectifying circuit may be achieved which uses these possibilities and avoids utilization of an optocoupler or of another galvanically separating device.

In accordance with a further aspect, the present invention includes a resonance converter, wherein a voltage which is rectified at the output load and is proportional to the output voltage (and has been generated, for example, via a regulator), or a rectified current which is proportional to the output current (and has been generated, for example, via a regulator), is used via a direct-current feedback such as, for example, a galvanically separating optocoupler in order to be initially compared with a reference value $U_{RO}$, and wherein the comparison result of the direct-current feedback is thereafter supplied to provide, from the feedback output thereof, a signal which is directly supplied to a voltage-controlled oscillator (VCO) so as to regulate the output voltage to have a constant value, and that, in addition, either a) an auxiliary signal obtained from the resonant transformer arrangement is used to operate a synchronization means designed to synchronize a turn-on of the switch unit by the driver with regard to a phase position using the auxiliary signal, or b) that no auxiliary signal is used, but the duty cycle of the switch unit has a fixed, preferably linear relation to the frequency of the voltage-controlled oscillator (VCO).

In accordance with a further aspect, the present invention includes a resonance converter, wherein the duty cycle takes on a value of between 0.4 and 0.5 (or, alternatively, of between 0.3 and 0.6) at a minimum frequency of the voltage-controlled oscillator (VCO) (and hence of the driving switch unit), and wherein the duty cycle takes on a value of between 0.1 and 0.2 (or, alternatively, between 0.05 and 0.25) at a maximum frequency of the voltage-controlled oscillator (VCO).

In accordance with a further aspect, the present invention includes a resonance converter, wherein a voltage which is rectified at the output load and is proportional to the output voltage (present across the load), or a rectified current proportional to the output current (flowing through the load) is initially compared with a reference value UR0, wherein the result of the comparison is supplied to a regulator (e.g. a proportional regulator, an integral regulator or a proportional-integral regulator), and wherein the output signal of the regulator is fed back via a galvanically separating feedback element (e.g. an optocoupler) so as to drive a VCO (or to control the frequency of the VCO). For example, the resonance converter is designed to generate a higher frequency in the event of an increasing output voltage (or increasing output current) present at the load resistor, and vice versa.

It shall be pointed out that the above aspects may be essentially combined in any manner desired, specific advantages resulting from certain combinations, of course, as has been discussed in detail in the preceding configurations.

It shall also be noted that FIG. 2F shows a current phase regulation leaning on WO 2004/055962 A2. FIG. 2G depicts a further development of the phase control and phase regulation by an auxiliary electrode of the piezo transformer (converter), a galvanic separation being achieved between the output and the input without having to feed back the load side via a galvanically separating element. In addition, an input-voltage detection is shown which, along with a reference source, generates a suitable linear function $\phi_{Z0min}$) subtracted from a linear function of the phase difference generated from the switch current and the load current, and which generates a relative or absolute turn-on time Don and, thus, an associated frequency.

FIG. 10 shows an embodiment of a class-E converter having a control IC, an IGBT with a reverse diode, a piezo transformer PT having an auxiliary electrode for generating a current supply for driving the integrated circuit (IC) and for recognizing the load-current zero crossing, as well as several input elements.

FIG. 15 shows a configuration of the input wiring of terminals, or pins, VU or V3 according to FIG. 7B. Such a simplification results, as has already been known as prior art, in saving one voltage divider resistor, respectively. In addition, the voltage values present at pin V3 which are negative in the invention presented are avoided in that the voltage is regulated to be zero, and in that a small current is fed in for this purpose. In addition, this circuit is low-loss, however, since the current fed in makes up only a fraction of load current $I_L$.

It may also be stated, in summary, that the invention report presented relates to three fundamentally new configurations and methods for regulated or controlled operation of narrow-band load resonance converters, preferably, but not necessarily, such narrow-band load resonance converters which have high-Q load circuits.

A first configuration, also referred to as "configuration A", is illustrated in FIGS. 5 and 7A in terms of circuit engineering. The first configuration uses a parallel, broad-band tapping or coupling-out of the alternating output voltage of the converter, or piezo transformer PT, or of the alternating output current of the converter, or piezo transformer PT, to generate a phase signal between the switch current zero crossing and the load current zero crossing or the load voltage with regard to achieving a reference, or a reference value, the phase signal leading, in accordance with equations (4) and (5), along with a signal derived from the input voltage of the converter, to a controlled turn-on time of the converter which generates a constant output voltage, a constant output current or a constant output power.

Compared to the prior art, the main advantages of this configuration are a saving in terms of a galvanically separating feedback from the load to the input, a fast reaction to load and input-voltage jumps by observing the phase position, and, thus, the output current, as well as applicability within wide limits of load and input voltage. What is disadvantageous, however, is the fact that only one control is used, which, for reasons relating to tolerance, generates an only approximated accuracy of the output characteristic to be achieved. What is also disadvantageous is a noise suppression of the switch current that may possibly be required, the switch current possibly containing parasitic harmonics in addition to a fundamental wave, which may lead to the control slowing down and, moreover, to additional expense with regard to filtering.

A second configuration, also referred to as "configuration B", is also defined in accordance with the circuits according to FIGS. 5 and 7A, a coupled-out auxiliary voltage from the converter and/or piezo transformer PT being additionally evaluated, however, with regard to its maximum voltage value, so that this value may be regulated in a constant manner so as to achieve a constant output voltage. The associated control concept is explained in FIG. 9 and FIG. 11, as well as FIG. 12, and is depicted in FIGS. 7A and 10 with regard to integrated circuit configurations.

In addition to the advantages of "configuration A" over the prior art, "configuration B" has the advantage of a regulation, and thus of increased accuracy, of the output quantities, i.e., for example, the output voltage. However, what is also disadvantageous is a noise suppression, which may possibly be required, of the switch current to be evaluated with regard to its phase, as well as the fact that such resonance converters having high-Q load circuits do not always enable a broad-band coupling-out of the output alternating voltage or the output alternating current to be effected in a simple manner unless a sinusoidal load current and a sinusoidal load voltage are given. In the event of an output-side rectification, however, an additional converter is required if the converter used does not allow the broad-band characteristic. On the other hand, the configuration mentioned may well be applied when an accurate output voltage is to be achieved and when broad-band coupling-out of the output voltage of the converter is not possible in a simple manner, such as in conventional resonance transformation. Further, the principle circuit diagram according to FIG. 2F applies to "configuration B". Both configurations (configuration A and configuration B) are further topology-independent with regard to the circuits, or input circuits, depicted in FIGS. 1B, 1C, 1D as well as 2A, 2B, 2C and 2D.

A third configuration, also referred to as "configuration C", is illustrated in the principle circuit diagram according to FIG. 2G as well as, additionally, in FIG. 16G. The third configuration uses serial, narrow-band coupling-out of the load current of a resonance converter, typically in the form of a separate tapping of a piezo transformer. The third configuration exhibits those advantages over the prior art which have been described with reference to configurations A and B, and further achieves a number of further objects, or entails a number of further advantages. A topology-independent turn-on is achieved in an optimum point by performing a phase coupling (PLL) of the switching frequency to the load resonant frequency by the load current zero crossing or another phase angle obtained from the tapping, with regard to a reference, or to a reference value. Since the coupled-out auxiliary voltage is always sinusoidal in the event of a high-Q load circuit, a noise can be filtered out by the load circuit itself (piezo transformer PT), and the regulation now is determined, with regard to its speed, only by the period duration of the converter in which the switches can react.

In addition, the phase and the amplitude of the coupled-out auxiliary signal are used to achieve a regulation to a constant current, a constant voltage or a constant power in that the regulation is performed either to a constant amplitude of the auxiliary signal (for example, a constant output current with a high load, or a constant output voltage with a small load), or a phase offset between the auxiliary signal and the turn-off moment of the switch is used so as to generate, together with the evaluation of the input voltage of the converter, a tracking (control) of the reference signal for evaluating the amplitude of the auxiliary signal, which amplitude again generates a desired regulation characteristic (constant output voltage, constant output current or constant output power) in the range between small and large loads.

An implementation in terms of circuit engineering with regard to an integrated concept is depicted in FIG. 7B, with regard to the waveforms and electrical functional circuit diagrams is depicted in FIGS. 13A-13F, and with regard to the block diagrams and a realization in terms of circuit engineering, of the control and regulation of an inventive arrangement is shown in FIGS. 14 and 15.

In accordance with the simplified configuration according to FIGS. 16G, 16A, 16B, 16C, 16D, 16E and 16F, reference sampling is performed at a maximum value (peak) only, and no phase sampling is performed from a constant reference value for regulating the frequency. Phase synchronization is achieved by a suitable phase shift PS. The burst-mode regulator, or the burst mode control, is related, according to FIG. 16G, to phase shift PD, which, according to FIG. 14, is detected as a burst mode control via angle $\phi_{Z0min}$. Optionally, the value of reference voltage $U_{REF}$ of variable reference RW may be set, according to FIG. 16G, via a correction function. When determining the correction function, value $U_{REF}$ of variable reference RW is achieved, for example, by means of a comparison of reverse time $t_{rev}$ of switch current $I_S$ and of positive turn-on time $t_{onf}$ of switch current I. Reverse time $t_{rev}$, or a reverse-time/forward-time ratio $v_{RE}$ is dependent on the input voltage, as has been explained with reference to FIGS. 16B and 16C, 16D and 16E.

Thus, the present invention relates to controlling electric loads by means of a regulated resonance converter. Such a resonance converter transmits a power from the source to the load only by means of alternating quantities (alternating current or alternating voltage), and in the inventive configuration preferably possesses a capacitive load and a resistive load in parallel connection. The resistive load may be formed by a rectifying circuit by means of which a sinusoidal alternating quantity transmitted by the converter is rectified and passed on to a direct-voltage load capacitance, a changing, or variable, resistive load being coupled in parallel with the direct-voltage load capacitance. A feedback of the output quantities present at the resistive load itself (current or voltage) via galvanically separating (or galvanically non-separating) elements (such as optocouplers or electromagnetic transformers) becomes avoidable in that full regulation of the output voltage (or of the output current or of an output power) is achieved either only by detecting the input voltage and/or a current in the switch unit of the converter, or, in addition to the latter, by detecting a current of the load network which is in phase with the output current, or a quantity proportional to the alternating output voltage of the load network. All required signals from the load network, galvanically separated from the load, are detected and fed back to the control circuit of the switch unit located on the primary side. Thus, the invention solves, among other things, the technical problem of constructing a galvanically separating power supply unit which is formed by employing a resonance converter and which requires—by analogy with the primary-current regulation which is possible when using a flyback converter—no galvanically separating feedback of the output voltage or of the output current.

The invention claimed is:

1. A resonance converter for providing an output voltage or an output current for a load network based on an energy supplied by an energy source, the resonance converter comprising:

a resonant transformer arrangement having an input for receiving an input-side excitation, an output for providing the output voltage or the output current for the load network, and an auxiliary output for transformationally providing a signal which is essentially proportional to the output voltage provided by the resonant transformer arrangement, or to the output current provided by the resonant transformer arrangement;

a switch unit designed to generate the input-side excitation of the resonant transformer arrangement from the energy of the energy source, the switch unit comprising a switch; and a control circuit designed to set or to regulate an operating frequency, with which the switch unit is switched, in dependence on a phase shift between a current flowing through the switch or a current flowing from the switch unit to the input of the resonant transformer arrangement, on the one hand, and on the signal present at the auxiliary output, on the other hand.

2. The resonance converter according to claim 1, wherein the auxiliary output is designed to provide an auxiliary signal which is essentially proportional to the output voltage, which further includes an output current detector for determining a load current information about the output current or a current in the load network, a logarithmizer for taking the logarithm for determining a logarithmized load current information by forming a logarithm of the load current information, a phase reference value provider for deriving a phase reference value from the logarithmized load current information by applying a linear function to the logarithmized load current information, and a regulator, the regulator being designed to regulate the operating frequency so as to minimize a difference between the phase shift and the phase reference value.

3. The resonance converter according to claim 2, wherein the logarithmizer and the phase reference value provider are designed to provide, with a higher output current or current in the load network, a smaller phase reference value than with a smaller output current or current in the load network.

4. The resonance converter according to claimed 1, wherein the auxiliary output is designed to provide an auxiliary signal which is essentially proportional to the output voltage, which includes a reference value comparator designed to compare the auxiliary signal with a predefined reference value and to detect reference crossing moments at which the auxiliary signal crosses the predefined reference value, and a zero crossing detector designed to detect zero crossing moments at which the current flowing through the switch, or the current flowing from the switch unit to the input of the resonant transformer arrangement, comprises zero crossings, and wherein the control circuit is designed to determine a phase shift between the reference crossing moments and the zero crossing moments to detect whether at least one reference crossing moment is present within a predefined time interval, so as to set a phase reference as a function of whether at least one reference crossing moment is present in the predefined time interval, and to regulate the operating frequency as a function of a difference between the phase shift and the phase reference.

5. The resonance converter according to claim 4, wherein the control circuit is designed to regulate the operating frequency so as to minimize the difference between the phase shift and the phase reference.

6. The resonance converter according to claim 1, wherein the auxiliary output is designed to provide an auxiliary signal essentially proportional to the output voltage,
  which includes a first reference value comparator designed to detect zero crossing moments of the auxiliary signal,
  a second reference value comparator designed to compare the auxiliary signal with a predefined reference value different from zero, and to provide an output signal which indicates whether the auxiliary signal is smaller or larger than the reference value, and
  a zero crossing detector designed to detect zero crossing moments at which the current flowing through the switch, or the current flowing from the switch unit to the input of the resonant transformer arrangement, comprises zero crossings, and
  wherein the control circuit is designed to determine a phase shift between the zero crossing moments of the auxiliary signal and the zero crossing moments of the current,
  to generate a phase reference value as a function of the output signal of the second reference value comparator, and
  to regulate the operating frequency based on the phase shift and the phase reference value.

7. The resonance converter according to claim 6, wherein the control circuit is designed to specify the direction of a change in the operating frequency as a function of the phase reference value, and to specify an amount of a change in the operating frequency as a function of the phase shift.

8. The resonance converter according to claim 1, further comprising a pump circuit connected in series to the input of the resonant transformer arrangement, wherein the control circuit is designed to sample a voltage curve across the pump circuit, to determine information about a source voltage, provided by the energy source, or a resonant frequency of the switch unit, and to determine, on the basis thereof, a correction variable and superimpose it onto the phase shift in a linear manner.

9. The resonance converter according to claim 1, which further comprises a pump circuit connected in series to the input of the resonant transformer arrangement,
  which includes a driver which is controllable to switch the control unit,
  and wherein the control circuit is further designed to generate a reverse detection signal when a current flowing through a switch of the switch unit falls below a predefined current value or flows in a reverse direction,
  to provide a turn-on signal to the driver to define turn-on moments at which the driver is to turn on the switch unit,
  to compare the voltage present across the pump circuit with a predefined pump voltage reference value,
  to generate a pump voltage reference comparison signal indicating whether the voltage present across the pump circuit is larger or smaller than the pump voltage reference value,
  to delay the pump voltage reference comparison signal to obtain a delayed pump voltage reference comparison signal, and
  to generate the turn-on signal by an OR operation of the reverse detection signal and of the delayed pump voltage reference comparison signal.

10. The resonance converter according to claim 9, wherein the control circuit is designed to delay the pump voltage reference comparison signal by a phase delay ranging between 80° and 100°, based on an operating frequency.

11. The resonance converter according to claim 1, wherein a voltage rectified at the output load and proportional to the output voltage, or a rectified current proportional to the output current is used via a direct current feedback, such as a galvanically separating optocoupler, to provide a reference value, and thus to regulate the output voltage or the output current, present at the output-side resistive load, to have a constant value.

12. A resonance converter for providing an output voltage or an output current for a load network based on an energy provided by an energy source, the resonance converter comprising:
  a resonant transformer arrangement having an input for receiving an input-side excitation, an output for providing the output voltage or the output current, and an auxiliary output for transformationally providing an auxiliary signal, the amplitude of which is essentially proportional to the output voltage provided by the resonant transformer arrangement, the amplitude of which is essentially proportional to the output current provided by the resonant transformer arrangement, or the amplitude of which is essentially proportional to a load alternating current flowing through a resonant circuit of the resonant transformer arrangement;
  a switch unit designed to generate the input-side excitation of the resonant transformer arrangement from the energy of the energy source; and
  a regulator circuit, the regulator circuit comprising a comparator adapted to receive the auxiliary signal, to compare it with a predefined reference value and to provide comparison information indicating whether the auxiliary signal is larger or smaller than the reference value,
  the regulator circuit further including a switching detector designed to detect whether the comparison information changes its state within a predefined time interval, and
  the regulator circuit being designed to change an operating frequency, the period duration of which determines time intervals between turn-on moments or turn-off moments of the switch unit, from a resonant frequency of the resonant transformer arrangement when the detector detects that the comparison information has changed its state within the predefined time interval, and to change the operating frequency toward the resonant frequency when the detector detects that the comparison information has not changed its state within the predefined time interval.

13. The resonance converter according to claim 11, wherein a voltage rectified at the output load and proportional to the output voltage, or a rectified current proportional to the output current is used via a direct current feedback, such as a galvanically separating optocoupler, to provide a reference value, and thus to regulate the output voltage or the output current, present at the output-side resistive load, to have a constant value.

14. A control circuit for a switch unit of a clocked power supply circuit, the switch unit being designed to effect input-side excitation of a resonant transformer arrangement, the control circuit comprising:
  an input for receiving an auxiliary signal from the resonant transformer arrangement, the auxiliary signal exhibiting an essentially fixed phase relation to a load alternating current flowing through a resonant circuit of the transformer arrangement;

a phase detector designed to detect reference crossing moments when the auxiliary signal crosses a predefined reference value;

a driver controllable to switch the switch unit;

a synchronizer designed to synchronize a turn-on of the switch unit by the driver with regard to a phase position with the auxiliary signal so as to achieve a turn-on of the switch unit within a predetermined time interval around a zero crossing of a voltage present across the switch unit, or of a current flowing through the switch unit, the synchronizer being designed to receive information about the reference crossing moments from the phase detector, and to provide a turn-on signal to the driver with a fixed phase delay at the reference crossing moments, so as to define turn-on moments at which the driver is to turn on the switch unit;

a detector designed to determine an amplitude information which depends on an amplitude or a mean value of the auxiliary signal; and a regulator designed to change an operating frequency in dependence on the amplitude information supplied by the detector, and to determine a period duration between turn-off moments at which the driver is to turn off the switch unit as a reciprocal of the operating frequency;

wherein a voltage rectified at the output load and proportional to the output voltage, or a rectified current proportional to the output current is used via a direct current feedback, such as a galvanically separating optocoupler, to provide a reference value, and thus to regulate the output voltage or the output current, present at the output-side resistive load, to have a constant value.

* * * * *